US009077165B2

(12) United States Patent
Temblador et al.

(10) Patent No.: US 9,077,165 B2
(45) Date of Patent: *Jul. 7, 2015

(54) ELECTRICAL ACCESSORIES AND ASSOCIATED METHODS OF USE AND MANUFACTURE

(71) Applicant: SOUTHWIRE COMPANY, LLC, Carrollton, GA (US)

(72) Inventors: Richard Temblador, Carrollton, GA (US); Mark Doughty Dixon, Carrollton, GA (US); Randy Deon Kummer, Villa Rica, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,746

(22) Filed: Feb. 21, 2014

(65) Prior Publication Data

US 2014/0231130 A1 Aug. 21, 2014

Related U.S. Application Data

(63) Continuation-in-part of application No. 13/232,634, filed on Sep. 14, 2011, now Pat. No. 8,669,471.

(60) Provisional application No. 61/382,723, filed on Sep. 14, 2010, provisional application No. 61/477,021, filed on Apr. 19, 2011.

(51) Int. Cl.
*H02G 3/08* (2006.01)
*H02G 3/10* (2006.01)
*H02G 3/12* (2006.01)

(52) U.S. Cl.
CPC ........... *H02G 3/085* (2013.01); *Y10T 29/49826* (2015.01); *H02G 3/086* (2013.01); *H02G 3/10* (2013.01); *H02G 3/126* (2013.01)

(58) Field of Classification Search
CPC ......... H02G 3/085; H02G 3/08; H02G 3/086; H02G 3/081; H02G 3/10; H02G 3/126; H02G 3/125; Y10T 29/49826; H05K 5/00; H05K 5/02
USPC ............. 174/480, 481, 50, 53, 57, 58, 61, 63, 174/666; 220/3.2–3.9, 4.02; 248/906, 200, 248/205.1, 213.2; 52/220.1, 220.8
See application file for complete search history.

(56) References Cited

U.S. PATENT DOCUMENTS 4,062,512 A * 12/1977 Arnold ........................ 248/906
4,447,030 A * 5/1984 Nattel ........................ 248/906
(Continued)

*Primary Examiner* — Angel R Estrada
(74) *Attorney, Agent, or Firm* — Sutherland Asbill & Brennan LLP

(57) ABSTRACT

Electrical accessories and associated methods of use and manufacture are shown and described. In one example embodiment, a system includes a plurality of electrical junction boxes. Each electrical junction box includes at least one wall with a pair of spaced-apart holes, wherein the holes are sized and shaped to receive a pair of corresponding mounting devices. The system also includes at least one mounting bracket. The mounting bracket includes a pair of spaced-apart mounting devices, wherein the mounting devices are sized and shaped to protrude through the pair of corresponding spaced-apart holes in the plurality of electrical junction boxes. At least one of the plurality of electrical junction boxes is maintained in a relative stationary position with respect to the at least one bracket when the pair of spaced-apart mounting devices protrudes through the respective pair of spaced-apart holes in the wall of the at least one electrical junction box.

24 Claims, 127 Drawing Sheets

(56) References Cited

U.S. PATENT DOCUMENTS

| | | | |
|---|---|---|---|
| 4,536,612 A * | 8/1985 | Domigan | 52/220.1 |
| 5,066,832 A * | 11/1991 | Clarey et al. | 174/50 |
| 5,191,171 A * | 3/1993 | Bordwell | 174/666 |
| 5,444,183 A * | 8/1995 | Gehrs et al. | 174/666 |
| 6,274,809 B1 * | 8/2001 | Pudims et al. | 174/50 |

* cited by examiner

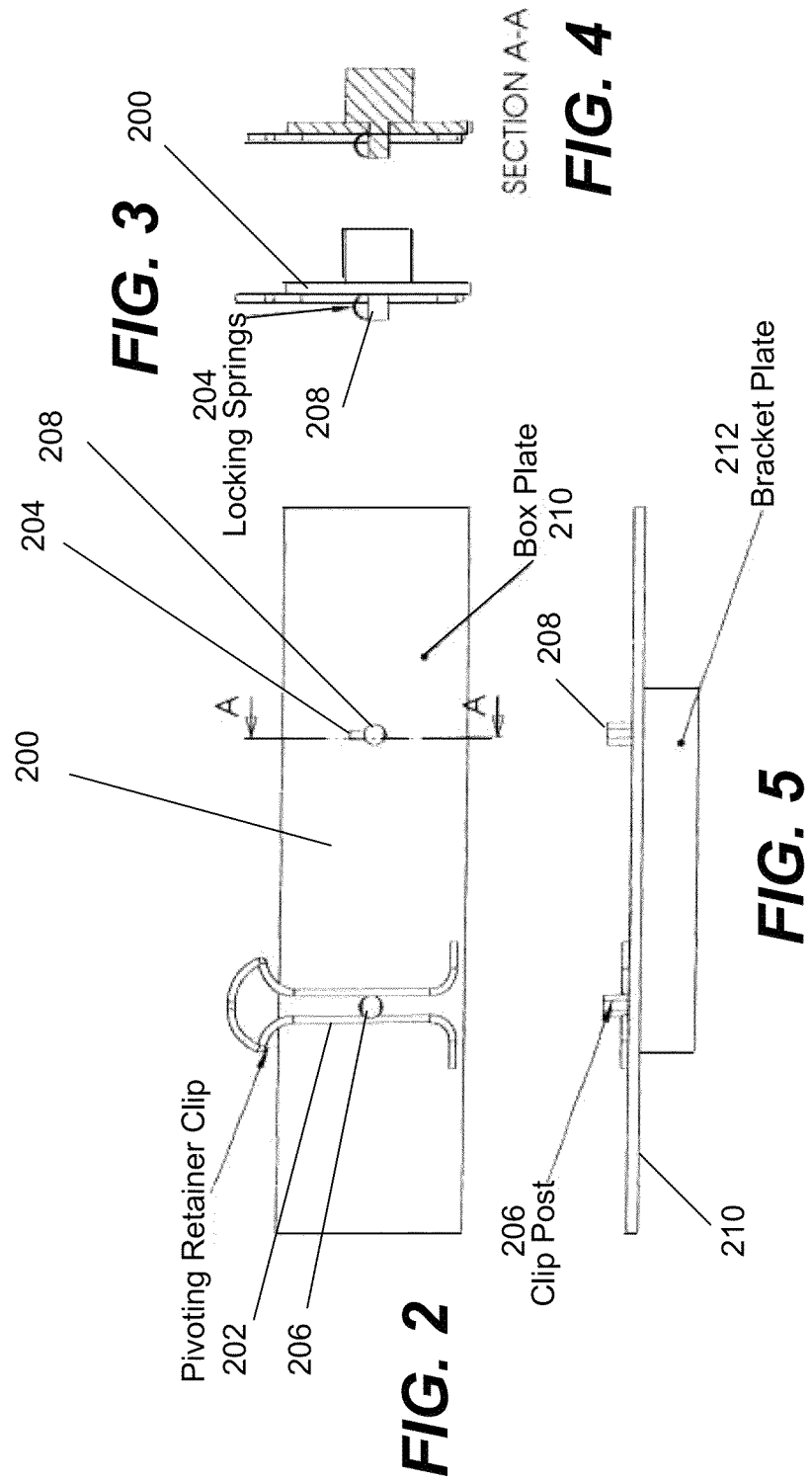

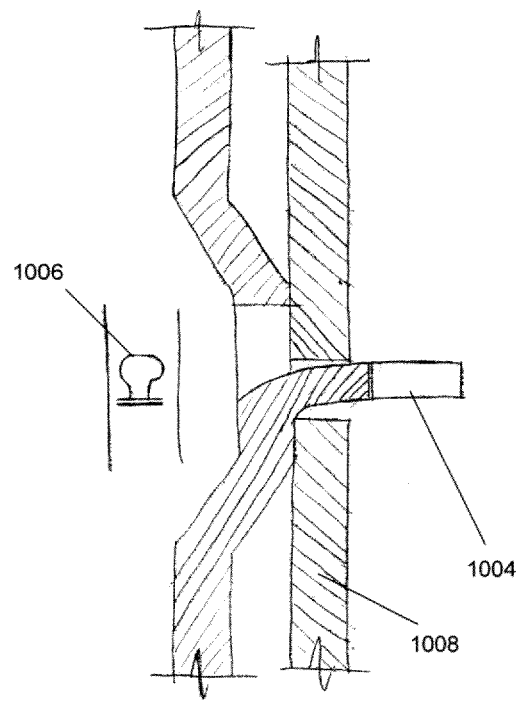
FIG. 12
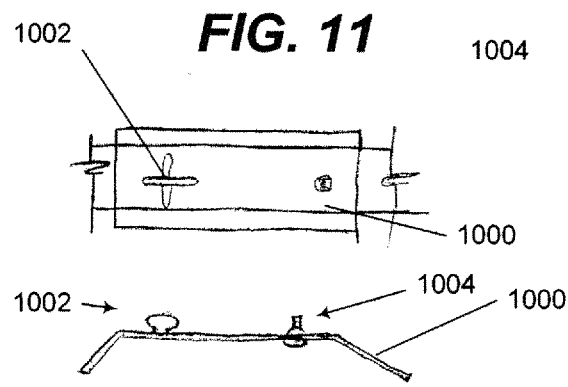
FIG. 11
FIG. 10

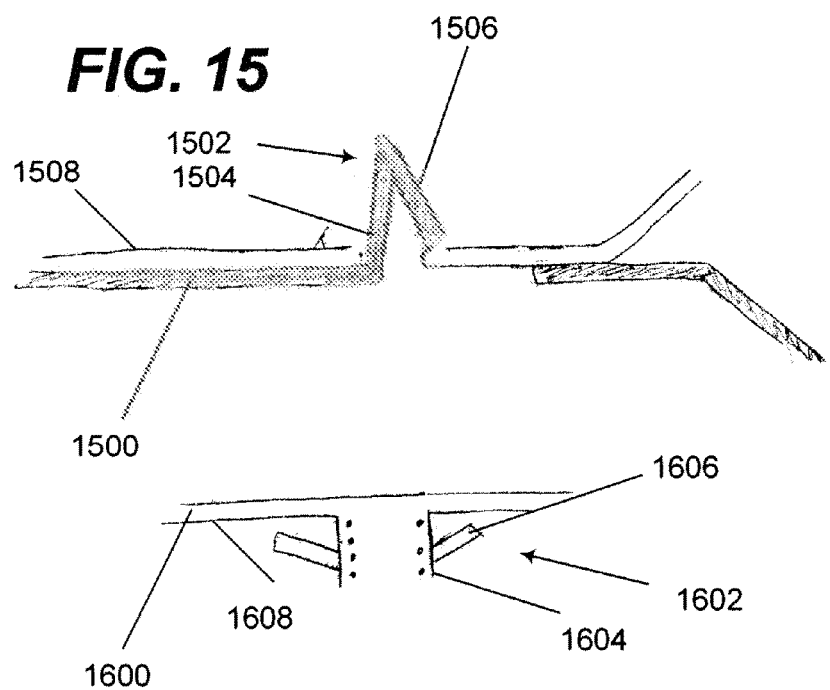
FIG. 15
FIG. 16
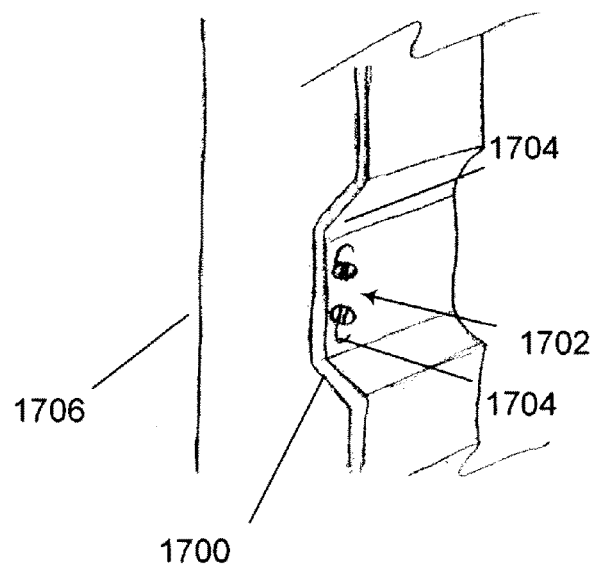
FIG. 17

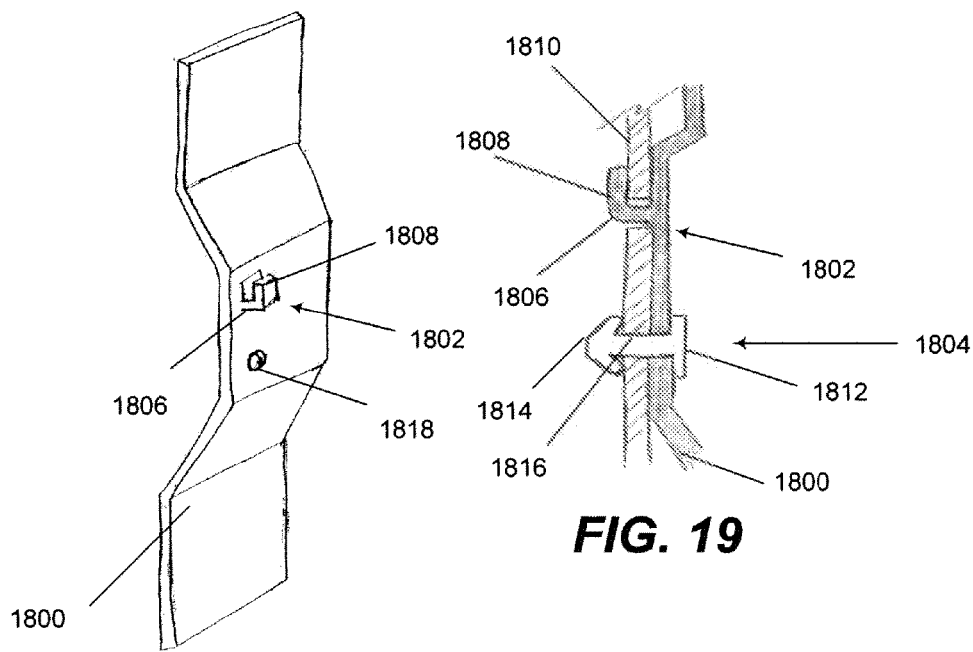
FIG. 18
FIG. 19
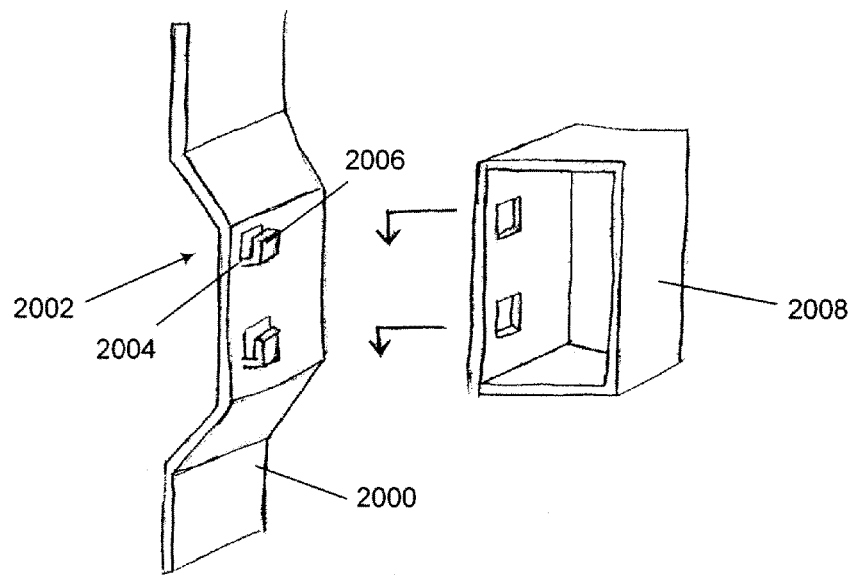
FIG. 20

Triple

| KO1 | KO2 | KO3 | A | B | C | D | E | F | G | H | I |
|---|---|---|---|---|---|---|---|---|---|---|---|
| 1 | 3/4 | 1/2 | 1.375 | 1.125 | 0.875 | 0.250 | 0.063 | 0.063 | 0.125 | 0.188 | 0.125 |
| 1 1/4 | 1 | 3/4 | 1.734 | 1.375 | 1.125 | 0.375 | 0.063 | 0.063 | 0.125 | 0.250 | 0.188 |
| 1 1/2 | 1 1/4 | 1 | 1.984 | 1.734 | 1.375 | 0.500 | 0.063 | 0.063 | 0.125 | 0.375 | 0.250 |

Double

| KO1 | KO2 | M | N | O | P |
|---|---|---|---|---|---|
| 3/4 | ½ | 1.125 | 0.875 | 0.188 | 0.125 |
| 1 | 3/4 | 1.375 | 1.125 | 0.250 | 0.188 |
| 1 1/4 | 1 | 1.734 | 1.375 | 0.375 | 0.250 |
| 1 1/2 | 1 1/4 | 1.984 | 1.734 | 0.500 | 0.375 |

FIG. 28

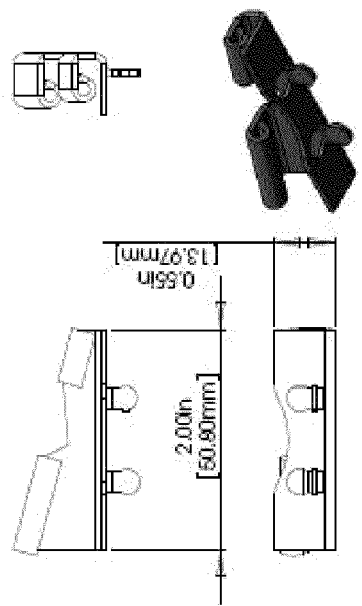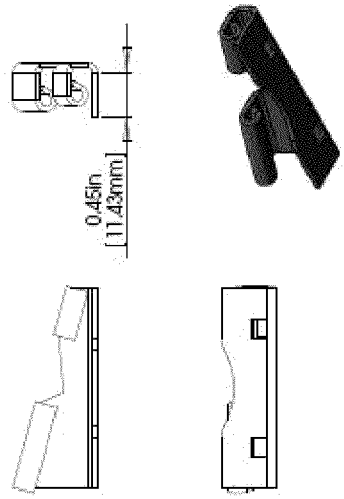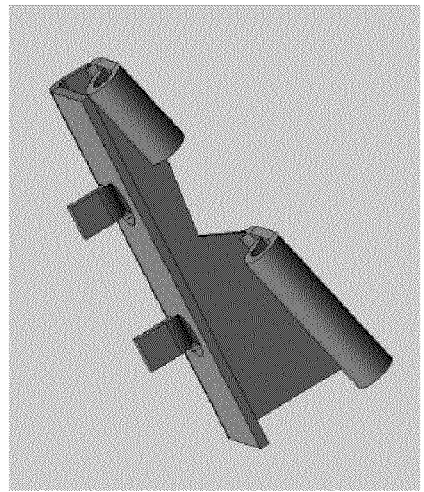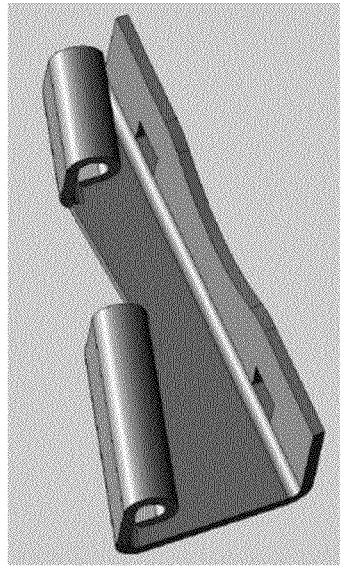
FIG. 36
FIG. 37

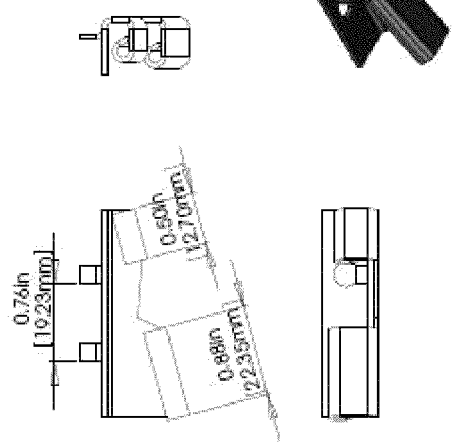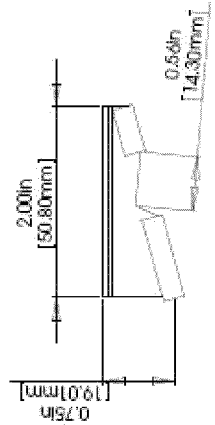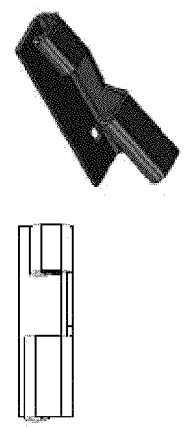
FIG. 38
FIG. 39

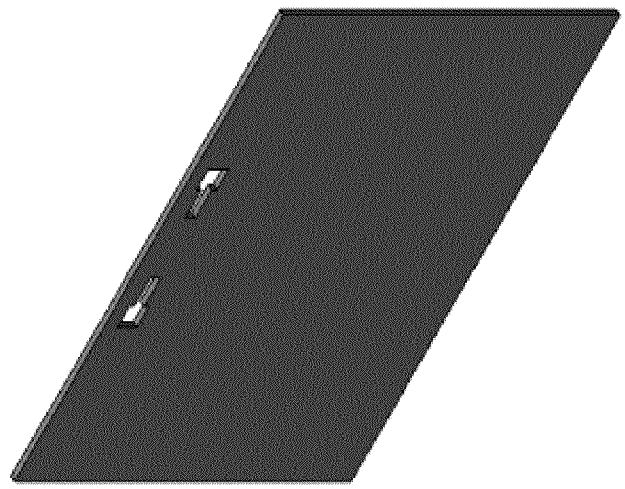
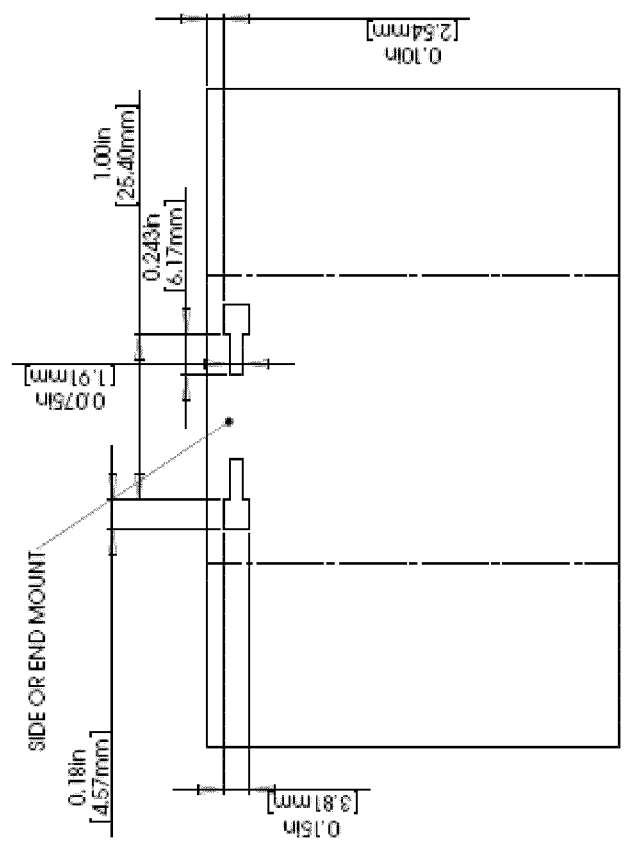
FIG. 42

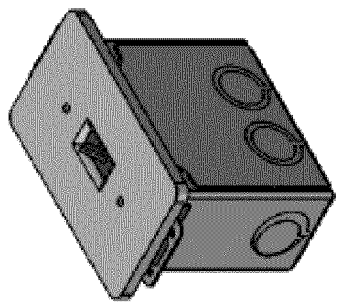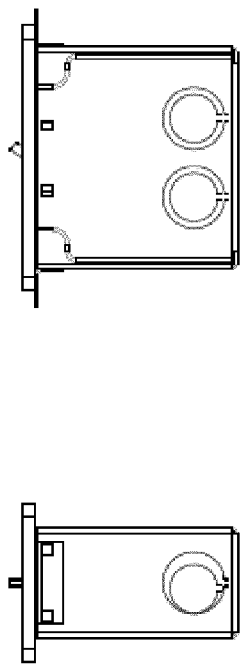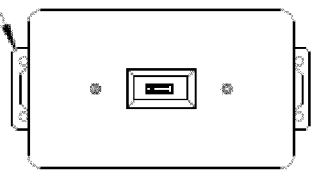
FIG. 54

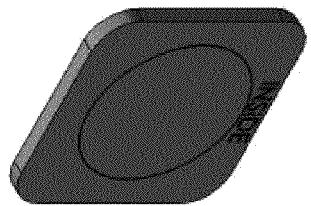
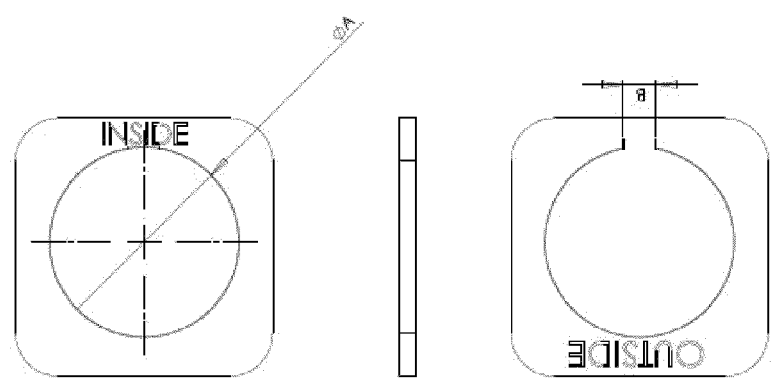
FIG. 55

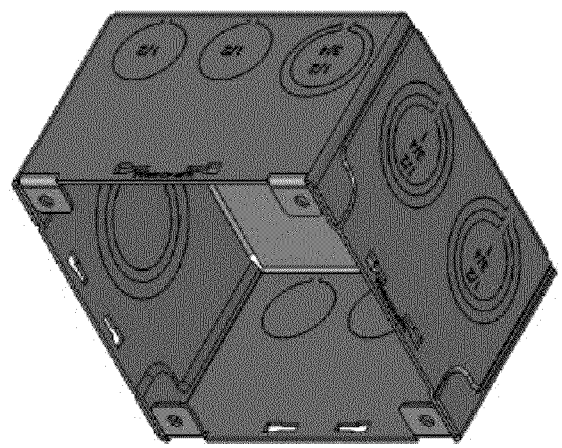
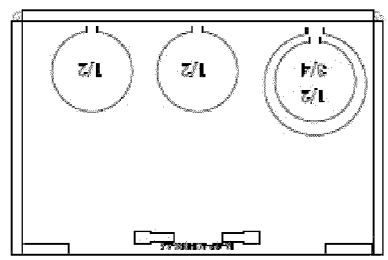
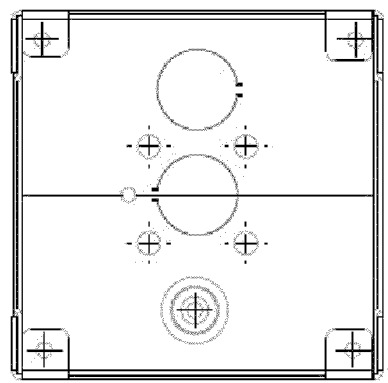
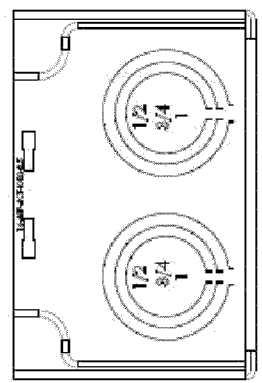
FIG. 65

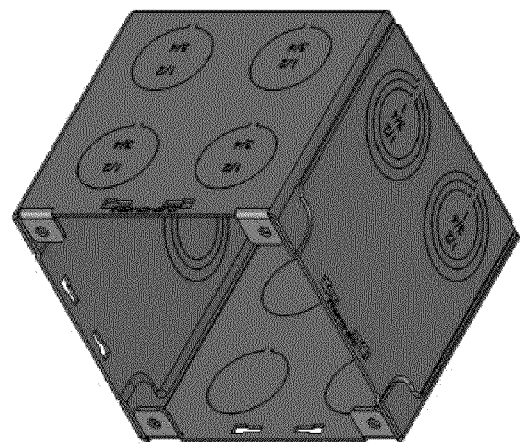
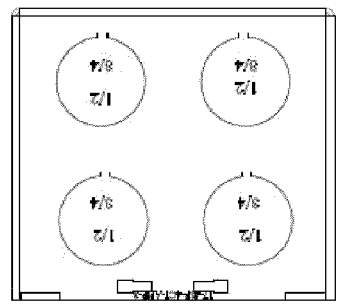
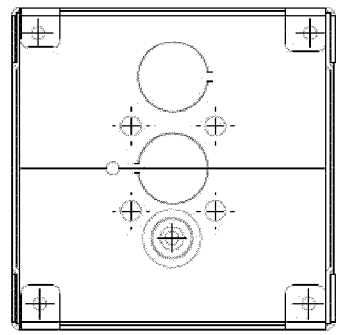
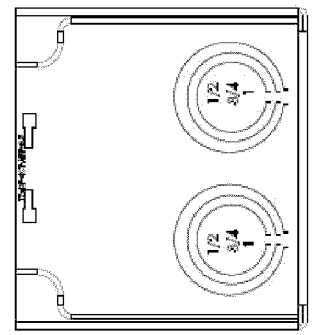
FIG. 66

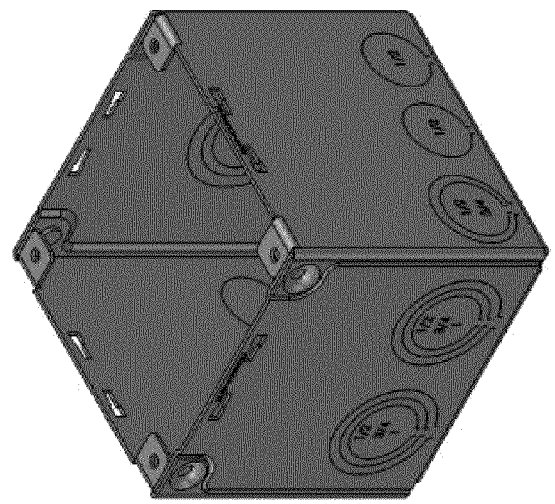
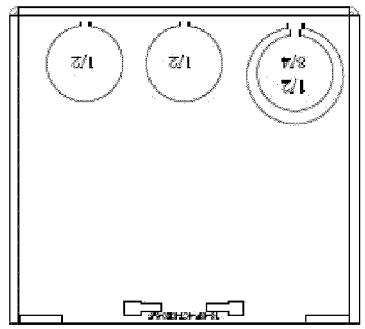
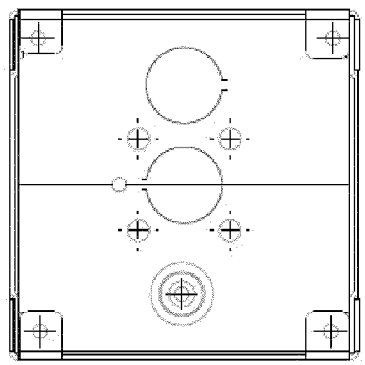
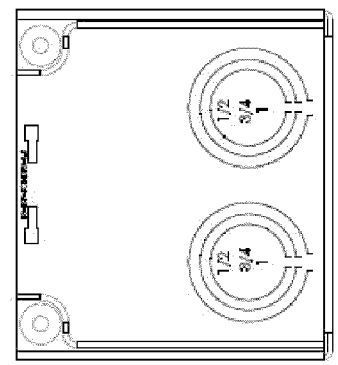
FIG. 67

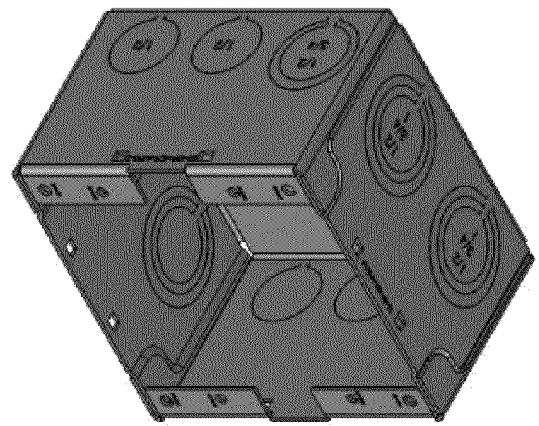
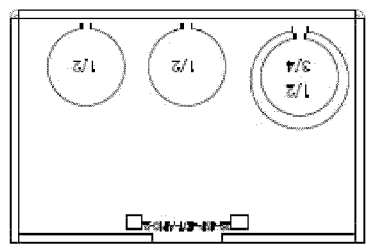
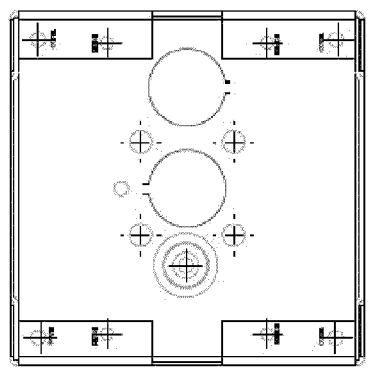
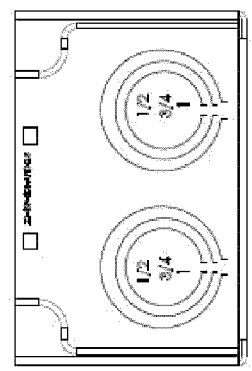
FIG. 68

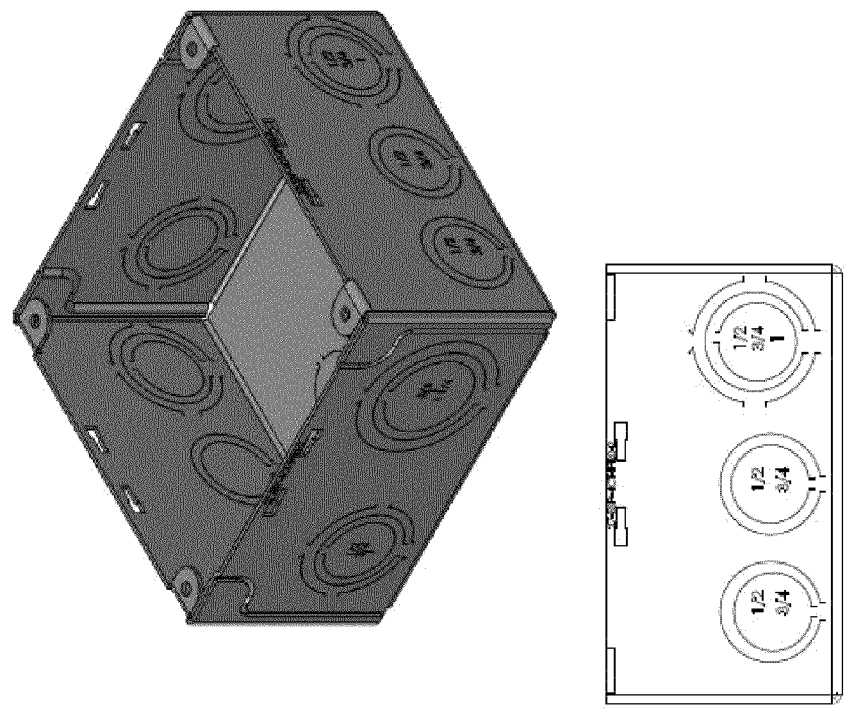
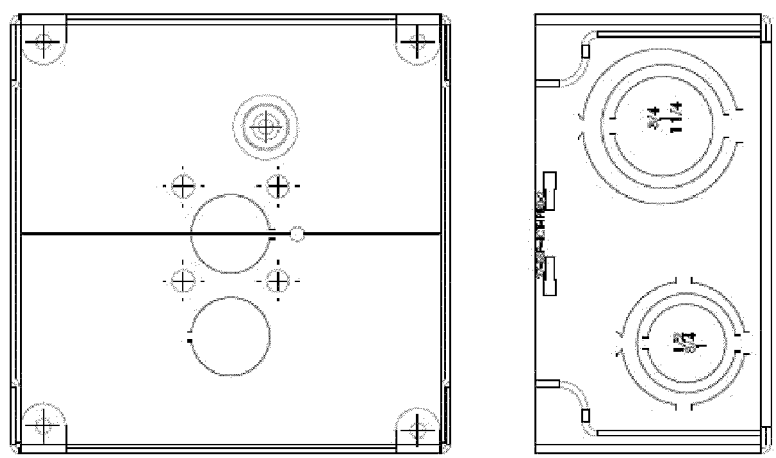
FIG. 70

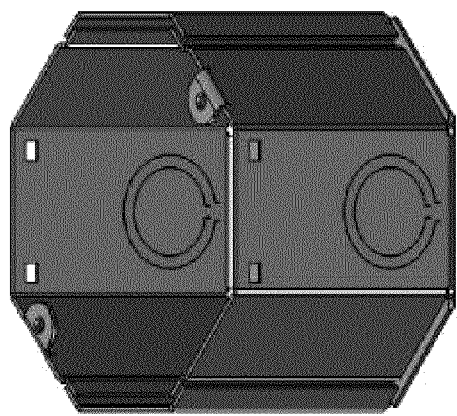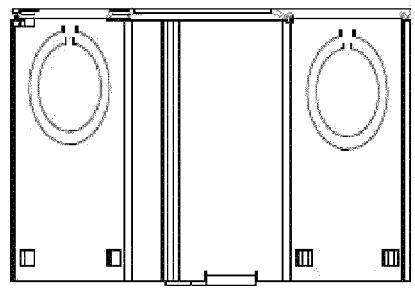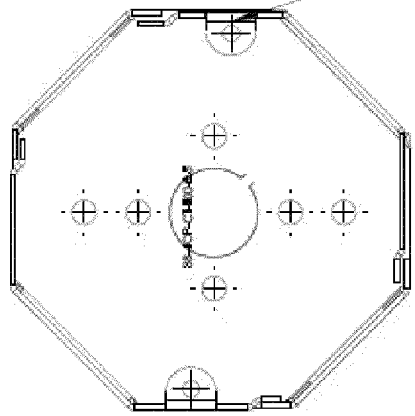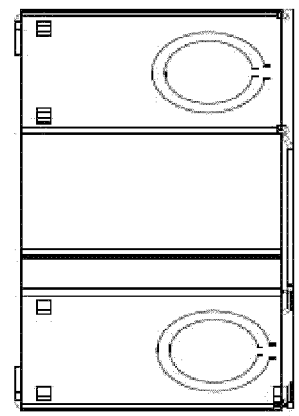
FIG. 73

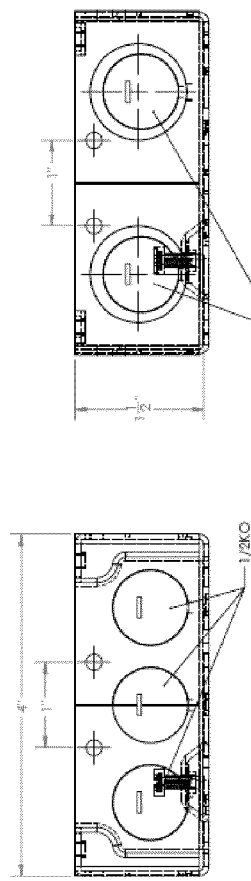
*FIG. 76C*
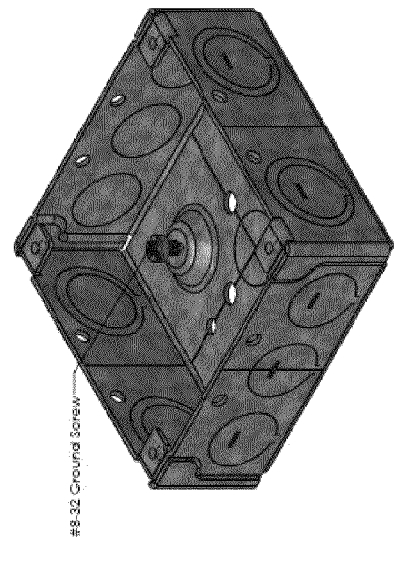
*FIG. 76A*
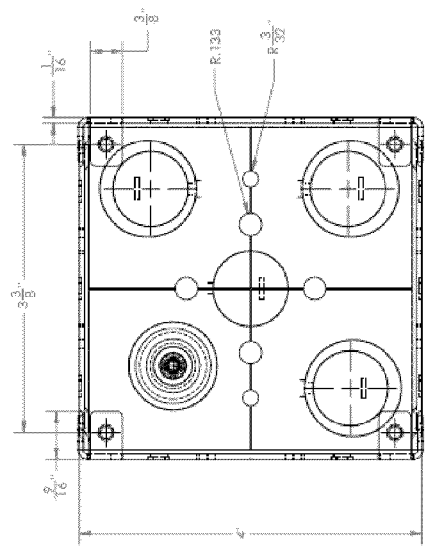
*FIG. 76B*
*FIG. 76D*

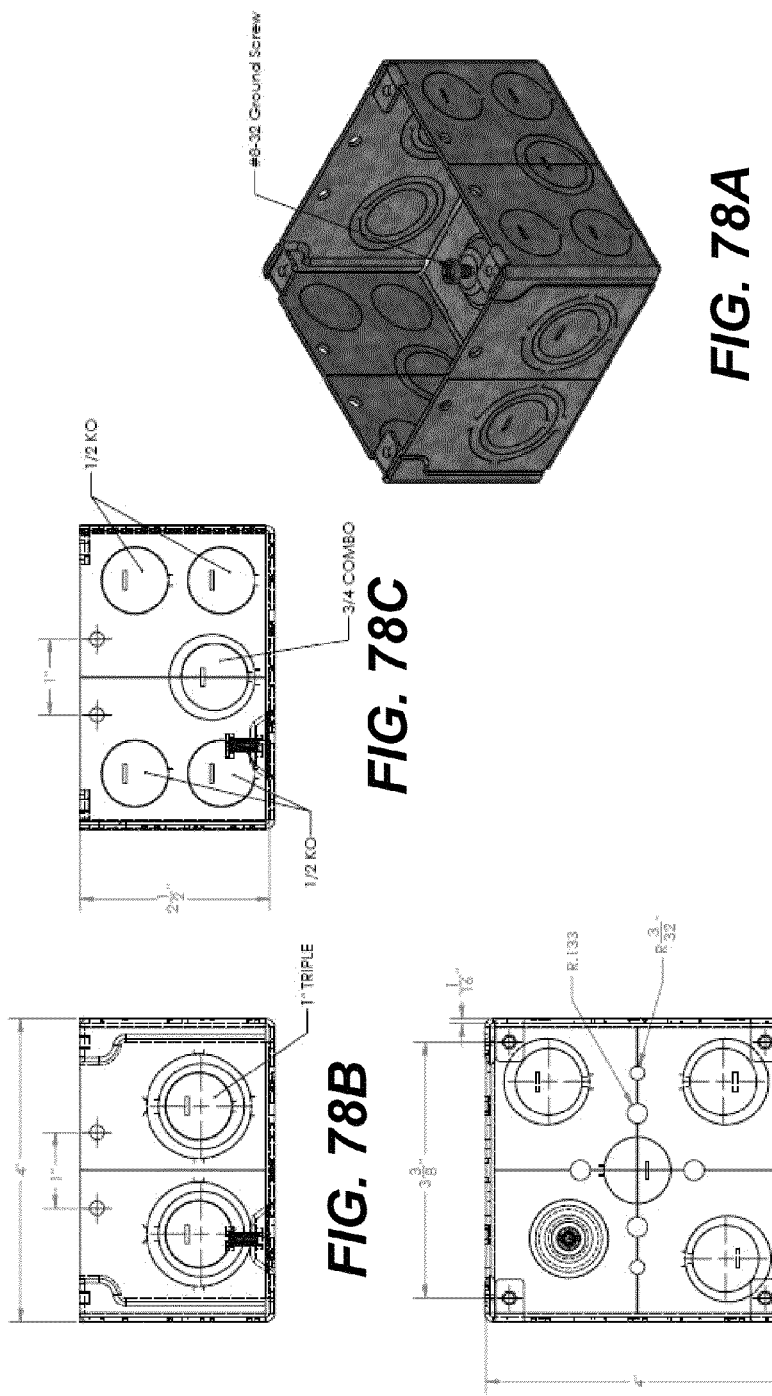

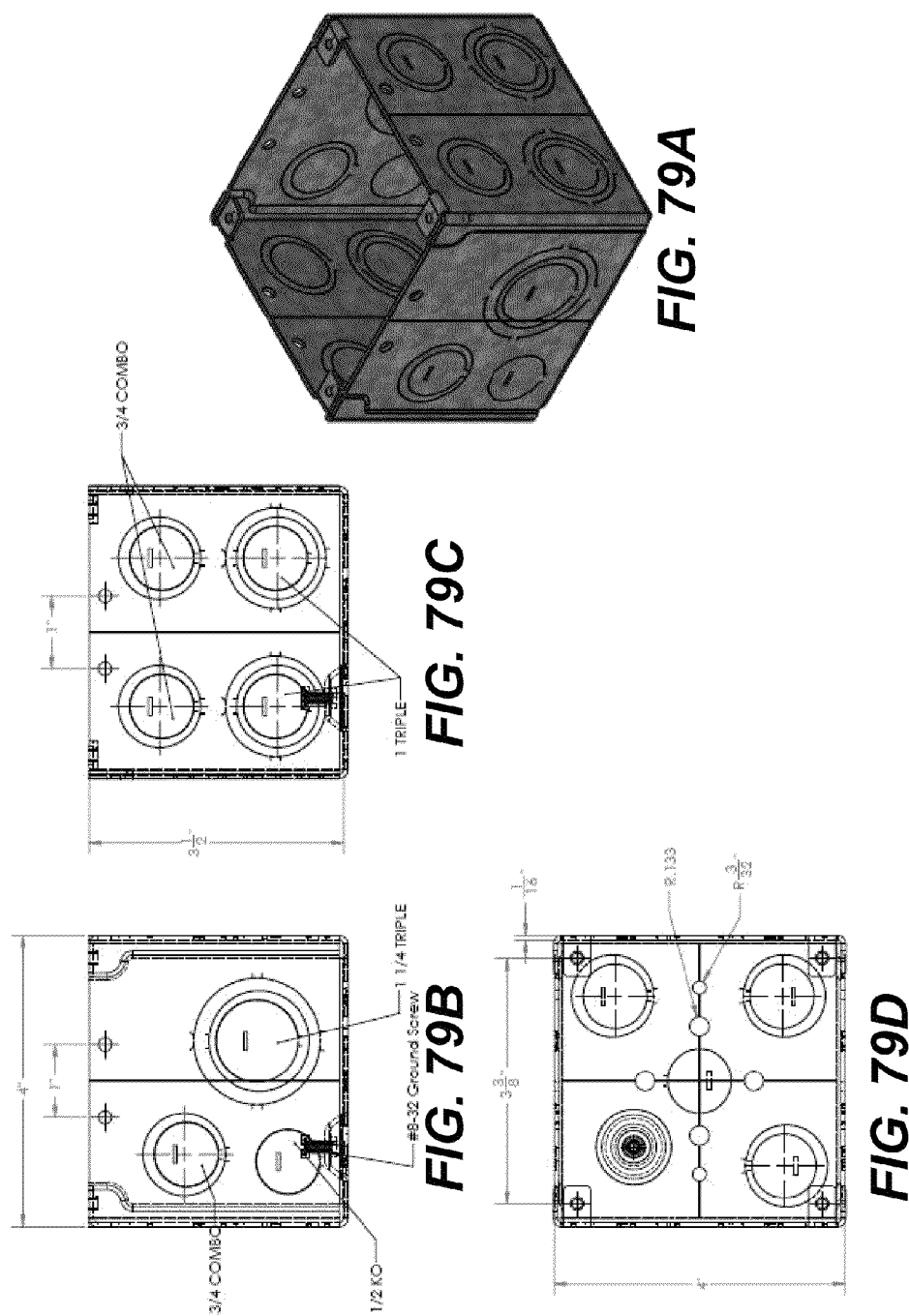

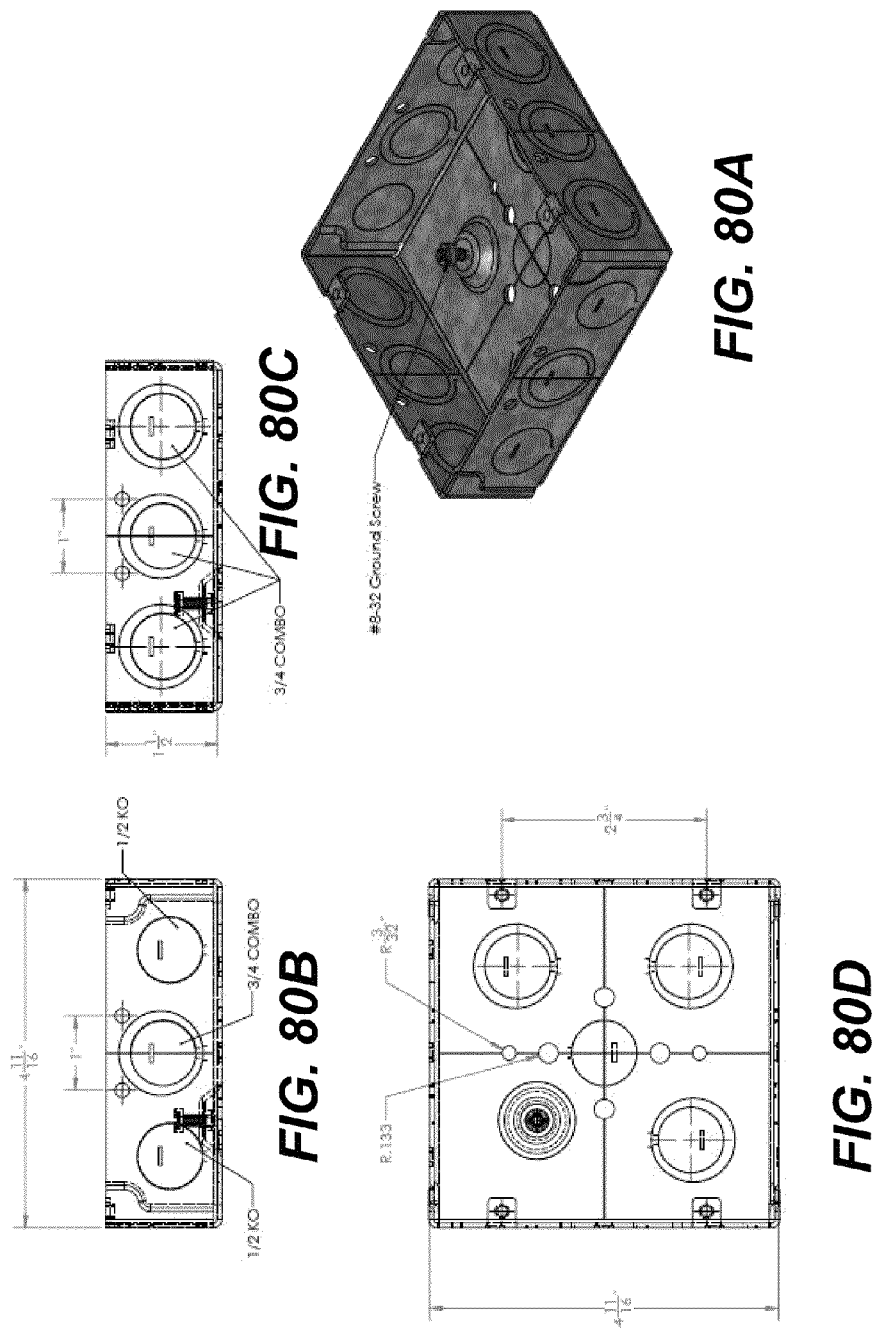

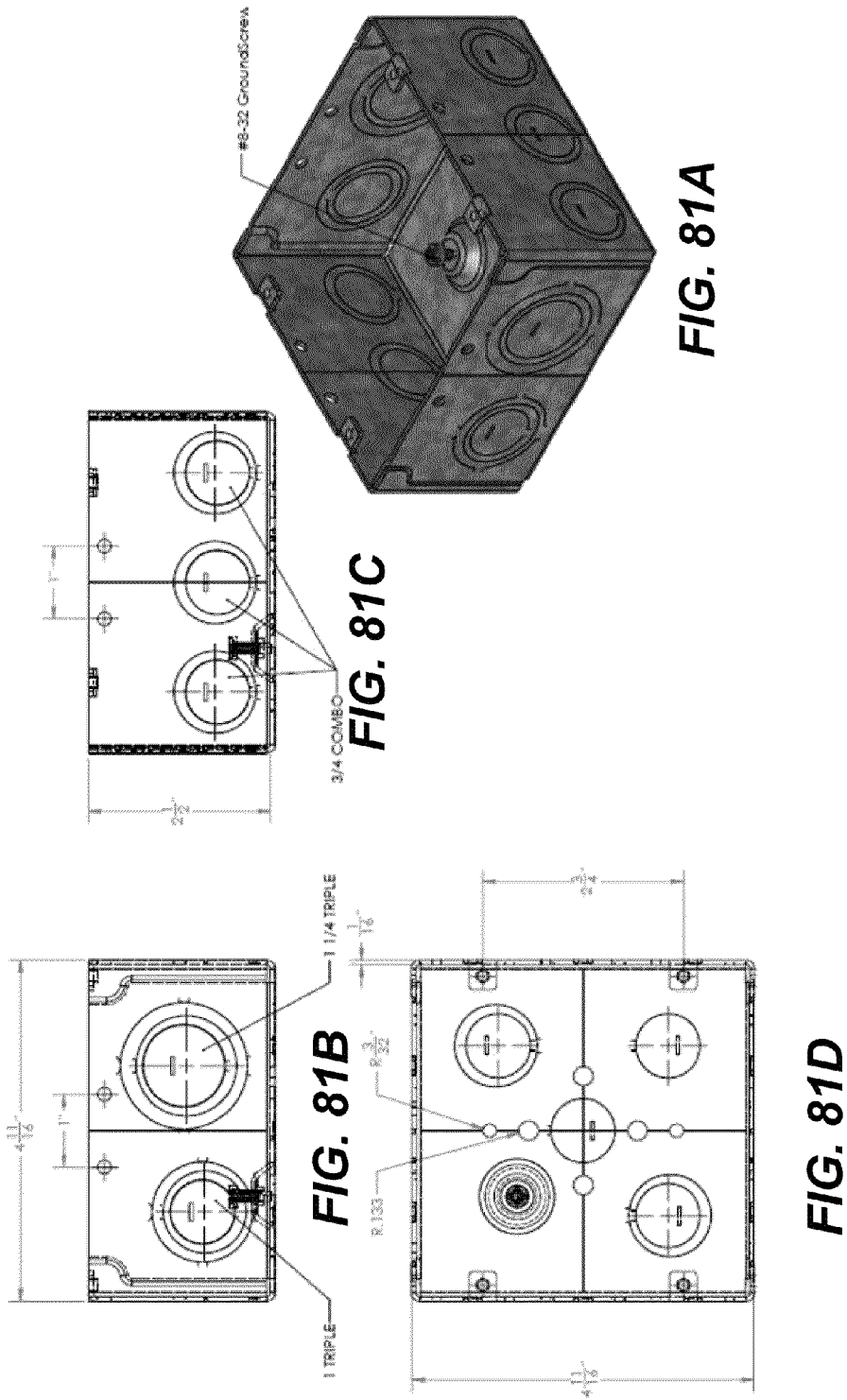

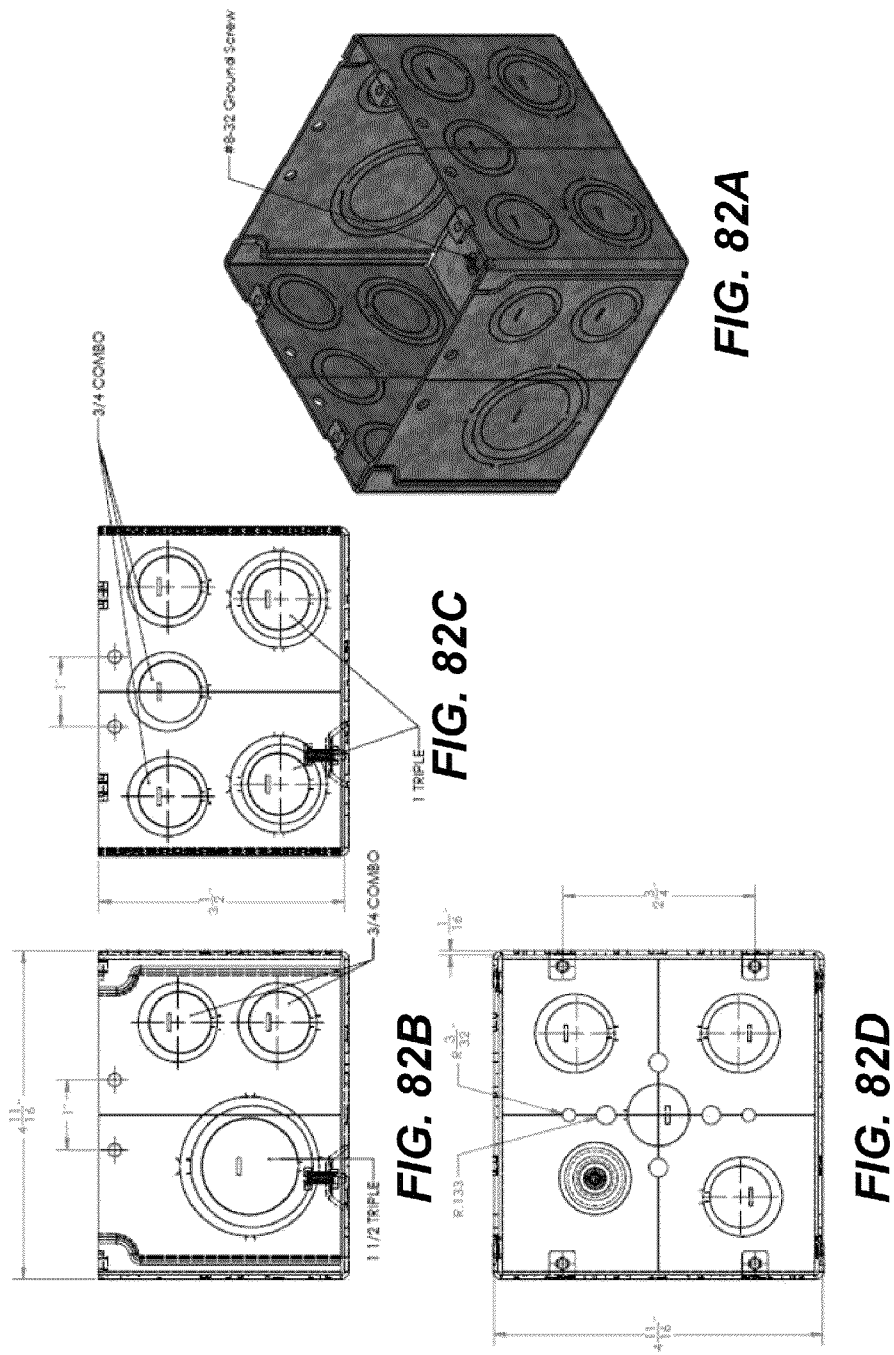

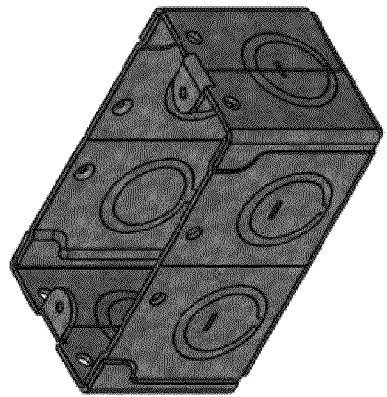
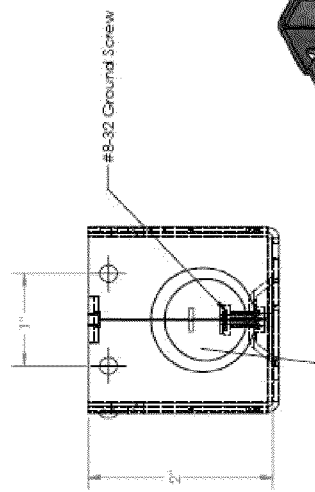
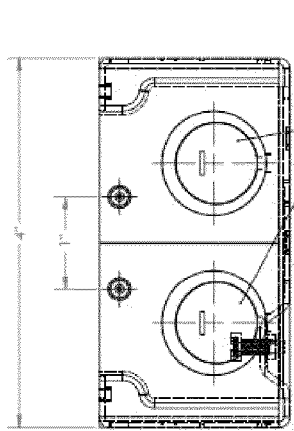
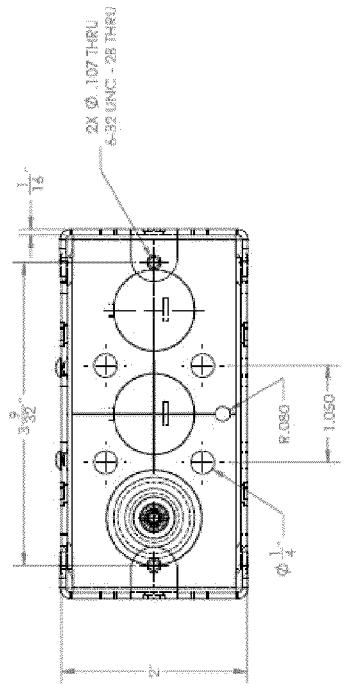
FIG. 84A
FIG. 84B
FIG. 84C
FIG. 84D

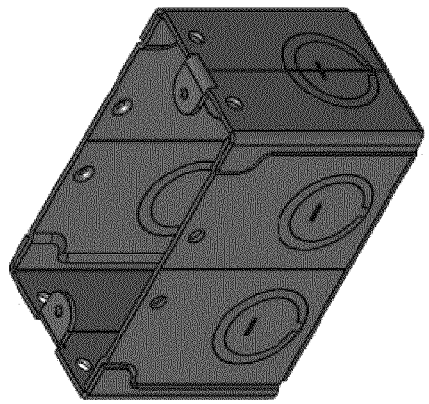
FIG. 85A
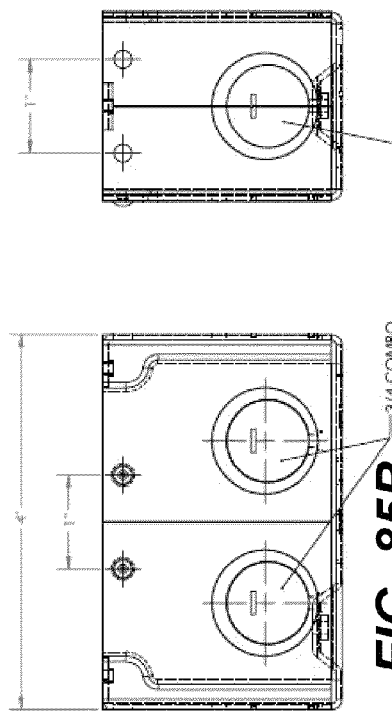
FIG. 85C
FIG. 85B
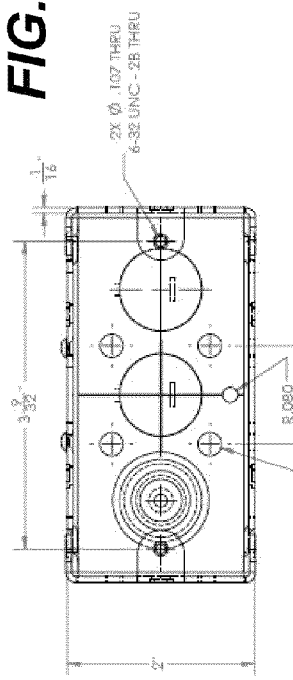
FIG. 85D

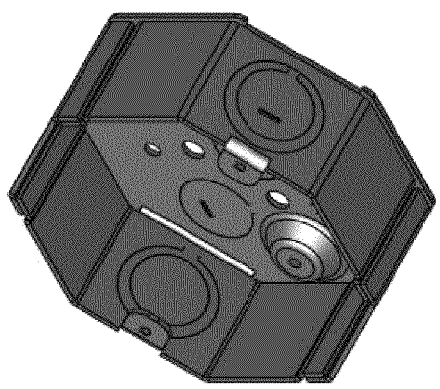
*FIG. 88A*
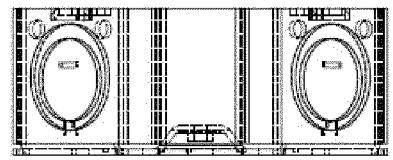
*FIG. 88D*
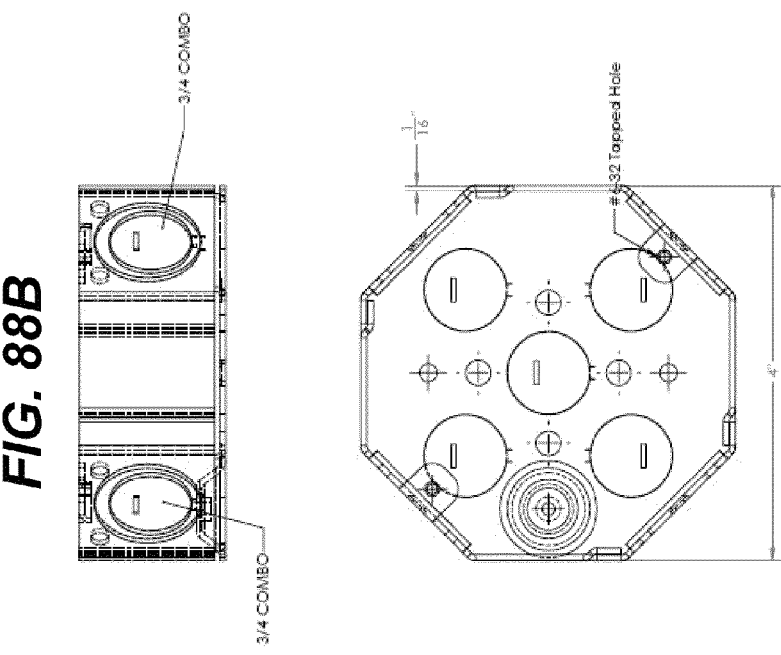
*FIG. 88B*
*FIG. 88C*

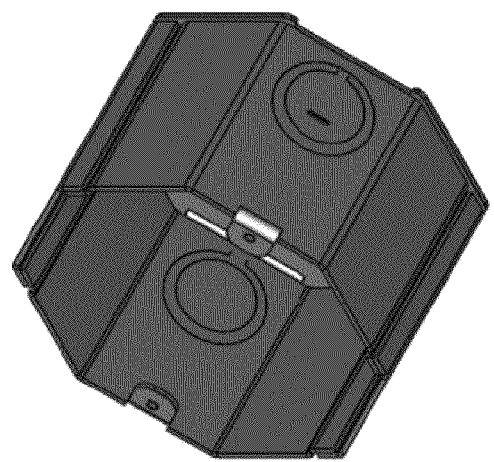
FIG. 89A
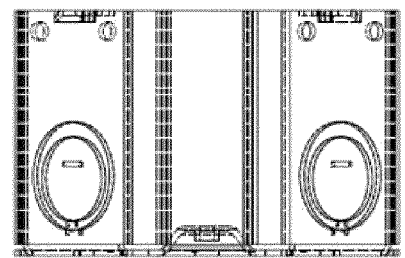
FIG. 89D
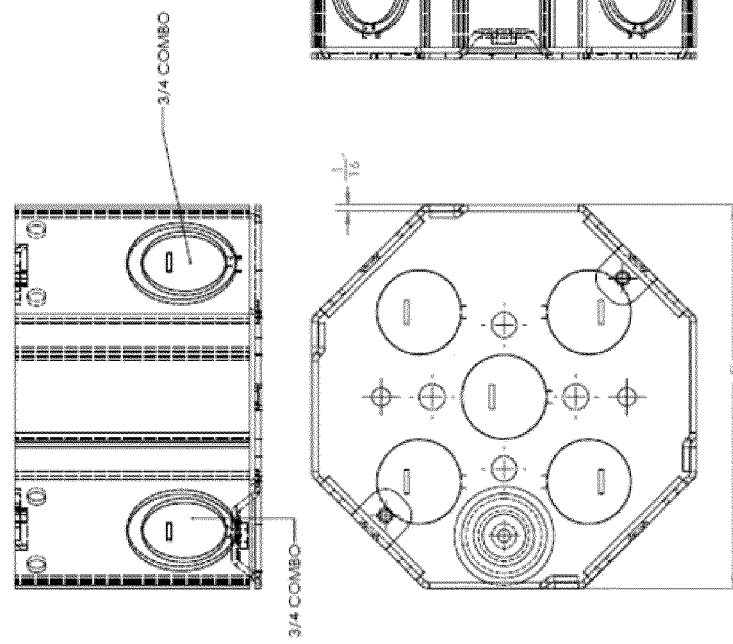
FIG. 89B
FIG. 89C

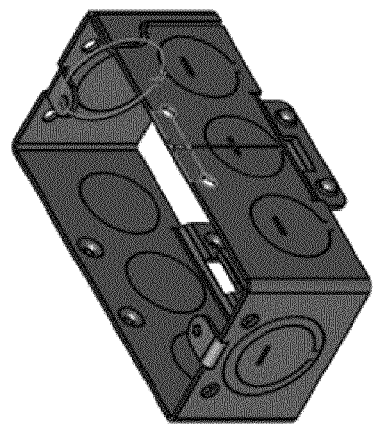
FIG. 91A
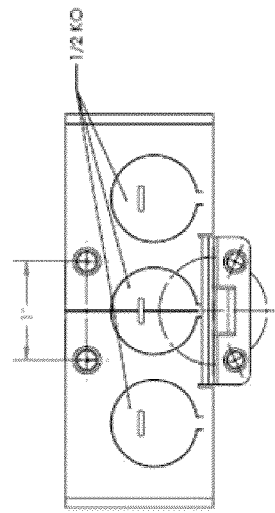
FIG. 91D
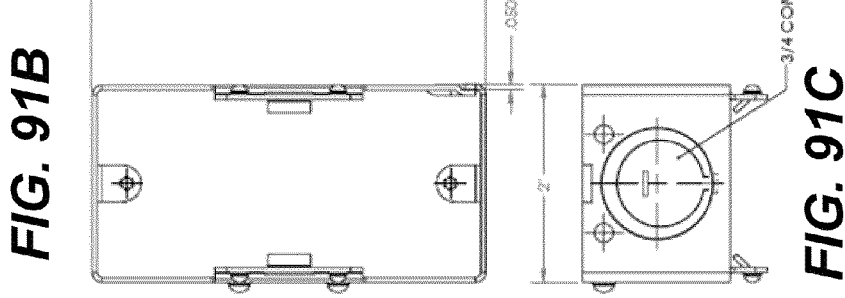
FIG. 91B
FIG. 91C

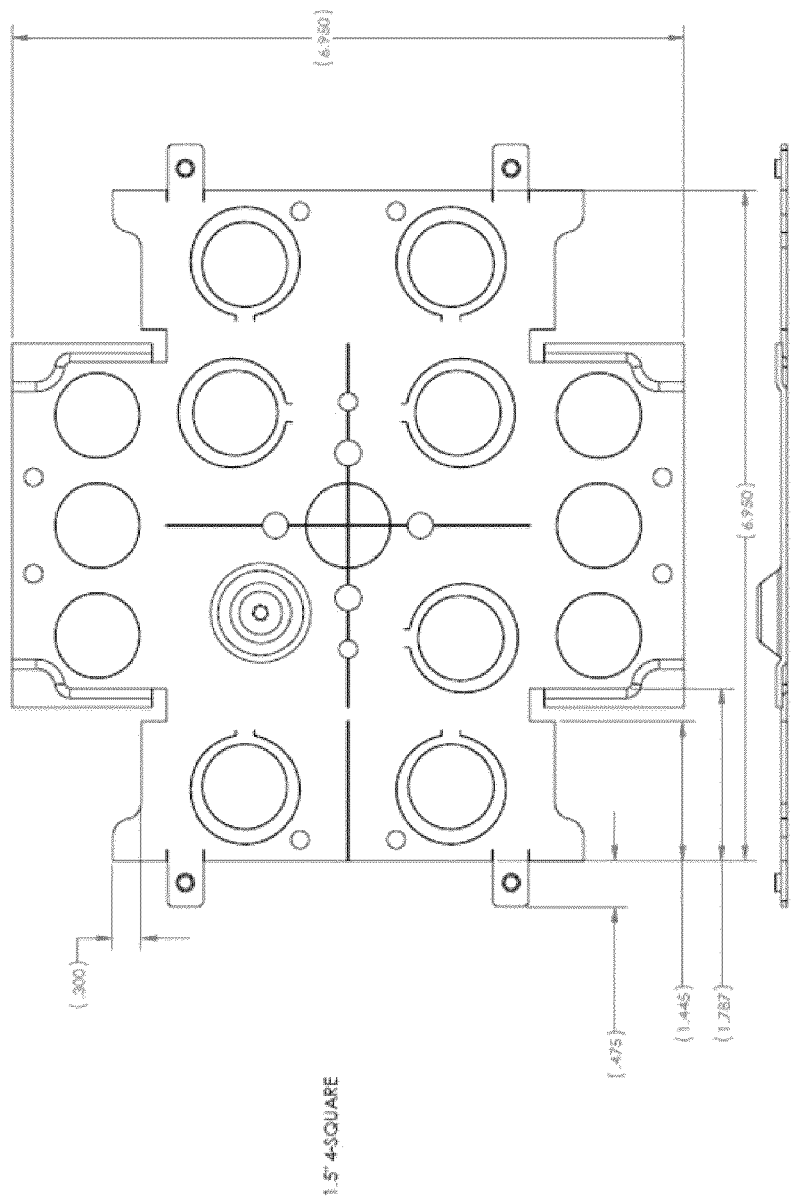

3.5" HANDY BOX

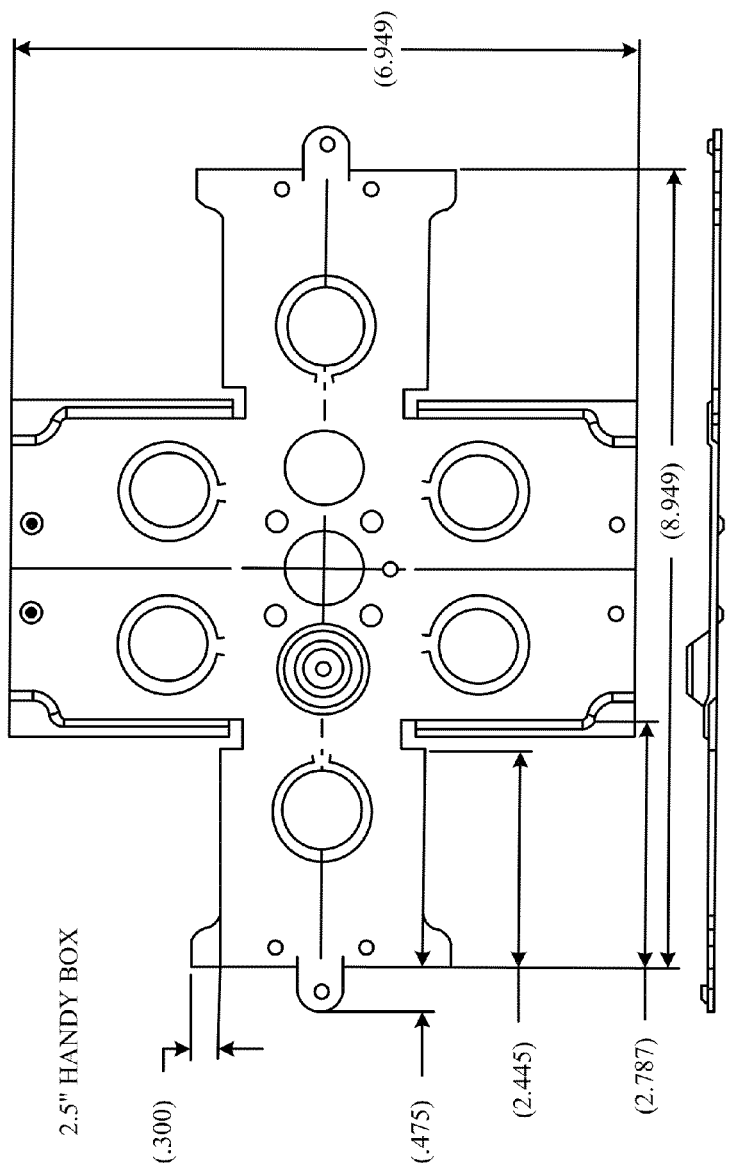

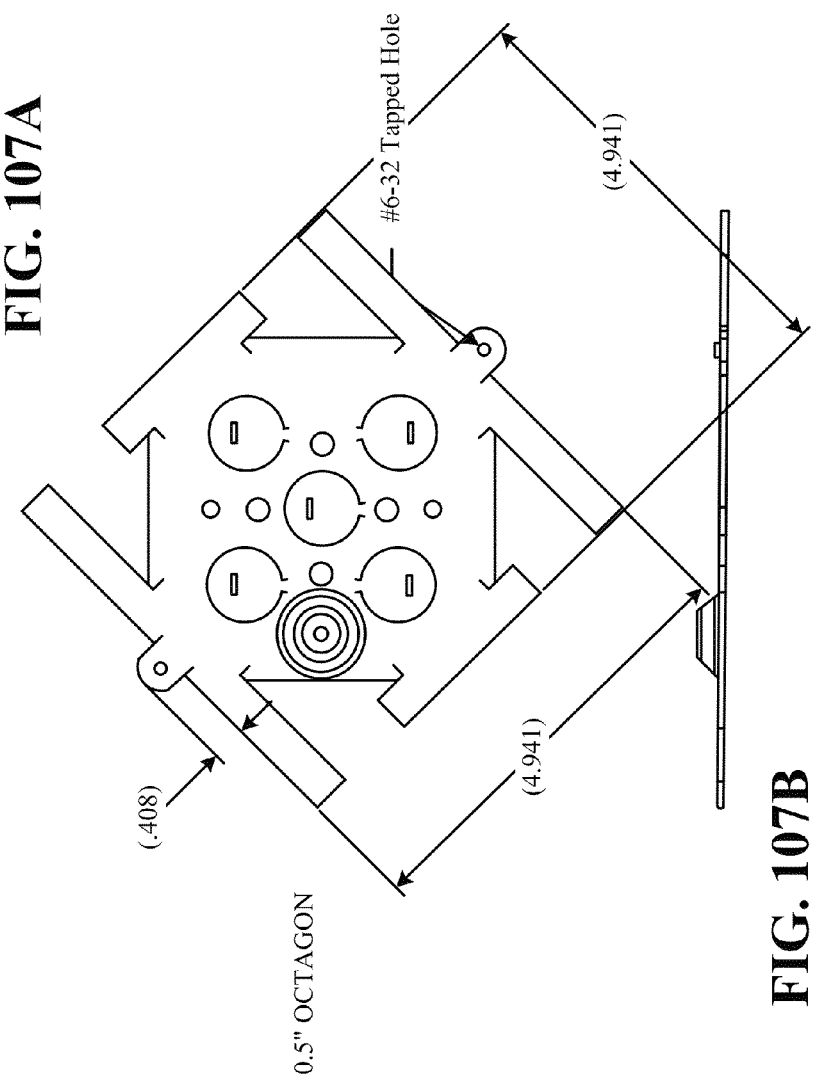

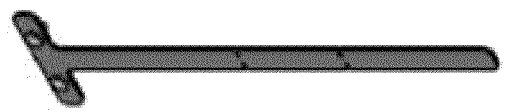
*FIG. 114A*
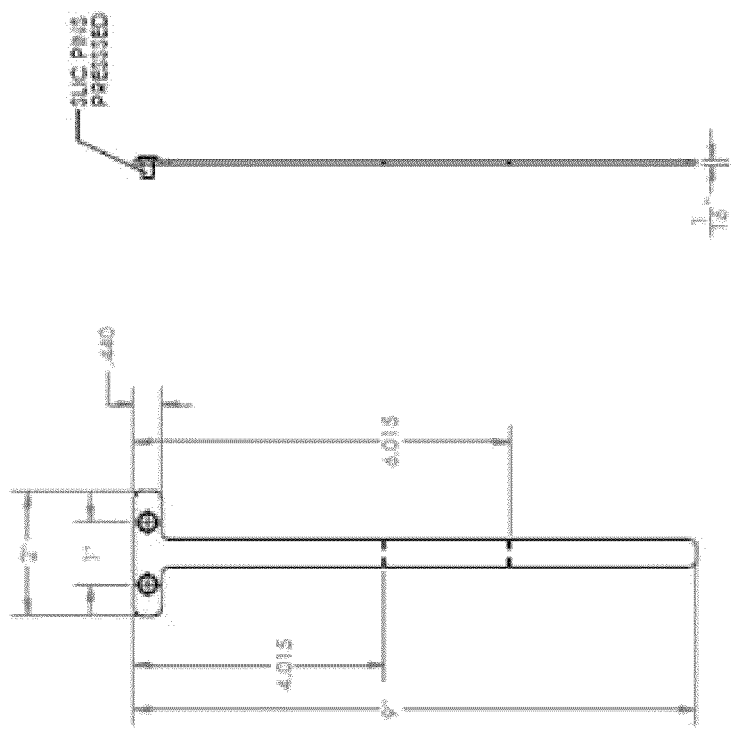
*FIG. 114C*
*FIG. 114B*

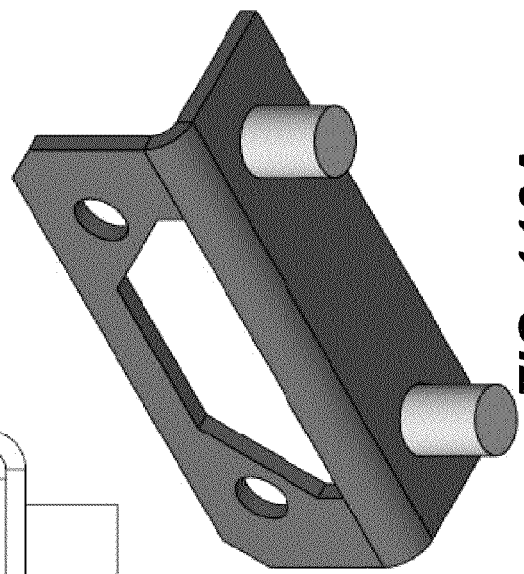
FIG. 116A
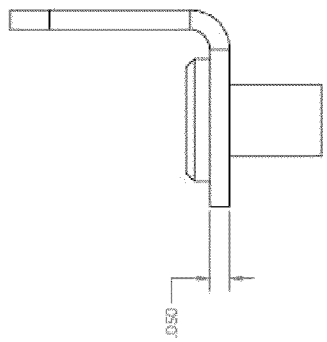
FIG. 116D
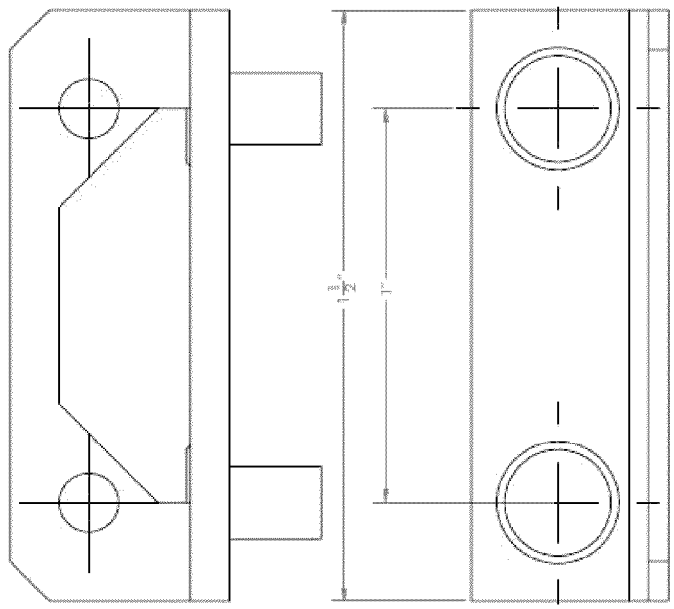
FIG. 116B
FIG. 116C

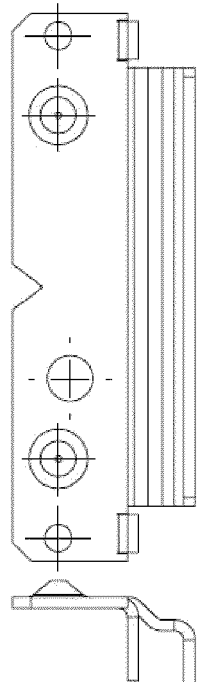
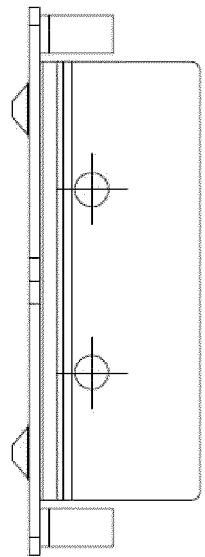
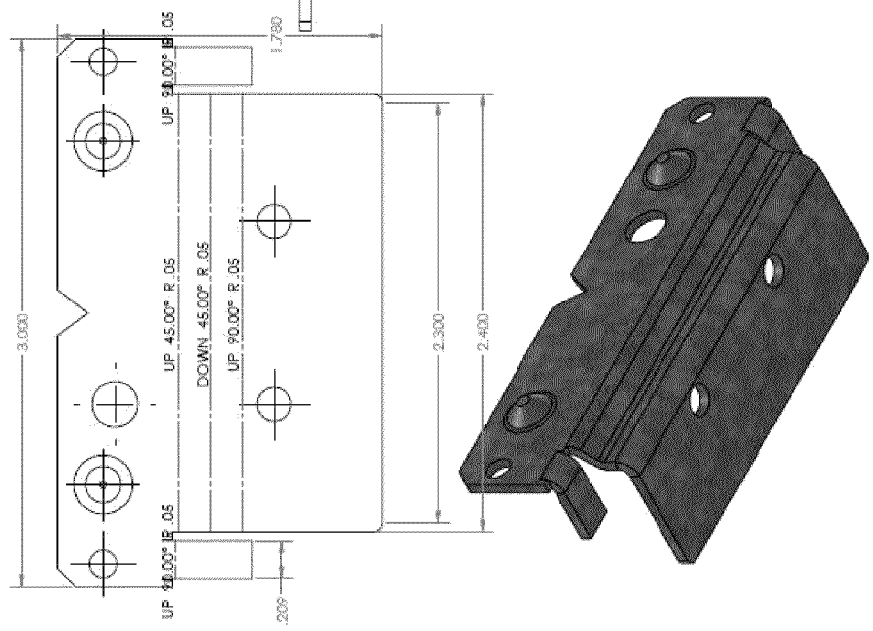
FIG. 117C
FIG. 117D
FIG. 117B
FIG. 117A

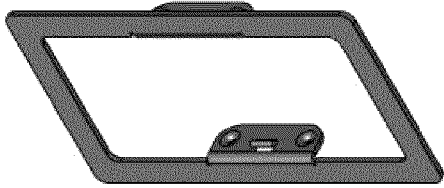
*FIG. 120A*
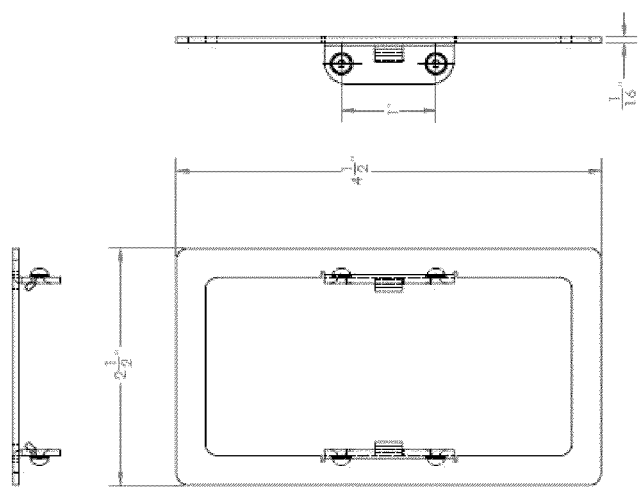
*FIG. 120B*  *FIG. 120C*  *FIG. 120D*

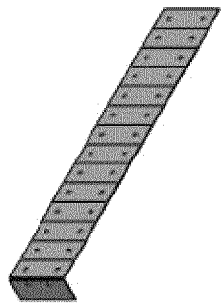
FIG. 124A
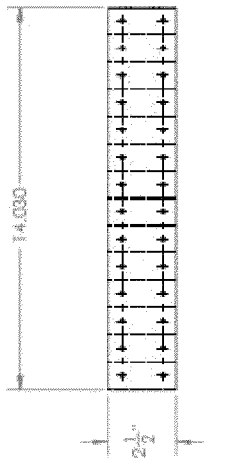
FIG. 124D
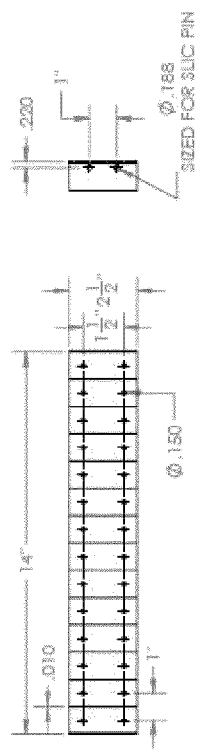
FIG. 124C
FIG. 124E
FIG. 124B

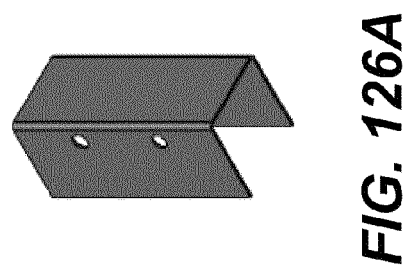
FIG. 126A
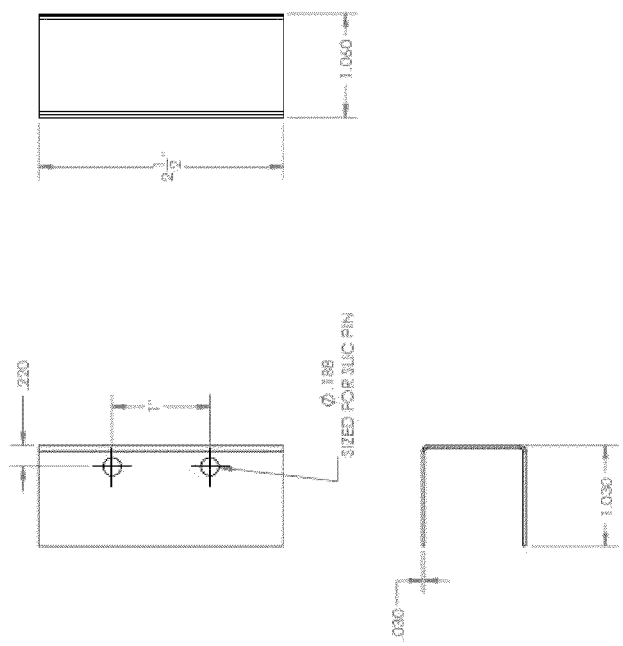
FIG. 126C
FIG. 126B
FIG. 126D

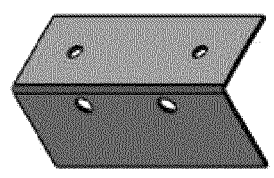
FIG. 128A
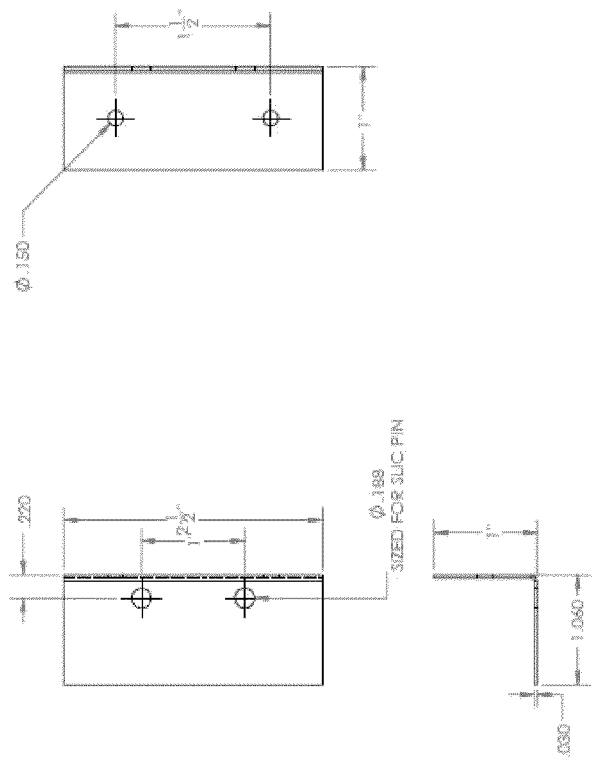
FIG. 128C
FIG. 128B
FIG. 128D

| # | Description | KO Configuration, Side | | Depth | Prototype Quantities | Mass, lbs net | Mass, Lbs gross | Converted Square inches |
|---|---|---|---|---|---|---|---|---|
| | | A (w/ P-form) | B (w/o P-form) | | | | | |
| | | | Handy Box – Device Tabs | | | | | |
| 1 | Handy Box | 3x0.5ko | 1x0.75combo | 1.5 | 20 | 0.5 | 0.51 | 28.58 |
| 2 | Handy Box | 2x0.75combo | 1x0.75combo | 2 | 25 | 0.6 | 0.61 | 34.21 |
| 3 | Handy Box | 2x0.75combo | 1x0.75combo | 2.5 | 20 | 0.7 | 0.71 | 39.83 |
| 4 | Handy Box | 4x0.75combo | 2x0.75combo | 3.5 | 10 | 0.9 | 0.91 | 51.09 |
| | | | Box Extensions – Handy | | | | | |
| 5 | Handy Extension | 3x0.5ko | 1x0.75combo | 1.5 | 10 | 0.3 | | |
| | | | Box Extensions – 4-Square | | | | | |
| 6 | 4" Square Extension | 3x0.5ko | 1x0.75combo – 2x0.5ko | 1.5 | 10 | 0.4 | | |
| | | | Box Extensions – Octagon | | | | | |
| 7 | Octagon Extension | 1x0.75combo | 1x0.75combo | 1.5 | 10 | 0.4 | | |
| | | | 4" Square Box – Cover Tabs (4 each at corners) | | | | | |
| 8 | 4" Square box | 3x0.5combo | 2x0.75combo | 1.5 | 20 | 0.7 | 0.71 | 39.92 |
| 9 | 4" Square box | 1x1.25combo+1x0.5combo | 1x0.75combo+4x0.5 | 2.5 | 15 | 1.0 | 1.01 | 56.8 |
| 10 | 4" Square box | 2x1.0 Triple | 2 rows (2x0.5ko+1¾combo) | 2.5 | 20 | 1.0 | 1.01 | 56.8 |
| 11 | 4" Square box | 1x1¼+1x¾combo+1x0.5ko | 2x1.0 Triple+2x¾combo | 3.5 | 12 | 1.3 | 1.31 | 73.69 |
| | | | 5" Square Box – Cover Tabs (4 each at corners) | | | | | |
| 12 | 5" Square box | 1x¾combo+2x0.5ko | 3x0.75combo | 1.5 | 10 | 0.9 | 0.91 | 51.18 |
| 13 | 5" Square box | 1x1combo+1x1 1/8combo | 3x0.75combo | 2.5 | 15 | 1.2 | 1.21 | 68.06 |
| 14 | 5" Square box | 2x0.75combo+1x1.5 Triple | 2x1.0 Triple+3x¾combo | 3.5 | 15 | 1.5 | 1.51 | 84.94 |
| | | | Octagon Boxes | | | | | |
| 15 | Octagon box | None | None | 0.5 | 10 | 0.4 | 0.41 | 23.2 |
| 16 | Octagon box | 1x¾combo | 1x¾combo | 1.5 | 15 | 0.6 | 0.61 | 34.56 |
| 17 | Octagon box | 1x¾combo | 1x¾combo | 2.5 | 10 | 0.8 | 0.81 | 45.82 |
| | | | Retro Rings | | | | | |
| 18 | Retro ring handy | None | None | 1.5 | 40 | 0.1 | | |
| 19 | Retro ring 4Square | None | None | 1.5 | 40 | 0.2 | | |
| | | | Far Side Support | | | | | |
| 20 | Far side support | None | None | — | 20 | 0.1 | | |
| | | | Brackets | | | | | |
| 21 | Brackets w/pins | None | None | — | 100 | 0.14 | | |
| 22 | Plaster ears | None | None | — | | 0.02 | | |
| 23 | Type H bracket | None | None | — | | 0.08 | | |
| | | | Mud Rings | | | | | |
| 24 | Single-gang mud ring | None | None | 0.5 | | | | |
| 25 | Two-gang mud ring | None | None | 0.5 | | | | |

FIG. 130

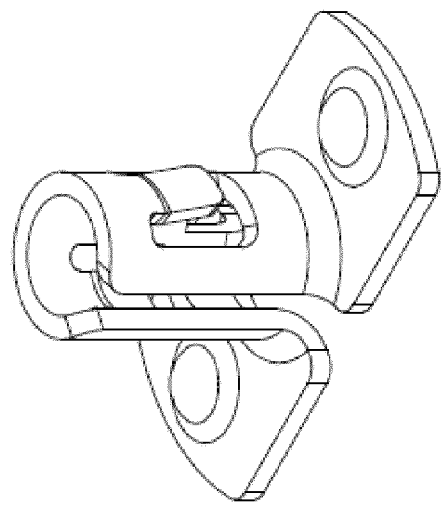
FIG. 132A
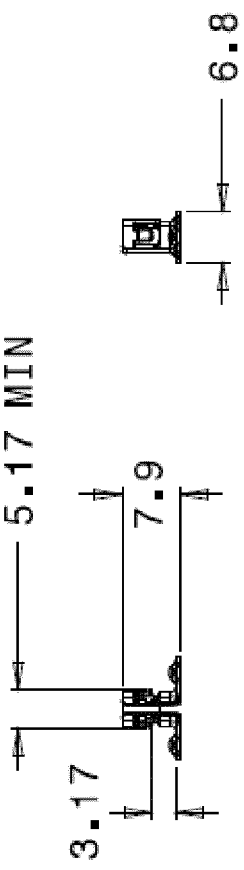
FIG. 132D
FIG. 132B
FIG. 132C

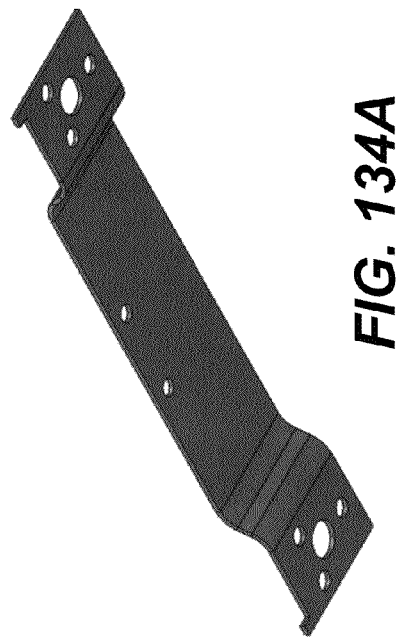
FIG. 134A
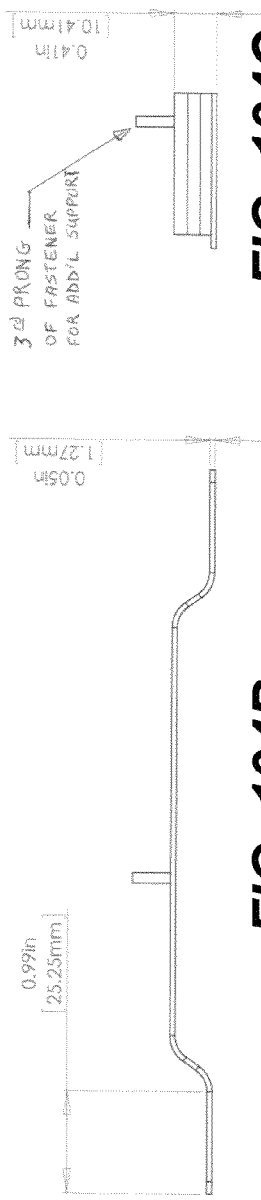
FIG. 134C
FIG. 134B
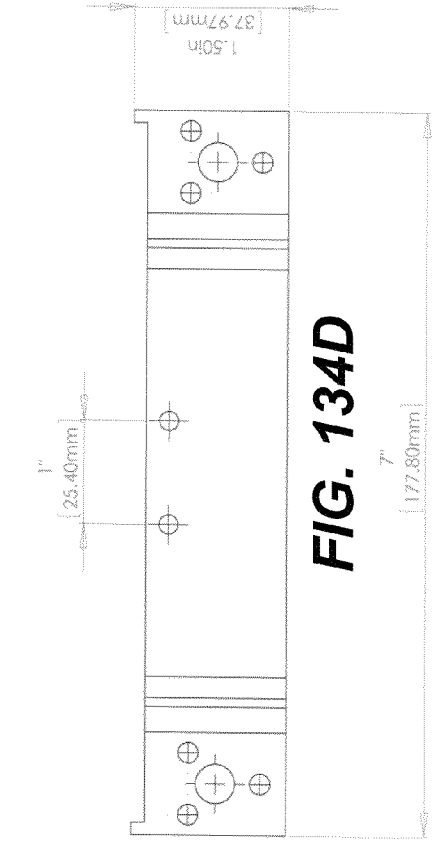
FIG. 134D

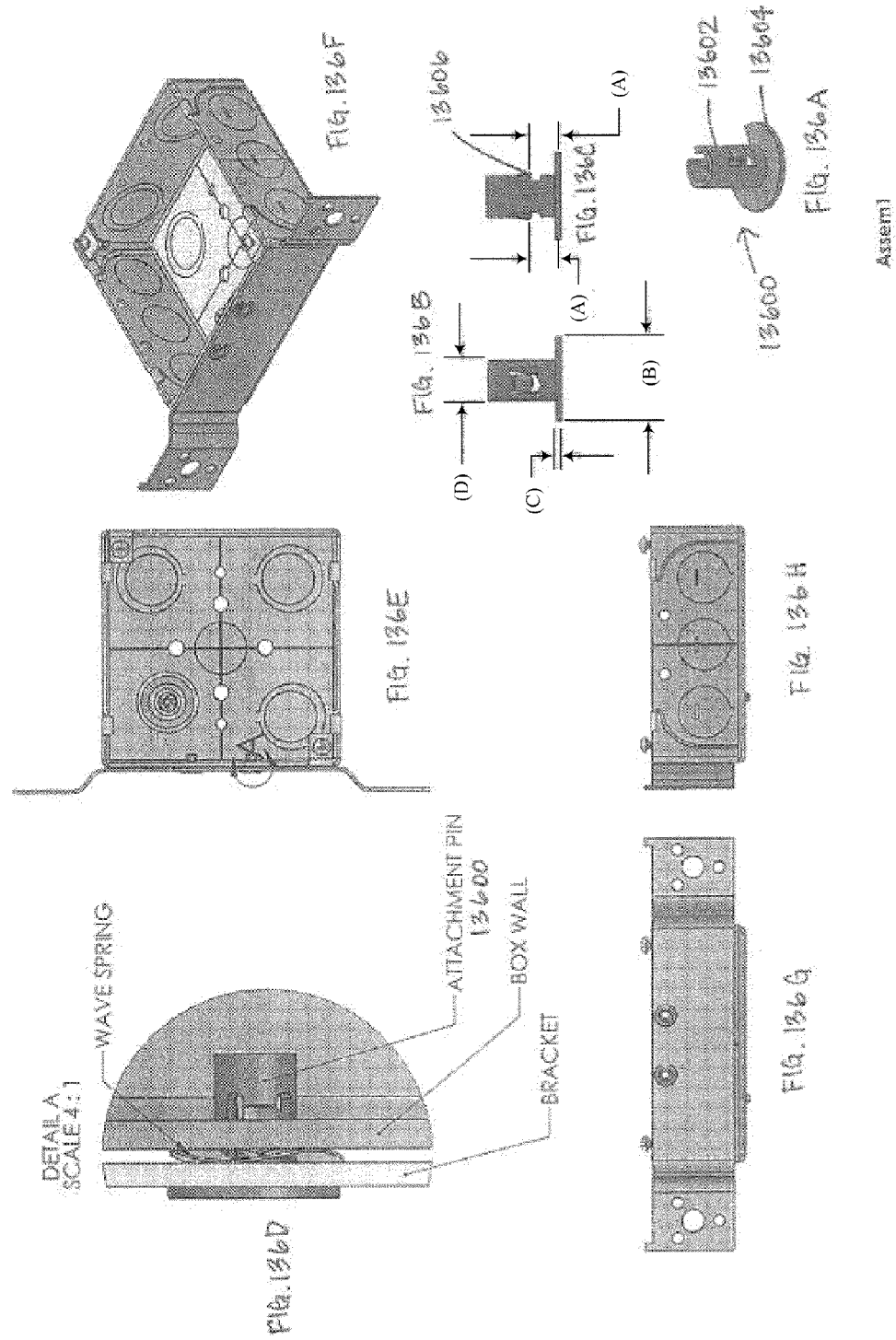

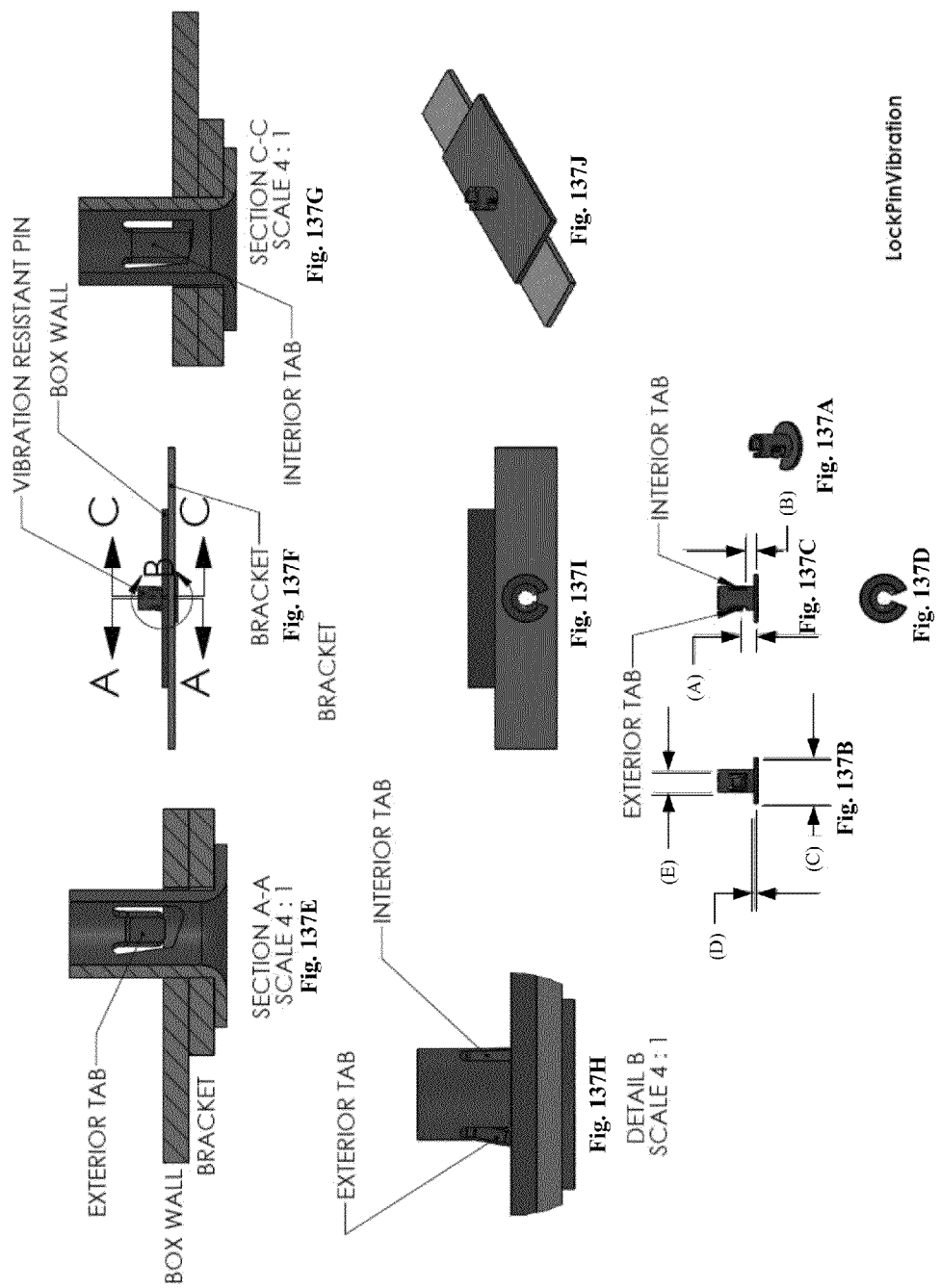

Step 1 – DENOTES SIDE WALL OF HANDY BOX

Step 1 – DENOTES SIDE WALL OF HANDY BOX
Step 2 – DENOTES SIDE WALL OF SQUARE BOX Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX
Step 4 - DENOTES SIDE WALL OF ANOTHER SQUARE BOX Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX
Step 4 - DENOTES SIDE WALL OF ANOTHER SQUARE BOX
Step 5 - DENOTES MATERIAL CUT AWAY BY 2ND BOX WALL Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX
Step 4 - DENOTES SIDE WALL OF ANOTHER SQUARE BOX
Step 5 - DENOTES MATERIAL CUT AWAY BY 2ND BOX WALL
Step 6 - DENOTES SIDE WALL FROM 3RD SQUARE BOX Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX
Step 4 - DENOTES SIDE WALL OF ANOTHER SQUARE BOX
Step 5 - DENOTES MATERIAL CUT AWAY BY 2ND BOX WALL
Step 6 - DENOTES SIDE WALL FROM 3RD SQUARE BOX
Step 7 - DENOTES MATERIAL CUT AWAY BY 3RD BOX WALL Step 1 - DENOTES SIDE WALL OF HANDY BOX
Step 2 - DENOTES SIDE WALL OF SQUARE BOX
Step 3 - DENOTES MATERIAL CUT AWAY SQUARE BOX MINUS HANDY BOX
Step 4 - DENOTES SIDE WALL OF ANOTHER SQUARE BOX
Step 5 - DENOTES MATERIAL CUT AWAY BY 2ND BOX WALL
Step 6 - DENOTES SIDE WALL FROM 3RD SQUARE BOX
Step 7 - DENOTES MATERIAL CUT AWAY BY 3RD BOX WALL
Steps 8 - 10 - DENOTES MATERIAL CUT AWAY BY OTHER BOX WALLS

ELECTRICAL ACCESSORIES AND ASSOCIATED METHODS OF USE AND MANUFACTURE

RELATED APPLICATIONS

This application is a continuation-in part of and claims priority under 35 U.S.C. §120 to U.S. patent application Ser. No. 13/232,634, titled "Electrical Accessories and Associated Methods of Use and Manufacture," filed on Sep. 14, 2011, which claims priority to U.S. Provisional Patent Application No. 61/382,723, titled "Modular Brackets, Mountings, and Knockouts for Electrical Junctions Boxes," filed on Sep. 14, 2010; and to U.S. Provisional Patent Application No. 61/477,021, titled "Electrical Accessories and Associated Methods of Use and Manufacture," filed Apr. 19, 2011, the entire contents of each of which are hereby incorporated herein by reference for all purposes.

TECHNICAL FIELD

This disclosure generally relates to electrical accessories, and more particularly relates to electrical accessories and associated methods of use and manufacture.

BACKGROUND

Electrical junction boxes, also known as outlet boxes, are utilized to provide termination and connection points for electrical wiring as well as data, communication, and control wiring. Generally, electrical wiring in residential and commercial construction will be installed in the walls or ceilings of the construction, and one or more electrical junction boxes can be provided at various points along the wiring to permit the installation of associated electrical switches, electrical outlets, and other devices such as lights, fans, etc. In some instances, such as for wall mounted switches or electrical outlets, an installer may need a certain length of exposed electrical wiring to connect a switch or outlet to the electrical wiring. In such instances, the exposed electrical wiring should be contained within the junction box to protect residents and/or commercial workers from electrical hazards associated with exposed electrical wiring.

Conventional metal electrical junction boxes can be mounted using a variety of brackets and other mounting means. However, the number of different conventional metal electrical junction boxes combined with the variety of brackets and other mounting means creates the need for providing ever increasing amount of inventory space for a manufacturer, supplier, or retailer to offer these products to a consumer. In addition, the number of SKUs (stock keeping units) or unique identifiers and associated time spent tracking this inventory can be burdensome and expensive.

BRIEF DESCRIPTION OF THE DRAWINGS

The foregoing, and other example embodiments and aspects will be better understood from the following detailed description of the certain embodiments of the disclosure with reference to the drawings, in which:

FIGS. 2-23, and 31-54 are views of example modular brackets and mountings for an electrical junction box in accordance with various example embodiments of the disclosure.

FIGS. 24-27 and 55-56 are views of example knockouts for an electrical junction box in accordance with various example embodiments of the disclosure.

FIG. 28 is an example set of dimensions for example knockouts for an electrical junction box in accordance with various example embodiments of the disclosure.

FIGS. 57-73 are views of example electrical junction boxes in accordance with various example embodiments of the disclosure.

FIGS. 74-89D, 94A-104, and 107A-110 are views of example folded electrical junction boxes in accordance with various example embodiments of the disclosure.

FIGS. 90A-93B and 105A-106B are views of example folded electrical accessories in accordance with various example embodiments of the disclosure.

FIGS. 114A-117D, and 121-129 are views of example mounting brackets for an electrical junction box in accordance with an example embodiment of the disclosure.

FIGS. 118A-120D are views of example electrical accessories in accordance with various example embodiments of the disclosure.

FIG. 130 illustrates a chart with example knockout configurations for electrical junction boxes in accordance with various example embodiments of the disclosure.

FIGS. 131-132D illustrate views of another example mounting device for an electrical junction box in accordance with an example embodiment of the disclosure.

FIGS. 133-134D illustrate views of another example modular bracket for an electrical junction box in accordance with an example embodiment of the disclosure.

FIGS. 136A-136H show another example mounting device in accordance with an example embodiment of the disclosure.

FIGS. 137A-137J show another example mounting device in accordance with an example embodiment of the disclosure.

DETAILED DESCRIPTION OF EXAMPLE EMBODIMENTS

Figure 1:
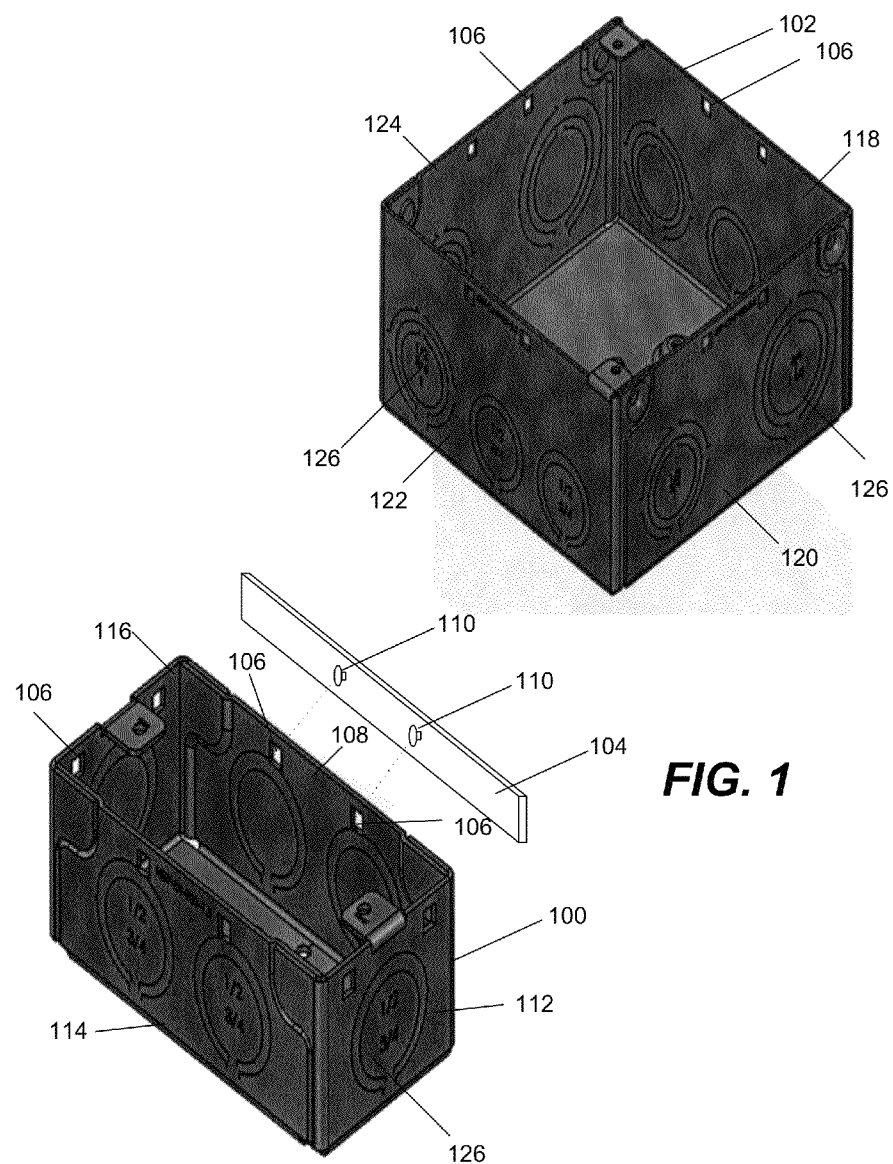
FIG. 1 is a perspective view of an example modular bracket, mountings, and electrical junction box in accordance with an example embodiment of the disclosure.

Example embodiments of the disclosure now will be described more fully hereinafter with reference to the accompanying drawings, in which example embodiments of the disclosure are shown. These concepts shown with reference to the example embodiments discussed herein may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like elements throughout.

The terms "electrical junction box," "electrical accessory," "electrical junction box," "outlet box," "junction box," and their pluralized forms are used interchangeably throughout this specification, and are intended to refer to a receptacle or device enclosure used for mounting or affixing electrical wires to or within a receptacle or device enclosure, which can in turn be mounted to a wall, wall stud, ceiling, or ceiling stud.

The terms "modular bracket," "mounting bracket," and their pluralized forms are used interchangeably throughout this specification, and are intended to refer to a device mounted to an exterior wall or surface of an electrical junction box.

The terms "mount," "mounting," "mounting device," and "modular attachment," and their pluralized forms are used interchangeably throughout this specification, and are intended to refer to an apparatus, device, or technique for connecting a modular or mounting bracket to an electrical junction box.

The term "predefined universal distance" is intended to refer to a preselected distance between the centers of at least two mounting holes in a wall of an electrical junction box. The preselected distance is typically selected based at least in part on the surface area of the wall of the electrical junction box, the sizing and spacing of knockouts on the wall of the electrical junction box, and the relative sizes of some or all electrical junction boxes in the same family or group of electrical junction boxes.

In accordance with example embodiments of the disclosure, modular brackets, mountings, and knockouts for electrical junction boxes and associated methods of use and manufacture are provided. Modular brackets and mountings for electrical junction boxes can be made to mount a variety of electrical junction boxes with different shapes and sizes. For example, a modular bracket and mounting for an electrical junction box can be configured to mount to one or more different sized and/or shaped electrical junction boxes including, but not limited to, a single gang, rectangular-shaped electrical junction box, a double gang rectangular-shaped electrical junction box, a square-shaped electrical junction box, a round electrical junction box, a hexagonal-shaped electrical junction box, or an octagonal-shaped electrical junction box. The term "modular" used in this specification generally refers to the interchangeability of a particular bracket to be mounted to multiple different sized and/or shaped electrical junction boxes. For example, a modular bracket of interest may be configured to be mounted to multiple sizes of electrical junction boxes including, but not limited to, a single gang, rectangular-shaped electrical junction box; a double gang rectangular-shaped electrical junction box; a round electrical junction box; and an octagonal-shaped electrical junction box.

In accordance with other example embodiments of the disclosure, knockouts for electrical junction boxes can be formed in electrical junction boxes with different shapes and sizes. For example, one or more knockouts for an electrical junction box can be selectively sized and oriented in one or more different sized and/or shaped electrical junction boxes including, but not limited to, a single gang, rectangular-shaped electrical junction box, a double gang rectangular-shaped electrical junction box, a square-shaped electrical junction box, a round electrical junction box, a hexagonal-shaped electrical junction box, or an octagonal-shaped electrical junction box. For example, a knockout of interest may be configured to be mounted to multiple sizes of electrical junction boxes including, but not limited to, a single gang, rectangular-shaped electrical junction box; a double gang rectangular-shaped electrical junction box; a round electrical junction box; and an octagonal-shaped electrical junction box.

Modular brackets and mountings for electrical junction boxes and associated methods of use and manufacture of such modular brackets and associated electrical junction boxes provided by certain embodiments of the disclosure can provide various technical effects and/or solutions. In certain instances, modular brackets and mountings for electrical junction boxes can reduce time and costs in storing, assembling together, and mounting the modular brackets and electrical junction boxes. Contractors, end users, and installers can benefit from using various embodiments of the disclosure since modular accessories can provide greater installation versatility, wherein many more configurations may be possible and the availability of some fixed configurations may be challenging.

Knockouts for electrical junction boxes and associated methods of use and manufacture of such knockouts and associated electrical junction boxes provided by certain embodiments of the disclosure can provide various technical effects and/or solutions. In certain instances, knockouts for electrical junction boxes can reduce time and costs in storing, assembling together, and mounting the modular brackets and electrical junction boxes.

FIG. 1 illustrates a perspective view of an example modular bracket, mountings, and electrical junction boxes in accordance with an example embodiment of the disclosure. FIG. 1 illustrates an example single gang, rectangular-shaped folded electrical junction box 100 and a double gang, square-shaped folded electrical junction box 102 ready for installation or use with a modular bracket 104 by a user or consumer in accordance with an example embodiment of the disclosure. Each junction boxes 100, 102 can include one or more spaced-apart holes 106 on at least one sidewall 108 of the boxes 100, 102 to receive a respective number of mounting devices 110 associated with the modular bracket 104. In this example, the smaller rectangular-shaped box 100 can include spaced-apart holes 106 near the upper open edges of all four of the sidewalls 108, 112, 114, 116. The spaced-apart holes 106 are generally spaced apart at approximately the same or similar distance, such as a predefined universal distance, to facilitate using a common modular bracket with mounting devices, such as 110. For example, a predefined universal distance for the electrical junction box shown as 100 in FIG. 1 and/or for a similar family or group of electrical junction boxes can be approximately 0.5 inches to 3.0 inches, such as about 1.0 inches (2.54 cm). Likewise, the larger square-shaped box 102 can include spaced-apart holes 106 near the upper open edges of all four of the sidewalls 118, 120, 122, 124. The spaced-apart holes 106 are generally spaced apart at approximately the same or similar distance, such as a predefined universal distance, to facilitate using a common modular bracket with mounting devices, such as 110. For example, a predefined universal distance for the electrical junction box shown as 102 in FIG. 1 and/or for a similar family or group of electrical junction boxes can be approximately 0.5 inches to 3.0 inches, such as about 1.0 inches (2.54 cm). Electrical junction boxes with similar shaped spaced-apart holes, such as 106, for use with a common modular bracket can be known collectively as a "family of electrical junction boxes." In other embodiments, an electrical junction box can have other shapes including, but not limited to, square, round, octagonal, rectangular "handy box," single gang rectangular, double gang rectangular, triple gang rectangular, and other multiple gang shapes. In other embodiments, a rectangular-shaped or square-shaped electrical junction box may have other dimensions such as a deeper or shallower depth than the boxes 100, 102 shown.

The spaced-apart holes 106 in the boxes 100, 102 shown in this example embodiment can be square-shaped holes. The spacing between the respective centerlines of the holes 104 can be, for example, between approximately 0.25 inches (0.64 cm) and 3.5 inches (8.9 cm), and the holes 104 can be spaced, for example, relatively close to the upper edge of the electrical junction boxes 100, 102, such as approximately 0.25 to 0.5 inches from the upper edge. In other embodiments, other shapes, dimensions, and spacing for the holes in an electrical junction box can be used.

A predefined universal distance or spacing between holes for a modular or mounting bracket in accordance with an example embodiment of the disclosure, such as spaced-apart holes 106 in FIG. 1, can be selected based at least in part on the surface area of one or more sidewalls for an electrical junction box, the sizing and spacing of knockouts, such as 126, on the sidewalls of the electrical junction box, and the relative sizes of some or all electrical junction boxes in the same family or group of electrical junction boxes. In any instance, the predefined universal distance or spacing between holes for a mounting bracket in accordance with an example embodiment of the disclosure can be consistent or otherwise closely similar to the distance between holes in a family or group of electrical junction boxes. In this manner, a common modular or mounting bracket can be used with multiple electrical junction boxes of different sizes and/or shapes, thus reducing time and costs in storing, assembling together, and mounting the modular or mounting brackets and electrical junction boxes.

According to an example embodiment of the disclosure, an example method for determining a predefined universal distance and the sizes and locations of various features, such as knockouts, for an electrical junction box is described with respect to FIGS. 138-146.

The modular bracket 104 shown can include two mounting devices 110, though in other embodiments, a fewer or greater number of mounting devices can be employed. The mounting devices 110 shown in FIG. 1 are protrusions with a relatively narrow body portion extending from the surface of the modular bracket 104 with both protrusions terminating with relatively wide flared head portion. The mounting devices 110 shown in FIG. 1 are correspondingly spaced apart a predefined universal distance, similar to the spaced-apart holes 106 in FIG. 1. The mounting devices 110 are shown by way of example only, and other mounting devices can be used in other embodiments. In use, the modular bracket 104 can mount adjacent to one of the sidewalls of either electrical junction box 100, 102, such as sidewall 108 or 118, when the mounting devices 110 are inserted through respective holes 106 in the sidewall 108 or 118. After each mounting device 110 is inserted through respective holes 106, the shape and configuration of the mounting devices 110 maintain the relative positions of the box 100, 102 and modular bracket 104 in a substantially adjacent orientation. Other modular brackets, mounting devices, and associated holes, and associated configurations, sizes, dimensions, positions, and numbers of modular brackets, mounting devices, and holes in each sidewall and electrical junction box are possible in accordance with embodiments of the disclosure.

In one aspect of an example embodiment, the modular bracket and mounting devices can be made from a single piece or integral material.

In one aspect of an example embodiment, a modular bracket and electrical junction box in accordance with an example embodiment of the disclosure can meet the standards specified by UL (Underwriters' Laboratories) 514A.

Other example modular or mounting brackets and mountings for an electrical junction box in accordance with various embodiments of the disclosure are shown and described below with respect to FIGS. 2-23, 31-54 and 147A-148. Each of the mountings that may be shown in FIGS. 2-23, 31-54, 147A-148 can be spaced apart a predefined universal distance from at least one other mounting, and used in conjunction with a modular bracket, such as 104, for use in mounting the modular bracket to a wall or sidewall of an electrical junction box, similar to 100, 102, or 14800 of FIG. 148. Furthermore, the various electrical junction boxes that may be shown in FIGS. 2-23, 31-54, and 148 can include or otherwise be modified to include a pair of spaced-apart mounting holes, similar to 106 in FIGS. 1 and 14806 in FIG. 148, near the upper open edges of the sidewalls. The spaced-apart holes of these electrical junction boxes are generally spaced apart at approximately the same or similar distance, such as a predefined universal distance, to facilitate using a common modular bracket with mounting devices, similar to 110 of FIGS. 1 and 14706 of FIG. 147A.

One will recognize that modular or mounting brackets and mountings in accordance with embodiments of the disclosure can be used with plaster ears, old work clips, far side box supports, and other electrical, data, communication, and control accessories.

Also shown in FIG. 1 is a series of knockouts 126 oriented in each of the sidewalls 108, 112, 114, 116, 118, 120, 122, 124 of the electrical junction boxes 100, 102 shown. Two knockouts 126 are shown in each of the longer sidewalls 106, 112 of the rectangular-shaped box 100, and one knockout 126 is shown in each of the shorter sidewalls 110, 114 of the rectangular-shaped box 100. The knockouts in the rectangular-shaped box 100 are, for example, all double knockout configurations with concentrically-shaped or eccentrically-shaped knockouts of ¾ and 1 inch sizes. In the square-shaped box, two knockouts are shown in a pair of opposing sidewalls 118, 122, and three knockouts are shown in the other pair of opposing sidewalls 120, 124. The two knockouts in the sidewalls 120, 124 of the square-shaped box 102 are two different sized triple knockout configurations with concentrically-shaped or eccentrically-shaped knockouts, the first including ½, ¾, and 1 inch sizes, and the second including ¾, 1, and 1¼ inch sizes. The three knockouts in the sidewalls 118, 122 of the square-shaped box 102 include two similar sized double knockout configurations with concentrically-shaped or eccentrically-shaped knockouts, these including ¾ and 1 inch sizes, and further including a triple knockout configuration with concentrically-shaped or eccentrically-shaped knockouts with ½, ¾, and 1 inch sizes. Other knockout configurations, sizes, dimensions, positions, and numbers of knockouts in each sidewall and electrical junction box are possible in accordance with embodiments of the disclosure.

In one aspect of an example embodiment, one or more knockouts in an electrical junction box in accordance with an example embodiment of the disclosure can meet the standards specified by UL (Underwriters' Laboratories) 514A.

Detailed views and dimensions for example knockouts for an electrical junction box in accordance with various embodiments of the disclosure are shown and described below with respect to FIGS. 24-28 and 55-56.

Turning to other examples of modular or mounting brackets and mountings, FIGS. 2-23, 31-54, and 147A-D are views of example modular or mounting brackets and mountings for an electrical junction box in accordance with various embodiments of the disclosure. In each of these embodiments, various shaped modular or mounting brackets with one or more mounting devices are shown.

In FIG. 2, a mounting bracket 200 with two different mounting devices 202, 204 is shown. The first mounting device, a pivoting retainer clip 202, is shown with a pair of extended open ends and an intermediate cap shape, wherein the cap shape can provide a spring-like force to maintain the extended open ends in a relatively parallel orientation. The clip 202 is shown in an installed position with respect to a cylindrical-shaped protrusion or clip post 206 extending from the mounting bracket 200. When the protrusion or clip post 206 is inserted into a respective hole of a junction box, the pivoting retainer clip 202 can be installed over the protrusion or clip post 206 to maintain the relative positions of the junction box and the mounting bracket 200 in substantial contact with each other.

The second mounting device, a locking spring 204, is shown in an extended position with respect to another cylindrical-shaped protrusion or second clip post 208 extending from the mounting bracket 200. FIG. 3 shows a side view of the mounting bracket shown in FIG. 2 with the locking spring 204 extending from an upper surface of the other cylindrical-shaped protrusion or second clip post 208 extending from the mounting bracket 200. The locking spring 204 is shown in an extended position, and when depressed can partially retract into the other cylindrical-shaped protrusion or second clip post 208. FIG. 4 shows a side-sectional view A-A of the locking spring 204 shown in FIG. 2.

FIG. 5 shows a side view of the mounting bracket 200 shown in FIG. 2. with a pair of clip posts 206, 208 is shown. The mounting bracket 200 is configured with a relatively wide and long box plate 210 to which the clip posts 206, 208 are mounted to, and is further configured with a relatively shorter but thicker bracket plate 212 mounted to the other side of the box plate 210 from the clip posts 206, 208.

Figure 6:
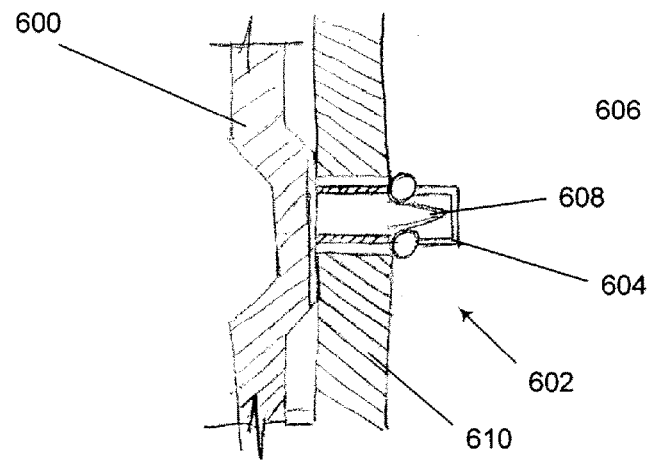

FIG. 6 illustrates a side view of a mounting bracket 600 with a mounting device such as a locking ball mechanism 602. In this example embodiment, the locking ball mechanism 602 can include a protrusion 604 extending from the mounting bracket 600, and a pair of spaced-apart lock balls 606 with a spring, such as a V-shaped spring 608, disposed between the lock balls 606. In use, when the locking ball mechanism 602 is inserted through a hole in a junction box, such as 610, the V-shaped spring 608 permits the lock balls 606 to recess within a portion of the protrusion 604 as the mechanism 602 passes through the sidewall of the junction box 610. When the lock balls 606 are substantially through the sidewall, the V-shaped spring 608 permits the lock balls 606 to move away from each other thus permitting the locking ball mechanism 602 to maintain the relative positions of the mounting bracket 600 and junction box 610 in substantial contact with each other.

Figure 7:
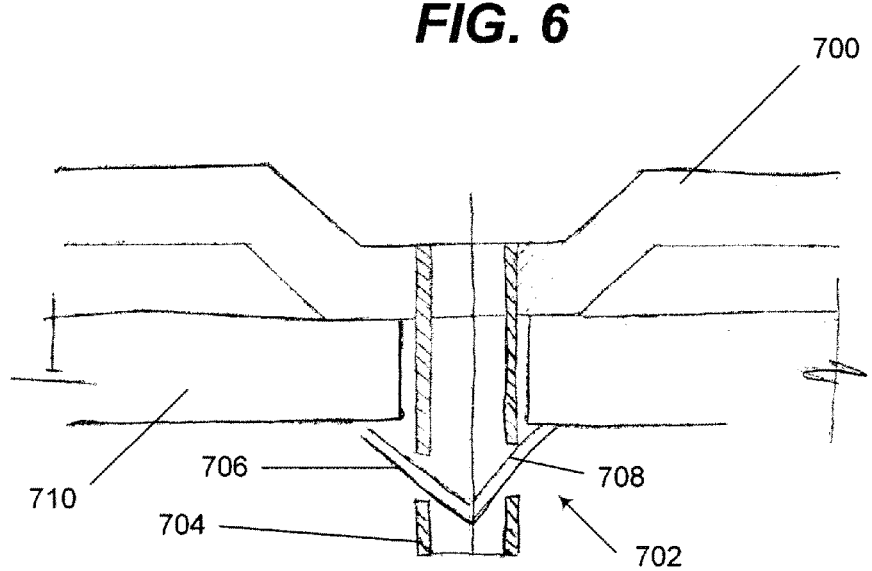

FIG. 7 illustrates a side view of a mounting bracket 700 with a mounting device such as a V-spring device 702. In this example embodiment, the V-spring device 702 can include a protrusion 704 extending from the mounting bracket 700, and a pair of spaced-apart arms 706 connected together at one end, such as a V-shaped spring 708, disposed within the protrusion. In use, when the V-spring device 702 is inserted through a hole in a junction box, such as 710, the V-shaped spring 708 permits the spaced-apart arms 706 to recess within a portion of the protrusion 704 as the device 702 passes through the sidewall of the junction box 710. When the spaced-apart arms 706 are substantially through the sidewall, the V-shaped spring 708 permits the spaced-apart arms 706 to move away from each other thus permitting the V-spring device 702 to maintain the relative positions of the mounting bracket 700 and junction box 710 in substantial contact with each other.

Figure 8:
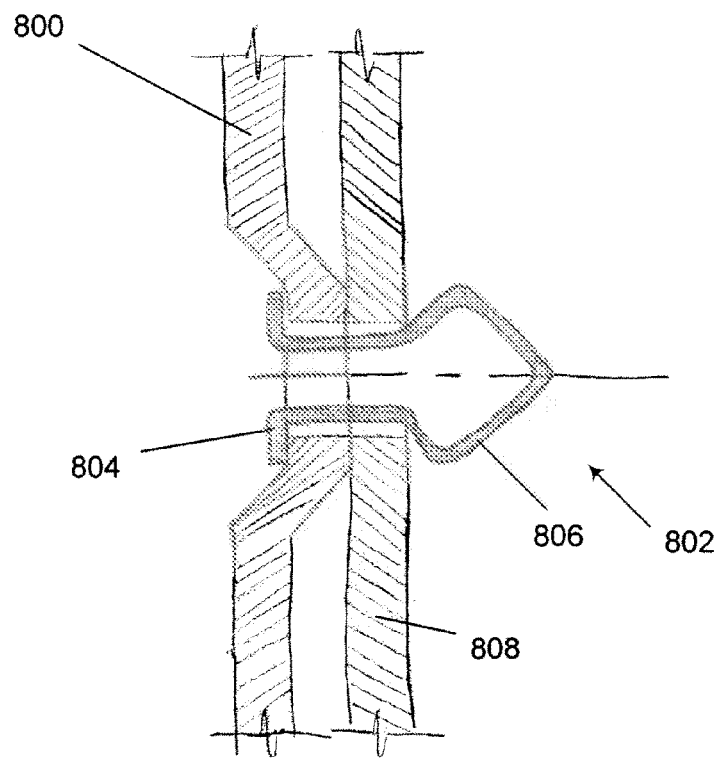

FIG. 8 illustrates a side view of a mounting bracket 800 with a mounting device such as a wire spade device 802. In this example embodiment, the wire spade device 802 can include a retention portion 804, an expanded portion 806, and an extended protrusion 806 disposed between the retention portion 804 and expanded portion 806. In use, when the wire spade device 802 is inserted through aligned a hole in a junction box, such as 808, the expanded portion 806 compresses to permit the device 802 to pass through the hole. When the expanded portion 806 is substantially through the sidewall of the junction box 808, the expanded portion 806 expands, thus permitting the wire spade device 802 to maintain the relative positions of the mounting bracket 800 and junction box 808 and in substantial contact with each other.

Figure 9:
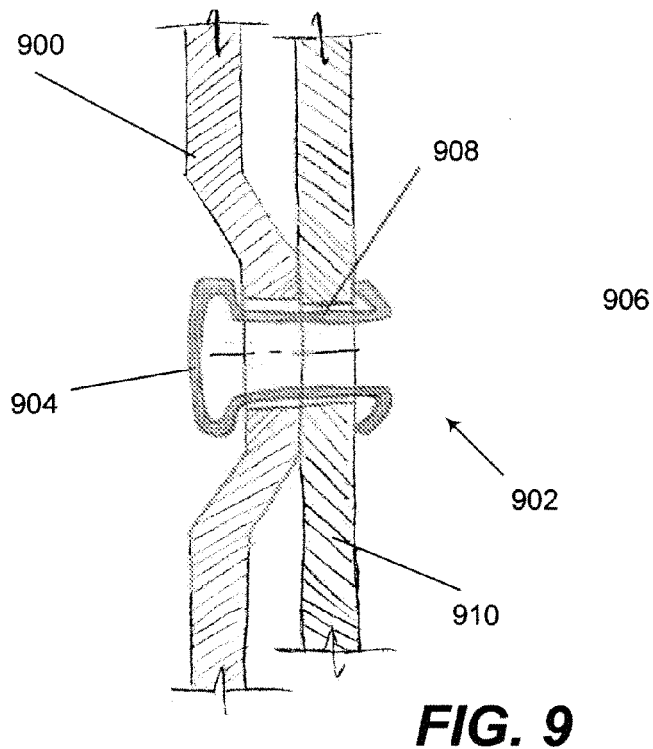

FIG. 9 illustrates a side view of a mounting bracket 900 with a mounting device such as an omega clip device 902. In this example embodiment, the omega clip device 902 can include a retention portion 904, a cup or lip 906, and an extended portion 908 disposed between the retention portion 904 and cup or lip 906. In use, when the omega clip device 902 is inserted through a hole in the junction box, such as 910, the lip or cup 906 compresses inwardly to permit the device 902 to pass through the hole. When the lip or cup 906 is substantially through the sidewall of the junction box 910, the lip or cup 906 can expand outwardly, thus permitting the omega clip device 902 to maintain the relative positions of the mounting bracket 900 in close proximity to the sidewall of the junction box 910.

In FIG. 10, a mounting bracket 1000 with two different mounting devices 1002, 1004 is shown. The first mounting device, a tab 1002, is shown with a terminating knobbed portion and a short protrusion from the mounting bracket 1000. When the knobbed portion of the tab 1002 is inserted into a respective hole of a junction box, the knobbed portion of the tab 1002 can maintain the relative positions of the junction box and the mounting bracket 1000 in substantial contact with each other.

The second mounting device, a screw 1004, is shown in an extended position from the mounting bracket 1000. FIG. 11 shows an overhead view and FIG. 12 shows and another side view of the mounting bracket 1000 shown in FIG. 10 with the screw 1004 extending from the mounting bracket 1000. An associated nut or cap 1006 can be mounted to one or more threads or otherwise exposed end of the screw 1004, and when tightened can maintain the relative position of the mounting bracket 1000 in close proximity to the sidewall of the junction box.

Figure 13:
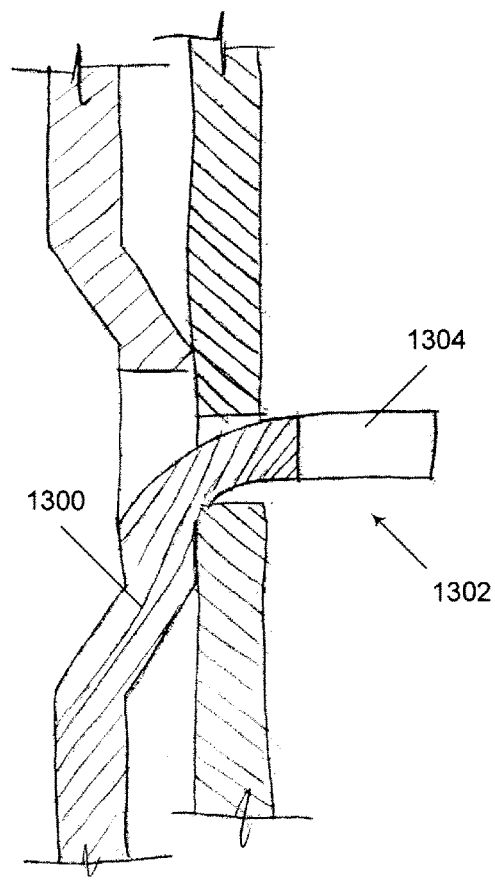
Figure 14:
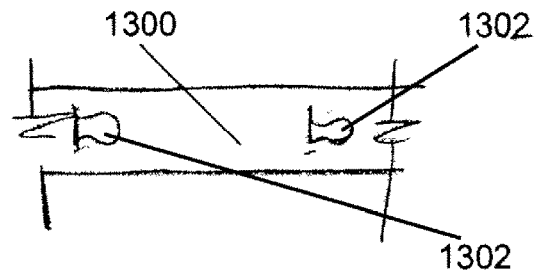

In FIGS. 13 and 14, a mounting bracket 1300 with a mounting device, such as a pliable lock device 1302 is shown. The pliable lock device 1302 is shown with a pliable portion 1304 extending from the mounting bracket 1300. When the pliable portion 1302 is inserted into a respective hole of a junction box, the pliable portion 1302 can be manipulated or otherwise twisted to maintain the relative positions of the junction box and the mounting bracket 1300 in substantial contact with each other.

FIG. 15 illustrates a side view of a mounting bracket 1500 with a mounting device such as a V-shape clip device 1502. In this example embodiment, the V-shape clip device 1502 can include an extended portion 1504 mounted to the mounting bracket 1500, and a barbed portion 1506 at an opposing end of the extended portion 1504. In use, when the V-shape clip device 1502 is inserted through a hole in a junction box, such as 1508, the barbed portion 1506 of the device 1502 compresses against the extended portion 1504 as the device 1502 passes through the sidewall of the junction box 1508. When the barbed portion 1506 is substantially through the sidewall, the barbed portion 1506 moves away from the extended portion 1504 thus permitting the V-shape clip device 1502 to maintain the relative positions of the mounting bracket 1500 and junction box 1508 in substantial contact with each other.

FIG. 16 illustrates a side view of a mounting bracket 1600 with a mounting device such as a winged locking device 1602. In this example embodiment, the winged locking device 1602 can include a protrusion 1604 extending from the mounting bracket 1600, and a pair of winglets 1606 operable to pivot outward from the protrusion 1604. In use, when the winged locking device 1602 is inserted through a hole in a junction box, such as 1608, the winged locking device 1602 permits the pair of winglets 1606 to recess within a portion of the protrusion 1604 as the device 1602 passes through the sidewall of the junction box 1608. When the winglets 1606 are substantially through the sidewall, the winged locking device 1602 permits the winglets 1606 to pivot outward from the protrusion 1604 thus permitting the winged locking device 1602 to maintain the relative positions of the mounting bracket 1600 and junction box 1608 in substantial contact with each other.

In FIG. 17, a mounting bracket 1700 with a pair of mounting devices, such as screws 1702, is shown. This example embodiment also includes an optional pair of locating devices, such as bumps 1704. The screws 1702 are mounted to the mounting bracket 1700 and extend from the bracket 1700 in a substantially perpendicular orientation. The bumps 1704 are located outwardly from the screws 1702, and can correspond with respective depressions formed on a junction box 1706. The bumps 1704 or other locating devices can assist a user when positioning the mounting bracket 1700 with respect to the junction box 1706. Furthermore, when the screws 1702 are inserted into a respective hole of a junction box, the screws can be tightened, for example, by a quarter turn, to maintain the relative positions of the junction box 1706 and the mounting bracket 1700 in substantial contact with each other.

In FIGS. 18 and 19, a mounting bracket 1800 with two different mounting devices 1802, 1804 is shown. The first mounting device, a tab 1802, is shown with a protrusion 1806 from the mounting bracket 1800, and a retaining portion 1808. Prior to installation, the protrusion 1806 and retaining portion 1808 are both substantially perpendicular to the mounting bracket 1800. When the retaining portion 1808 is inserted into a respective hole of a junction box, such as 1810, the retaining portion 1802 can be manipulated or otherwise twisted to maintain the relative positions of the junction box 1810 and the mounting bracket 1800 in substantial contact with each other.

The second mounting device, a tree-shaped device 1804, is shown in mounted position with respect to the mounting bracket 1800 in FIG. 19. The tree-shaped device 1804 can be a plastic device with a retaining portion 1812, a tree-shaped head 1814, and a protrusion 1816 extending between the retaining portion 1812 and the head 1814. In use, the mounting bracket 1800 and junction box 1810 can be aligned such that at least one hole in the junction box 1810 is aligned with a corresponding hole 1818 in the mounting bracket 1800. The tree-shaped device 1804 can be mounted by leading the head 1814 through the holes of the junction box 1810 and mounting bracket 1800, wherein the head 1814 compresses while passing through the holes, and then expands to maintain the relative position of the mounting bracket 1800 in close proximity to the sidewall of the junction box 1810.

In FIG. 20, a mounting bracket 2000 with a pair of mounting devices, such as L-shaped tabs 2002, is shown. The L-shaped tabs 2002 are shown with a protrusion 2004 from the mounting bracket 2000, and a retaining portion 2006. When the retaining portions 2006 of the L-shaped tabs 2002 are inserted into a respective holes of a junction box, such as 2008, the junction box 2008 can be manipulated to fit a portion of the junction box 2006 snugly between the retaining portions 2004 and the mounting bracket 2000 to maintain the relative positions of the junction box 2008 and the mounting bracket 2000 in substantial contact with each other.

Figure 21:
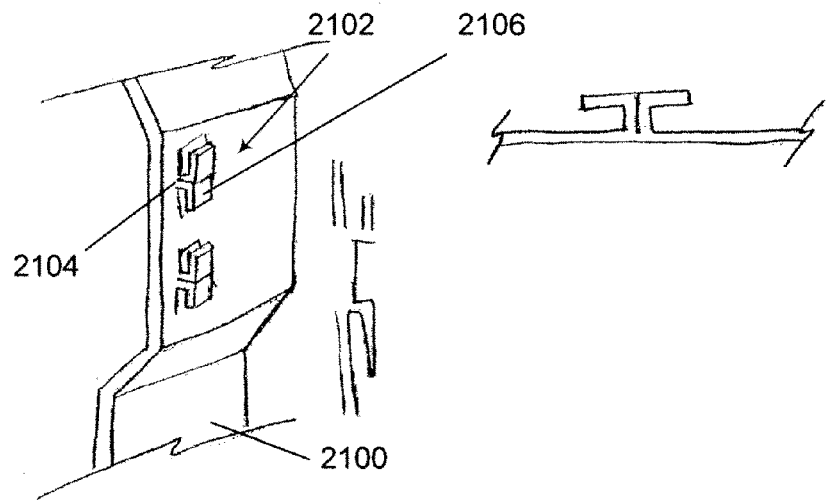

In FIG. 21, a mounting bracket 2100 with a pair of mounting devices, such as T-shaped tabs 2102, is shown. Each of the T-shaped tabs 2102 is shown as a pair of L-shaped tabs similar to 2002 in FIG. 20 with the protrusions 2104 of each tab 2102 adjacent to or in close proximity to each other. In other embodiments, each of the T-shaped tabs 2102 can each be integrally formed from a single material piece. In any instance, when the retaining portions 2106 of the L-shaped tabs 2102 are inserted into a respective holes of a junction box, the junction box can be manipulated to fit a portion of the junction box snugly between the retaining portions 2104 and the mounting bracket 2100 to maintain the relative positions of the junction box and the mounting bracket 2100 in substantial contact with each other.

Figure 22:
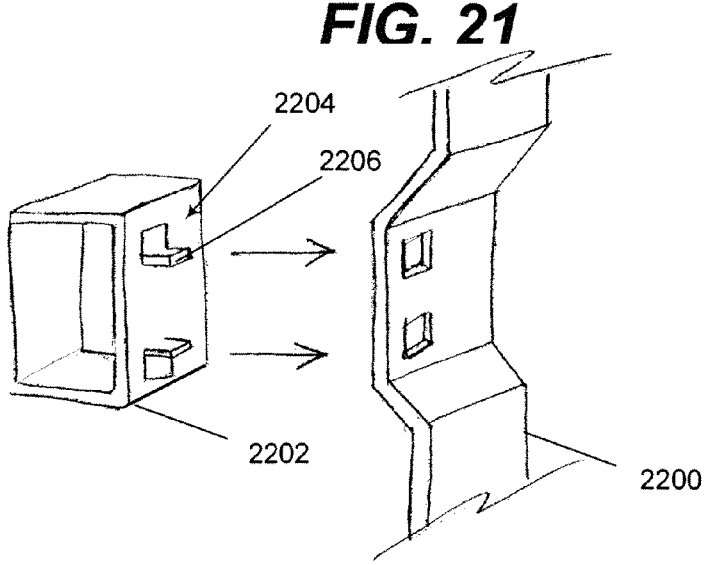

In FIG. 22, a mounting bracket 2200 and a junction box 2202 with a pair of similar mounting devices, such as pliable tabs 2204, are shown. The pliable tabs 2204 are shown with a protrusion 2206 from the junction box 2202. Prior to installation, the protrusion 2206 is substantially perpendicular to the junction box 2202. When the protrusion 2206 is inserted into a respective hole of a mounting bracket, such as 2200, the protrusion 2206 can be manipulated or otherwise twisted to maintain the relative positions of the junction box 2202 and the mounting bracket 2200 in substantial contact with each other. In this example, the mounting devices are shown on the junction box instead of the mounting bracket. One will recognize the interchangeability of mountings for a junction box and mounting bracket in accordance with embodiments of the disclosure. That is, some or all of the mountings can be placed on the junction box rather than the mounting bracket, and vice-versa.

Figure 23:
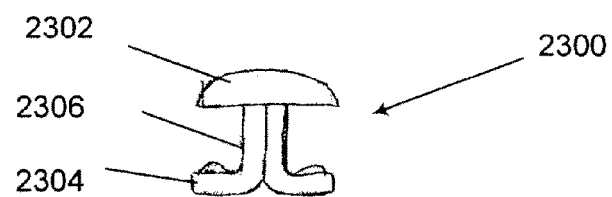

In FIG. 23, a standalone mounting device such as a split T-shaped lock 2300 is shown. In certain embodiments, a mounting device can be a standalone device not mounted to a mounting bracket, while in other embodiments, a mounting device can be mounted to the mounting bracket prior to installation of the mounting bracket to a junction box or other electrical accessory. In either instance, a mounting device in accordance with embodiments of the disclosure can maintain the relative positions of a junction box and a mounting bracket in substantial contact with each other. Returning to the example embodiment of FIG. 23, the split T-shaped lock 2300 can include a relatively flat screw head 2302, a pair of retaining arms 2304, and a protrusion 2306 disposed between the head 2302 and the arms 2304. In use, the split T-shaped lock 2300 can be mounted by leading the head 2302 through the aligned holes of a junction box and mounting bracket, wherein the head 2302 compresses while passing through the holes, and then expands to maintain the relative position of the mounting bracket in close proximity to the sidewall of the junction box.

FIGS. 31-54 illustrate additional example modular brackets and mountings for an electrical junction box in accordance with various embodiments of the disclosure.

Figure 31:
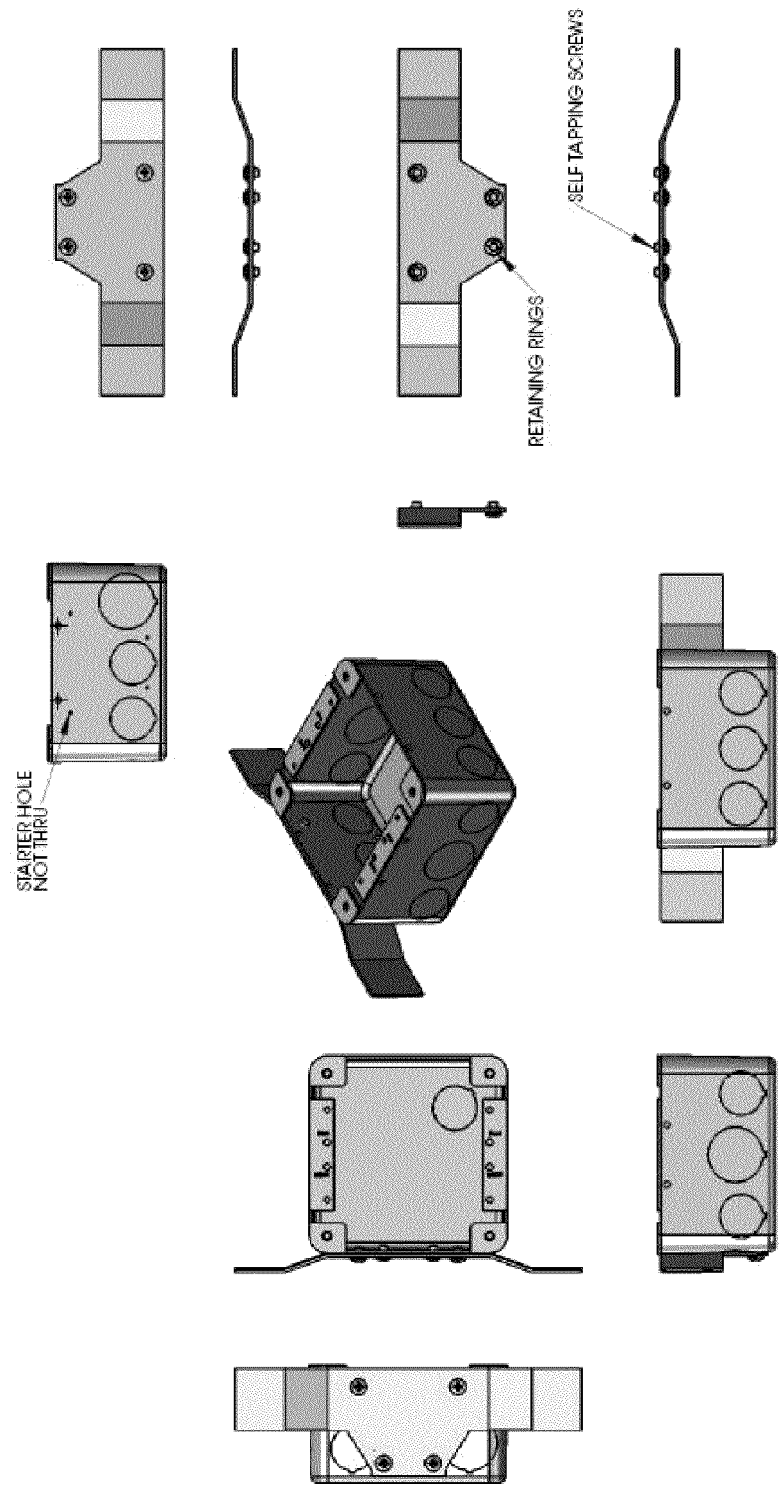

FIG. 31 illustrates various views of a square-shaped double gang electrical junction box 3100 and modular bracket 3102 in accordance with an example embodiment of the disclosure. The modular bracket includes one or more mounting devices such as a set of retaining rings 3104 and self-tapping screws 3106. The modular bracket 3102 is shown mounted to a lateral side of the junction box 3100 by way of the set of retaining rings 3104 and self-tapping screws 3106. Each of the retaining rings 3104 can be a reinforced body operable receive a respective end of a self-tapping screw 3106. When the self-tapping screws 3106 are correspondingly mounted to the retaining rings 3104, and one or more screws 3106 are driven into the retaining rings, the retaining rings 3104 and screws 3106 can maintain the relative positions of the junction box 3100 and the modular bracket 3102 in substantial contact with each other.

Figure 32:
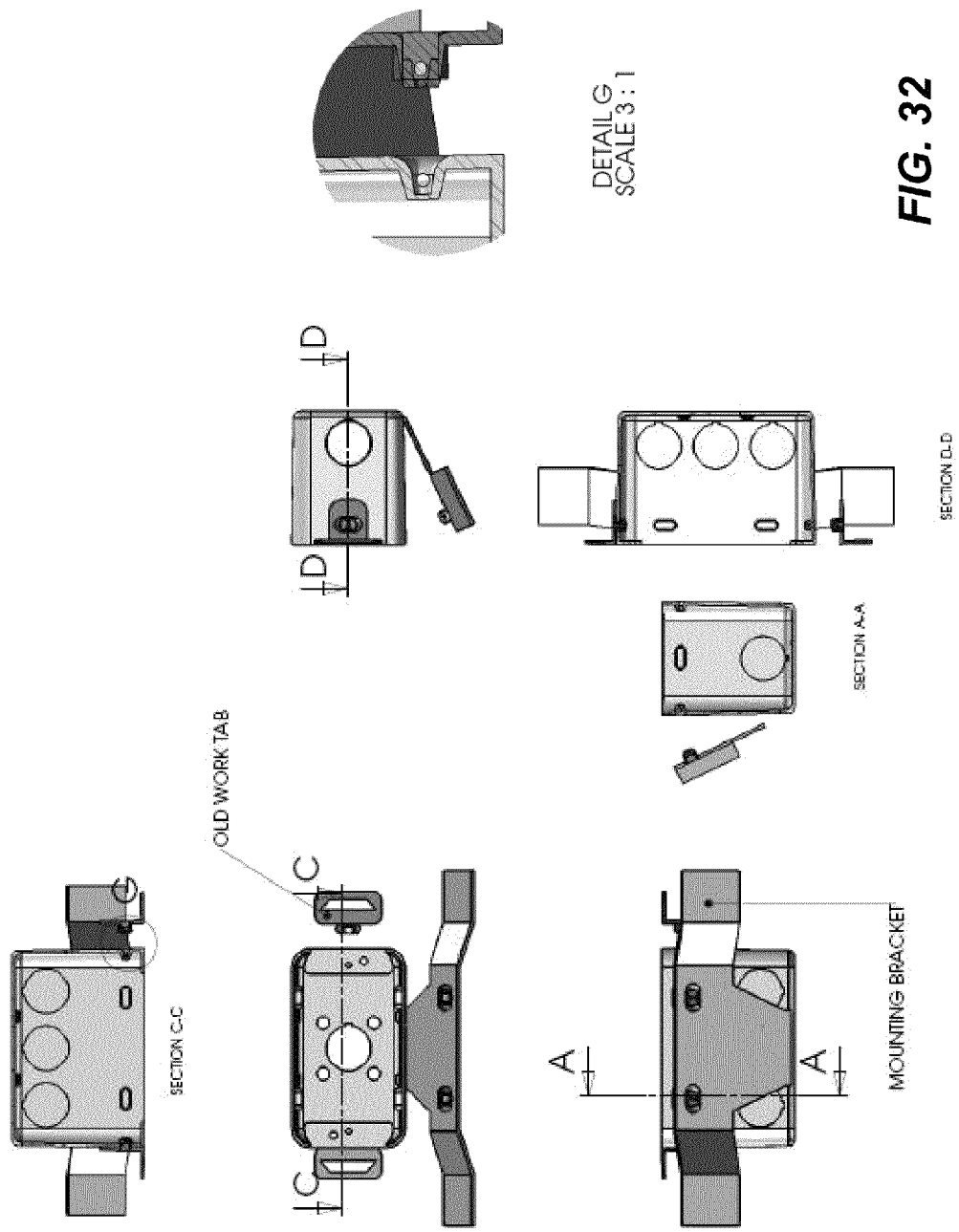

FIG. 32 illustrates various views of a rectangular-shaped single gang electrical junction box 3200 and modular bracket 3202 in accordance with an example embodiment of the disclosure. The geometrically-shaped modular bracket 3202 can include one or more mounting devices such as a set of protrusions 3204. The modular bracket 3202 can be mounted to a lateral side of the junction box 3200 by way of the protrusions fitting into corresponding recesses 3206 in the junction box. Another shorter modular bracket 3208 shown for the relatively shorter end walls of the junction box 3200 can use similar shaped protrusions to mount to similar shaped recesses at either of the end walls of the junction box 3200. In either instance, when the protrusions 3204 are correspondingly mounted to the recesses 3206 in the junction box 3200, the mating of the protrusions 3204 in the recesses 3206 can maintain the relative positions of the junction box 3200 and the modular bracket 3202, 3208 in substantial contact with each other.

Figure 33:
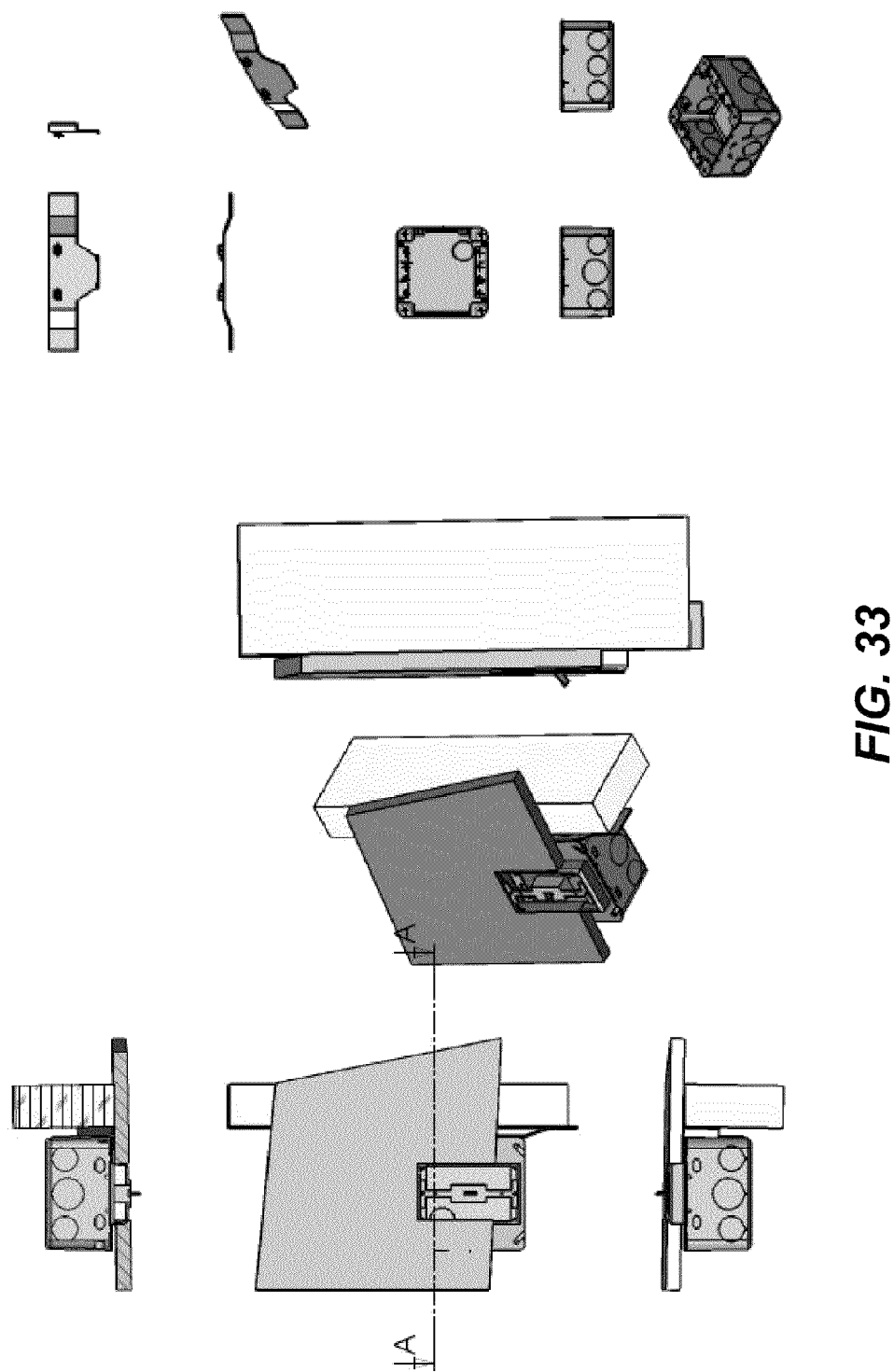

FIG. 33 illustrates various views of a square-shaped double gang electrical junction box 3300 and modular bracket 3302 in accordance with an example embodiment of the disclosure. The geometrically-shaped modular bracket 3302 can include one or more mounting devices such as a set of protrusions 3304. The modular bracket 3302 is shown mounted to a lateral side of the junction box 3300 by way of the protrusions 3304 fitting into corresponding holes 3306 in the junction box. When the protrusions 3304 are correspondingly mounted to the holes 3306 in the junction box 3300, the mating of the protrusions 3304 in the holes 3306 can maintain the relative positions of the junction box 3300 and the modular bracket 3302 in substantial contact with each other.

Figure 34:
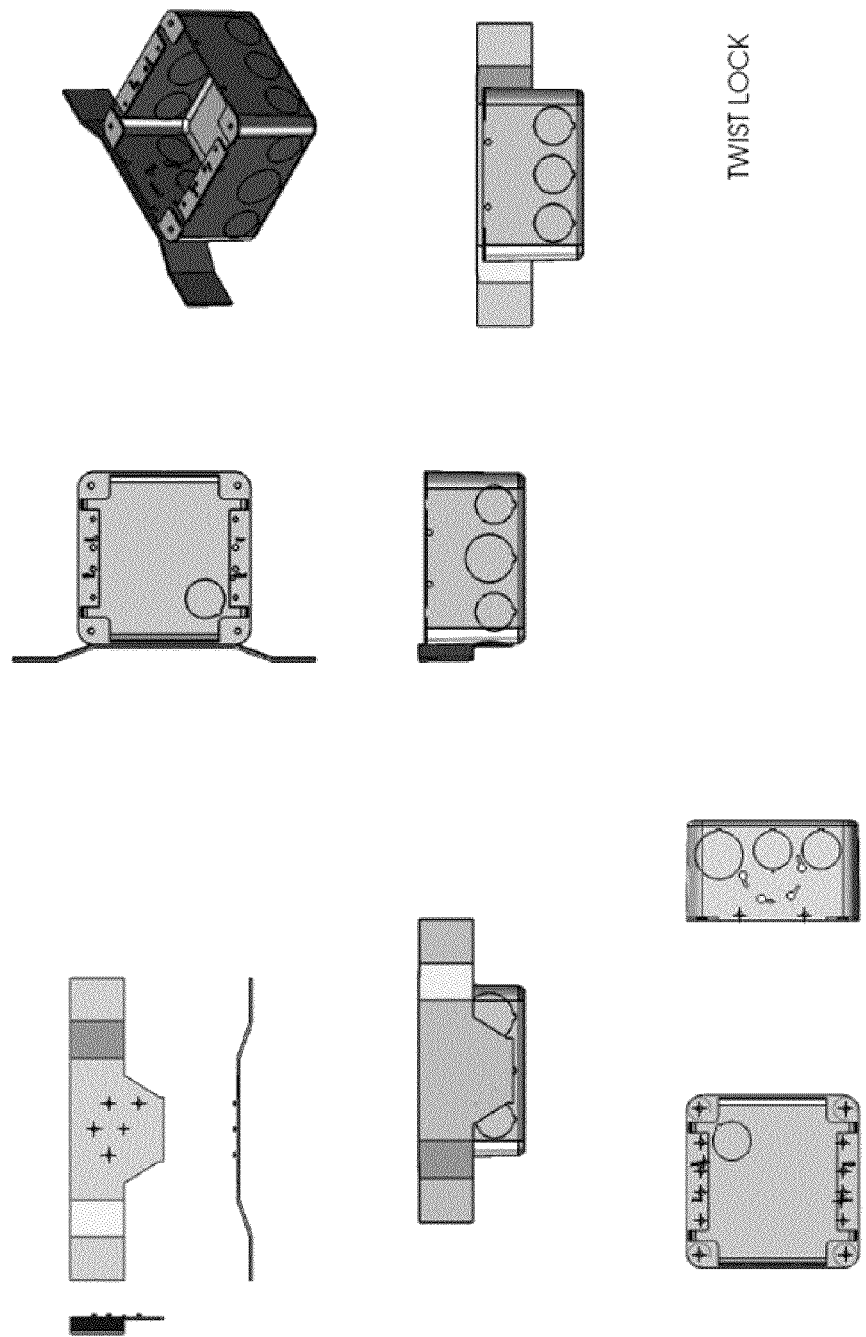

FIG. 34 illustrates various views of a square-shaped double gang electrical junction box 3400 and modular bracket 3402 in accordance with an example embodiment of the disclosure. The geometrically-shaped modular bracket 3400 can include one or more mounting devices such as a set of protrusions 3404. The modular bracket 3402 is shown mounted to a lateral side of the junction box 3400 by way of the protrusions 3404 fitting into corresponding holes 3406 in the junction box. When the protrusions 3404 are correspondingly mounted to the holes 3406 in the junction box 3400, the mating of the protrusions 3404 in the holes 3406 can maintain the relative positions of the junction box 3400 and the modular bracket 3402 in substantial contact with each other.

Figure 35:
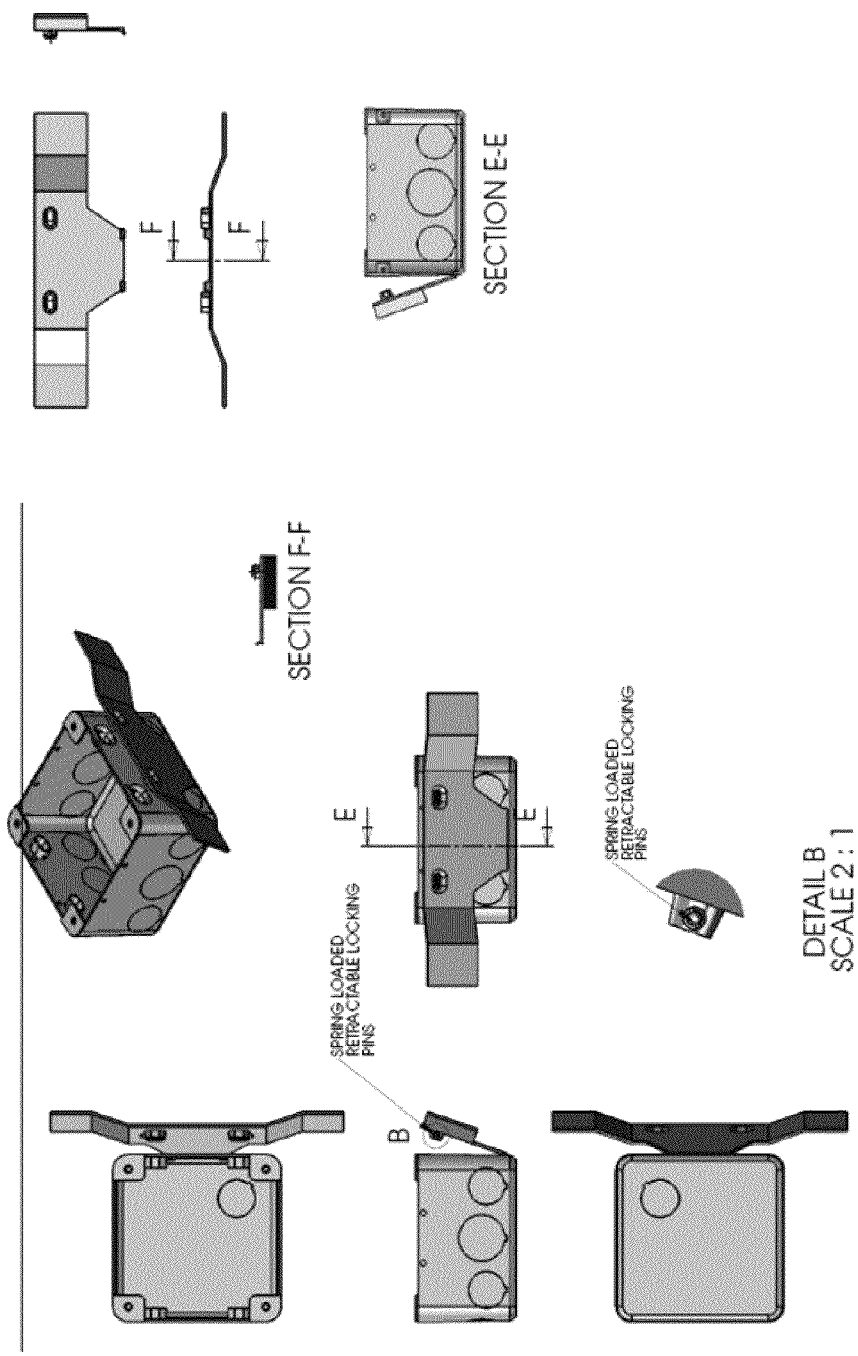

FIG. 35 illustrates various views of a square-shaped double gang electrical junction box 3500 and modular bracket 3502 in accordance with an example embodiment of the disclosure. The geometrically-shaped modular bracket 3502 can include one or more mounting devices such as a set of spring loaded retractable pins 3504. The modular bracket 3502 is shown mounted to a lateral side of the junction box 3500 by way of the spring loaded retractable pins 3504 fitting into corresponding holes 3506 in the junction box 3500. When the pins 3504 are correspondingly mounted to the holes 3506 in the junction box 3500, the mating of the pins 3504 in the holes 3506 can maintain the relative positions of the junction box 3500 and the modular bracket 3502 in substantial contact with each other.

FIGS. 36-54 illustrate various configurations of modular brackets in accordance with other example embodiments of the disclosure. The modular brackets shown in FIGS. 36-54 can include one or more mounting holes and/or mounting devices operable to mount the modular bracket to a lateral side of an electrical junction box.

FIG. 36 illustrates various views of a mounting bracket 3600 with an angled body portion 3602 with two mounting tabs 3604, associated holes 3606, and two fastener loop holes 3608. The mounting tabs 3604 and associated holes 3606 are oriented on one side of the angled body portion 3602, and the two fastener loop holes 3608 are oriented on an opposing side of the angled body portion 3602. The spaced-apart mounting tabs 3604 are generally spaced apart at approximately the same or similar distance, such as a predefined universal distance, to facilitate using the common modular bracket with corresponding mounting holes in an electrical junction box. In one example embodiment, the mounting tabs 3604 of the mounting bracket 3600 can be inserted into corresponding mounting holes, such as those provided in an end wall or side wall of an electrical junction box. In this manner, when the mounting tabs 3604 are correspondingly mounted to the holes in the junction box, the mating of the mounting tabs 3604 in the holes can maintain the relative positions of the junction box and the mounting bracket 3600 in substantial contact with each other.

FIG. 37 illustrates various views of a mounting bracket 3700 with an angled body portion 3702 with two mounting holes 3704 and two fastener loop holes 3706. The mounting holes 3704 are oriented on one side of the angled body portion 3702, and the two fastener loop holes 3706 are oriented on an opposing side of the angled body portion 3702. The spaced-apart mounting holes 3704 are generally spaced apart at approximately the same or similar distance, such as a predefined universal distance, to facilitate using the common modular bracket with corresponding mounting devices in an electrical junction box. In one example embodiment, the mounting holes 3704 of the mounting bracket 3700 can receive corresponding mounting devices such as a set of protrusions, for instance those provided on an end wall or side wall of an electrical junction box. In this manner, when the mounting holes 3704 correspondingly receive the mounting devices such as a set of protrusions on a junction box, the mating of the protrusions in the mounting holes 3704 can maintain the relative positions of the junction box and the mounting bracket 3700 in substantial contact with each other.

FIG. 38 illustrates various views of a mounting bracket 3800 with an angled body portion 3802 with two mounting tabs 3804, associated holes 3806, and two fastener loop holes 3808. The mounting tabs 3804 and associated holes 3806 are oriented on one side of the angled body portion 3802, and the two fastener loop holes 3808 are oriented on an opposing side of the angled body portion 3802. The spaced-apart mounting tabs 3804 are generally spaced apart at approximately the same or similar distance, such as a predefined universal distance, to facilitate using the common modular bracket with corresponding mounting holes in an electrical junction box. In one example embodiment, the mounting tabs 3804 of the mounting bracket 3800 can be inserted into corresponding mounting holes, such as those provided in an end wall or side wall of an electrical junction box. In this manner, when the mounting tabs 3804 are correspondingly mounted to the holes in the junction box, the mating of the mounting tabs 3804 in the holes can maintain the relative positions of the junction box and the mounting bracket 3800 in substantial contact with each other.

FIG. 39 illustrates various views of a mounting bracket 3900 with an angled body portion 3902 with two mounting holes 3904 and two fastener loop holes 3906. The mounting holes 3904 are oriented on one side of the angled body portion 3902, and the two fastener loop holes 3906 are oriented on an opposing side of the angled body portion 3902. The spaced-apart mounting holes 3904 are generally spaced apart at approximately the same or similar distance, such as a predefined universal distance, to facilitate using the common modular bracket with corresponding mounting devices in an electrical junction box. In one example embodiment, the mounting holes 3904 of the mounting bracket 3900 can receive corresponding mounting devices such as a set of protrusions, for instance those provided on an end wall or side wall of an electrical junction box. In this manner, when the mounting holes 3904 correspondingly receive the mounting devices such as a set of protrusions on a junction box, the mating of the protrusions in the mounting holes 3904 can maintain the relative positions of the junction box and the mounting bracket 3900 in substantial contact with each other.

Figure 40:
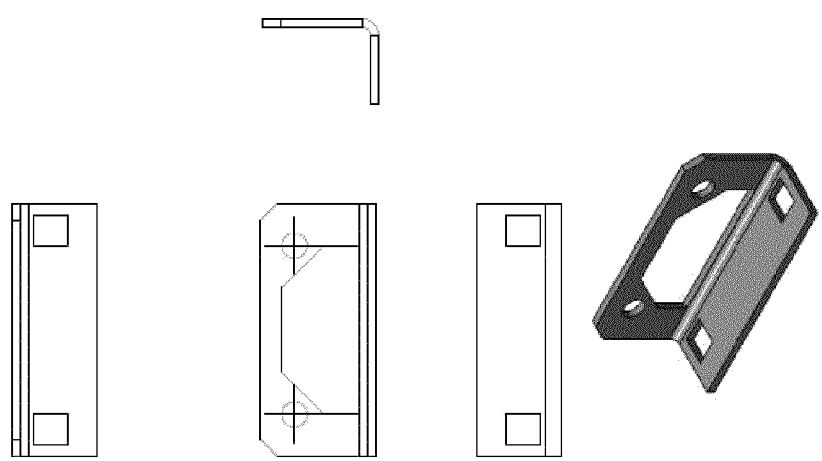

FIG. 40 illustrates various views of a mounting bracket 4000 with an angled body portion 4002 with two mounting holes 4004 and two fastener holes 4006. The mounting holes 4004 are oriented on one side of the angled body portion 4002, and the two fastener loop holes 4006 are oriented on an opposing side of the angled body portion 4002. The spaced-apart mounting holes 4004 are generally spaced apart at approximately the same or similar distance, such as a predefined universal distance, to facilitate using the common modular bracket with corresponding mounting devices in an electrical junction box. In one example embodiment, the mounting holes 4004 of the mounting bracket 4000 can receive corresponding mounting devices such as a set of protrusions, for instance those provided on an end wall or side wall of an electrical junction box. In this manner, when the mounting holes 4004 correspondingly receive the mounting devices such as a set of protrusions on a junction box, the mating of the protrusions in the mounting holes 4004 can maintain the relative positions of the junction box and the mounting bracket 4000 in substantial contact with each other.

Figure 41:
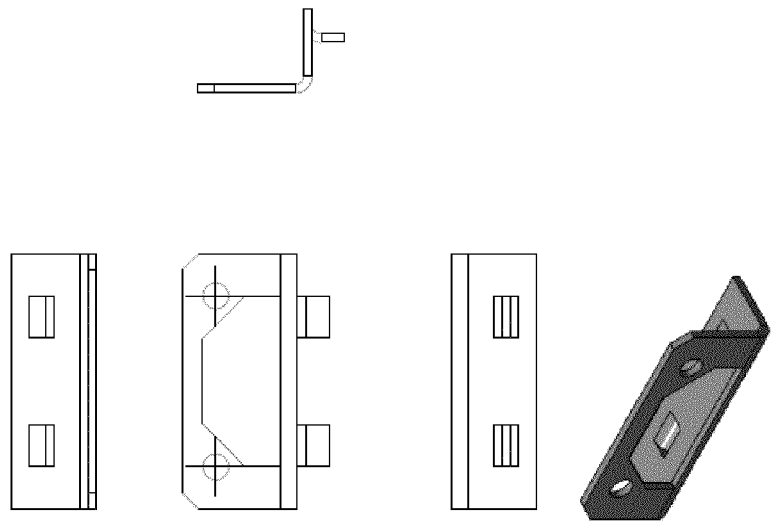

FIG. 41 illustrates various views of a mounting bracket 4100 with an angled body portion 4102 with two mounting tabs 4104, associated holes 4106, and two fastener loop holes 4108. The mounting tabs 4104 and associated holes 4106 are oriented on one side of the angled body portion 4102, and the two fastener loop holes 4108 are oriented on an opposing side of the angled body portion 4102. The spaced-apart mounting tabs 4104 are generally spaced apart at approximately the same or similar distance, such as a predefined universal distance, to facilitate using the common modular bracket with corresponding mounting holes in an electrical junction box. In one example embodiment, the mounting tabs 4104 of the mounting bracket 4100 can be inserted into corresponding mounting holes, such as those provided in an end wall or side wall of an electrical junction box. In this manner, when the mounting tabs 4104 are correspondingly mounted to the holes in the junction box, the mating of the mounting tabs 4104 in the holes can maintain the relative positions of the junction box and the mounting bracket 4100 in substantial contact with each other.

FIG. 42 illustrates views of a mounting bracket 4200 with a relatively flat, rectangular-shaped body portion 4202 with two mounting holes 4204. The key-shaped mounting holes 4204 are spaced apart and oriented adjacent to an edge of the body portion 4202. The spaced-apart mounting holes 4204 are generally spaced apart at approximately the same or similar distance, such as a predefined universal distance, to facilitate using the common modular bracket with corresponding mounting devices in an electrical junction box. In one example embodiment, the mounting holes 4204 of the mounting bracket 4200 can receive corresponding mounting devices such as a set of protrusions, for instance those provided on an end wall or side wall of an electrical junction box. In this manner, when the mounting holes 4204 correspondingly receive the mounting devices such as a set of protrusions on a junction box, the mating of the protrusions in the mounting holes 4204 can maintain the relative positions of the junction box and the mounting bracket 4200 in substantial contact with each other.

Figure 43:
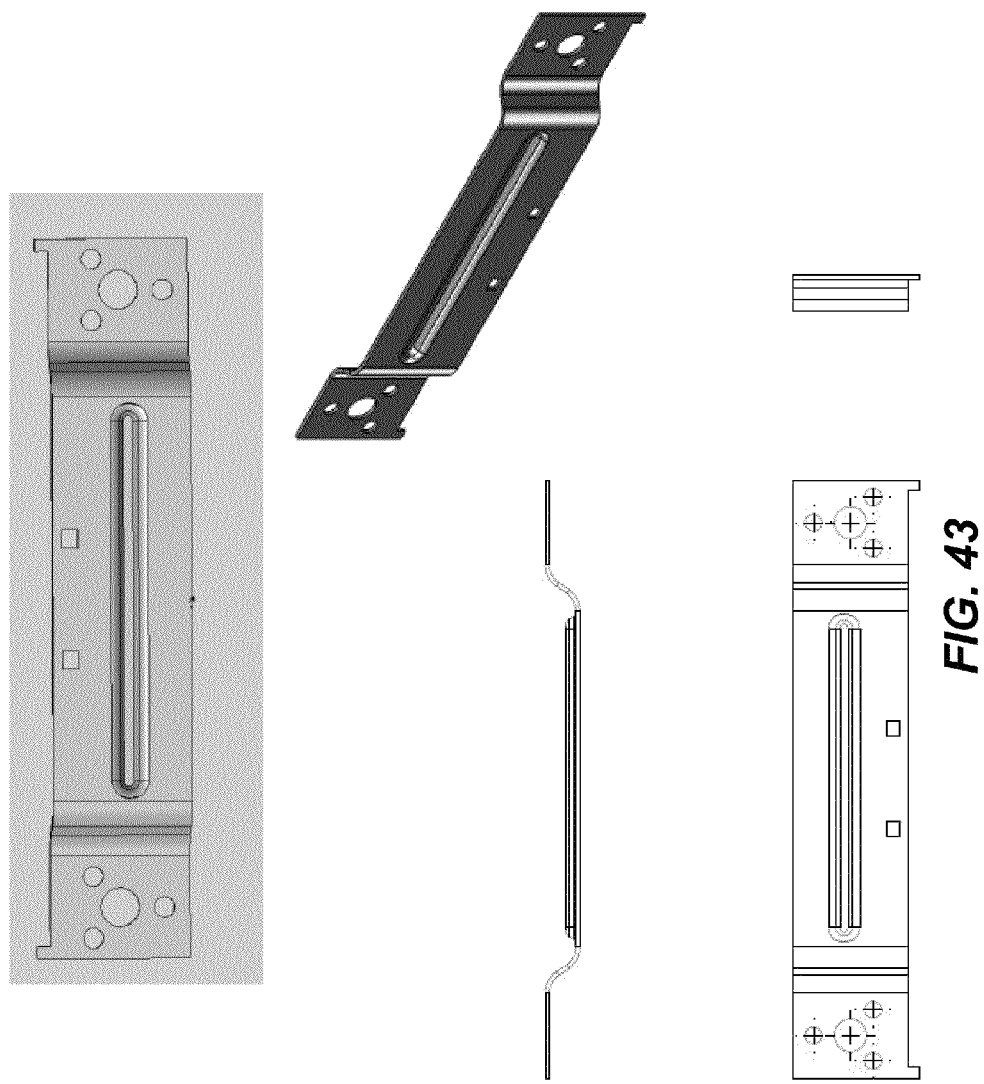

FIG. 43 illustrates views of a mounting bracket 4300 with an angled, rectangular-shaped body portion 4302 with two mounting holes 4304. The rectangular-shaped mounting holes 4304 are spaced apart and oriented adjacent to an edge of the body portion 4202. The spaced-apart mounting holes 4304 are generally spaced apart at approximately the same or similar distance, such as a predefined universal distance, to facilitate using the common modular bracket with corresponding mounting devices in an electrical junction box. In one example embodiment, the mounting holes 4304 of the mounting bracket 4300 can receive corresponding mounting devices such as a set of protrusions, for instance those provided on an end wall or side wall of an electrical junction box. In this manner, when the mounting holes 4304 correspondingly receive the mounting devices such as a set of protrusions on a junction box, the mating of the protrusions in the mounting holes 4304 can maintain the relative positions of the junction box and the mounting bracket 4300 in substantial contact with each other.

Figure 44:
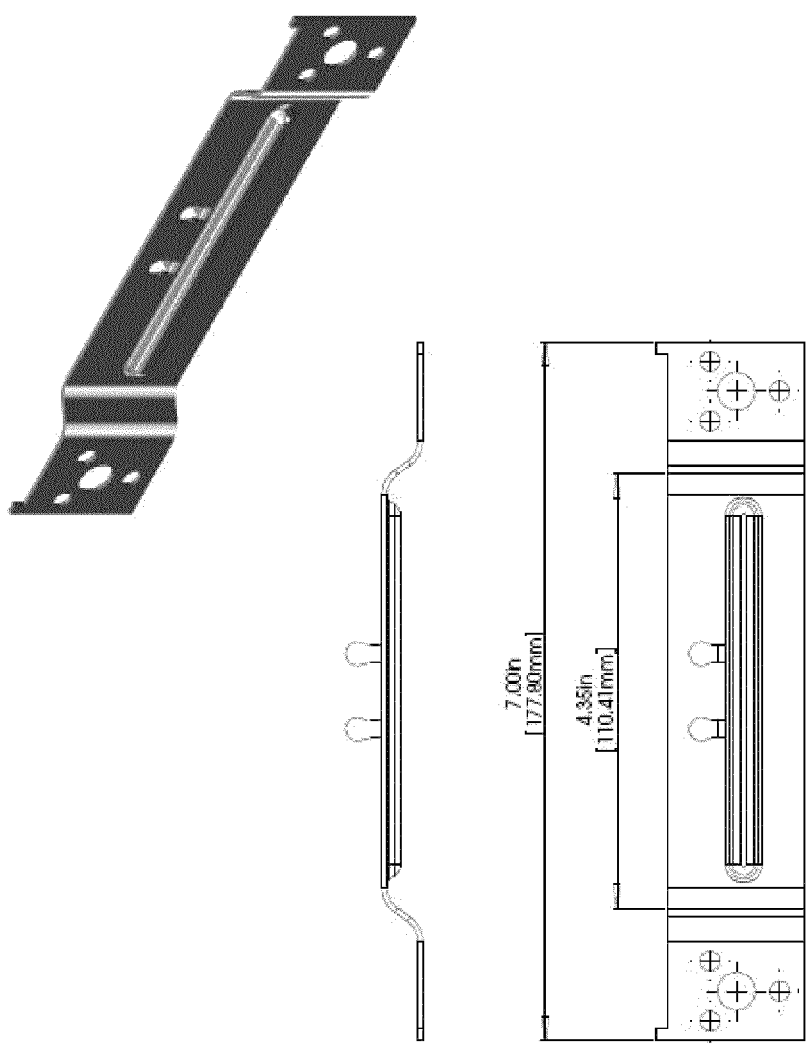

FIG. 44 illustrates views of a mounting bracket 4400 with an angled, rectangular-shaped body portion 4402 with two mounting holes 4404. The circular-shaped mounting holes 4404 are spaced apart and oriented adjacent to an edge of the body portion 4402. The spaced-apart mounting holes 4404 are generally spaced apart at approximately the same or similar distance, such as a predefined universal distance, to facilitate using the common modular bracket with corresponding mounting devices in an electrical junction box. In one example embodiment, the mounting holes 4404 of the mounting bracket 4400 can receive corresponding mounting devices such as a set of protrusions, for instance those provided on an end wall or side wall of an electrical junction box. In this manner, when the mounting holes 4404 correspondingly receive the mounting devices such as a set of protrusions on a junction box, the mating of the protrusions in the mounting holes 4404 can maintain the relative positions of the junction box and the mounting bracket 4400 in substantial contact with each other.

Figure 45:
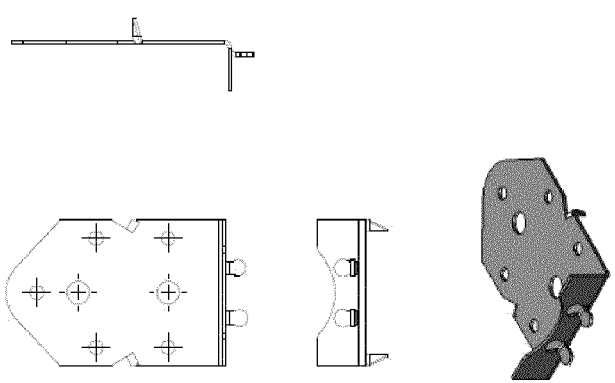

FIG. 45 illustrates various views of a mounting bracket 4500 with an angled body portion 4502 with two mounting tabs 4504, associated holes 4506, and multiple fastener holes 4508. The mounting tabs 4504 and associated holes 4506 are oriented on one side of the angled body portion 4502, and the multiple fastener holes 4508 are oriented on an opposing side of the angled body portion 4502. The spaced-apart mounting tabs 4504 are generally spaced apart at approximately the same or similar distance, such as a predefined universal distance, to facilitate using the common modular bracket with corresponding mounting holes in an electrical junction box. In one example embodiment, the mounting tabs 4504 of the mounting bracket 4500 can be inserted into corresponding mounting holes, such as those provided in an end wall or side wall of an electrical junction box. In this manner, when the mounting tabs 4504 are correspondingly mounted to the holes in the junction box, the mating of the mounting tabs 4504 in the holes can maintain the relative positions of the junction box and the mounting bracket 4500 in substantial contact with each other.

Figure 46:
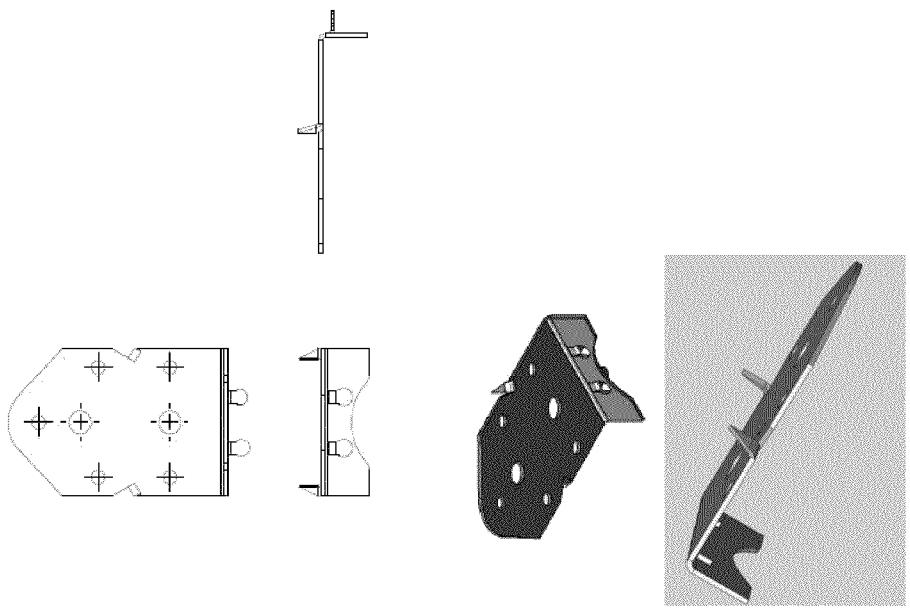

FIG. 46 illustrates various views of a mounting bracket 4500 with an angled body portion 4602 with two mounting holes 4604, mounting spikes 4606, and multiple fastener holes 4608. The mounting holes 4604 are oriented on one side of the angled body portion 4602, and the mounting spikes 4606 and multiple fastener holes 4608 are oriented on an opposing side of the angled body portion 4602. The spaced-apart mounting holes 4604 are generally spaced apart at approximately the same or similar distance, such as a predefined universal distance, to facilitate using the common modular bracket with corresponding mounting devices in an electrical junction box. In one example embodiment, the mounting holes 4604 of the mounting bracket 4600 can receive corresponding mounting devices such as a set of protrusions, for instance those provided in an end wall or side wall of an electrical junction box. In this manner, when the mounting holes 4604 receive corresponding mounting devices on the junction box, the mating of the mounting holes 4604 with the mounting devices can maintain the relative positions of the junction box and the mounting bracket 4600 in substantial contact with each other.

Figure 47:
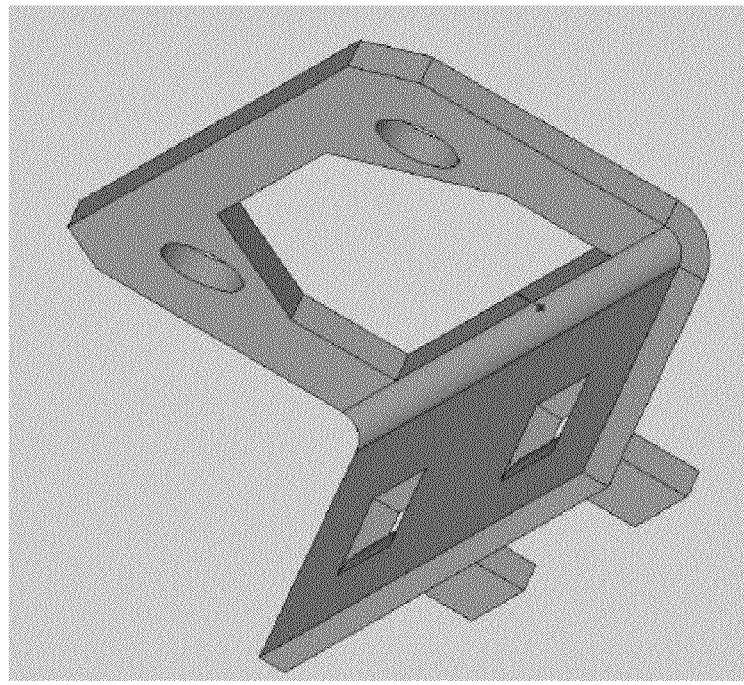

FIG. 47 illustrates an example mounting bracket 4700 with an angled body portion 4702 with two mounting tabs 4704, associated holes 4706, and two fastener holes 4708. The mounting tabs 4704 and associated holes 4706 are oriented on one side of the angled body portion 4702, and the two fastener holes 4708 are oriented on an opposing side of the angled body portion 4702. The spaced-apart mounting tabs 4704 are generally spaced apart at approximately the same or similar distance, such as a predefined universal distance, to facilitate using the common modular bracket with corresponding mounting holes in an electrical junction box. In one example embodiment, the mounting tabs 4704 of the mounting bracket 4700 can be inserted into corresponding mounting holes, such as those provided in an end wall or side wall of an electrical junction box. In this manner, when the mounting tabs 4704 are correspondingly mounted to the holes in the junction box, the mating of the mounting tabs 4704 in the holes can maintain the relative positions of the junction box and the mounting bracket 4700 in substantial contact with each other.

Figure 48:
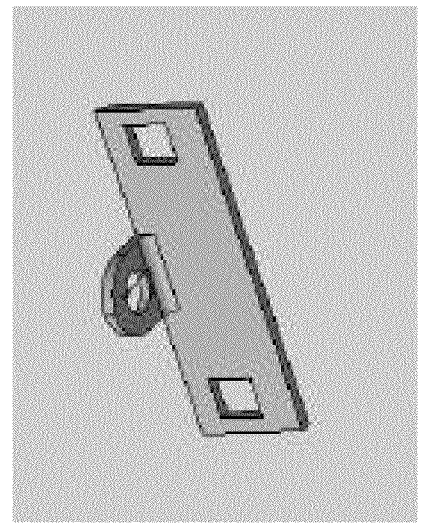

FIG. 48 illustrates views of a mounting bracket 4800 with an angled, rectangular-shaped body portion 4802 with two mounting holes 4804, and a fastener mounting hole 4806. The square-shaped mounting holes 4804 are spaced apart and oriented adjacent to an edge of the body portion 4802. The spaced-apart mounting holes 4804 are generally spaced apart at approximately the same or similar distance, such as a predefined universal distance, to facilitate using the common modular bracket with corresponding mounting devices in an electrical junction box. In one example embodiment, the mounting holes 4804 of the mounting bracket 4800 can receive corresponding mounting devices such as a set of protrusions, for instance those provided on an end wall or side wall of an electrical junction box. In this manner, when the mounting holes 4804 correspondingly receive the mounting devices such as a set of protrusions on a junction box, the mating of the protrusions in the mounting holes 4804 can maintain the relative positions of the junction box and the mounting bracket 4800 in substantial contact with each other.

Figure 49:
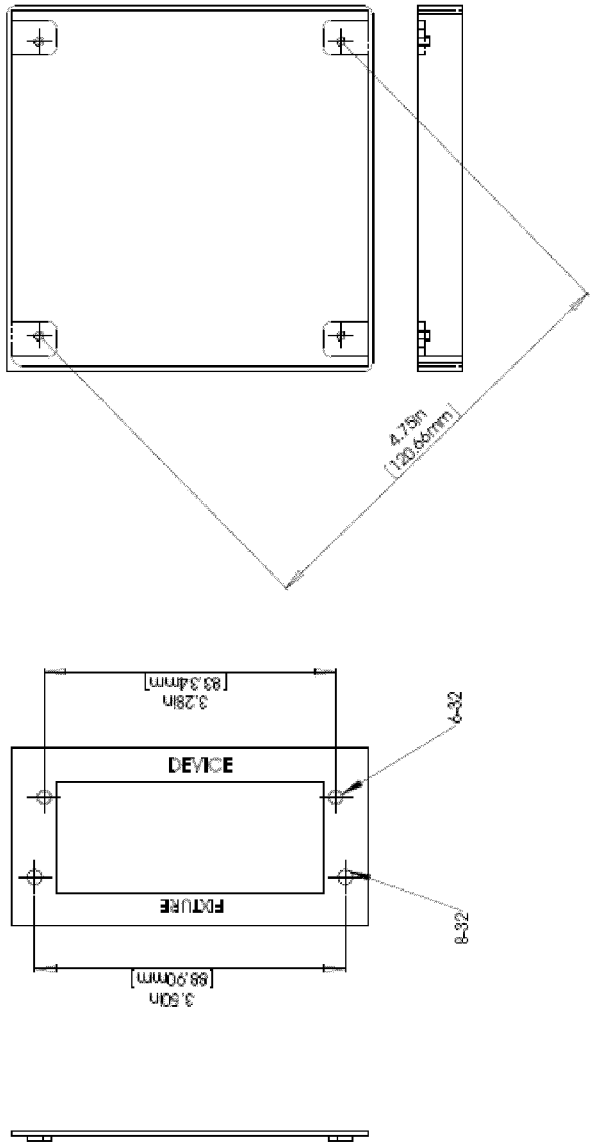
Figure 50:
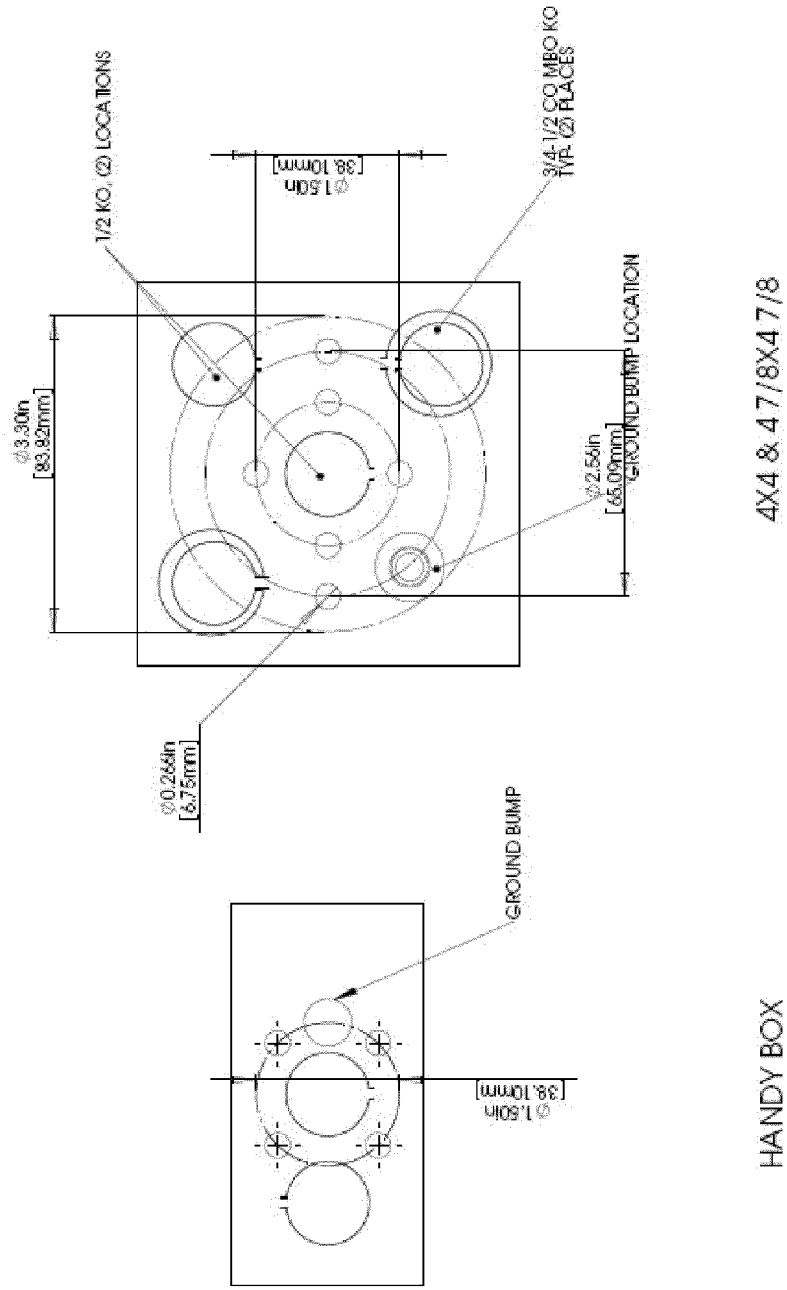
Figure 51:
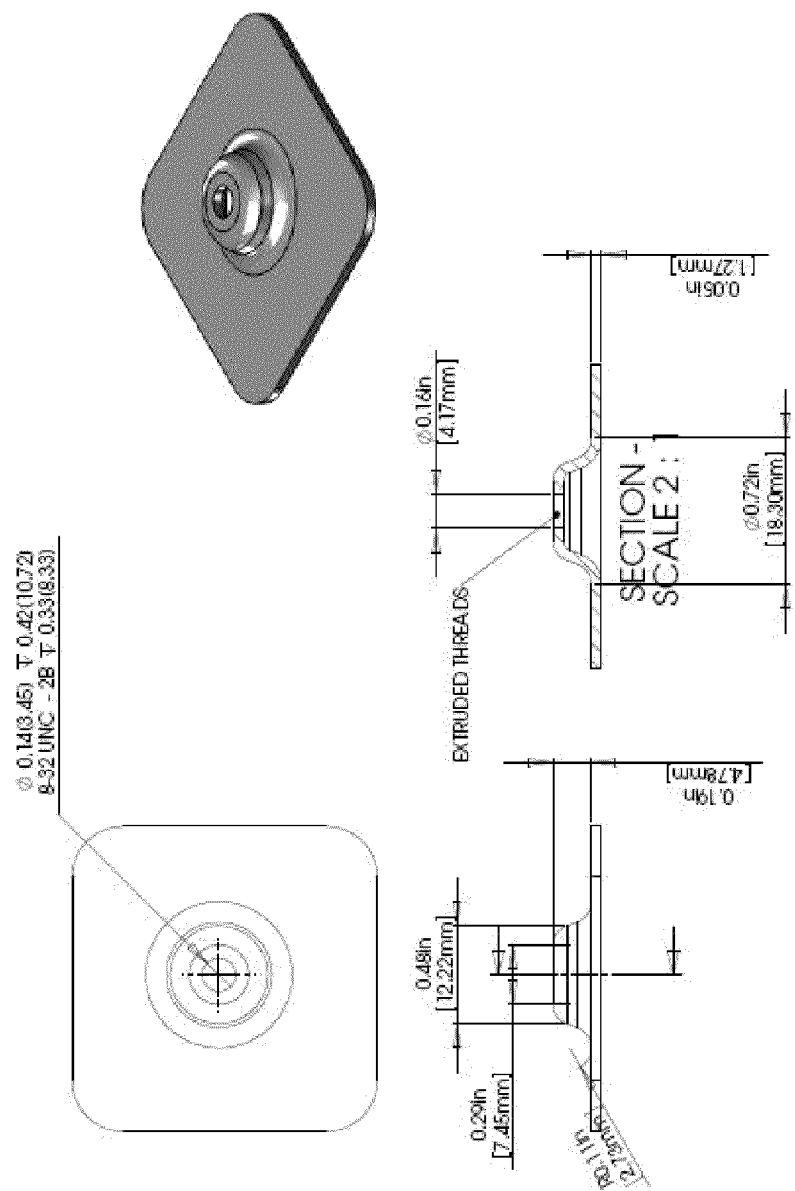

FIGS. 49-51 illustrate various view of example electrical accessories. In FIG. 49, various views of a square-shaped, relatively shallow electrical junction box 4900 are shown. In FIG. 50, various views of a square-shaped electrical junction box 5000 and associated features are shown.

In FIG. 51, various views of an electrical accessory plate 5100 with an extruded thread mounting 5102 are shown. The extruded thread mounting 5102 can be sized to receive a fastener such as a mounting bolt or a ground screw. An extruded body portion 5104 of the mounting 5102 can include a series of threads 5106 which correspond to threads associated with a fastener such as a mounting bolt or ground screw. The extruded thread mounting 5102 can be a feature used in any wall of an electrical junction box, such as a bottom or rear wall, or in a mounting or modular bracket in accordance with an example embodiment of the disclosure. As shown in FIG. 51, the body portion 5104 is formed with a raised portion above the plane of a base, wall, or bracket. Within the hole 5108 in the body portion, the threads 5106 can be formed to receive a fastener, ground screw, or other mounting bolt. Typically the extruded thread mounting 5102 and threads 5106 can be manufactured using extrusion and/or molding techniques.

In another example embodiment, an extruded thread mounting can be formed in or otherwise made in other walls, tabs, or components of electrical junction boxes, electrical accessories, and mounting or modular brackets. For example, an extruded thread mounting can be formed in an upper tab of an electrical junction box, and the associated hole and threads can be sized to receive a cover plate bolt, ground screw, or fastener. Example extruded thread mountings are shown in electrical junction boxes illustrated in FIGS. 61 and 62.

Figure 52:
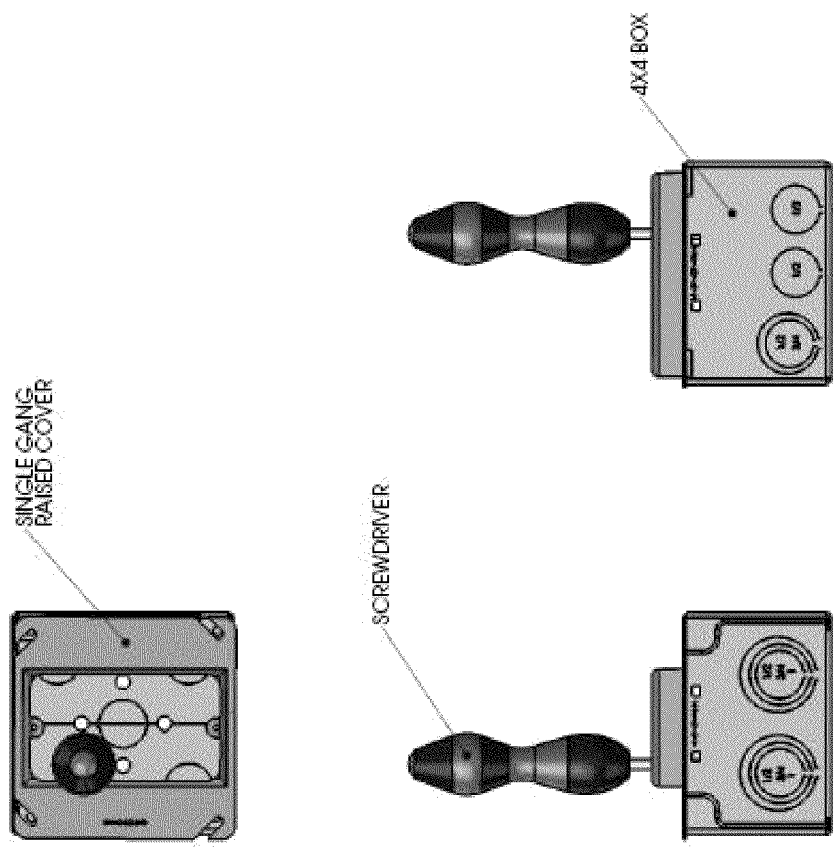
Figure 53:
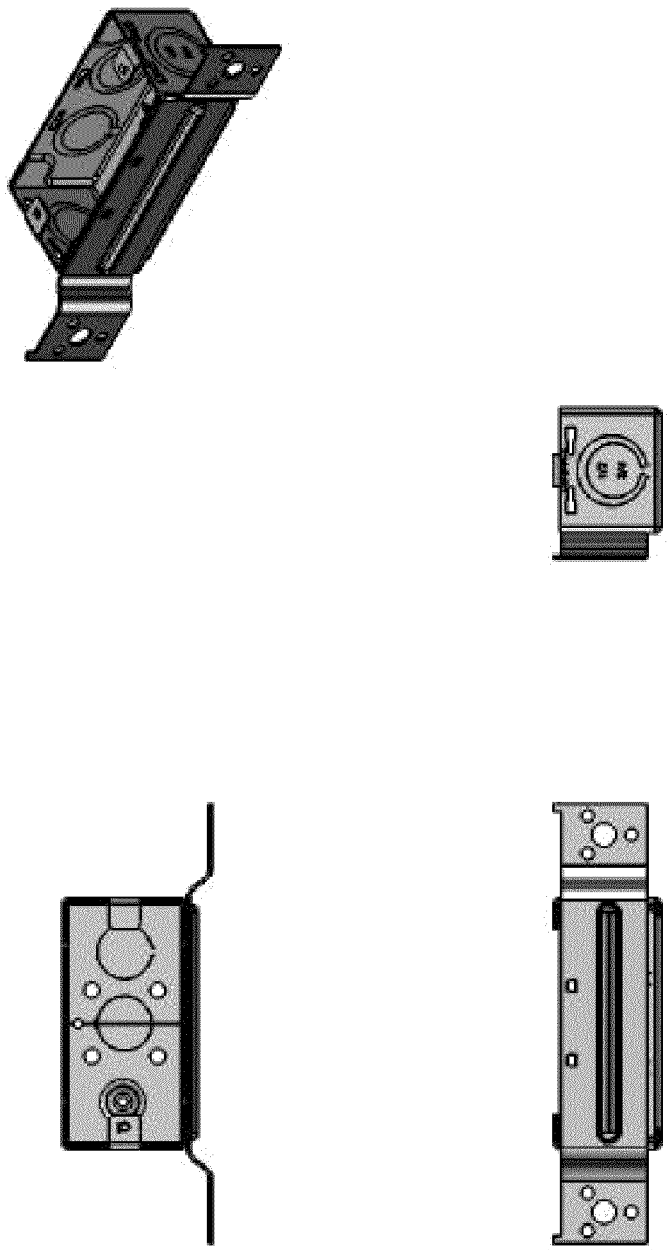
Figure 56:
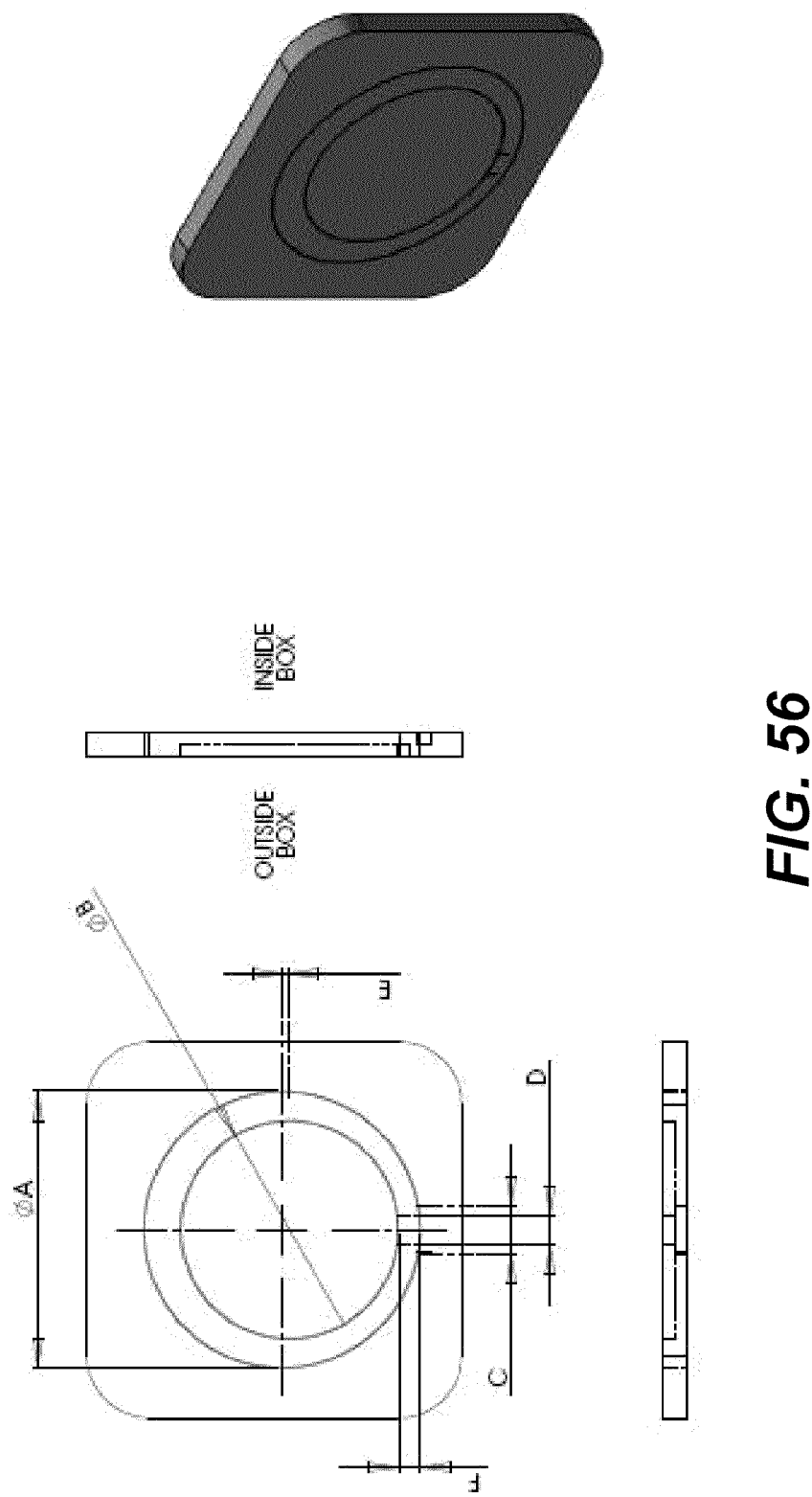

FIGS. 52-54 illustrate various views of example electrical accessories. In FIG. 52, various views of a single gang electrical junction box 5200 with a raised cover 5202 are shown. FIG. 53 shows views of a mounting bracket 5300 mounted to an electrical junction box 5302. FIG. 54 shows views of a cover plate 5400 mounted to an electrical junction box 5402.

The mounting brackets and mounting devices shown in FIGS. 2-23, and 31-54 are shown by way of example only, and other configurations, shapes, and designs can exist in accordance with other example embodiments of the disclosure.

FIGS. 57-73 illustrate various example electrical junction boxes, mounting holes, devices, and knockouts in accordance with example embodiments of the disclosure. The example boxes shown are similar to the box shown in FIG. 1, but may include different configurations, shapes, mounting holes, devices, knockouts, and other features or aspects.

Figure 57:
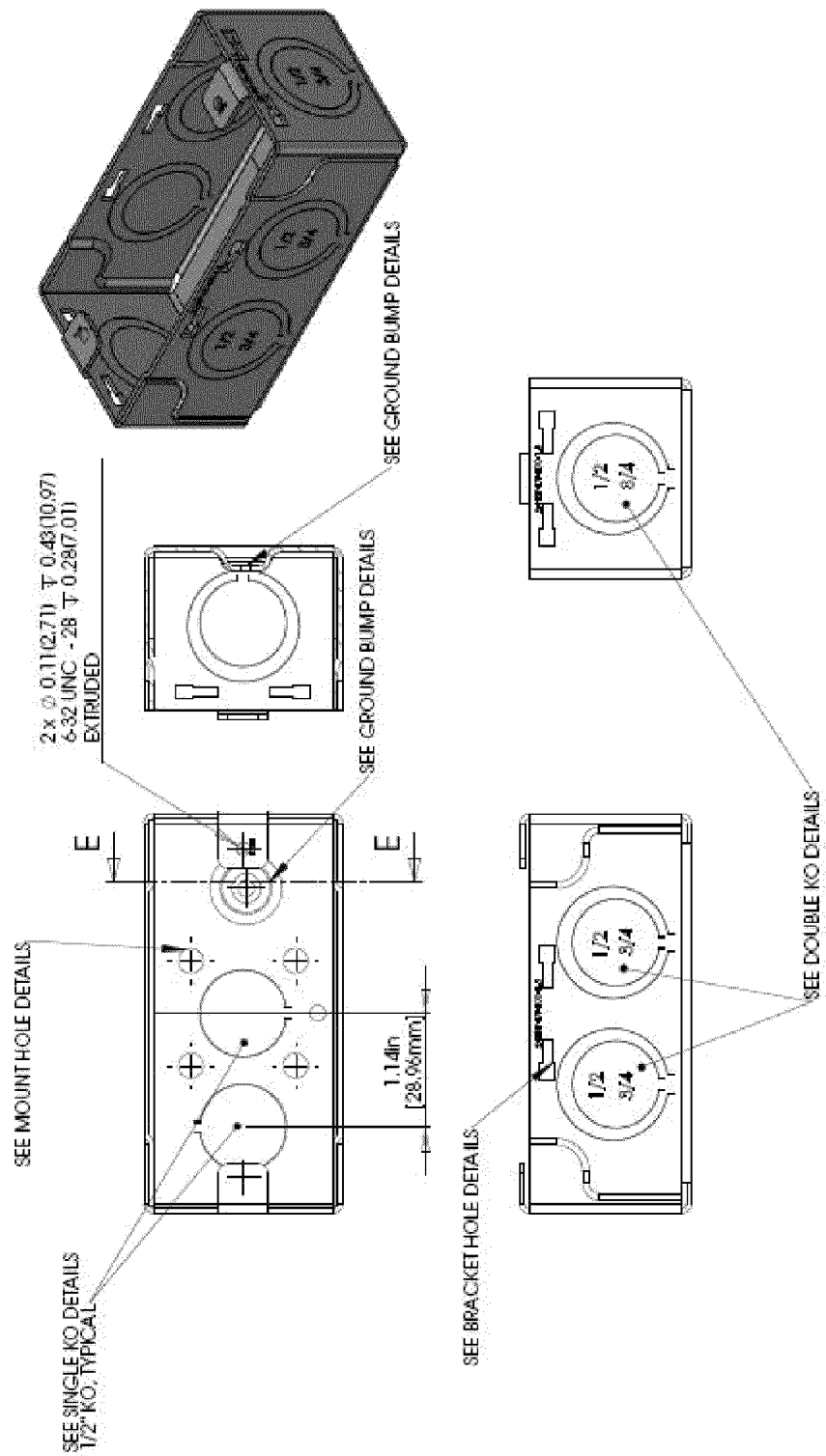

FIG. 57 illustrates various views of an example rectangular-shaped single gang electrical junction box 5700 in accordance with an example embodiment of the disclosure. The electrical junction box can include one or more mounting holes and/or devices and knockouts. In this example embodiment, the mounting holes are pairs of key-shaped holes 5702 generally spaced apart at approximately the same or similar distance, such as a predefined universal distance, to facilitate using the common modular bracket with corresponding mounting holes in an electrical junction box. In one example, mounting devices of a mounting bracket can be inserted into corresponding mounting holes, such as those provided in an end wall or side wall of the electrical junction box 5700. In this manner, when the mounting devices are correspondingly mounted to the mounting holes in the junction box 5700, the mating of the mounting devices in the holes can maintain the relative positions of the junction box 5700 and the mounting bracket in substantial contact with each other.

Also shown in FIG. 57 are a series of knockouts 5704, 5706 in the side walls and end walls of the electrical junction box. These knockouts are similar to those described in more detail with respect to FIGS. 24-26 below.

Figure 58:
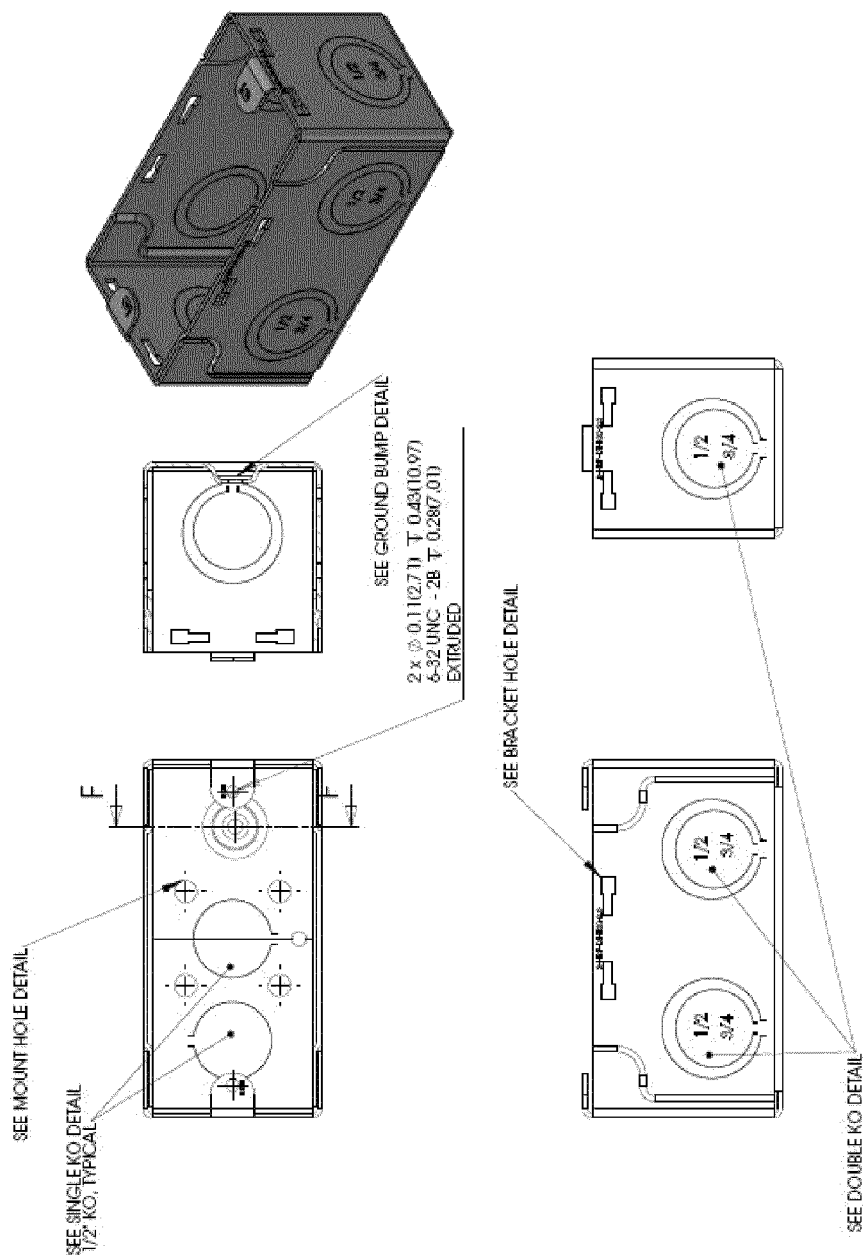

FIG. 58 illustrates various views of another example rectangular-shaped single gang electrical junction box in accordance with an example embodiment of the disclosure. The electrical junction box 5800 can include one or more mounting holes 5802 and/or devices and knockouts 5804, 5806. The mounting holes 5802 and knockouts 5804, 5806 are similar to those described above with respect to FIG. 57.

Figure 59:
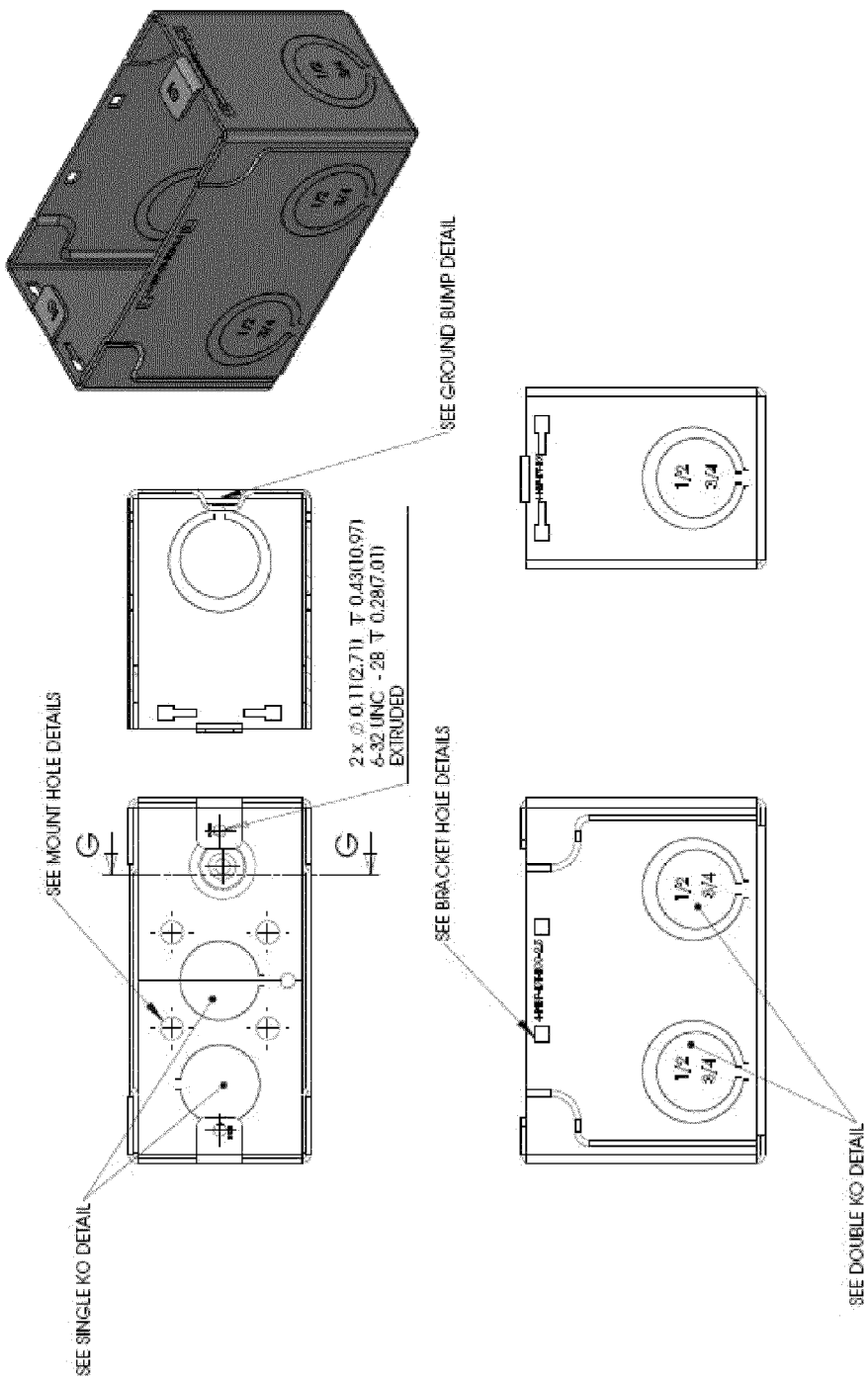

FIG. 59 illustrates various views of another example rectangular-shaped single gang electrical junction box in accordance with an example embodiment of the disclosure. The electrical junction box 5900 can include one or more mounting holes 5902 and/or devices and knockouts 5904, 5906. The mounting holes 5902 and knockouts 5904, 5906 are similar to those described above with respect to FIG. 57, except the mounting holes 5902 in this example embodiment can be square or rectangular-shaped.

Figure 60:
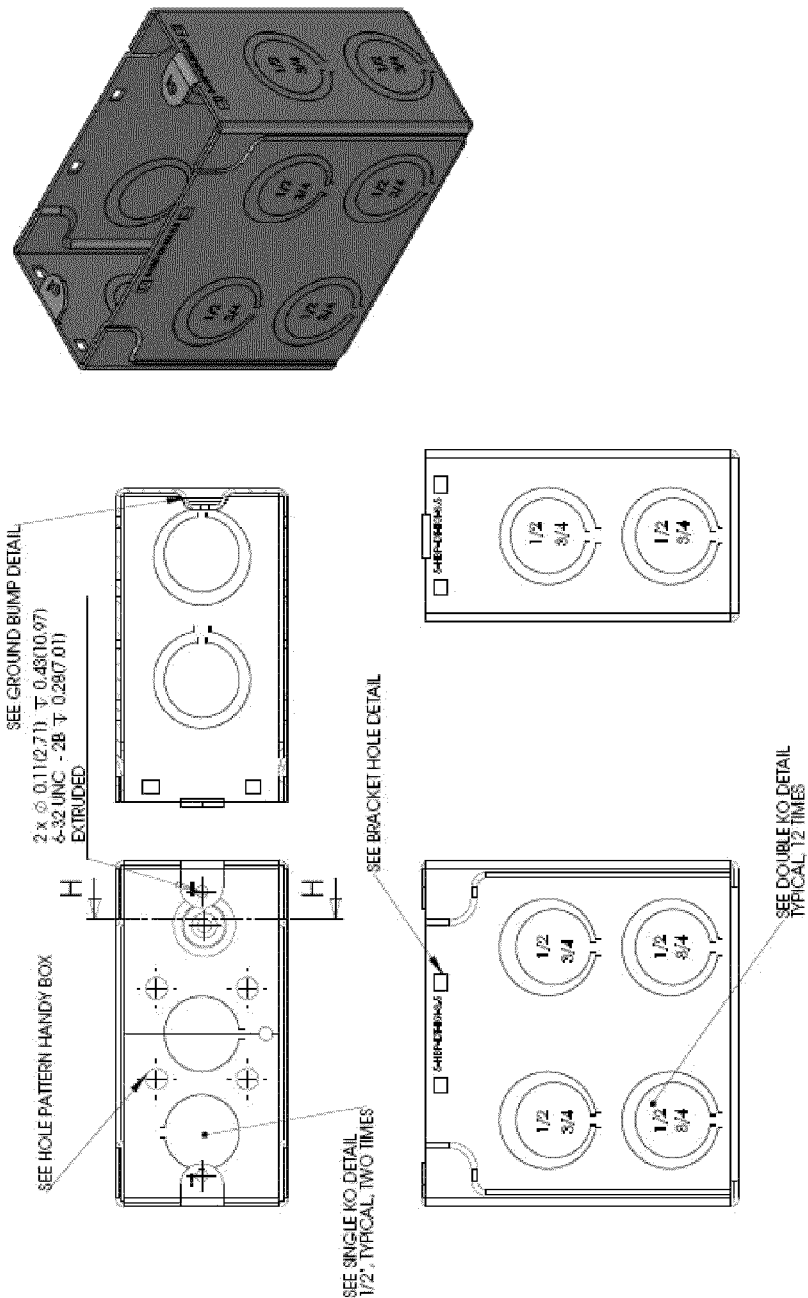

FIG. 60 illustrates various views of another example rectangular-shaped single gang electrical junction box in accordance with an example embodiment of the disclosure. The electrical junction box 6000 can include one or more mounting holes 6002 and/or devices and knockouts 6004, 6006. The mounting holes 6002 and knockouts 6004, 6006 are similar to those described above with respect to FIG. 57, except the mounting holes 6002 in this example embodiment can be square or rectangular-shaped.

Figure 61:
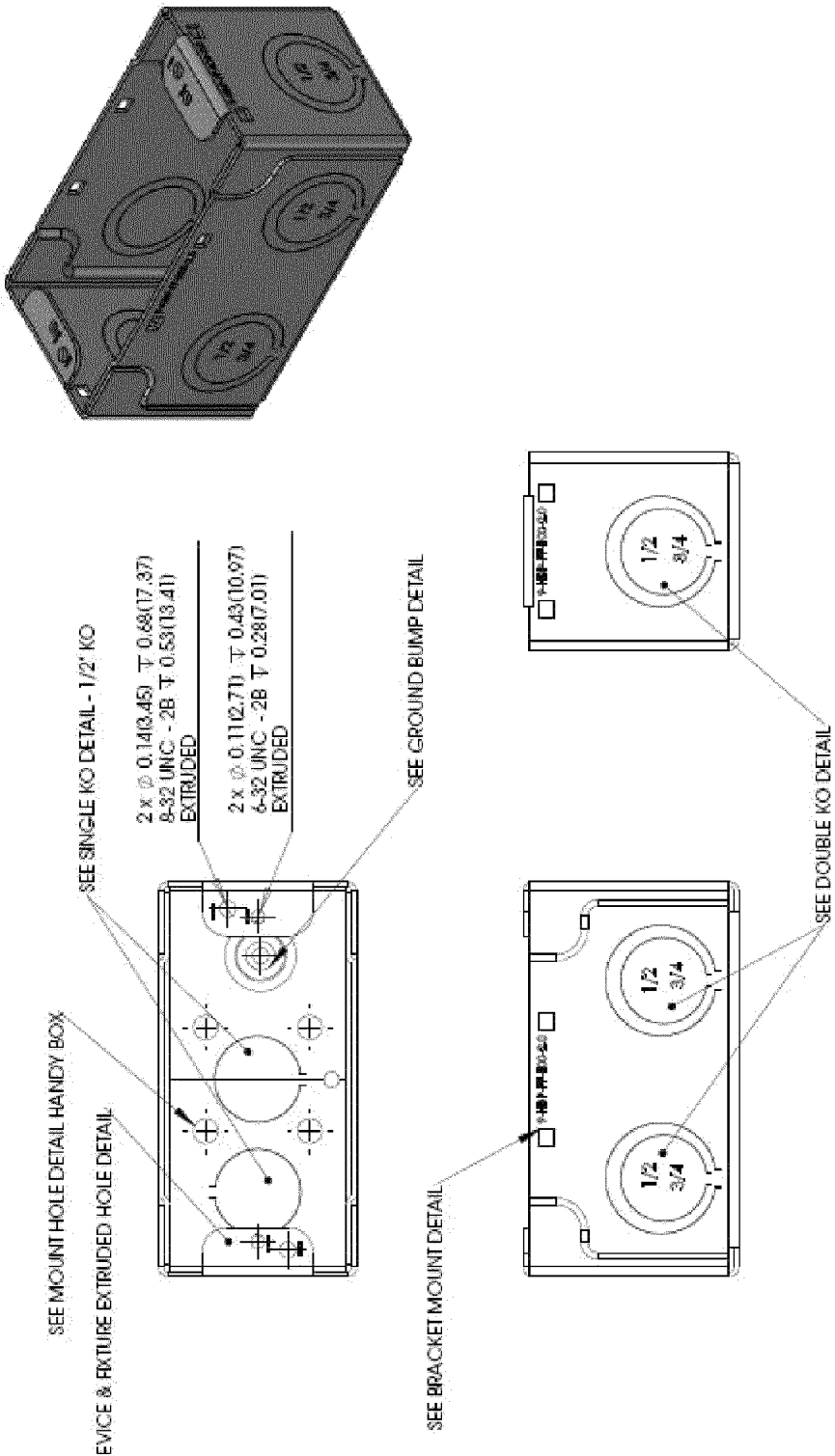

FIG. 61 illustrates various views of another example rectangular-shaped single gang electrical junction box in accordance with an example embodiment of the disclosure. The electrical junction box 6100 can include one or more mounting holes 6102 and/or devices and knockouts 6104, 6106. The mounting holes 6102 and knockouts 6104, 6106 are similar to those described above with respect to FIG. 57, except the mounting holes 6102 in this example embodiment can be square or rectangular-shaped. Furthermore, one or more extruded thread mountings 6108 can be formed or otherwise made in extended tabs 6110 from the end walls to accommodate cover plate fasteners, ground screws, or bolts.

Figure 62:
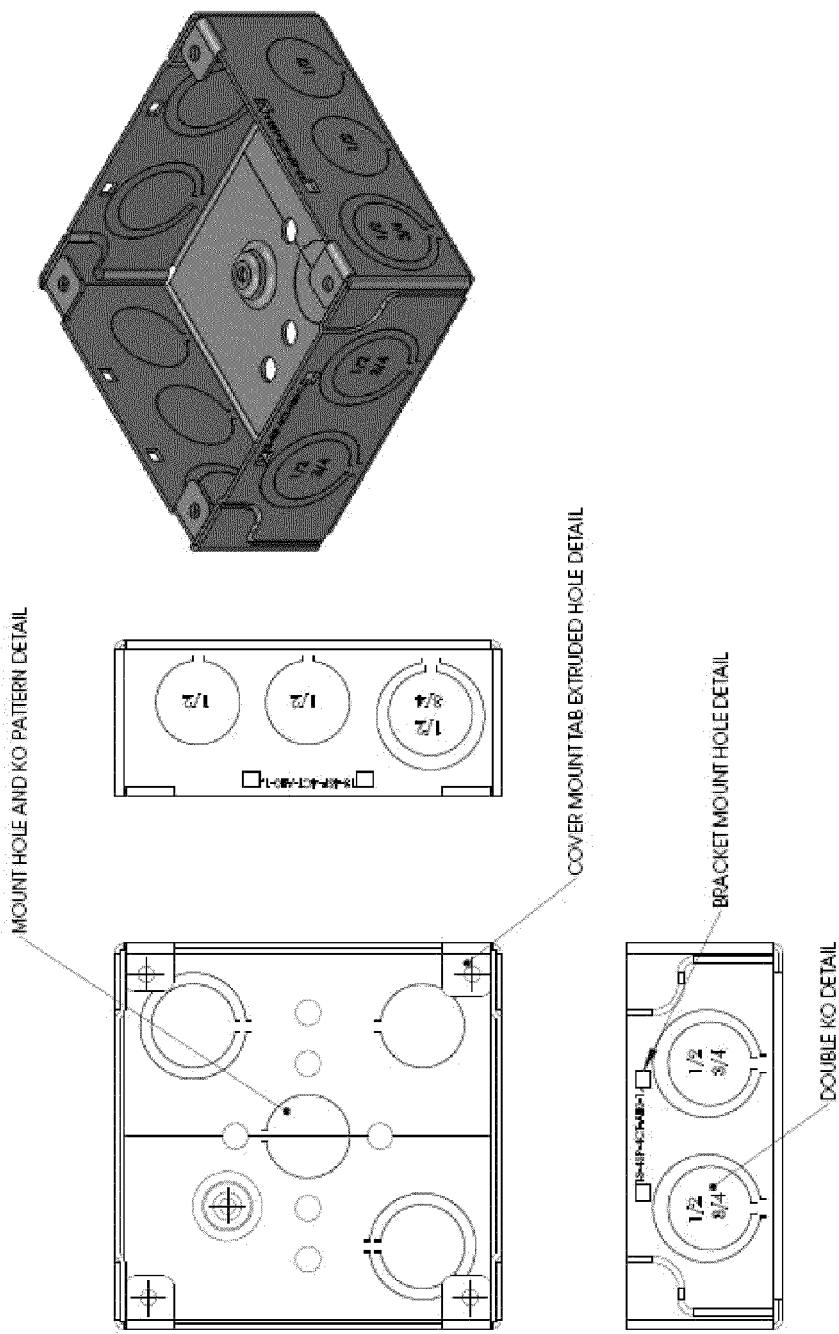

FIG. 62 illustrates various views of an example square-shaped double gang electrical junction box in accordance with an example embodiment of the disclosure. The electrical junction box 6200 can include one or more mounting holes 6202 and/or devices and knockouts 6204, 6206. The mounting holes 6202 and knockouts 6204, 6206 are similar to those described above with respect to FIG. 57, except the mounting holes 6202 in this example embodiment can be square or rectangular-shaped. Furthermore, one or more extruded thread mountings 6208 can be formed or otherwise made in corner tabs 6210 to accommodate cover plate fasteners, ground screws, or bolts.

Figure 63:
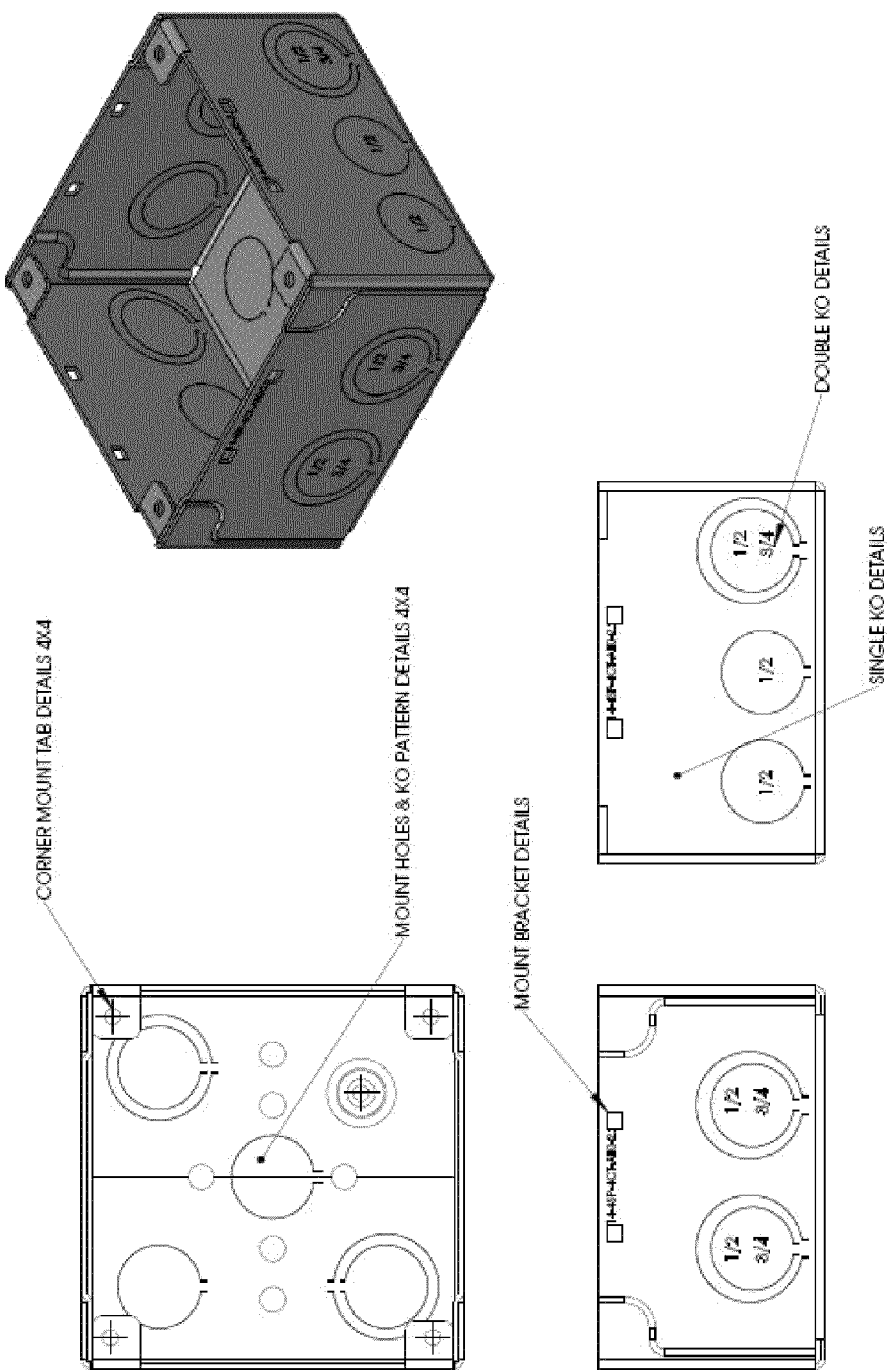

FIG. 63 illustrates various views of another example square-shaped double gang electrical junction box in accordance with an example embodiment of the disclosure. The electrical junction box 6300 can include one or more mounting holes 6302 and/or devices and knockouts 6304, 6306. The mounting holes 6302 and knockouts 6304, 6306 are similar to those described above with respect to FIG. 57, except the mounting holes 6202 in this example embodiment can be square or rectangular-shaped.

Figure 64:
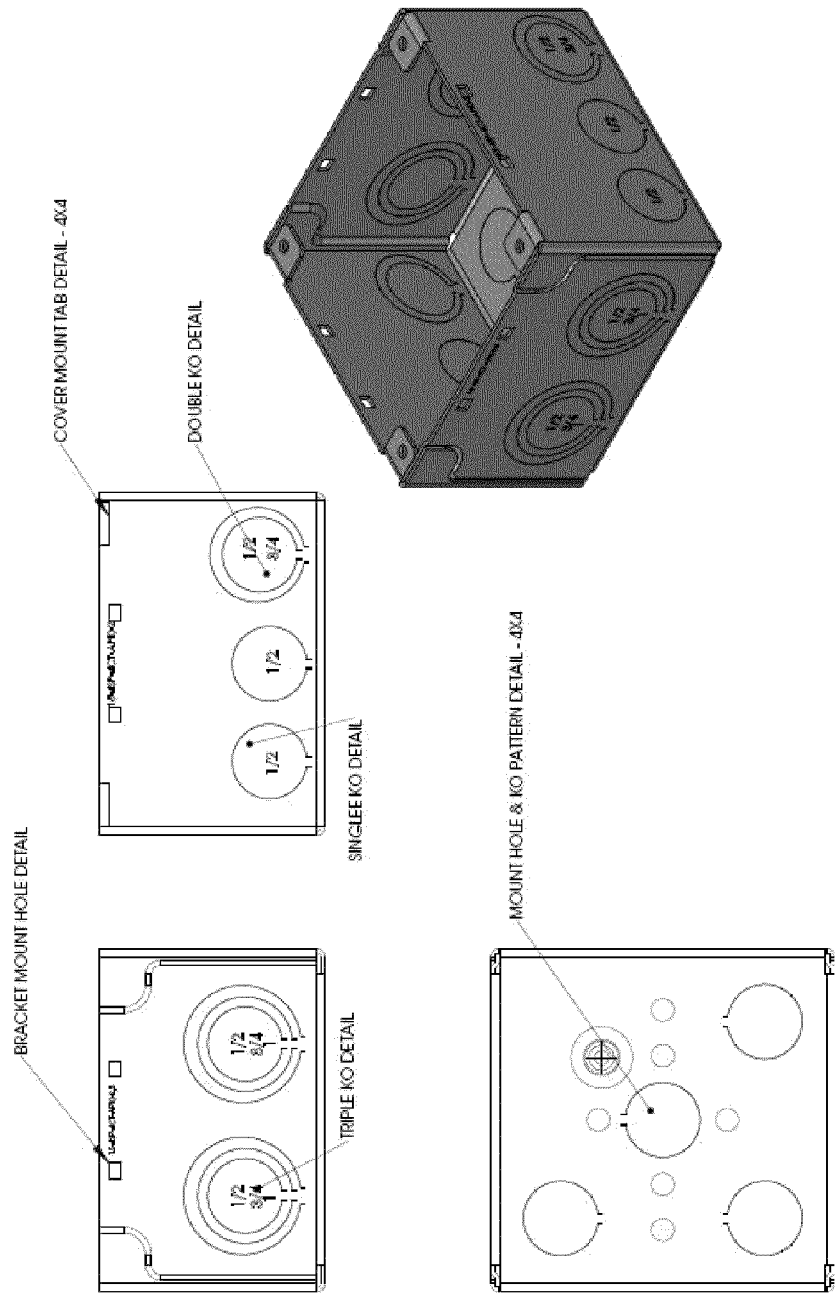

FIG. 64 illustrates various views of another example square-shaped double gang electrical junction box in accordance with an example embodiment of the disclosure. The electrical junction box 6400 can include one or more mounting holes 6402 and/or devices and knockouts 6404, 6406. The mounting holes 6402 and knockouts 6404, 6406 are similar to those described above with respect to FIG. 57, except the mounting holes 6402 in this example embodiment can be square or rectangular-shaped.

FIG. 65 illustrates various views of another example square-shaped double gang electrical junction box in accordance with an example embodiment of the disclosure. The electrical junction box 6500 can include one or more mounting holes 6502 and/or devices and knockouts 6504, 6506. The mounting holes 6502 and knockouts 6504, 6506 are similar to those described above with respect to FIG. 57.

FIG. 66 illustrates various views of another example square-shaped double gang electrical junction box in accordance with an example embodiment of the disclosure. The electrical junction box 6600 can include one or more mounting holes 6602 and/or devices and knockouts 6604, 6606. The mounting holes 6602 and knockouts 6604, 6606 are similar to those described above with respect to FIG. 57.

FIG. 67 illustrates various views of another example square-shaped double gang electrical junction box in accordance with an example embodiment of the disclosure. The electrical junction box 6700 can include one or more mounting holes 6702 and/or devices and knockouts 6704, 6706. The mounting holes 6702 and knockouts 6704, 6706 are similar to those described above with respect to FIG. 57.

FIG. 68 illustrates various views of another example square-shaped double gang electrical junction box in accordance with an example embodiment of the disclosure. The electrical junction box 6800 can include one or more mounting holes 6802 and/or devices and knockouts 6804, 6806. The mounting holes 6802 and knockouts 6804, 6806 are similar to those described above with respect to FIG. 57, except the mounting holes 6802 in this example embodiment can be square or rectangular-shaped.

Figure 69:
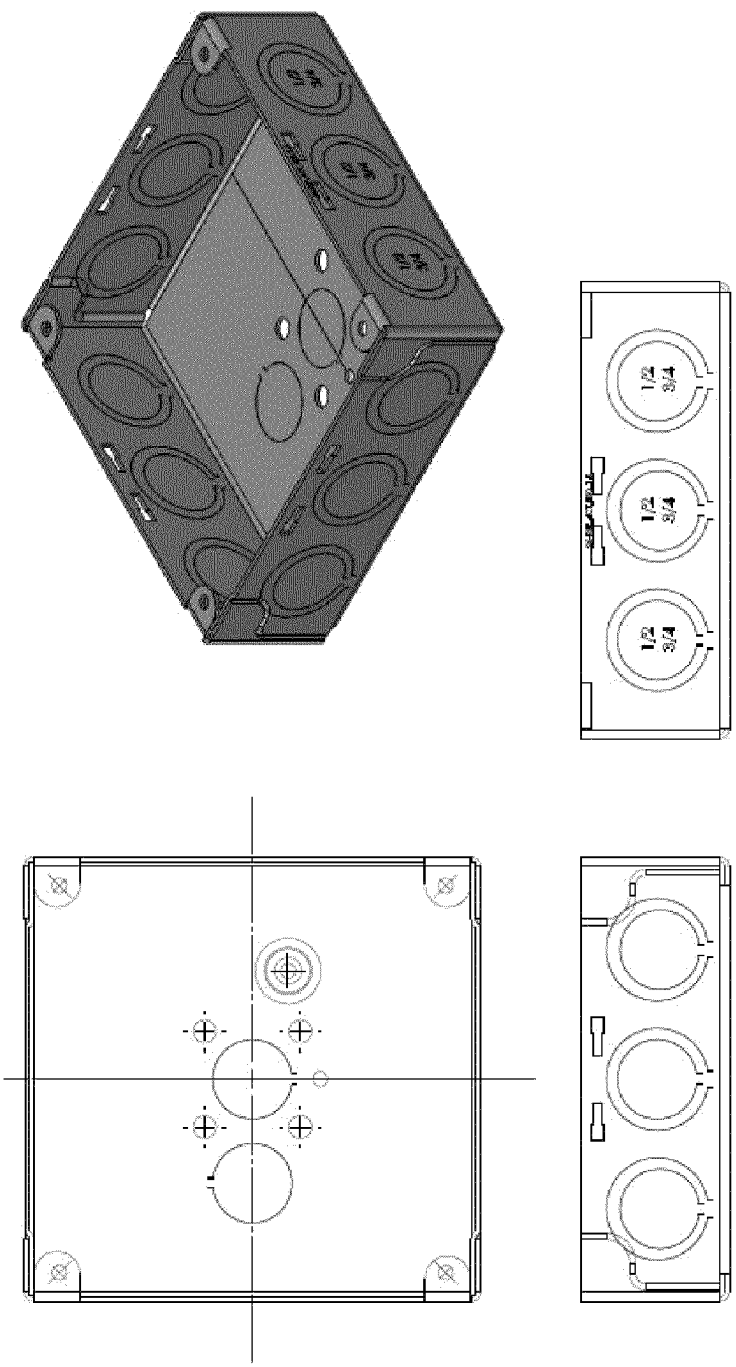

FIG. 69 illustrates various views of another example square-shaped double gang electrical junction box in accordance with an example embodiment of the disclosure. The electrical junction box 6900 can include one or more mounting holes 6902 and/or devices and knockouts 6904, 6906. The mounting holes 6902 and knockouts 6904, 6906 are similar to those described above with respect to FIG. 57.

FIG. 70 illustrates various views of another example square-shaped double gang electrical junction box in accordance with an example embodiment of the disclosure. The electrical junction box 7000 can include one or more mounting holes 7002 and/or devices and knockouts 7004, 7006. The mounting holes 7002 and knockouts 7004, 7006 are similar to those described above with respect to FIG. 57.

Figure 71:
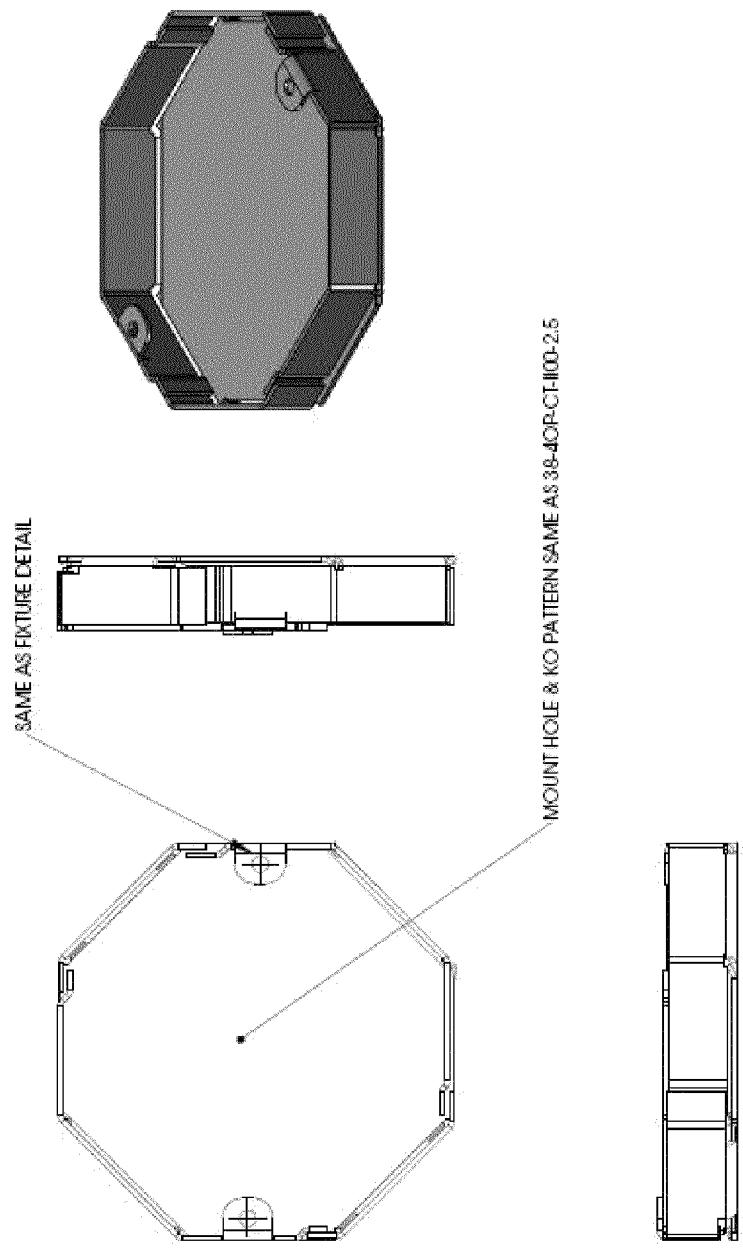

FIG. 71 illustrates various views of an example octagonally-shaped electrical junction box in accordance with an example embodiment of the disclosure. The electrical junction box 7100 can include one or more mounting holes and/or devices and knockouts. The mounting holes and knockouts can be similar to those described above with respect to FIG. 57.

Figure 72:
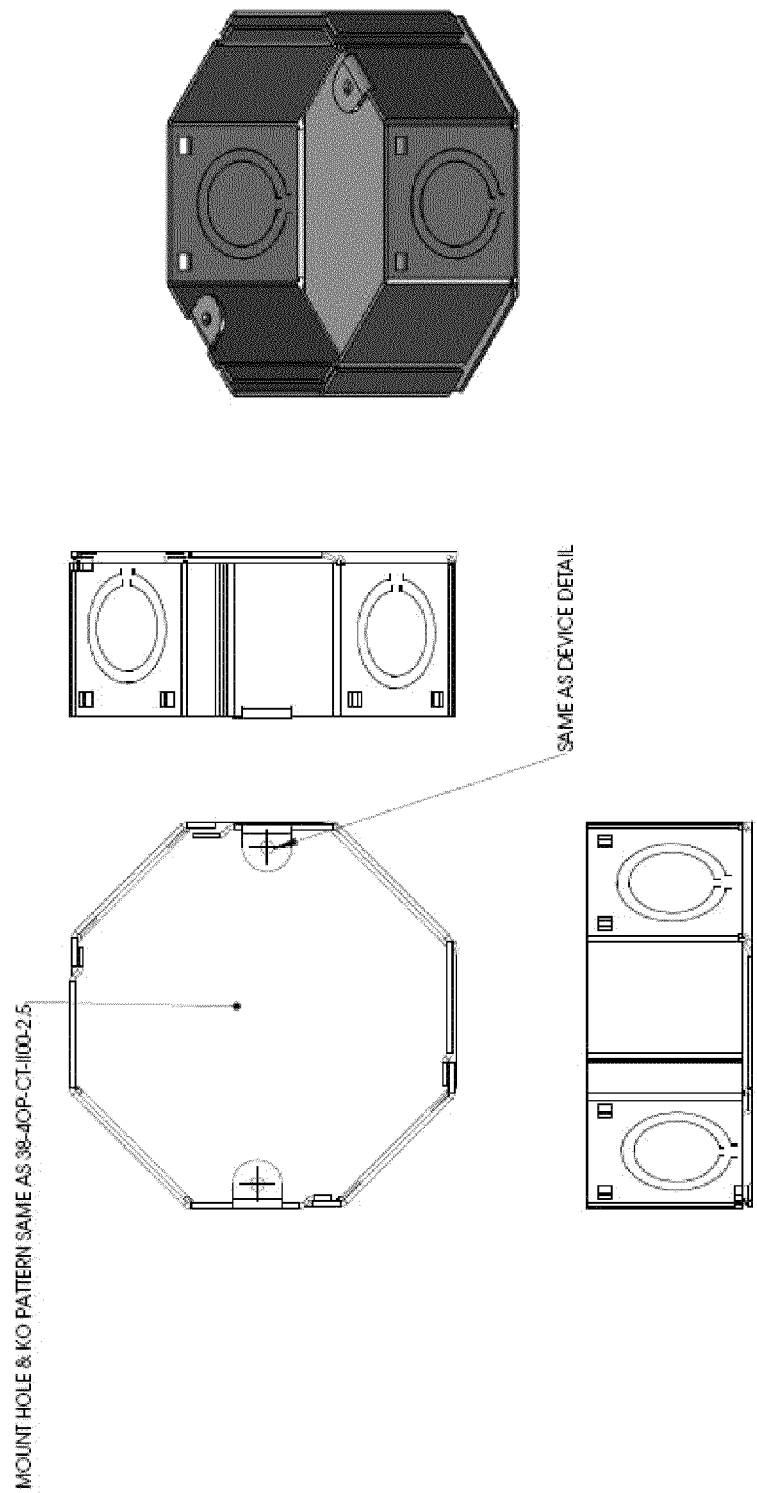

FIG. 72 illustrates various views of another example octagonally-shaped electrical junction box in accordance with an example embodiment of the disclosure. The electrical junction box 7200 can include one or more mounting holes 7202 and/or devices and knockouts 7204, 7206. The mounting holes 7202 and knockouts 7204, 7206 are similar to those described above with respect to FIG. 57, except the mounting holes 7202 in this example embodiment can be square or rectangular-shaped.

FIG. 73 illustrates various views of another example octagonally-shaped electrical junction box in accordance with an example embodiment of the disclosure. The electrical junction box 7300 can include one or more mounting holes 7302 and/or devices and knockouts 7304, 7306. The mounting holes 7302 and knockouts 7304, 7306 are similar to those described above with respect to FIG. 57, except the mounting holes 7302 in this example embodiment can be square or rectangular-shaped.

The electrical junction boxes, mounting holes, devices, and knockouts shown in FIGS. 57-73 are shown by way of example only, and other configurations, shapes, and designs can exist in accordance with other example embodiments of the disclosure.

Figure 24:
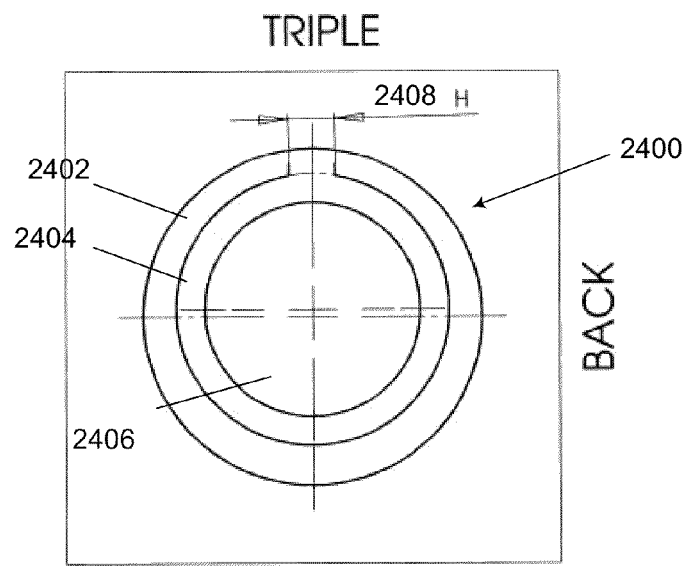
Figure 25:
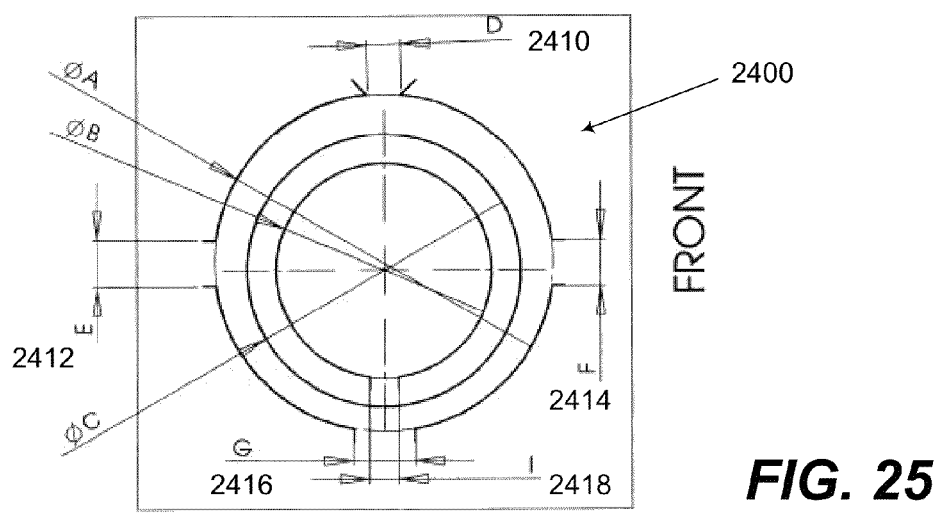

Turning now to FIGS. 24 and 25, these figures illustrate an example knockout for an electrical junction box in accordance with example embodiments of the disclosure. In FIG. 24, a back or interior view of a triple knockout 2400 comprising three concentric or eccentric circular-shaped knockouts 2402, 2404, 2406 is shown. In FIG. 25, a front or exterior view of the triple knockout 2400 is shown. Example dimensions A, B, C, D, E, F, G, H, and I for three sizes (1, 1¼, and 1½) of a triple knockout 2400 are illustrated in FIG. 28.

As shown in FIG. 24, on the back or interior side of the knockout 2400, the outer circular-shaped knockout 2402 and inner circular-shaped knockout 2406 are full circles etched or formed in the wall of an electrical junction box, such as 100 in FIG. 1. The intermediate circular-shaped knockout 2404 includes a tab-shaped portion 2408 with a width of H shown in FIG. 28 depending on the size of the knockout 2400. As shown in FIG. 25, on the front or exterior side of the knockout 2400, the intermediate circular-shaped knockout 2404 is a full circle etched or formed in the wall of an electrical junction box, such as 100 in FIG. 1. The outer circular-shaped knockout 2402 and inner circular-shaped knockout 2406 include tab-shaped portions 2410, 2412, 2416, 2418, 2420 with respective widths of D, E, F, G, and I shown in FIG. 28 depending on the size of the knockout 2400. The respective diameters of each of the circular-shaped knockouts 2402, 2404, 2406 are indicated by A, B, C in FIG. 28 depending on the size of the knockout 2400.

Figure 26:
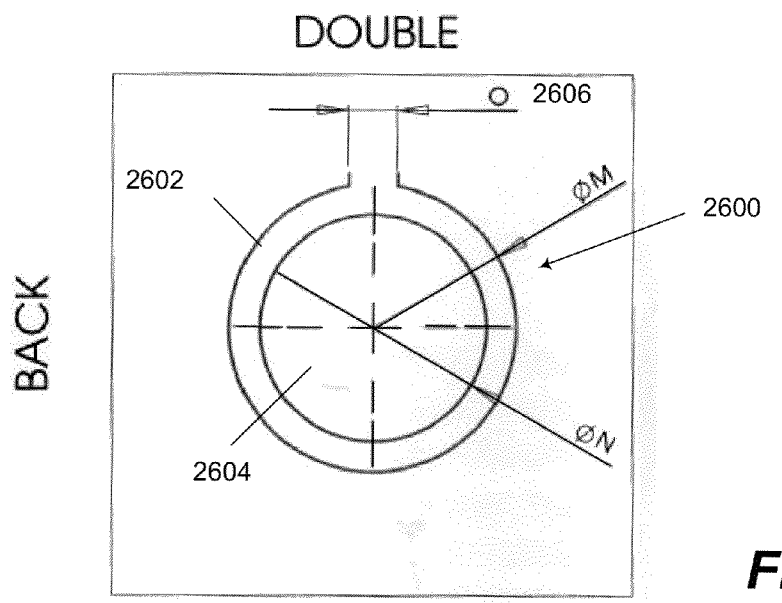
Figure 27:
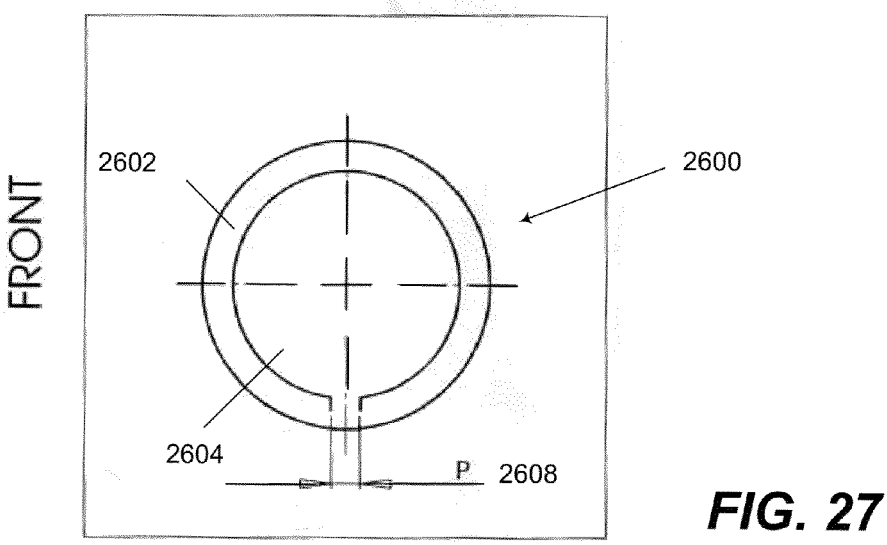

FIGS. 26 and 27 illustrate another example knockout for a junction box in accordance with example embodiments of the disclosure. In FIG. 26, a back or interior view of a double knockout 2600 comprising two concentric or eccentric circular-shaped knockouts 2602, 2604 is shown. In FIG. 27, a front or exterior view of the double knockout 2600 is shown. Example dimensions M, N, O, and P for four sizes (¾, 1, 1¼, and 1½) of a double knockout 2600 are illustrated in FIG. 28.

As shown in FIG. 26, on the back or interior side of the knockout 2400, the inner circular-shaped knockout 2604 is a full circle etched or formed in the wall of an electrical junction box, such as 100 in FIG. 1. The outer circular-shaped knockout 2602 includes a tab-shaped portion 2606 with a width of O shown in FIG. 28 depending on the size of the knockout 2600. As shown in FIG. 27, on the front or exterior side of the knockout 2600, the outer circular-shaped knockout 2602 is a full circle etched or formed in the wall of an electrical junction box, such as 100 in FIG. 1. The inner circular-shaped knockout 2604 includes a tab-shaped portions 2608 with a width of P shown in FIG. 28 depending on the size of the knockout 2600. The respective diameters of each of the circular-shaped knockouts 2602, 2604 are indicated by M and N in FIG. 28 depending on the size of the knockout 2600.

In one aspect of an embodiment, one or more knockouts and electrical junction boxes in accordance with an example embodiment of the disclosure can meet the standards specified by UL (Underwriters' Laboratories) 514A.

Selective sizing and spacing for one or more knockouts in an electrical junction box in accordance with an example embodiment of the disclosure, such as knockouts 126 in FIG. 1, can be selected based at least in part on the surface area of one or more sidewalls for an electrical junction box, the sizing and spacing of mounting holes, such as 106, on the sidewalls of the electrical junction box, and the relative sizes of some or all electrical junction boxes in the same family or group of electrical junction boxes. In any instance, the selective sizing and spacing for one or more knockouts in an electrical junction box in accordance with an example embodiment of the disclosure can be consistent or otherwise closely similar to the sizing and spacing between knockouts in a family or group of electrical junction boxes. In this manner, one or more common knockout configurations can be used with multiple electrical junction boxes of different sizes and/or shapes, thus reducing time and costs in storing, assembling together, and mounting the electrical junction boxes with knockouts.

Figure 29:
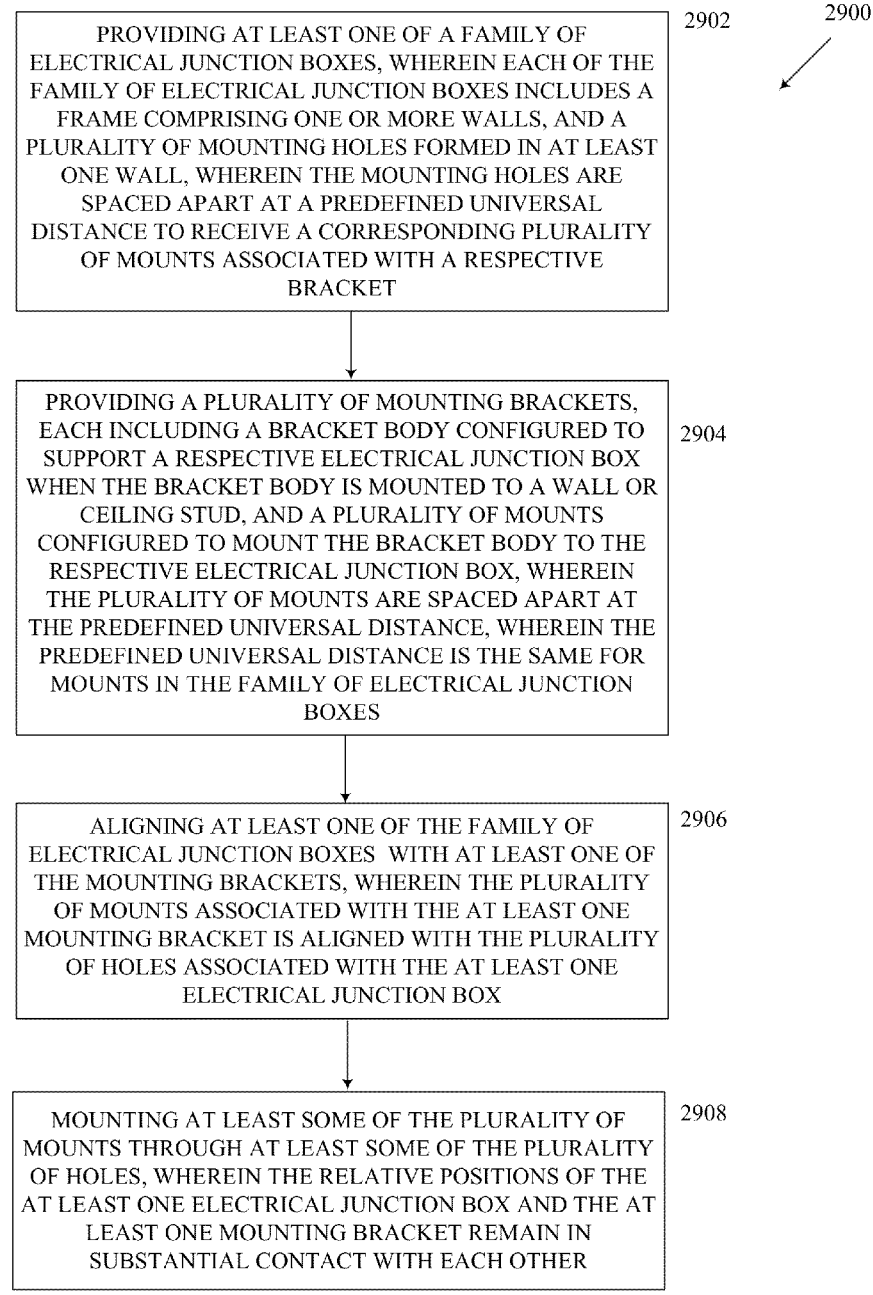
FIGS. 29 and 30 are flowcharts of example methods for using modular brackets, mountings, and/or knockouts for an electrical junction box in accordance with various example embodiments of the disclosure.
Figure 30:
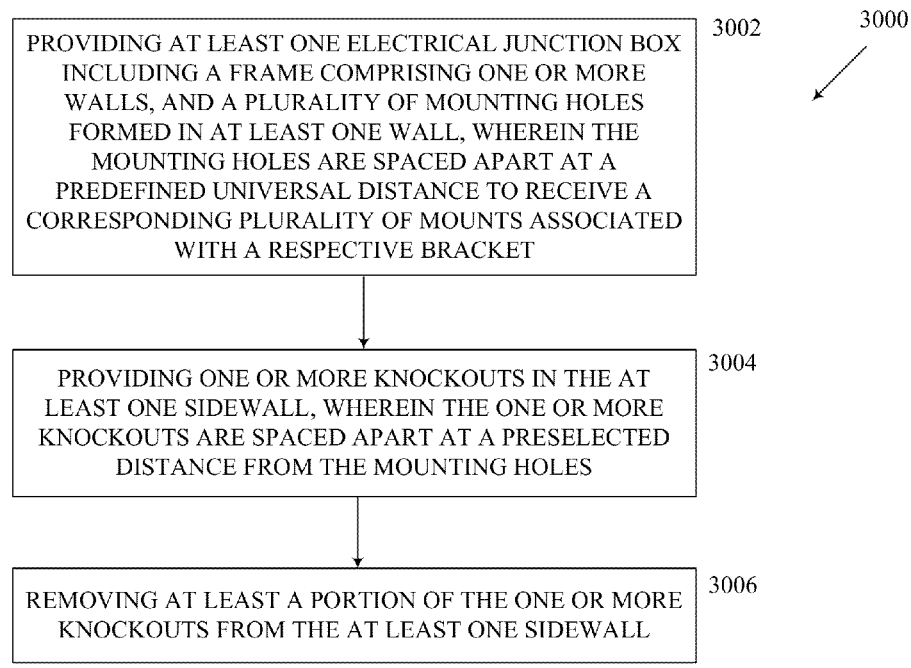

Turning now to methods associated with certain example embodiments of the disclosure, FIGS. 29 and 30 illustrate various example methods of manufacturing and/or using a modular bracket and mounting with a family of electrical junction boxes and/or accessories, such as illustrated above. Each of the flowcharts 2900 and 3000 shown in FIGS. 29 and 30, respectively, are shown by way of example only, and can have fewer or greater numbers of elements than shown.

In FIG. 29, an example method for using a modular bracket and mounting with a family of electrical junction boxes is shown in accordance with an example embodiment of the disclosure. The method 2900 begins at block 2902. In block 2902, a at least one of a family of electrical junction boxes, wherein each of the family of electrical junction boxes includes a frame comprising one or more walls, and a plurality of mounting holes formed in at least one wall, wherein the mounting holes are spaced apart at a predefined universal distance to receive a corresponding plurality of mounts associated with a respective bracket is provided.

Block 2902 is followed by block 2904, in which a plurality of mounting brackets, each including a bracket body configured to support a respective electrical junction box when the bracket body is mounted to a wall or ceiling stud, and a plurality of mounts configured to mount the bracket body to the respective electrical junction box, wherein the plurality of mounts are spaced apart at the predefined universal distance, wherein the predefined universal distance is the same for mounts in the family of electrical junction boxes is provided.

Block 2904 is followed by block 2906, in which at least one of the family of electrical junction boxes is aligned with at least one of the mounting brackets, wherein the plurality of mounts associated with the at least one mounting bracket is aligned with the plurality of holes associated with the at least one electrical junction box.

Block 2906 is followed by block 2908, in which at least some of the plurality of mounts are mounted through at least some of the plurality of holes, wherein the relative positions of the at least one electrical junction box and the at least one mounting bracket remain in substantial contact with each other.

The method 2900 ends after block 2908.

An example modular bracket and mount for an electrical junction box in a family of electrical junction boxes for use with the method 2900 shown in FIG. 29 is illustrated in FIG. 1.

In one aspect of an example embodiment, the family of electrical junction boxes can include two or more of the following: a single gang rectangular-shaped box, a double gang rectangular-shaped box, a square-shaped box, a hexagonal-shaped box, or an octagonal-shaped box.

In one aspect of an example embodiment, the family of electrical junction boxes can include a subset of a larger group or number of electrical junction boxes. For example, a family of electrical junction boxes can be defined as one or more boxes with a common and/or different box type or box depth and operable to mount to a single, common, or set of mounting brackets.

In one aspect of an example embodiment, the plurality of mounts can include one or more of the following: a locking ball device, a clip over a post device, a spring-loaded device, a spade-shaped spring wire clip device, an Omega-shaped spring wire clip device, a tab and screw combination, a pliable or flexible locking device, a V-shaped clip locking device, a screw or bolt, plastic tree-shaped locking device, or a L-shaped clip.

In another aspect of an example embodiment, a plurality of mounts can include one or more of the following: mounting channels, grooves, slots and cut outs, snap on brackets, snap in brackets, screw on brackets, and other similar devices.

In one aspect of an example embodiment, the predefined universal distance is between about 0.25 and about 3.5 inches.

In FIG. 30, an example method for using a folded electrical junction box is shown. The method 3000 begins at block 3002. In block 3002, at least one electrical junction box is provided comprising a frame comprising one or more walls, and a plurality of mounting holes formed in at least one wall, wherein the mounting holes are spaced apart at a predefined universal distance to receive a corresponding plurality of mounts associated with a respective bracket.

Block 3002 is followed by block 3004, in which one or more knockouts are provided in the at least one wall, wherein the one or more knockouts are spaced apart from the plurality of mounting holes at a preselected distance.

Block 3004 is followed by block 3006, in which at least a portion of the one or more knockouts is removed from the at least one wall.

The method 3000 ends after block 3006.

An example knockout for an electrical junction box for use with the method 3000 shown in FIG. 30 is illustrated in FIG. 1.

In one aspect of an example embodiment, the knockouts are at least one of the following sizes: ½, ¾, 1, 1¼, or 1½ inches.

In another aspect of an example embodiment, the predefined universal distance is between about 0.25 and about 3.5 inches.

In another aspect of an example embodiment, the knockout includes one or more of the following: two concentrically aligned knockouts, three concentrically aligned knockouts, two eccentrically aligned knockouts, or three eccentrically aligned knockouts.

Figure 74:
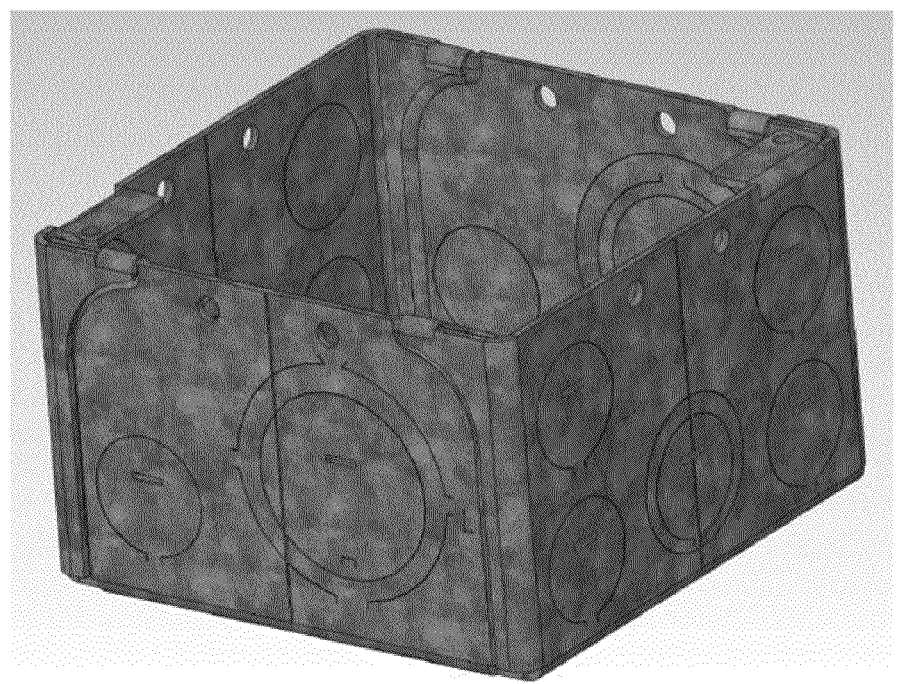
Figure 75:
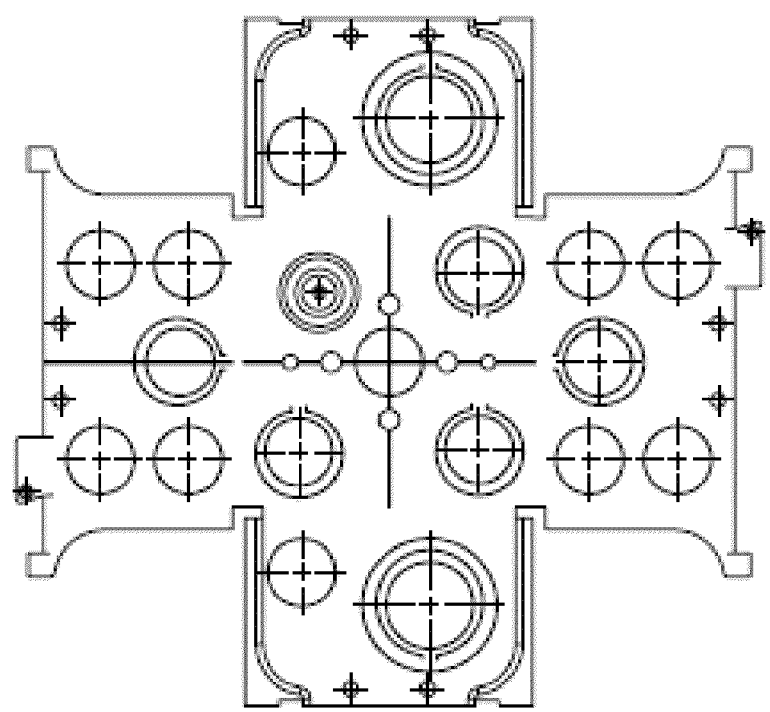
Figures 77A, 77B, 77C, 77D:
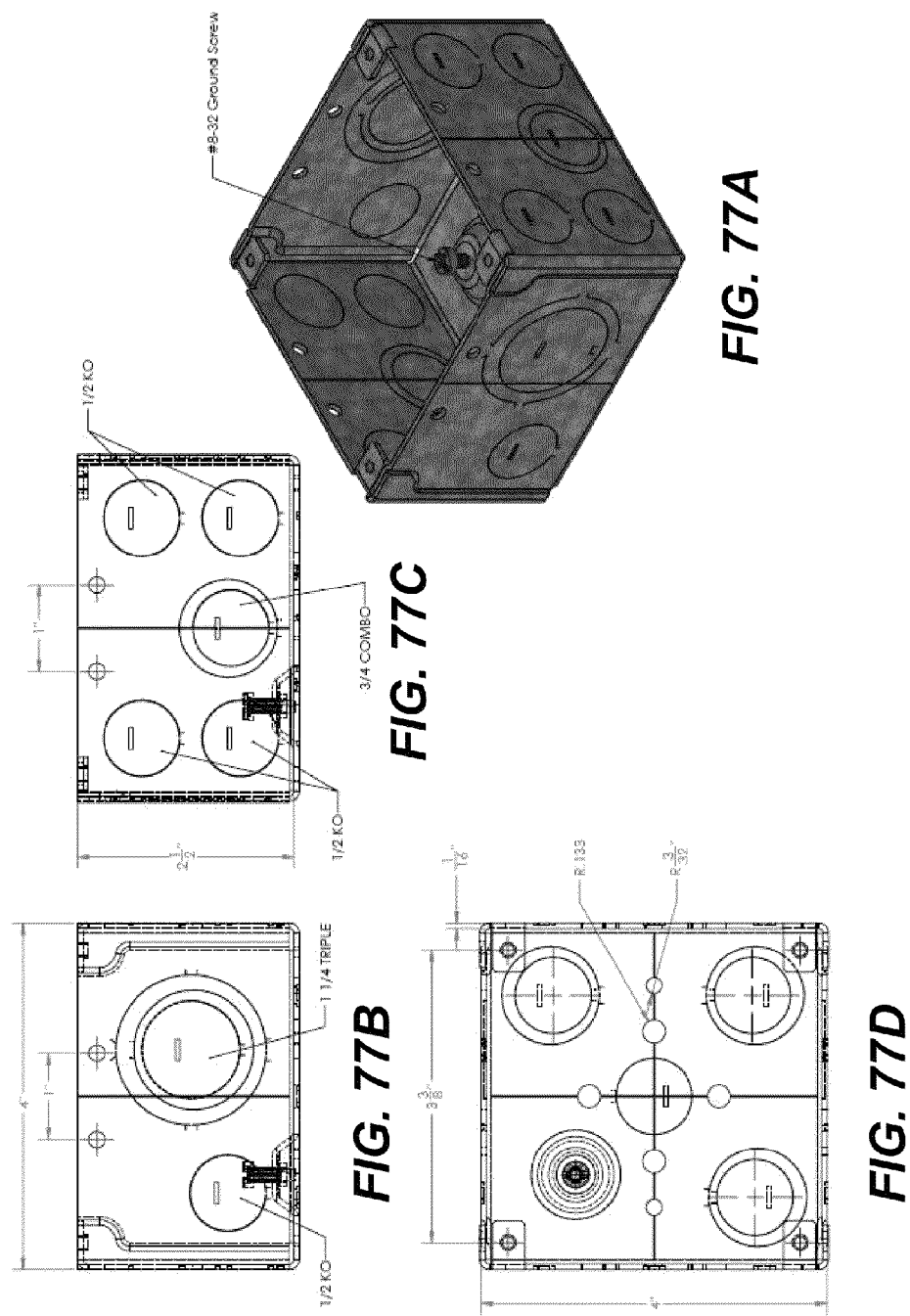
Figure 83A:
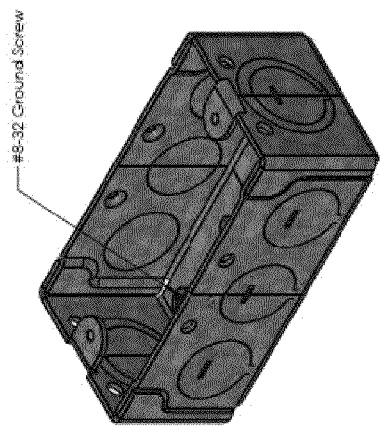
Figure 83C:
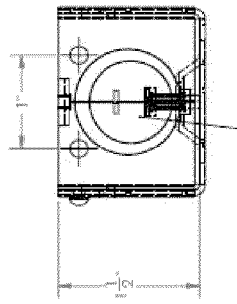
Figure 83B:
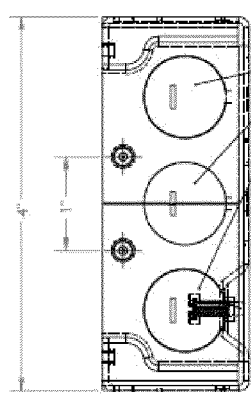
Figure 83D:
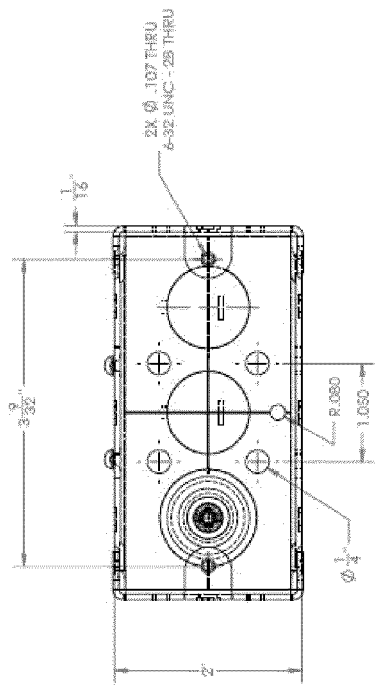
Figure 86A:
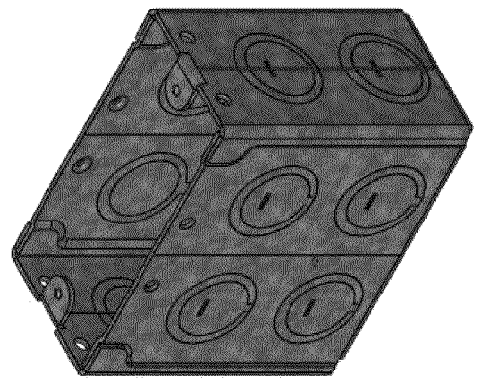
Figure 86C:
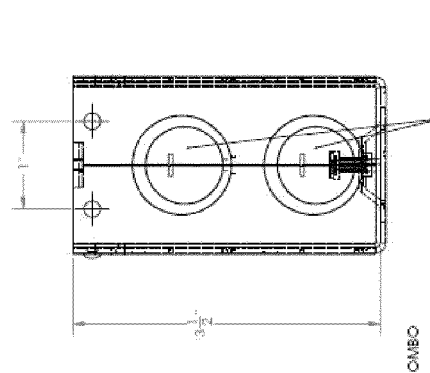
Figure 86B:
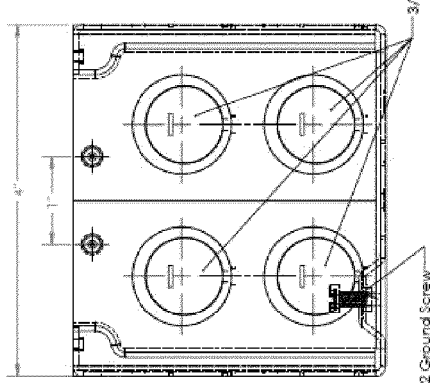
Figure 86D:
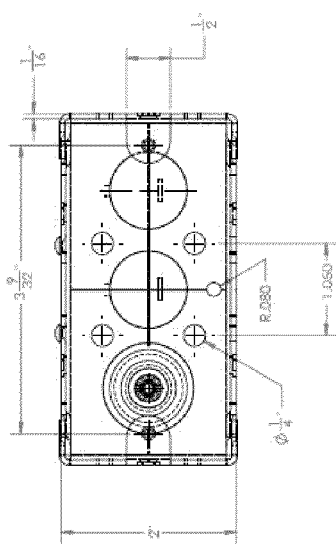
Figure 87A:
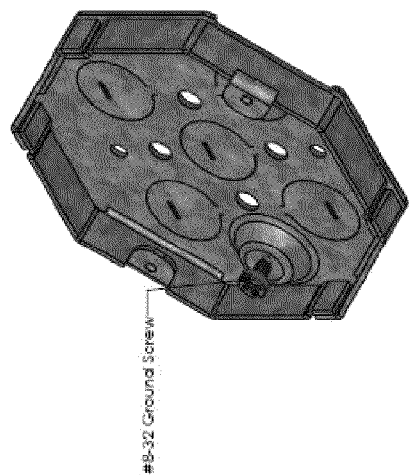
Figure 87D:
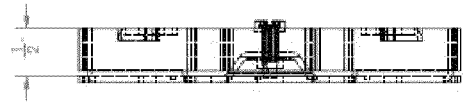
Figure 87B:
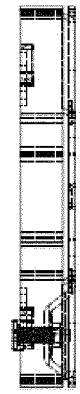
Figure 87C:
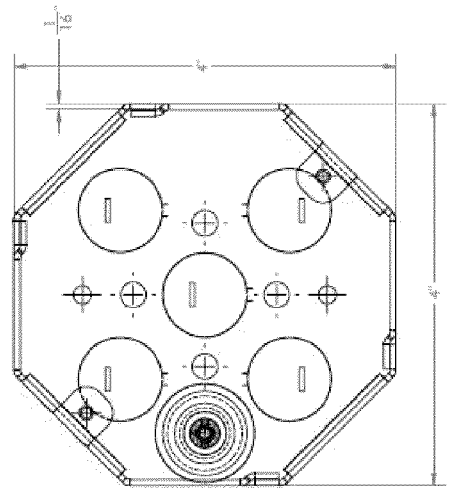
Figure 90A:
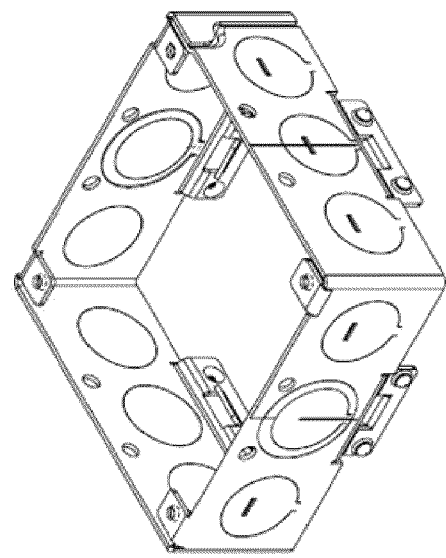
Figure 90D:
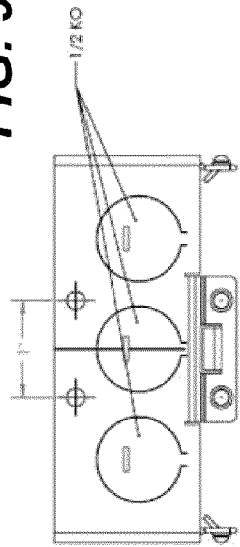
Figure 90B:
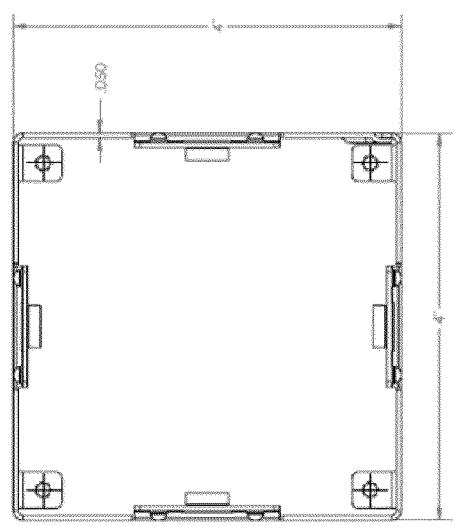
Figure 90C:
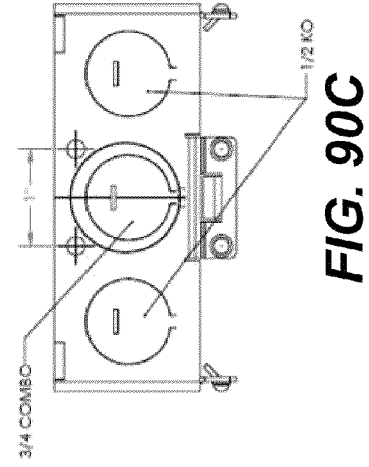
Figure 92A:
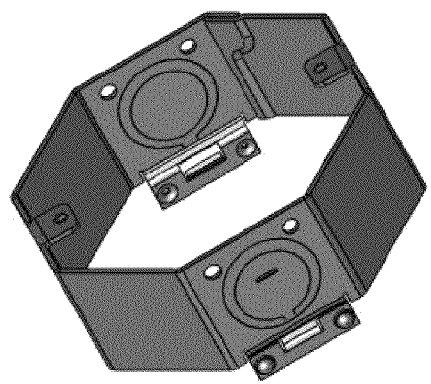
Figure 92D:
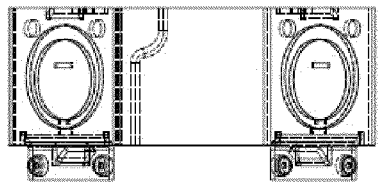
Figure 92B:
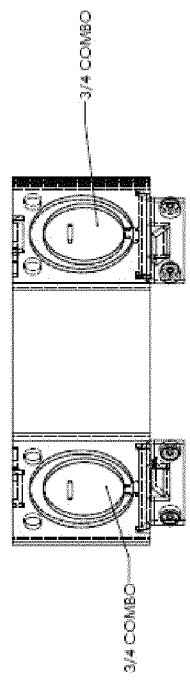
Figure 92C:
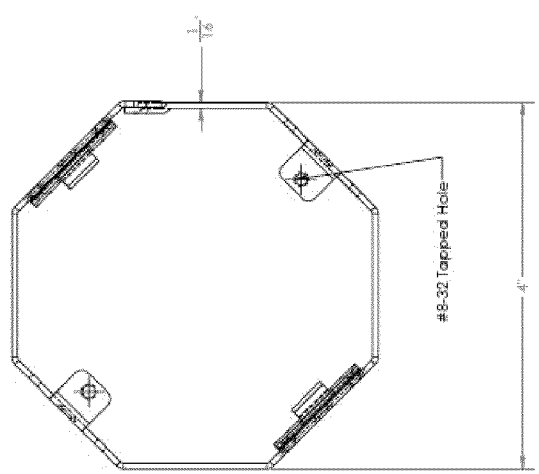
Figures 93A, 93B:
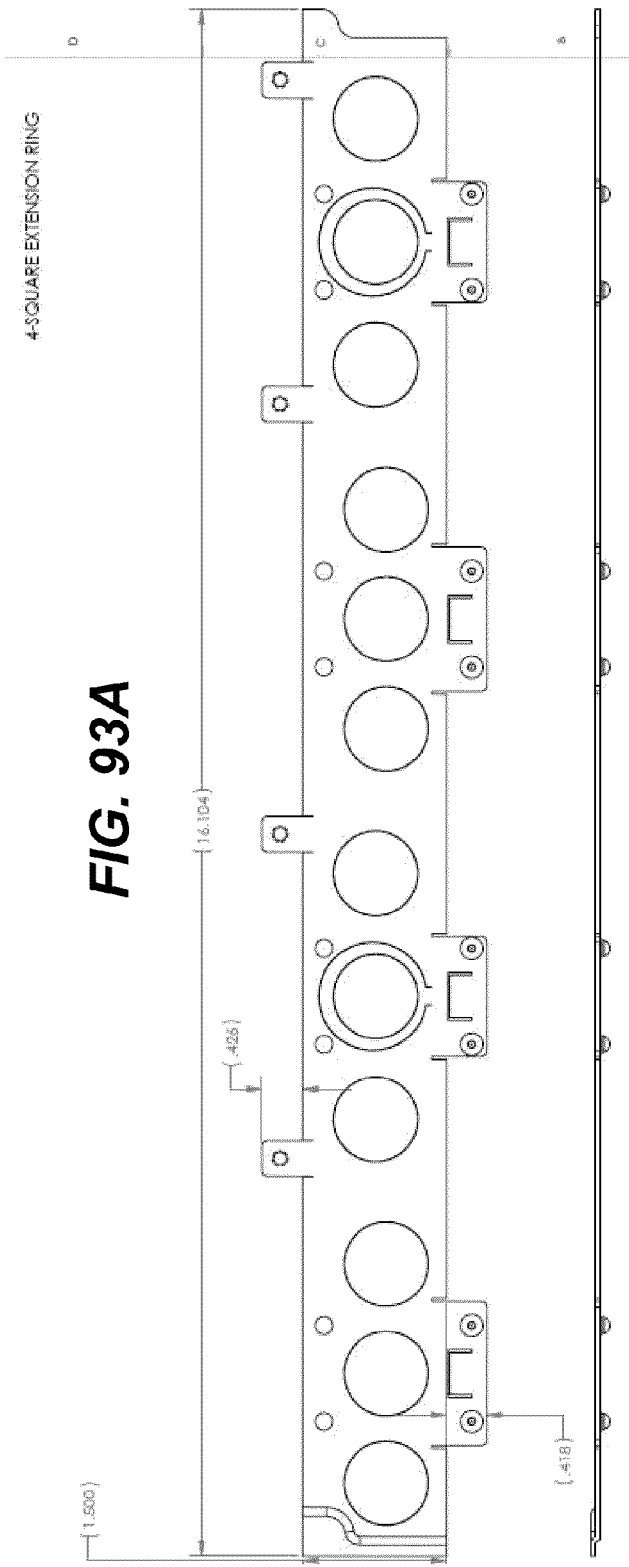
Figure 95:
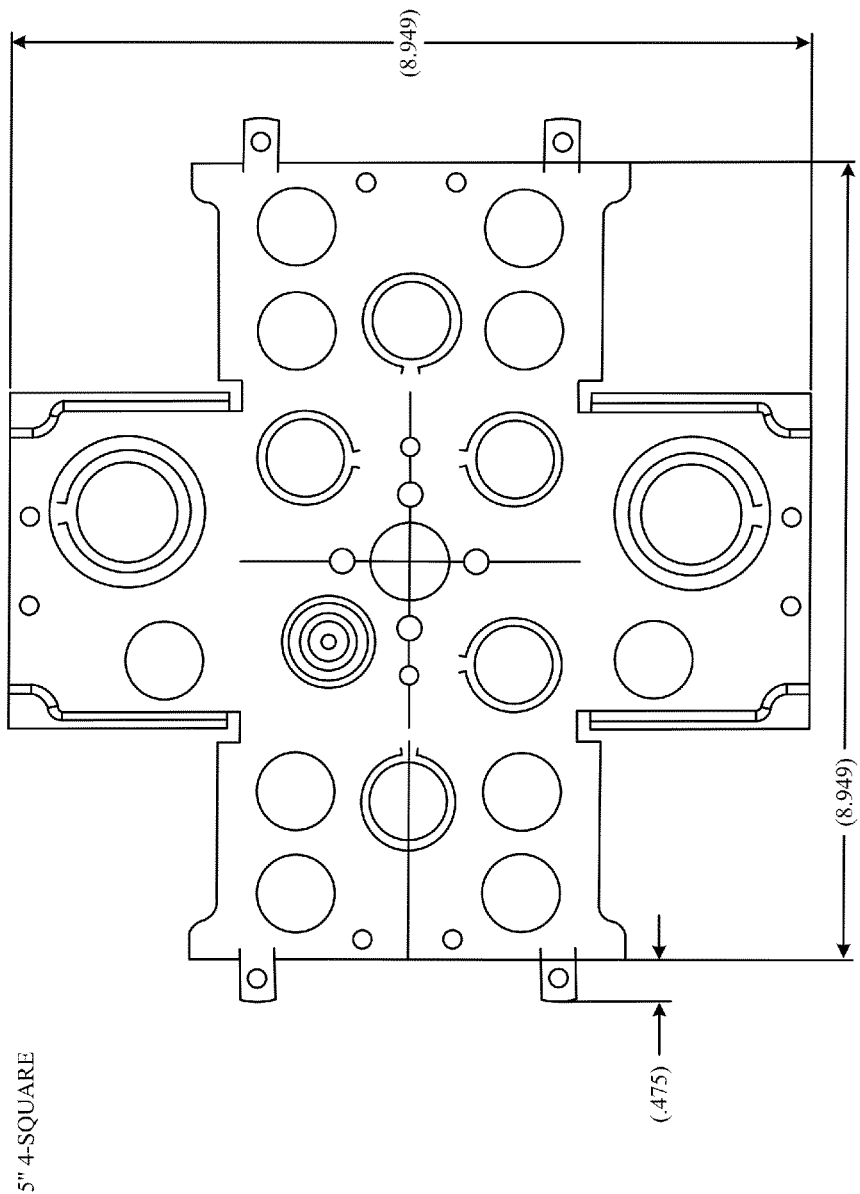
Figure 96:
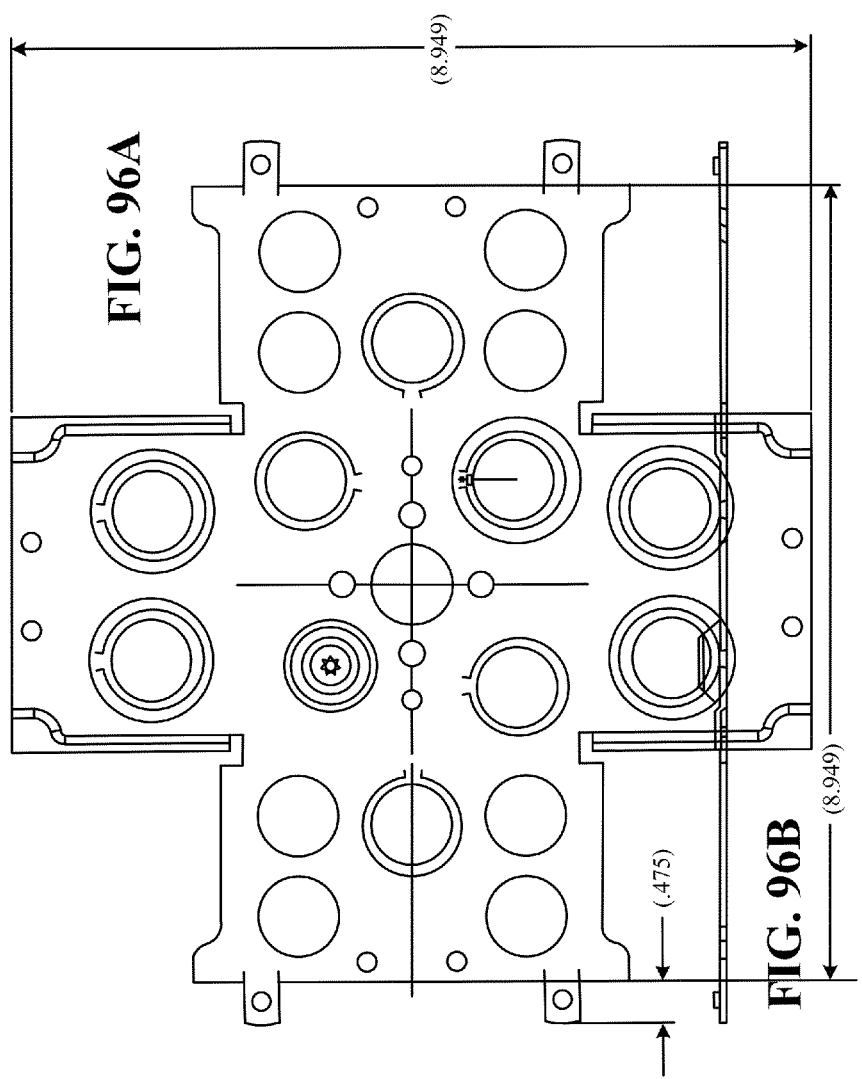
Figure 97:
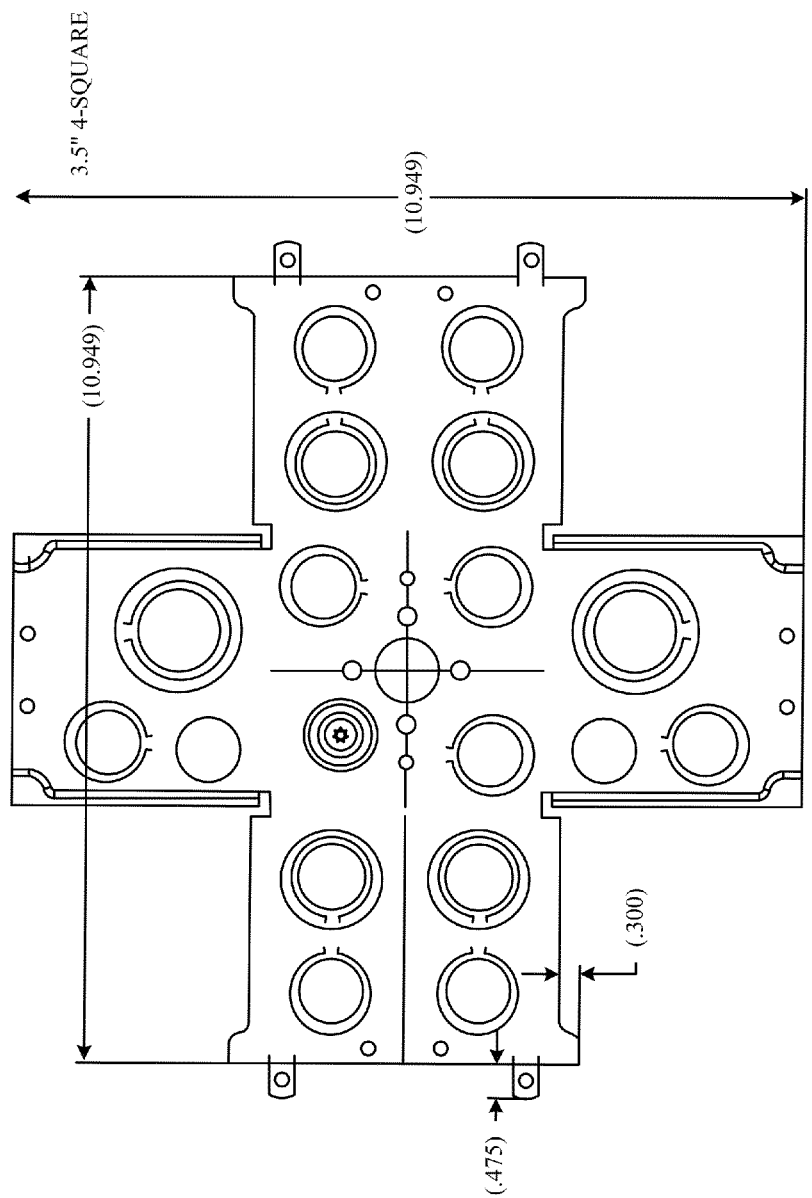
Figures 98A, 98B:
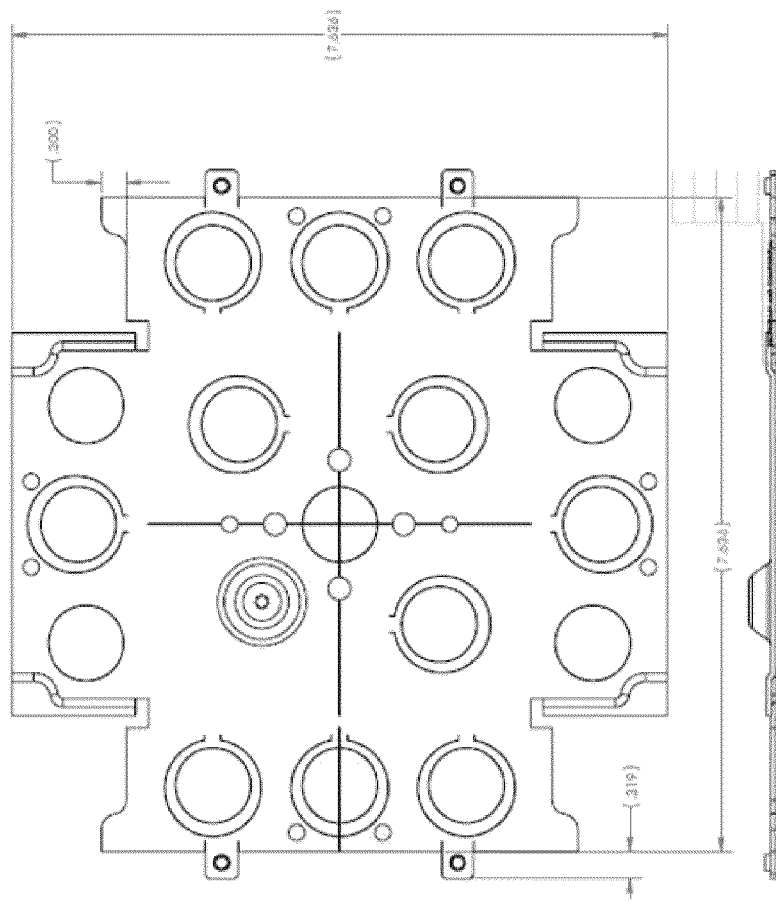
Figure 99:
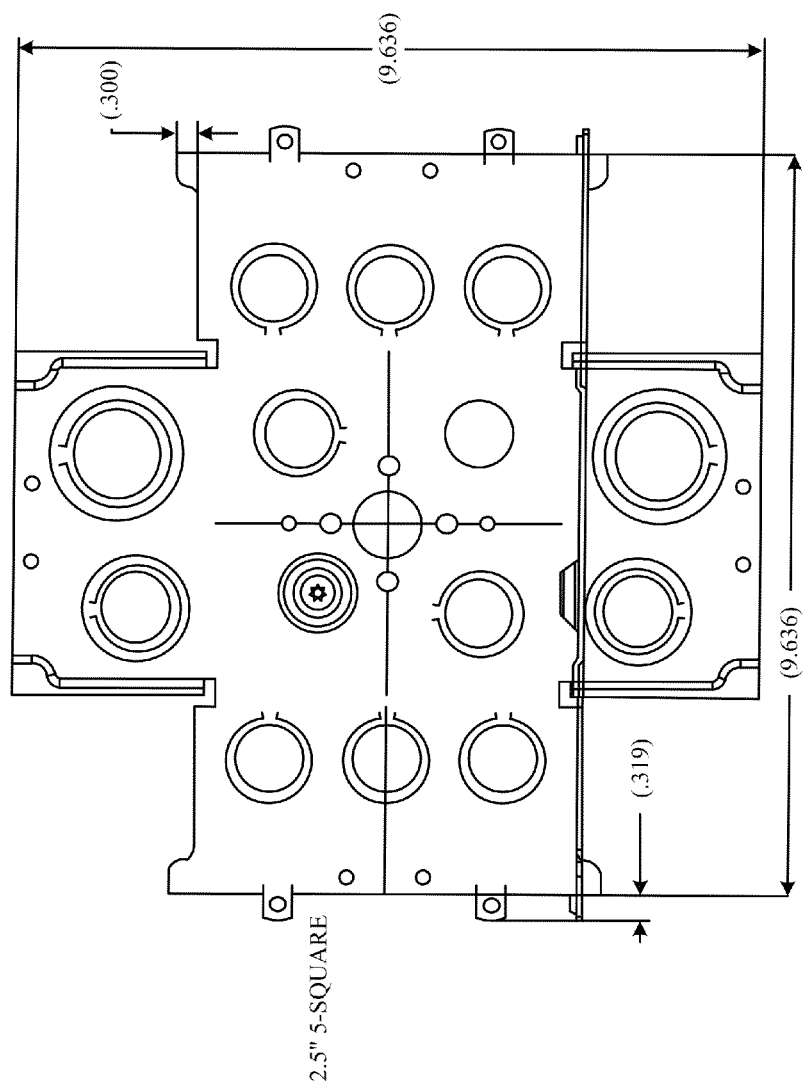
Figure 100:
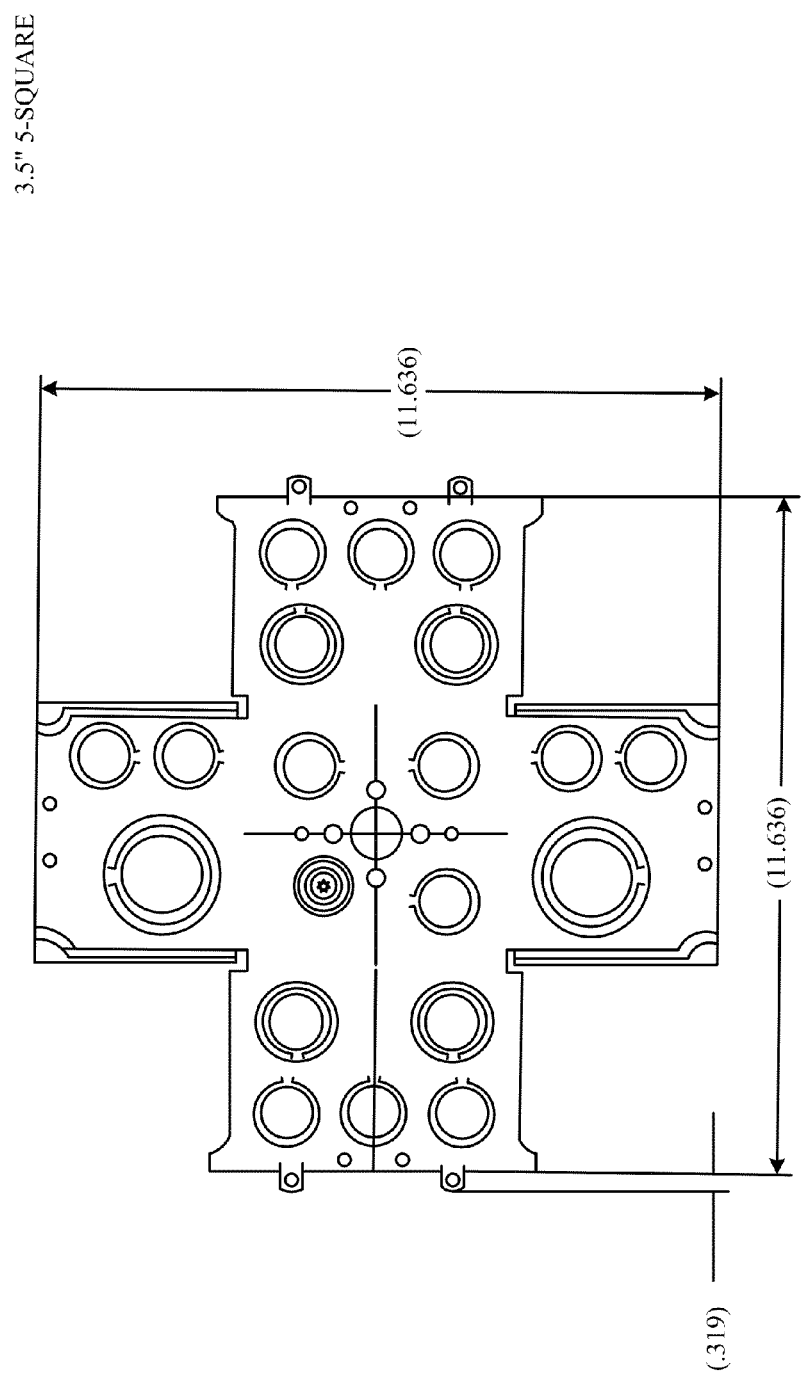
Figure 101A:
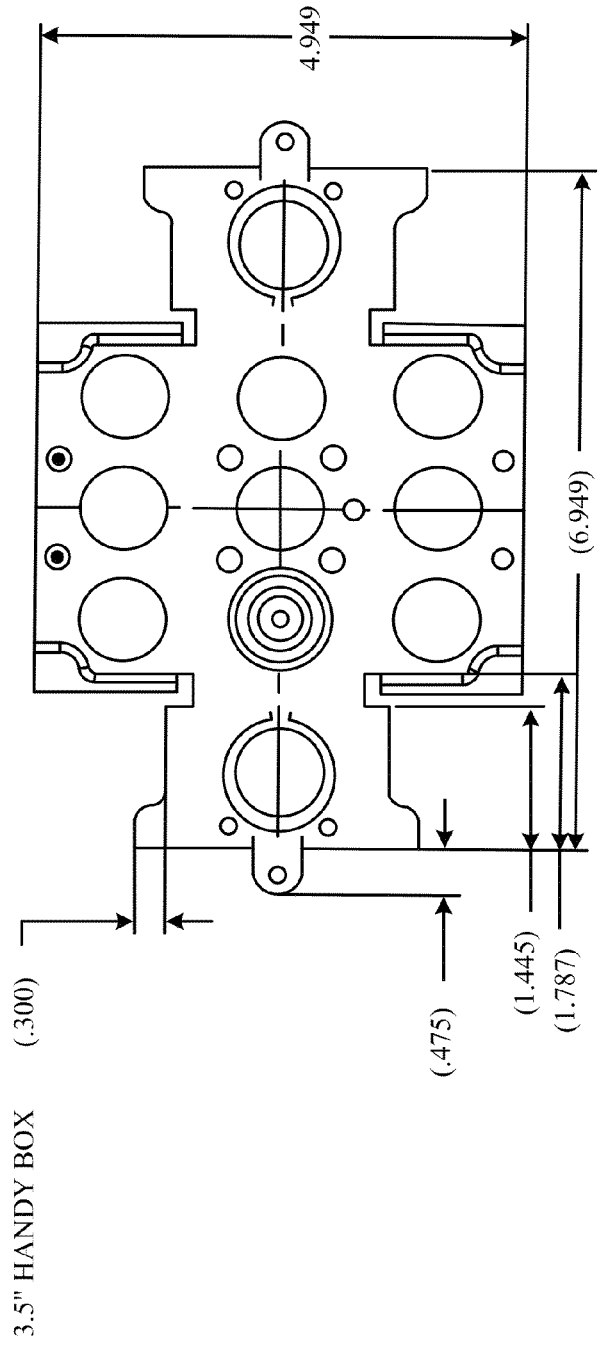
Figure 101B:
Figures 102A, 102B:
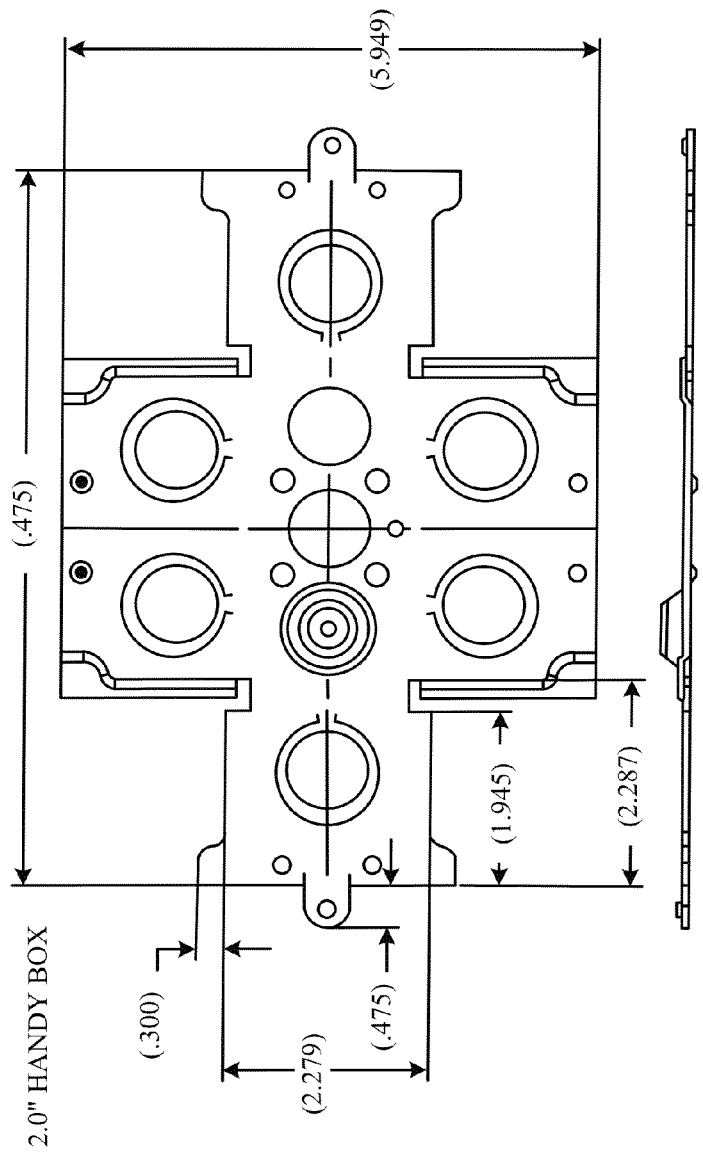
Figure 104:
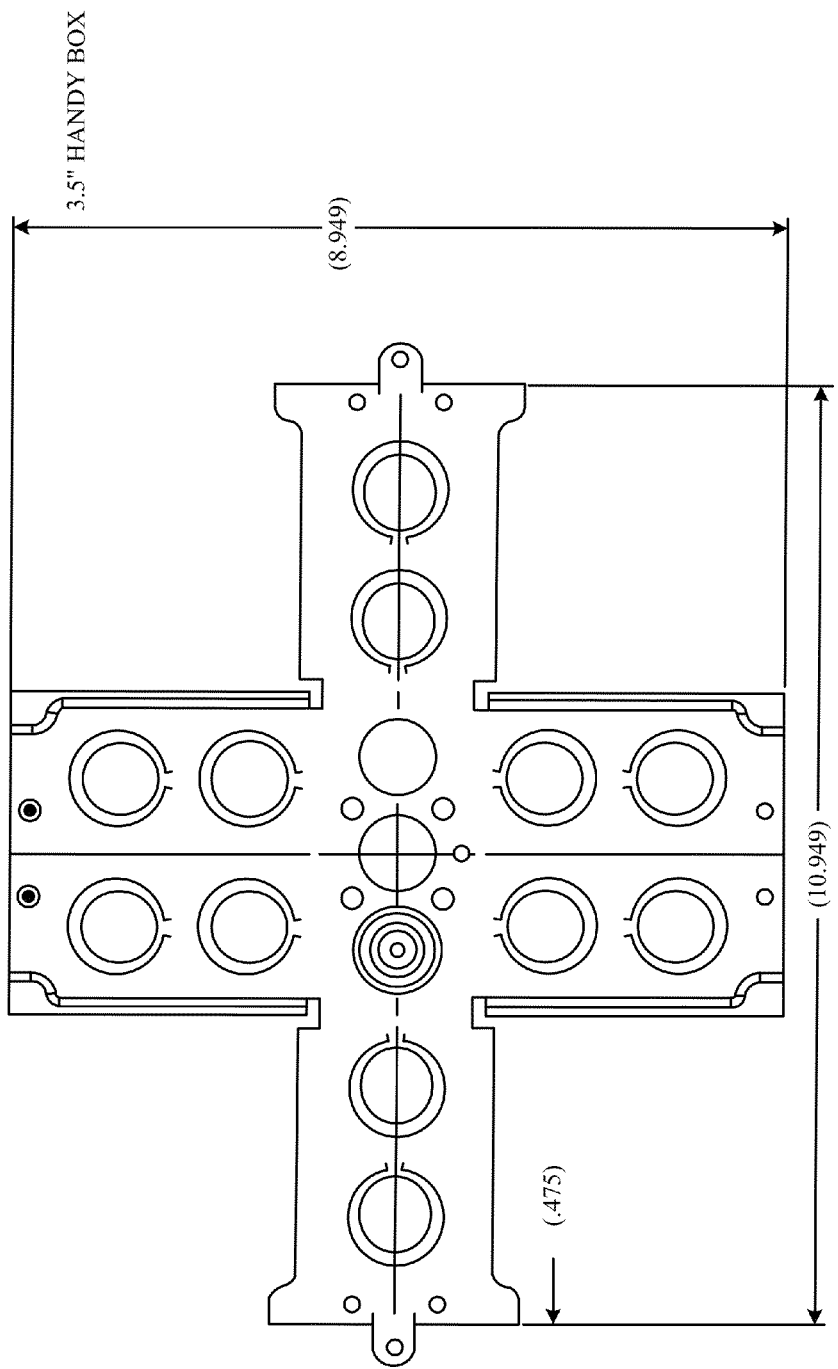
Figures 105A, 105B:
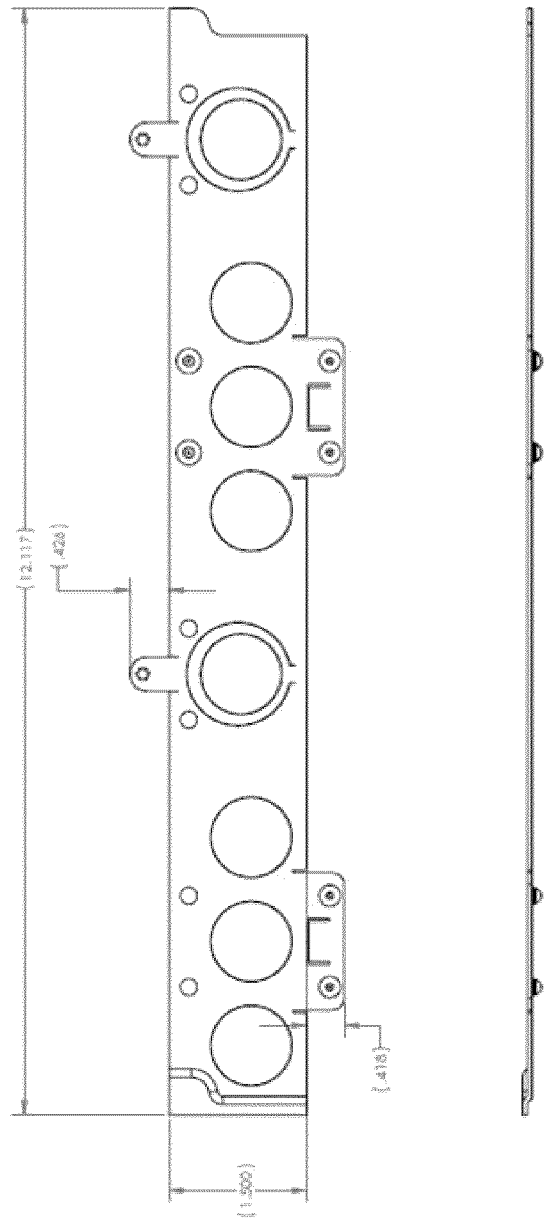
Figures 106A, 106B:
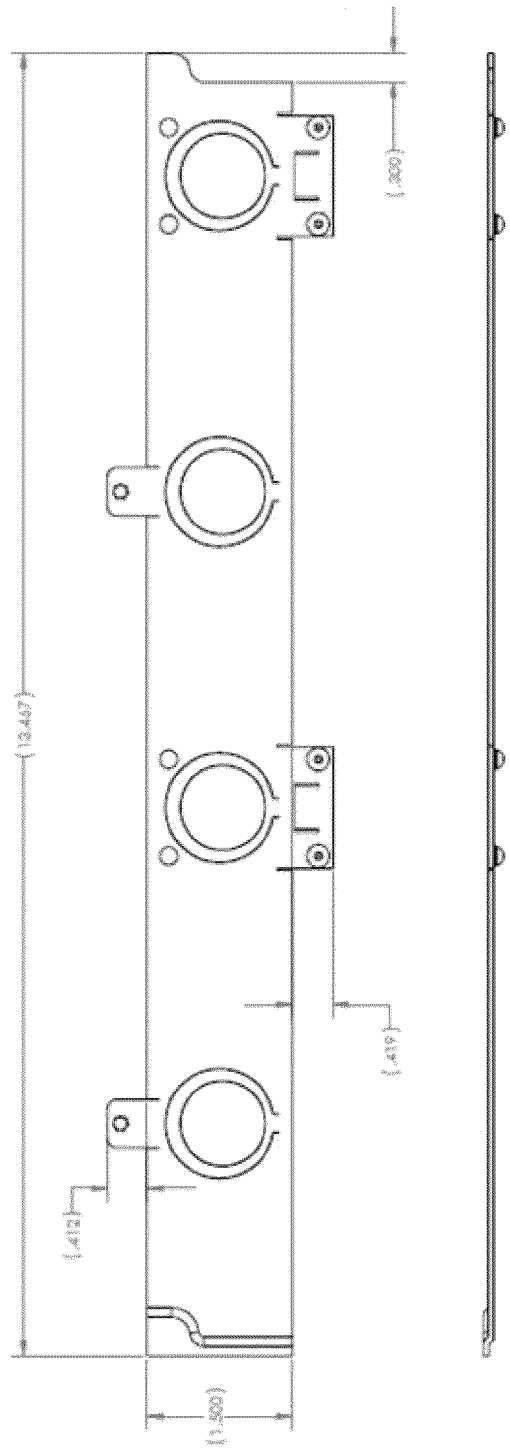
Figure 108:
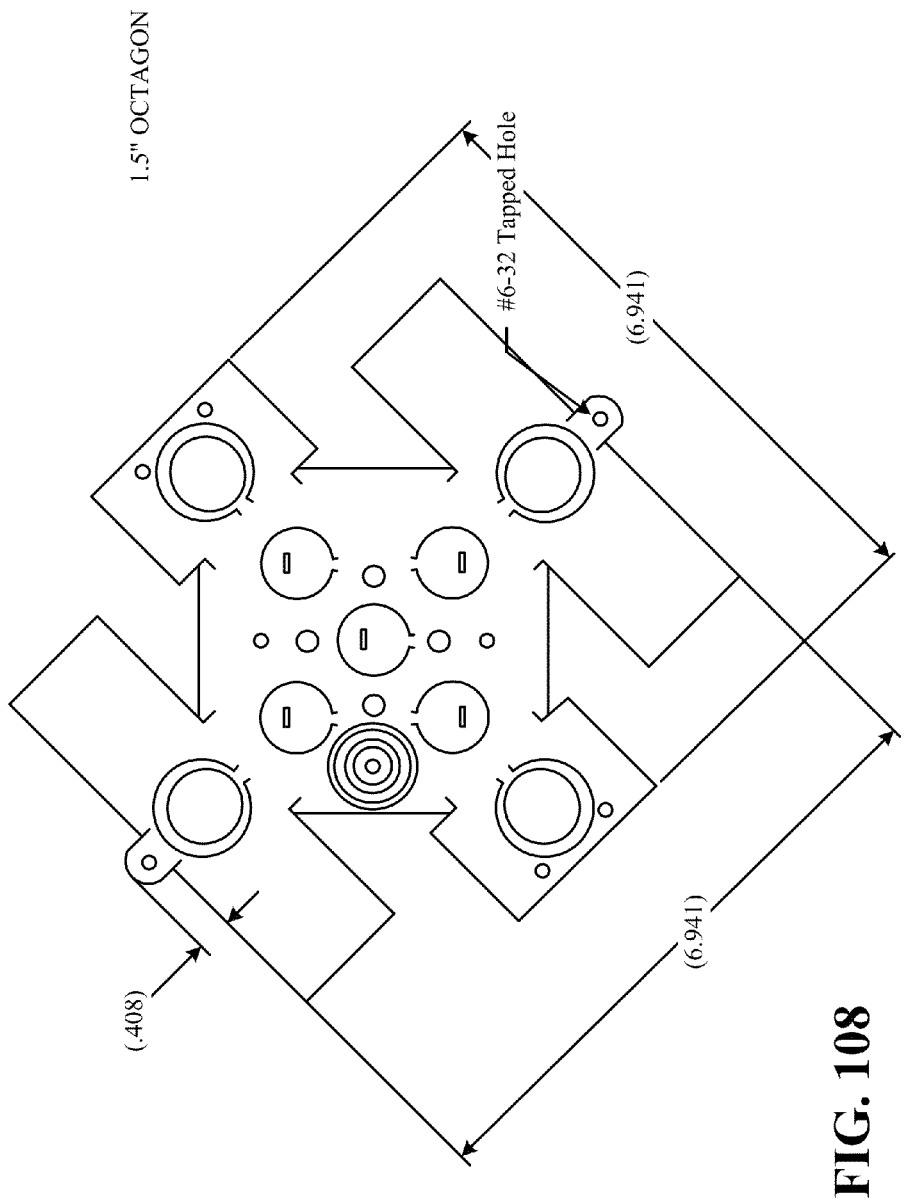
Figure 109:
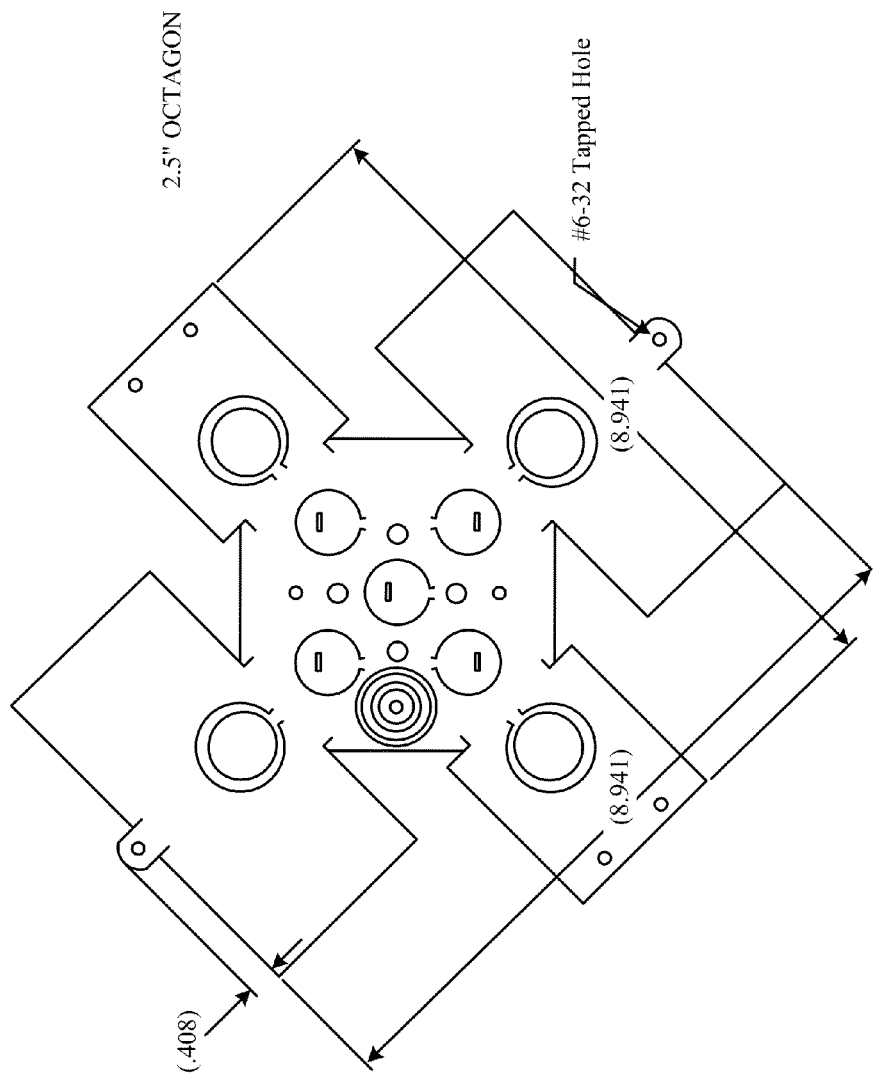
Figure 110:
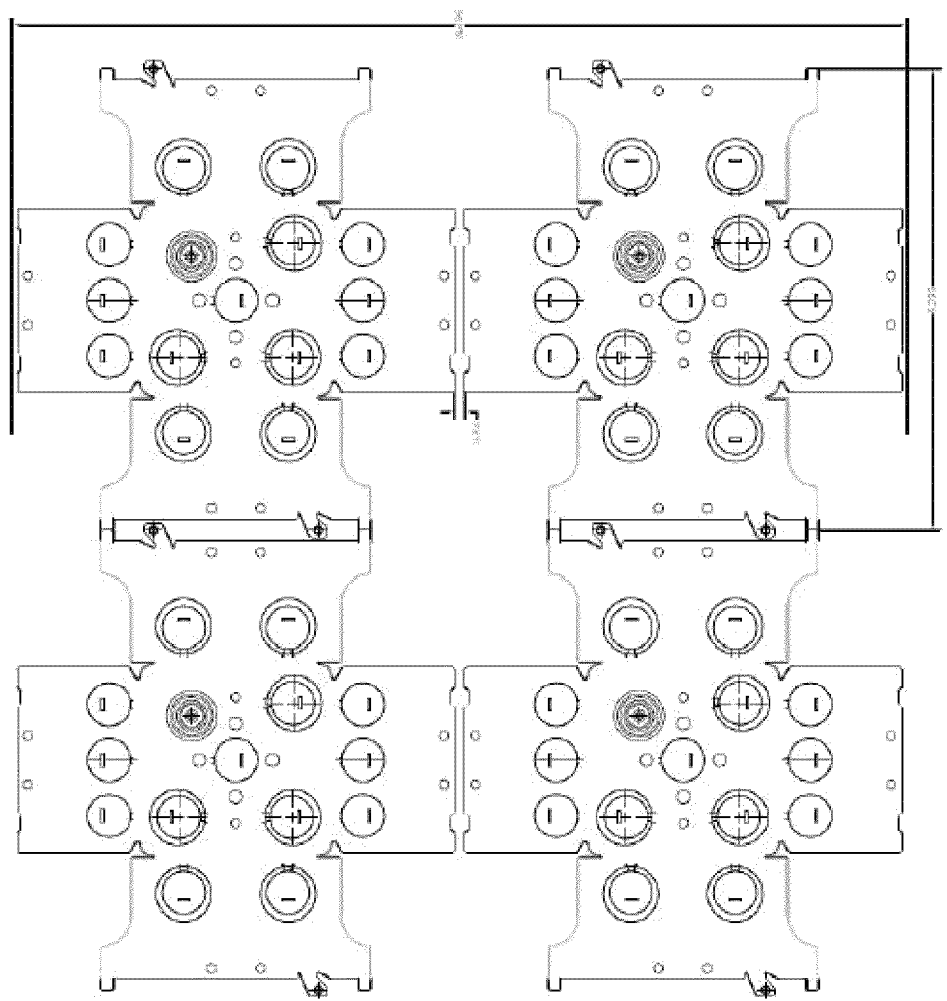

Turning now to other example embodiments of electrical junction boxes, FIGS. 74 and 75 illustrate various views of an example folded electrical junction box in accordance with an example embodiment of the disclosure. FIG. 74 illustrates an example double gang, square-shaped folded electrical junction box in a folded orientation, ready for installation or use by a user or consumer. The view shown in FIG. 75 is the box of FIG. 74 in an unfolded orientation. In other example embodiments, a folded electrical junction box can have other shapes or sizes, such as a rectangle, hexagonal, or octagonal shape; a relatively larger or smaller square-shaped double gang size; or a rectangular-shaped single or triple gang size.

As seen in FIGS. 74 and. 75, the box 7400 can include a pair of side walls 7402, 7404, an upper wall 7406, a lower wall 7408, and a rear wall 7410. The side walls 7402, 7404 can include a pair of foldable tabs 7410, wherein each tab is positioned adjacent to the extended corners of the side walls. Corresponding tab recesses 7412 can be formed in the extended corners of the upper wall 7406 and lower wall 7408, wherein the tab recesses 7412 are shaped to receive the corresponding tabs 7410 when the side walls 102, 104 are folded adjacent to the folded upper wall 7406 and lower wall 7408, and the tabs 7410 are folded into the recesses 742. In the example embodiment shown in FIG. 74, the foldable tabs 7410 can be folded over the adjacent upper wall 7406 and lower wall 7408.

In the example embodiment shown in FIG. 75, the foldable tabs 7410 on each side wall 7402, 7404 can be relatively narrow extensions of the side walls, and in the example shown, can widen to form a square shape at the extended edge of each side wall. Likewise, the tab recesses 7412 can be relatively narrow recesses along the lateral sides of the upper wall 7406 and lower wall 7408, and configured to receive a foldable tab 7410. In this manner, the foldable tabs 7410 can be received within the tab recesses 7412 when the side walls 7402, 7404, upper wall 7406, and lower wall 7408 are folded towards each other, and the foldable tabs 7410 are folded over the adjacent upper wall 7406 and lower wall 7408. In other example embodiments, the orientations of foldable tabs and tab recesses can be reversed from that shown in FIGS. 74 and 75.

In one example embodiment, the relative positions overlapping foldable tabs and tab recesses can be secured or otherwise maintained using at least one locking device and/or locking means. As shown in FIGS. 74 and 75, the square shape at the extended edge of each side wall 7402, 7404 can be a locking device. A corresponding notch or cutout in the extended edge of the upper wall 7406 and lower wall 7408 can be configured to receive a portion of the locking device. After the foldable tabs 7410 are folded over the adjacent upper wall and lower wall, the locking tabs can be folded over the corresponding notch or cutout and extended edge of the adjacent upper wall and lower wall. Other suitable example locking devices and/or locking means can include, but are not limited to, a spot weld, a toggle lock, a combination indentation and protrusion, an adhesive, or a mechanical-type connection.

Returning to the box 7400, a mounting hole tab 7414 extending from a portion of the extended edges of the side walls 7402, 7404 can include a respective fastener mounting hole for receiving a switch or outlet mounting screw. One or more punch outs or knockouts 7416 for directing electrical cables into or from the box can be formed in one or more of the side walls and/or the upper wall, lower wall, and rear wall. A raised mounting for a ground screw can also be positioned in, for example, the rear wall of the box. In other example embodiments, one or more bracket holes, cable openings, clamps, mounting holes, raised mountings for a ground screw, nail guides, and mounting brackets can be formed any of the walls of the folded electrical junction box.

As shown in FIGS. 74 and 75, additional mounting holes in the side walls, upper wall, lower wall, and rear wall can be positioned adjacent to the extended edges of the side walls, upper wall, and lower wall as well as the rear wall. In this example embodiment, the mounting holes 7418 oriented adjacent to the edges of the side walls 7402, 7404, upper wall 7406, and lower wall 7408 can be configured to accept one or more mounting brackets and associated mounting pins and/or mounting devices. For example, a pair of mounting holes 7418 can be positioned, at a predefined spacing apart from each other, on each of the side walls, upper wall, lower wall, and rear wall. Each of the mounting holes 7418 can be sized to accept, for example, a mounting pin and/or mounting device, which connects the box 7400 to a mounting bracket or other electrical accessory.

In one example embodiment, the mounting holes 7418 are generally spaced apart at approximately the same or similar distance, such as a predefined universal distance, to facilitate using a common mounting bracket with mounting devices, such as mounting pins. In one example embodiment, providing consistently sized and spaced-apart mounting holes in one or more of the side walls, upper wall, lower wall, and rear wall can be part of a technique to provide a universal set of mounting brackets and mounting devices for a family of electrical accessories. Electrical junction boxes with similar shaped spaced-apart holes for use with a common mounting bracket can be known collectively as a "family of electrical junction boxes."

The spaced-apart mounting holes 7418 in the box 7400 shown in this example embodiment can be round-shaped holes. The spacing between the respective centerlines of the holes can be, for example, between approximately 0.25 and 3.5 inches, and the holes can be spaced, for example, relatively close to the upper edge of the electrical junction box. In other example embodiments, other shapes, dimensions, and spacing for the holes in an electrical junction box can be used.

A predefined universal distance or spacing between holes for a family of electrical junction boxes in accordance with an example embodiment of the disclosure, such as spaced-apart holes in FIGS. 74 and 75, can be selected based at least in part on the surface area of one or more sidewalls for an electrical junction box, the sizing and spacing of knockouts, on any of the walls of the electrical junction box, and the relative sizes of some or all electrical junction boxes in the same family or group of electrical junction boxes. In any instance, the predefined universal distance or spacing between holes in accordance with an example embodiment of the disclosure can be consistent or otherwise closely similar to the distance between holes in a family or group of electrical junction boxes. In this manner, a common mounting bracket and/or electrical accessory can be used with multiple electrical junction boxes of different sizes and/or shapes, thus reducing time and costs in storing, assembling together, and mounting the mounting brackets, electrical accessories, and electrical junction boxes.

As seen in FIG. 74, an opening in the front portion of the folded electrical junction box 7400 is sized to receive an electrical component, such as a switch or outlet, which can be mounted within the folded electrical junction box via one or more screws secured within the mounting holes formed in the mounting hole tabs of the side walls.

In the example embodiment shown in FIGS. 74 and 75, some or all of the folded electrical junction box 7400 can be formed from a relatively durable material such as stainless steel or another metal. In one example, the material can be about 0.6250 inch thick or 16 gauge stainless steel. Other dimensions and/or types of materials can be used in accordance with other example embodiments of the disclosure depending on the suitability of the dimensions and/or materials for manufacturing a folded electrical junction box in a single operation and/or using a folded electrical junction box in a commercial or residential building construction environment.

One example embodiment of the disclosure can be an electrical junction box comprising: a metal frame comprising: a plurality of walls comprising at least a first wall and a second wall; wherein a portion of the first wall overlaps a portion of the second wall to form a folded edge or corner.

One aspect of the example embodiment can further comprise a locking device to maintain the respective positions of the overlapping portions of the first wall and the second wall.

One aspect of the example embodiment can further comprise one or more locking devices to maintain the respective positions of the overlapping portions of the first wall and the second wall, the one or more locking devices comprising at least one of the following: a weld, a toggle lock, a combination indentation and protrusion, an adhesive, a screw connection, or a mechanical-type connection such as a fold-over tab.

One aspect of the example embodiment can further comprise locking means to maintain the respective positions of the overlapping portion of the first wall and the second wall.

In one aspect of the example embodiment, an electrical junction box can be constructed from a single contiguous sheet of material rather than separate material pieces joined together.

In one aspect of the example embodiment, the folded edge or corner is rounded.

In one aspect of the example embodiment, some or all of the edges or corners are either folded and rounded, or folded, rounded, and overlapped.

In one aspect of the example embodiment, the plurality of walls further comprise a third wall and a fourth wall; wherein a portion of the second wall overlaps the third wall to form a second folded edge or corner; wherein a portion of the third wall overlaps the fourth wall to form a third folded edge or corner; and wherein a portion of the fourth wall overlaps the first wall to form a fourth folded edge or corner.

In one aspect of the example embodiment, the plurality of walls further comprises a third wall, a fourth wall, a fifth wall, a sixth wall, a seventh wall, and an eighth wall; wherein a portion of the second wall overlaps the third wall to form a second folded edge or corner; wherein a portion of the third wall overlaps the fourth wall to form a third folded edge or corner; wherein a portion of the fourth wall overlaps the fifth wall to form a fourth folded edge or corner; wherein a portion of the fifth wall overlaps the sixth wall to form a fifth folded edge or corner; wherein a portion of the sixth wall overlaps the seventh wall to form a sixth folded edge or corner; wherein a portion of the seventh wall overlaps the eighth wall to form a seventh folded edge or corner; and wherein a portion of the eighth wall overlaps the first wall to form an eighth folded edge or corner.

In one aspect of the example embodiment, one or more of the walls, such as a bottom or rear wall, can include one or more ground screw holes, which can include one or more extruded threads operable to receive a ground screw or device mounting screw. In one example embodiment, extruded threads and corresponding extruded threaded holes can accommodate the ground screw or device mounting screw. In this manner, additional junction box material or metal can engage the ground screw threads, thus making the ground screw and/or threads less likely to be stripped.

The foldable electrical junction box 7400 shown as in FIGS. 74 and 75 is shown by way of example only, and other configurations, shapes, and designs can exist in accordance with other example embodiments of the disclosure.

FIGS. 76A-89D are views of other example folded electrical junction boxes in accordance with various example embodiments of the disclosure. Each of these electrical junction boxes are similar to the folded electrical junction boxes shown in FIGS. 74 and 75, including features such as mounting holes and knockouts, but without the locking device and corresponding notch. The electrical junction boxes of FIGS. 76A-89D are similar to each other but with different depths, shapes, and configurations.

FIGS. 90A-93B are views of example folded electrical accessories, such as extension rings. These are similar to the folded electrical junction boxes shown in FIGS. 74 and 75, including features such as mounting holes and knockouts, but without a rear wall, locking device, and corresponding notch.

FIGS. 94A-110 illustrate flattened stamps or dies for example folded electrical junction boxes and electrical accessories. In accordance with an example embodiment of the disclosure, a manufacturing process can generate a flattened stamp or die for a folded electrical junction box or electrical accessory. The flattened stamp or die can include one or more features of the folded electrical junction box or electrical accessory. For example, suitable features can include, but are not limited to, side walls, upper and lower walls, rear walls, knockouts, mounting holes, foldable tabs, recesses, notches, cutouts, ground screw holes, and access holes. Some or all of the stamps or dies shown in FIGS. 94A-110 can be used to form the example folded electrical junction boxes shown in FIGS. 74-89D.

Figure 111A:
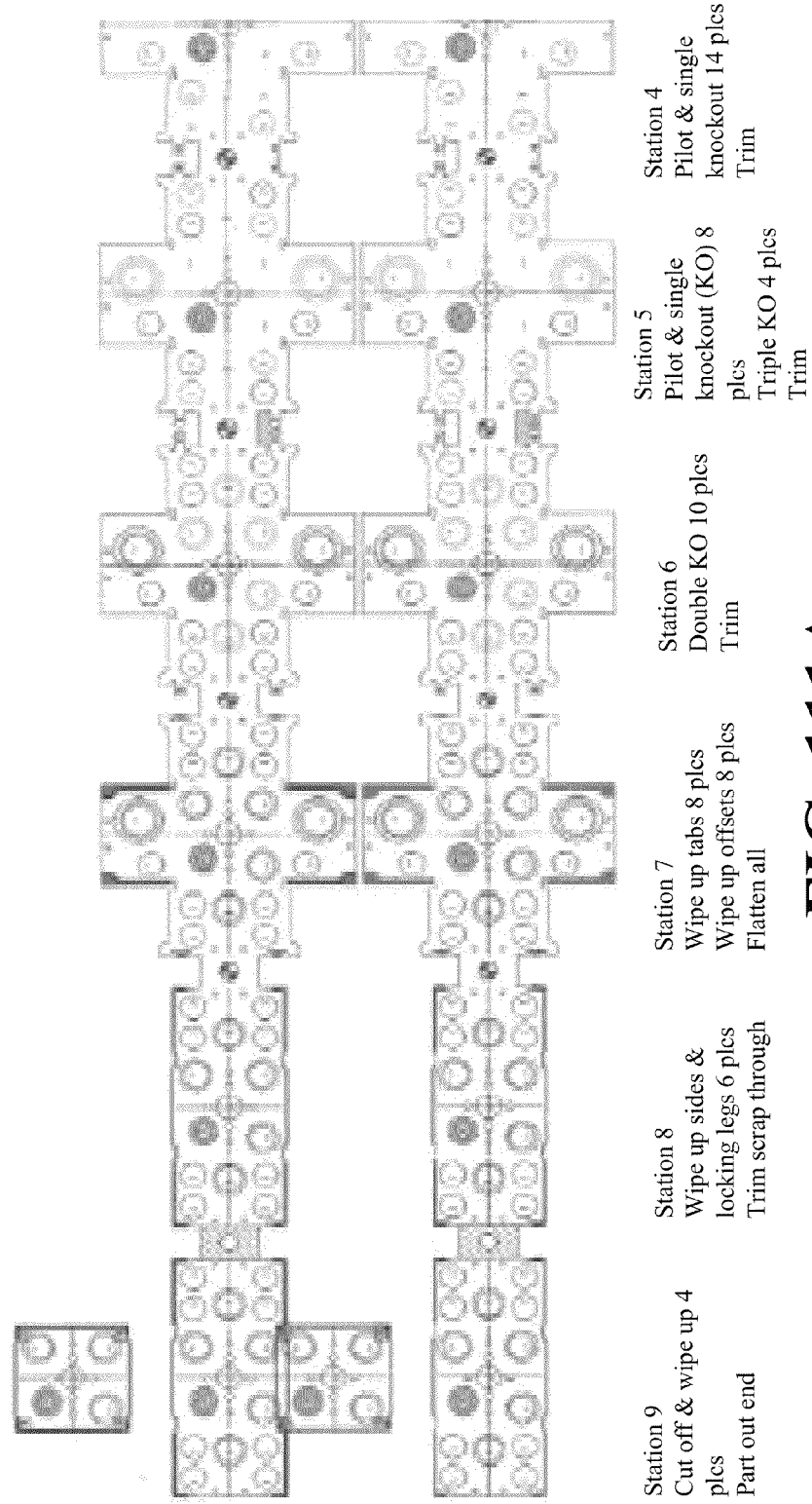
FIGS. 111A-111B are views of an example process in accordance with an example embodiment of the disclosure.
Figure 111B:
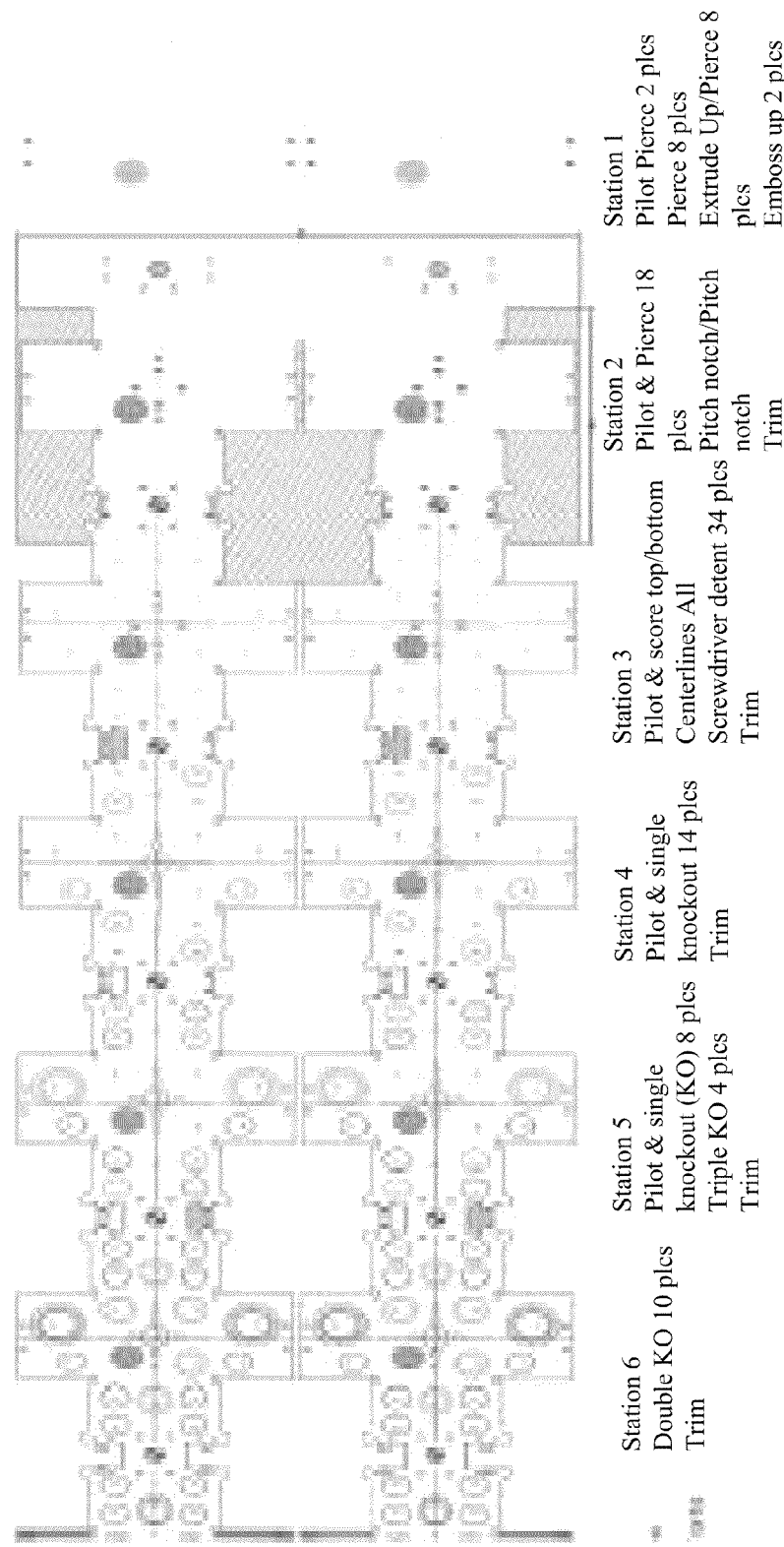

FIGS. 111A and 111B illustrate a process in accordance with an example embodiment of the disclosure. In the example process, at least one folded electrical junction box can be manufactured. The example process shown in FIGS. 111A-111B can include one or more manufacturing operations to make at least one folded electrical junction box. An example flattened stamp for at least one folded electrical junction box is shown as FIG. 110. Typically, the process can optimize the material used in a material sheet, and a plurality of folded electrical junction boxes can be manufactured during the process. The operations shown in FIGS. 111A and 111B are by way of example. Fewer or greater numbers of operations can be performed in accordance with example embodiments of the disclosure. Other operations can be combined with these operations in accordance with example embodiments of the disclosure. The operations shown can be performed in any number of different sequences in accordance with example embodiments of the disclosure.

Figure 112:
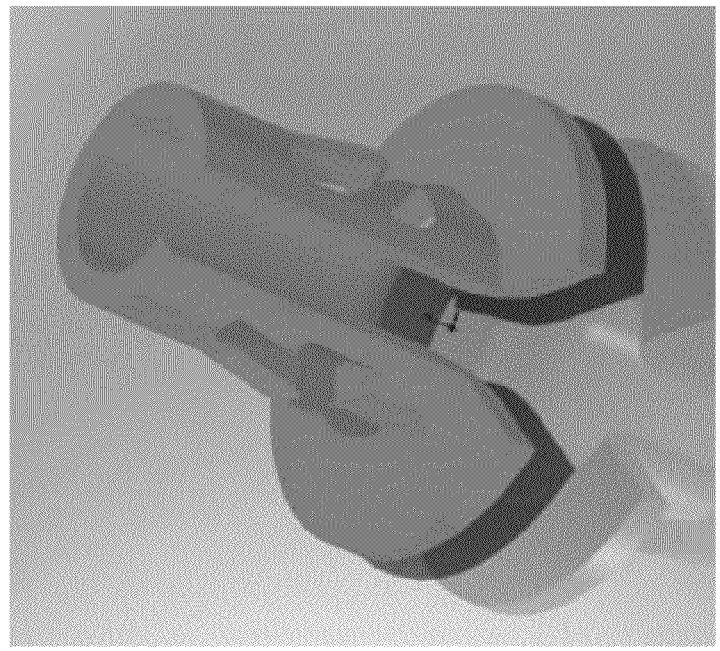
FIGS. 112-113 are example mounting pins or mounting devices in accordance with various example embodiments of the disclosure.
Figure 113:
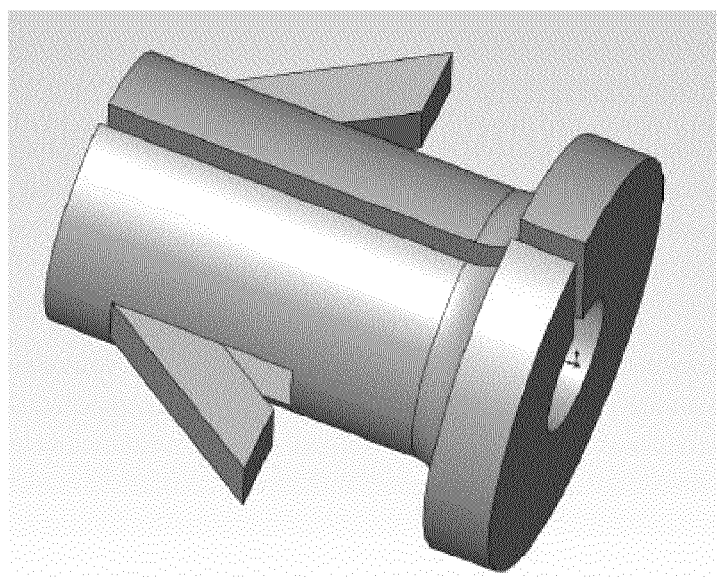
Figure 115A:
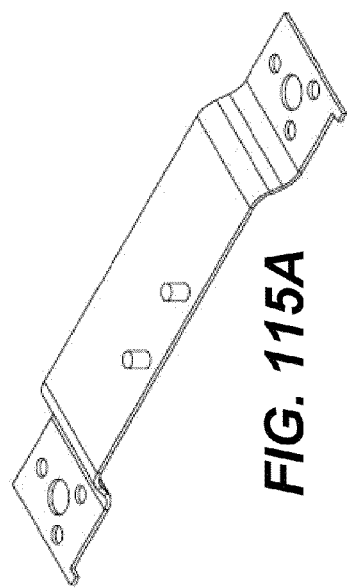
Figure 115E:
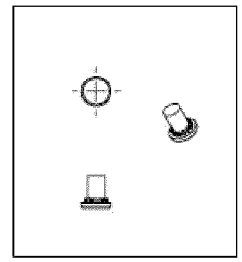
Figure 115B:
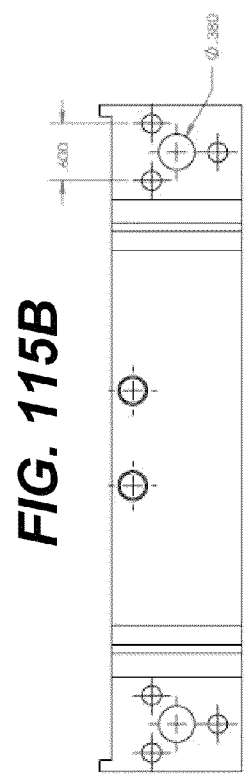
Figure 115C:
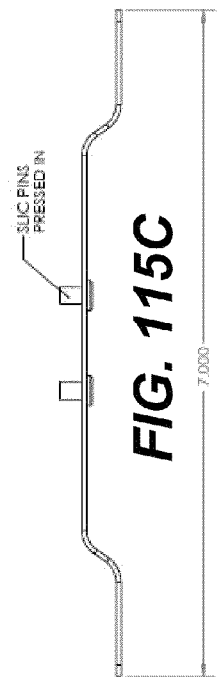
Figure 115D:
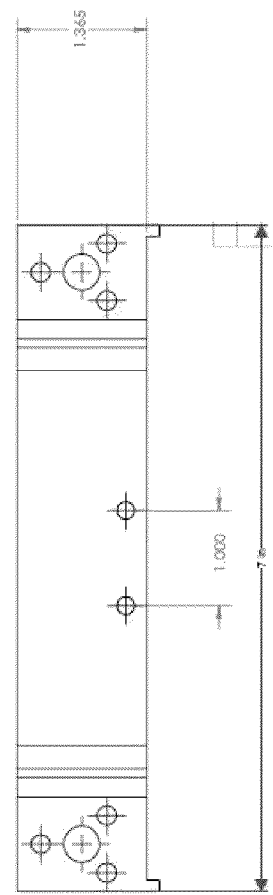
Figure 118A:
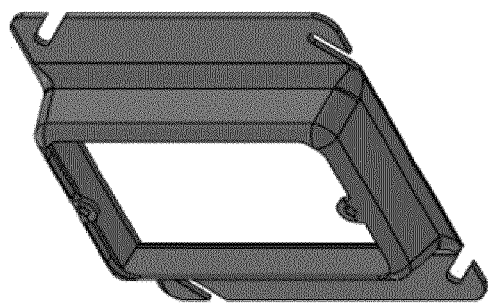
Figure 118D:
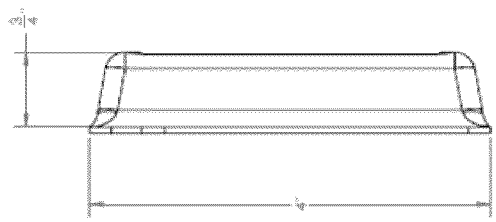
Figure 118B:
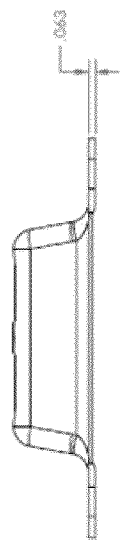
Figure 118C:
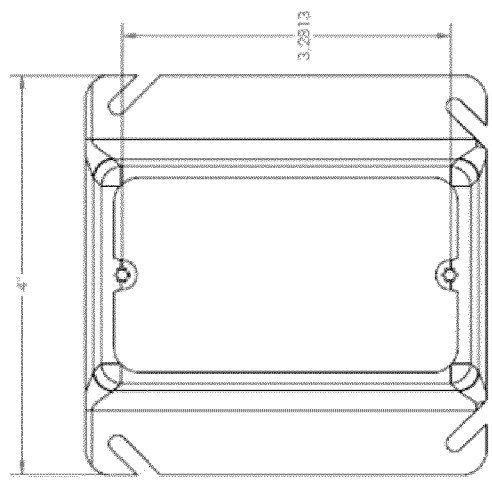
Figure 119A:
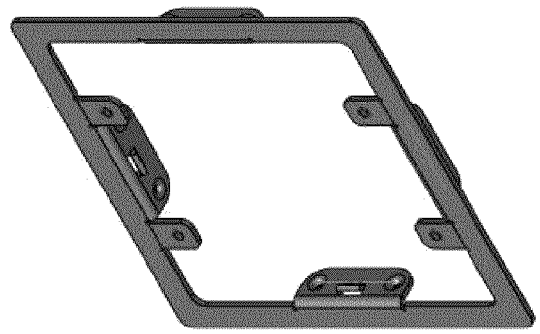
Figure 119D:
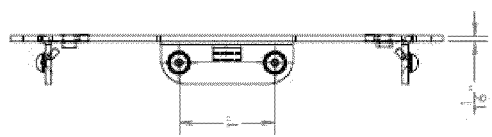
Figure 119B:
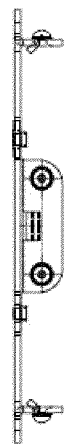
Figure 119C:
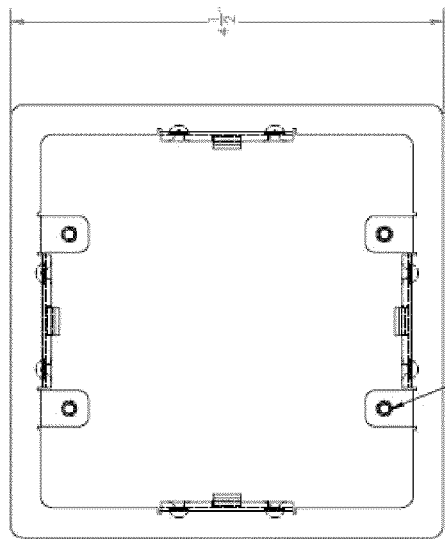

FIGS. 112 and 113 are example mounting pins for mounting brackets, electrical accessories, and/or an electrical junction box in accordance with various example embodiments of the disclosure. The example mounting pins 11200, 11300 respectively shown in FIGS. 112 and 113 can be used to connect at least two electrical accessories together. Suitable electrical accessories can include, but are not limited to, an electrical junction box, a mounting bracket, and an electrical accessory. For example, a pair of mounting pins can be inserted into a respective pair of spaced-apart holes, spaced at a predefined universal distance, in a side wall of an electrical junction box to facilitate using a common mounting bracket to mount adjacent to the side wall of the electrical junction box.

The pin 11200 shown in FIG. 112 can include a split elongated body 11202 with a head portion 11204. On opposing lateral sides of the body, a pair of flexible extensions 11206 can be located. Each of the extensions 11206 can be configured to recess within the body when a force is applied to each extension. When the force is removed, each extension 11206 can return to a position extending slightly outward from the lateral side of the body. A split opening 11208 alongside a substantial portion of the body 11202 and/or head portion 11204 can permit compression of certain portions of the pin 11200. In this manner, the pin 11200 can be inserted into a hole, for example, of an electrical junction box, mounting bracket or electrical accessory, and the pin 11200 can be retained within the hole. For instance, as the body 11202 of the pin 11200 passes through the hole, the contact force of the pin 11200 against the lateral sides of the hole compresses certain portions of the pin 11200 and applies a force to the extensions 11206, causing the extensions 11206 to recede within the body 11202 of the pin 11200. As the pin 11200 is suitably or fully inserted into the hole, the extensions 11206 may extend away from the lateral sides of the pin 11200 when the extensions 11206 are no longer in contact with the lateral sides of the hole. If the pin 11200 backed out of the hole, the extended extensions 11206 may prevent movement of the pin 11200 outward from the hole unless a force is applied to one or both of the extensions 11206 to recess the extensions into the body 11202 of the pin 11200.

In one example embodiment, the split body 11202 and head portion 11204 of the pin 11200 can facilitate compression of the pin body 11202 and head portion 11204 during installation. In this manner, a compressed pin 11200 can be inserted into a relatively tight hole or space, and after insertion, the material may expand slightly to fill the hole or space, thus creating a relatively tight fit between the pin 11200 and the hole or space.

The pin 11300 shown in FIG. 113 functions similarly to the pin in FIG. 112, but has a slightly different shape. The pin 11300 in FIG. 113 also includes a split body 11302 and head portion 11304, and a pair of extensions 11306 on opposing lateral sides of the body 11302. In this example embodiment, the extensions 11306 can be slightly larger than the extensions 11206 shown in FIG. 112.

FIGS. 114A-117D, and 121-129 illustrate example mounting brackets in accordance with various example embodiments of the disclosure. FIGS. 114A, 114B, and 114C illustrate different views of an example T-shape mounting bracket 11400, also known as a far side support, for use with an electrical junction box or electrical accessory in accordance with an example embodiment of the disclosure. Typically, the T-shape mounting bracket 11400 can be used with any number of electrical junction boxes and/or electrical accessories with a pair of spaced-apart holes to receive a respective number of mounting pins and/or mounting devices associated with the mounting bracket. In this example, the upper portion of the mounting bracket 11400 can include a pair of spaced-apart mounting pins 11402 or mounting devices. When the mounting pins 11402 and/or mounting devices are aligned with the corresponding holes in an electrical junction box and/or electrical accessory, the mounting pins 11402 or mounting devices can be inserted into the corresponding holes, and the relative positions of the mounting bracket 11400 and electrical junction box or electrical accessory can be maintained.

In the example embodiment shown in FIGS. 114A, 114B, and 114C, an extended lower portion of the T-shape bracket 11400 can mount to surface, such as a wall stud, the floor, or other object. In this manner, the T-shape bracket 11400 can support a mounted electrical junction box or electrical accessory away from the surface to which the extended lower portion of the T-shape bracket 11400 is mounted to.

Also shown in FIGS. 114A, 114B, and 114C, the extended lower portion of the T-shape bracket 11400 can include a series of perforations 11404 or notches at predefined distances from the upper portion of the bracket. These perforations 11404 or notches can permit a user to break or cut the bracket to a predefined desired size or length.

In one example embodiment, spaced-apart mounting pins and/or mounting devices can be preconfigured and are generally spaced apart at approximately the same or similar distance, such as a predefined universal distance, to facilitate using a common mounting bracket with mounting devices, such as mounting pins.

The T-shape mounting bracket 11400 shown in FIGS. 114A, 114B, and 114C can include two previously installed mounting devices, such as 11402, though in other example embodiments, a fewer or greater number of mounting devices can be employed. The mounting devices 11402 shown in FIGS. 114A, 114B, and 114C are shown by way of example only, and other mounting devices can be used in other example embodiments. In use, the mounting bracket 11400 can mount adjacent to one of the walls of an electrical junction box or to an electrical accessory, when the mounting devices 11402 are inserted through respective holes in the walls of an electrical junction box or electrical accessory. After each mounting device 11402 is inserted through respective holes, the mounting devices 11402 can maintain the relative positions of the box or electrical accessory and mounting bracket 11400 in a substantially adjacent orientation. Other mounting brackets and associated hole configurations, sizes, dimensions, positions, and numbers of holes in an electrical junction box or electrical accessory are possible in accordance with example embodiments of the disclosure.

FIGS. 118A-120D illustrate views of example electrical accessories, such as cover or mud rings, also known as "retro rings," in accordance with various example embodiments of the disclosure. The example electrical accessories in FIGS. 119A-D and 120A-D can be snap fit to an electrical junction box or electrical accessory by way of a series of mounts that correspondingly fit within the recess or opening of an adjacent electrical junction box or electrical accessory. Other types of mounts can be used in accordance with certain example embodiments of the disclosure.

Figure 121:
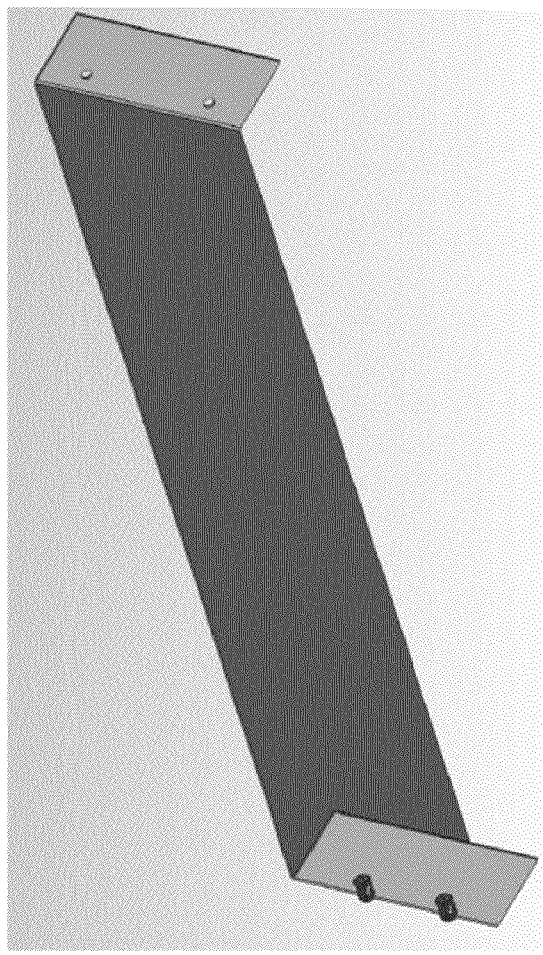

FIG. 121 illustrates a perspective view of an example square C-shape mounting bracket 12100, also known as a box-to-box bracket, for use with an electrical junction box or electrical accessory in accordance with an example embodiment of the disclosure. The bracket 12100 shown can be rectangular-shaped with an elongated or extended body with angled end portions at approximately 90 degrees with respect to the body. Typically, the square C-shape mounting bracket 12100 can be used with any number of electrical junction boxes and/or electrical accessories with a pair of spaced-apart holes to receive a respective number of mounting pins and/or mounting devices associated with the mounting bracket. In this example, one end portion of the mounting bracket 12100 can include a pair of previously installed, spaced-apart mounting pins 12102 or mounting devices. When the mounting pins 12102 and/or mounting devices are aligned with the corresponding holes in an electrical junction box and/or electrical accessory, the mounting pins 12102 or mounting devices can be inserted into the corresponding holes, and the relative positions of the mounting bracket 12100 and electrical junction box or electrical accessory can be maintained. An opposing end portion of the mounting bracket 12100 can include a pair of spaced-apart mounting holes 12104. When the mounting holes 12104 are aligned with corresponding pins and/or mounting devices in an electrical junction box and/or electrical accessory, the holes 12104 can be mounted to the corresponding mounting pins or mounting devices, and the relative positions of the mounting bracket 12100 and electrical junction box or electrical accessory can be maintained.

In the example embodiment shown in FIG. 121, an extended portion 12106 between the two angled end portions 12108 can separate the end portions 12108 at a predefined distance. For example, one end portion of the square C-shape bracket can mount to surface, such as a wall stud, the floor, or other object. In this manner, the square C-shape bracket 12100 can support a mounted electrical junction box or electrical accessory away from the surface to which the extended lower portion of the square C-shape bracket is mounted to.

In one example embodiment, the spaced-apart mounting pins and/or mounting devices as well as the spaced-apart mounting holes are generally spaced apart at approximately the same or similar distance, such as a predefined universal distance, to facilitate using the square C-shape mounting bracket as a common mounting bracket with any number of electrical junction boxes and/or electrical accessories.

The C-shape mounting bracket 12100 shown in FIG. 121 can include two previously installed mounting devices, such as 12102, though in other example embodiments, a fewer or greater number of mounting devices can be employed. The mounting devices 12102 shown in FIG. 121 are shown by way of example only, and other mounting devices can be used in other example embodiments. In use, the mounting bracket 12100 can mount adjacent to one of the walls of an electrical junction box or to an electrical accessory, when the mounting devices 12102 are inserted through respective holes in the walls of an electrical junction box or electrical accessory. After each mounting device 12102 is inserted through respective holes, the mounting devices 12102 can maintain the relative positions of the box or electrical accessory and mounting bracket 12100 in a substantially adjacent orientation. Other mounting brackets and associated hole configurations, sizes, dimensions, positions, and numbers of holes in an electrical junction box or electrical accessory are possible in accordance with example embodiments of the disclosure.

FIGS. 122A-122E illustrate views of another C-shape mounting bracket 12200, similar to the bracket 12100 shown in FIG. 121, but with mounting holes 12202 at both ends of the angled portions.

Figure 123:
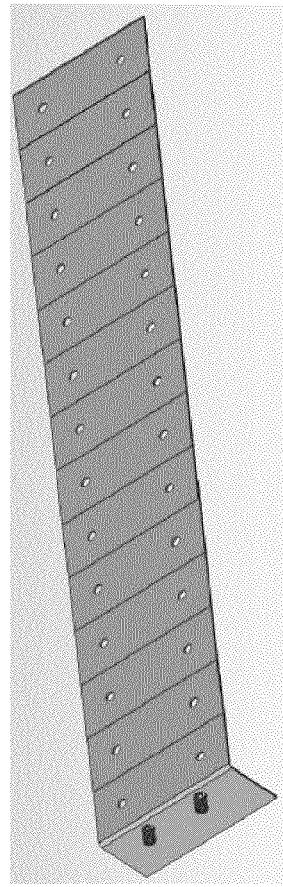
Figure 122D:
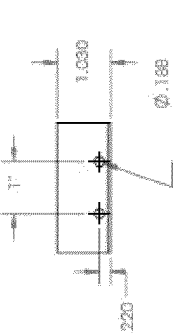
Figure 122C:
Figure 122B:
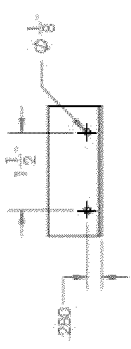
Figure 122E:
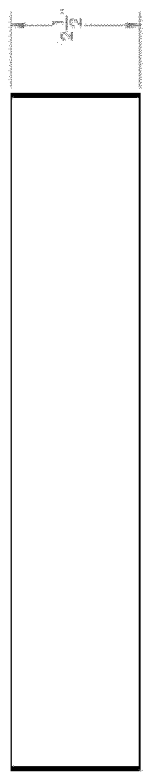
Figure 122A:
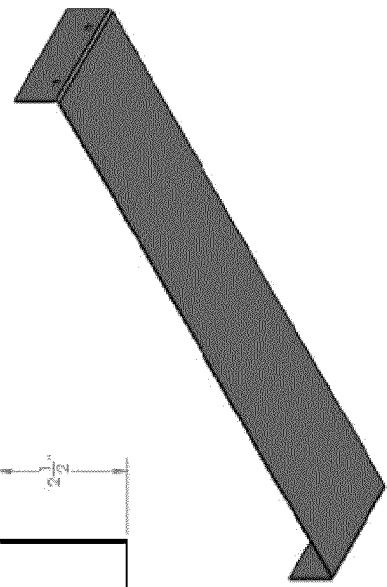

FIG. 123 illustrates a perspective view of an example L-shape mounting bracket 12300, also known as a box-to-box bracket, for use with an electrical junction box or electrical accessory in accordance with an example embodiment of the disclosure. Typically, the L-shape mounting bracket 12300 can be used with any number of electrical junction boxes and/or electrical accessories with a pair of spaced-apart holes to receive a respective number of mounting pins and/or mounting devices associated with the mounting bracket. In this example, a relatively short end portion of the mounting bracket 12300 can include a pair of previously installed, spaced-apart mounting pins 12302 or mounting devices. When the mounting pins 12302 and/or mounting devices are aligned with the corresponding holes in an electrical junction box and/or electrical accessory, the mounting pins 12302 or mounting devices can be inserted into the corresponding holes, and the relative positions of the mounting bracket and electrical junction box or electrical accessory can be maintained.

In the example embodiment shown in FIG. 123, an extended longer portion 12304 of the L-shape bracket 12300 can mount to surface, such as a wall stud, the floor, or other object. In this manner, the L-shape bracket 12300 can support a mounted electrical junction box or electrical accessory away from the surface to which the extended lower portion of the L-shape bracket is mounted to.

Also shown in FIG. 123, the extended longer portion 12304 of the L-shape bracket 12300 can include a series of perforations 12306 or notches at predefined distances from the relatively short end portion of the bracket. These perforations 12306 or notches can permit a user to break or cut the bracket to a predefined desired size or length. Each of the segments 12308 between the perforations 12306 or notches can include a series of mounting holes 12310, such as 2 holes, sized to receive a mounting pin, mounting device, or other fastening device.

In one example embodiment, the spaced-apart mounting pins and/or mounting devices are generally spaced apart at approximately the same or similar distance, such as a predefined universal distance, to facilitate using the L-shape bracket as a common mounting bracket with any number of electrical junction boxes and/or electrical accessories.

The L-shape mounting bracket 12300 shown in FIG. 123 can include two previously installed mounting devices, such as 12302, though in other example embodiments, a fewer or greater number of mounting devices can be employed. The mounting devices 12302 shown in FIG. 123 are shown by way of example only, and other mounting devices can be used in other example embodiments. In use, the mounting bracket 12300 can mount adjacent to one of the walls of an electrical junction box or to an electrical accessory, when the mounting devices 12302 are inserted through respective holes in the walls of an electrical junction box or electrical accessory. After each mounting device 12302 is inserted through respective holes, the mounting devices 12302 can maintain the relative positions of the box or electrical accessory and mounting bracket in a substantially adjacent orientation. Other mounting brackets and associated hole configurations, sizes, dimensions, positions, and numbers of holes in an electrical junction box or electrical accessory are possible in accordance with example embodiments of the disclosure.

FIGS. 124A-124E illustrate views of a L-shape mounting bracket 12400, similar to the bracket 12300 shown in FIG. 123, but with mounting holes 12402 in the relatively short end of the bracket 12400.

Figure 125:
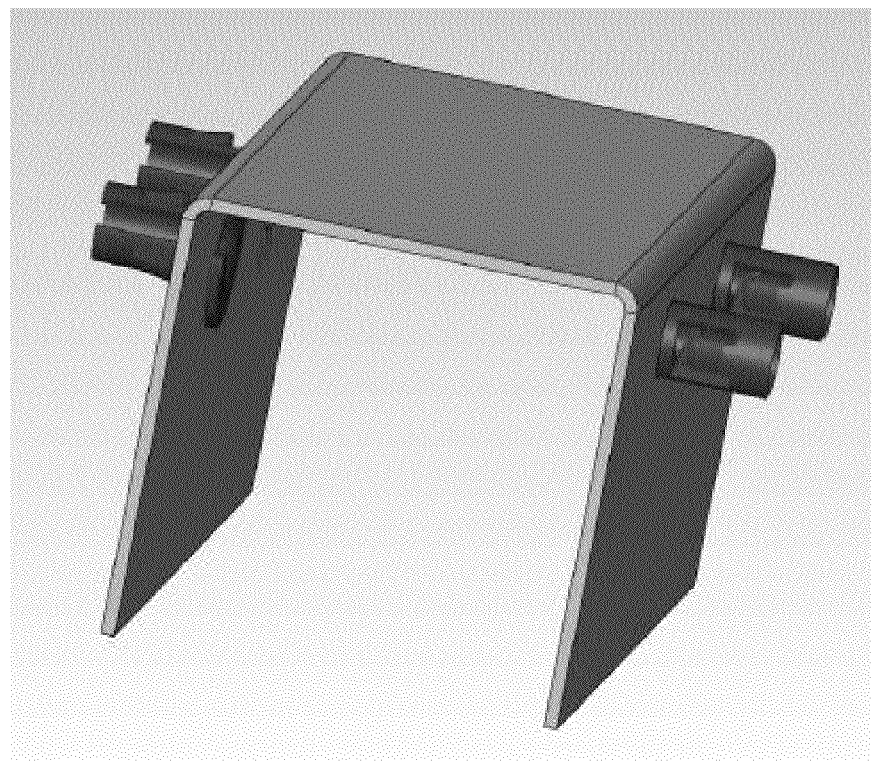

FIG. 125 illustrates another example square C-shape bracket 12500, also known as a box-to-box bracket, that can function similar to the mounting bracket 12100 shown and described in FIG. 121. In the example embodiment shown in FIG. 125, the extended portion 12502 between the end portions 12504 is relatively short and can be machined to a predefined length depending on the intended use for the bracket 12500. Further, the bracket shown in FIG. 125 includes four previously installed mounting pins 12506 or mounting devices, though any number of pins or devices can be used with the bracket.

FIGS. 126A-126D illustrate views of a square C-shape mounting bracket 12600, similar to the bracket 12500 shown in FIG. 125, but with mounting holes 12602 in the end portions of the bracket 12600.

Figure 127:
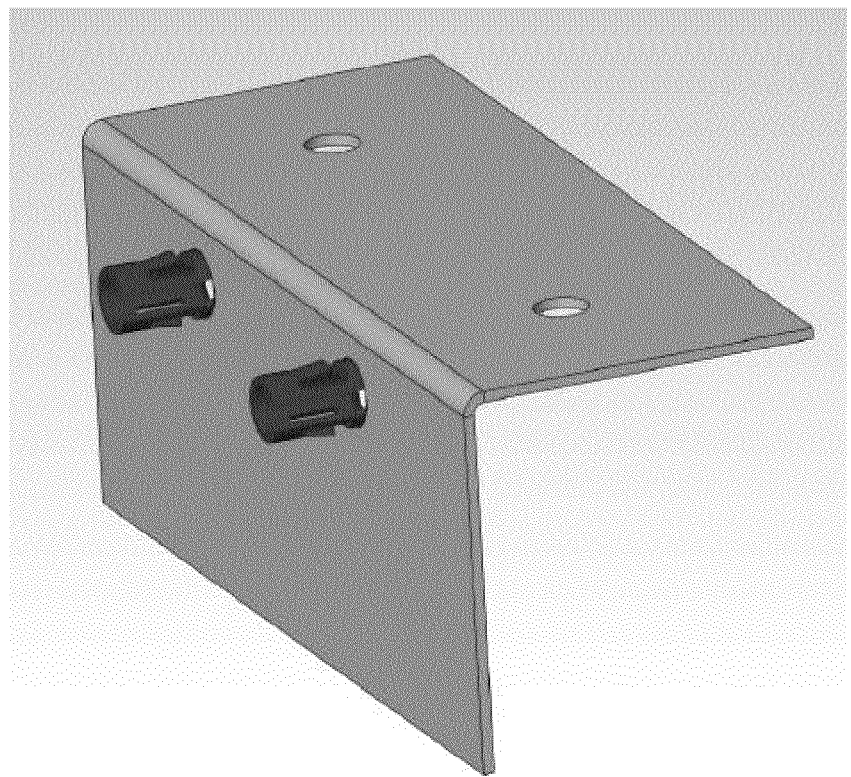

FIG. 127 illustrates a perspective view of an example L-shape mounting bracket 12700, also known as a box-to-box bracket, for use with an electrical junction box or electrical accessory in accordance with an example embodiment of the disclosure. Typically, the L-shape mounting bracket 12700 can be used with any number of electrical junction boxes and/or electrical accessories with a pair of spaced-apart holes to receive a respective number of mounting pins and/or mounting devices associated with the mounting bracket. In this example, one end portion of the mounting bracket 12700 can include a pair of previously installed, spaced-apart mounting pins 12702 or mounting devices. When the mounting pins 12702 and/or mounting devices are aligned with the corresponding holes in an electrical junction box and/or electrical accessory, the mounting pins 12702 or mounting devices can be inserted into the corresponding holes, and the relative positions of the mounting bracket 12700 and electrical junction box or electrical accessory can be maintained. An opposing end portion of the mounting bracket 12700 can include a pair of spaced-apart mounting holes 12704. When the mounting holes 12704 are aligned with corresponding pins and/or mounting devices in an electrical junction box and/or electrical accessory, the holes 12704 can be mounted to the corresponding mounting pins or mounting devices, and the relative positions of the mounting bracket 12700 and electrical junction box or electrical accessory can be maintained.

In the example embodiment shown in FIG. 127, one end portion of the L-shape bracket 12700 can mount to surface, such as a wall stud, the floor, or other object. In this manner, the L-shape bracket 12700 can support a mounted electrical junction box or electrical accessory away from the surface to which the extended lower portion of the L-shape bracket is mounted to.

In one example embodiment, the spaced-apart mounting pins and/or mounting devices as well as the spaced-apart mounting holes are generally spaced apart at approximately the same or similar distance, such as a predefined universal distance, to facilitate using the L-shape mounting bracket as a common mounting bracket with any number of electrical junction boxes and/or electrical accessories.

The L-shape mounting bracket 12700 shown in FIG. 127 can include two previously installed mounting devices, such as 12702, though in other example embodiments, a fewer or greater number of mounting devices can be employed. The mounting devices 12702 shown in FIG. 127 are shown by way of example only, and other mounting devices can be used in other example embodiments. In use, the mounting bracket 12700 can mount adjacent to one of the walls of an electrical junction box or to an electrical accessory, when the mounting devices 12702 are inserted through respective holes in the walls of an electrical junction box or electrical accessory. After each mounting device 12702 is inserted through respective holes, the mounting devices 12702 can maintain the relative positions of the box or electrical accessory and mounting bracket in a substantially adjacent orientation. Other mounting brackets and associated hole configurations, sizes, dimensions, positions, and numbers of holes in an electrical junction box or electrical accessory are possible in accordance with example embodiments of the disclosure.

In one aspect of an example embodiment, any of the mounting brackets and electrical junction boxes in accordance with example embodiments of the disclosure described above can meet the standards specified by UL (Underwriters' Laboratories) 514A.

One will recognize that certain mounting brackets in accordance with example embodiments of the disclosure can be used with plaster ears, old work clips, far side box supports, and other electrical, data, communication, and control accessories.

One will recognize that other configurations for mounting brackets in accordance with example embodiments of the disclosure are possible.

FIGS. 128A-128D illustrate views of a square L-shape mounting bracket 12800, similar to the bracket 12700 shown in FIG. 127, but with four total mounting holes 12802 in the bracket 12800.

Figure 129:
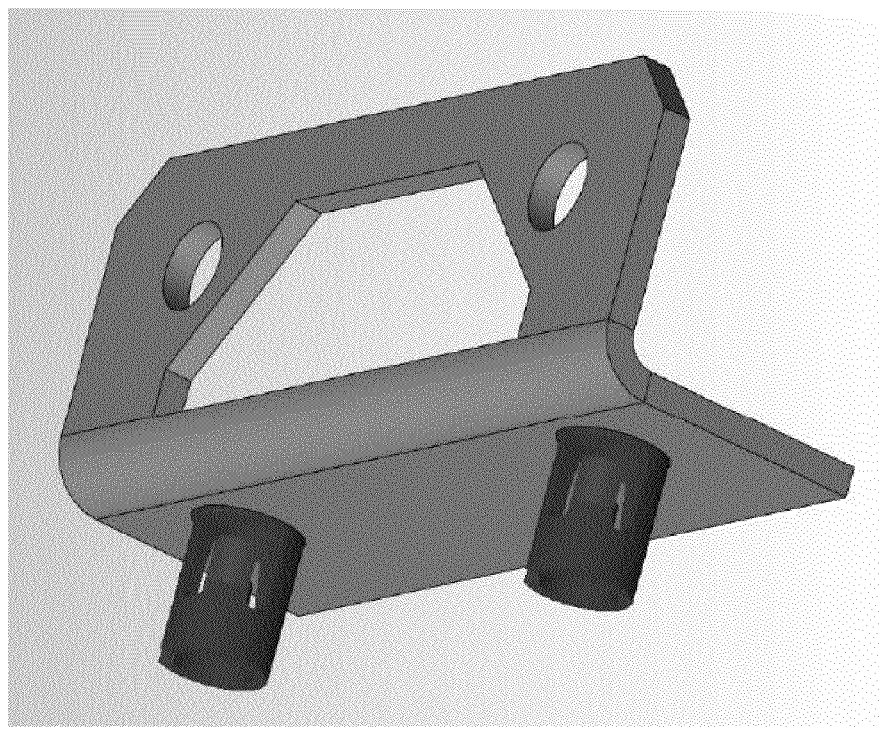

FIG. 129 is a perspective views of a square L-shape mounting bracket 12900, similar to the bracket 12700 shown in FIG. 127, but with several edge and corner tapers, and a geometrically-shaped hole 12902 in the bracket 12900.

FIG. 130 illustrates a chart describing example configurations for knockout arrangements in electrical junction boxes according to various example embodiments of the disclosure. Several different knockout arrangements are described for different size and depth electrical junction boxes, including handy boxes, 4" square, octagon-shape, 4" square, and 5"

square, though embodiments of the disclosure should not be limited to these sizes only. For each of the configurations, the selected knockout arrangements are optimized for providing different knockout options to a user on one or more sides of the electrical junction box.

In one example embodiment, a screwdriver tip recess can be provided on the face of central knockout. The recess can be shaped to fit the tip of a screwdriver or other instrument, and can facilitate the removal of the knockout when a force is applied to the recess with the screwdriver or other instrument.

In one example embodiment, a knockout arrangement can include a series of contact points arranged at about 90 degrees along the circumference of the knockout. For example, in a concentric or eccentric knockout arrangement, the outer knockout can include 4 contact points with the associated electrical junction box, wherein the 4 contact points are approximately spaced at the about 0, 90, 180, and 270 degree orientations along the circumference of the outer knockout.

In one example embodiment, a concentric or eccentric knockout arrangement can have an alternating profile. That is, a knockout arrangement with multiple concentric or eccentric knockouts can alternate profile heights with an inner knockout being raised, a middle knockout being recessed with respect to the inner knockout, and an outer knockout being raised with respect to the middle knockout.

In certain example embodiments, a concentric or eccentric knockout arrangement with an alternating profile can be compressed to stiffen the arrangement to minimize accidental removal of one or more of the knockouts.

Figure 131:
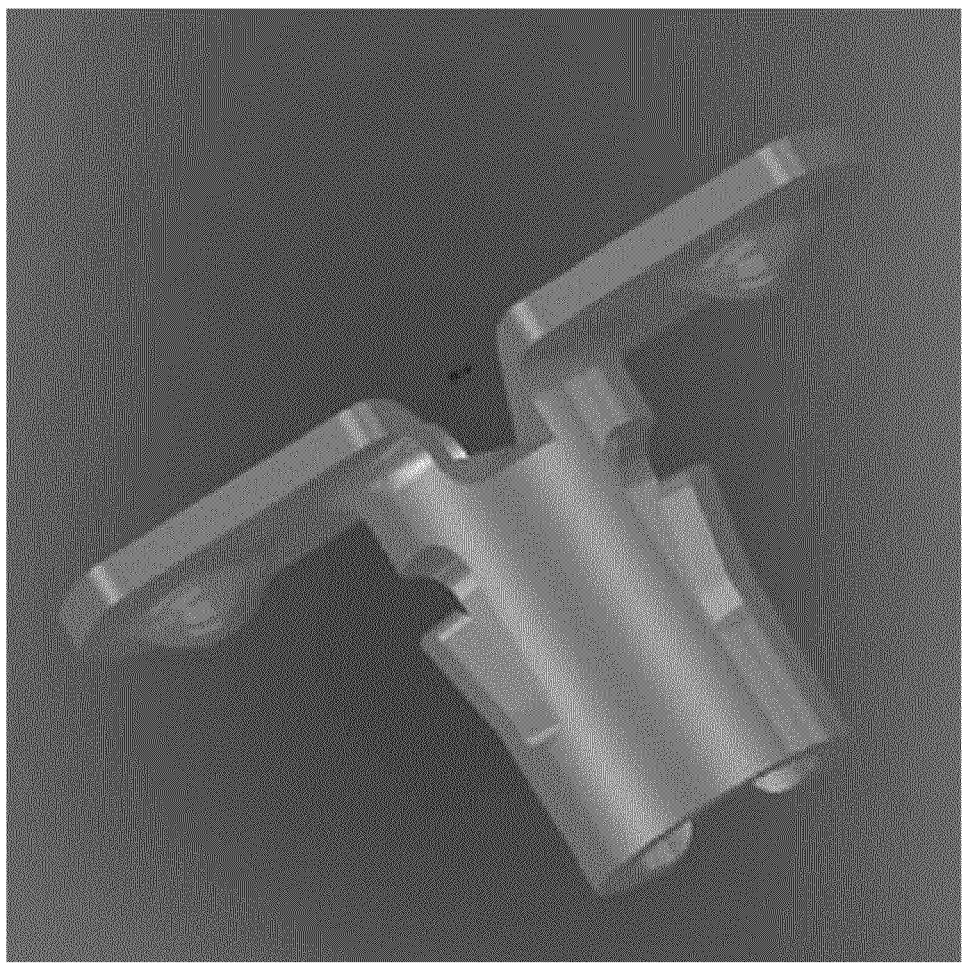

FIGS. 131-132D illustrate views of another example mounting device for an electrical junction box in accordance with an example embodiment of the disclosure. The example mounting pin 13100 shown in FIGS. 131 and 132A-132D can be used to connect at least two electrical accessories together. Suitable electrical accessories can include, but are not limited to, an electrical junction box, a mounting bracket, and an electrical accessory. For example, a pair of mounting pins can be inserted into a respective pair of spaced-apart holes, spaced at a predefined universal distance, in a side wall of an electrical junction box to facilitate using a common mounting bracket to mount adjacent to the side wall of the electrical junction box.

The pin 13100 shown in FIG. 131 can include a split elongated body 13102 with a head portion 13104. On opposing lateral sides of the body, a pair of flexible extensions 13106 can be located. Each of the extensions 13106 can be configured to recess within the body when a force is applied to each extension. When the force is removed, each extension 13106 can return to a position extending slightly outward from the lateral side of the body. A split opening 13108 alongside a substantial portion of the body 13102 and/or head portion 13104 can permit compression of certain portions of the pin 13100. In this manner, the pin 13100 can be inserted into a hole, for example, of an electrical junction box, mounting bracket or electrical accessory, and the pin 13100 can be retained within the hole. For instance, as the body 13102 of the pin 13100 passes through the hole, the contact force of the pin 13100 against the lateral sides of the hole compresses certain portions of the pin 13100 and applies a force to the extensions 13106, causing the extensions 13106 to recede within the body 13102 of the pin 13100. As the pin 13100 is suitably or fully inserted into the hole, the extensions 13106 may extend away from the lateral sides of the pin 13100 when the extensions 13106 are no longer in contact with the lateral sides of the hole. If the pin 13100 backed out of the hole, the extended extensions 13106 may prevent movement of the pin 13100 outward from the hole unless a force is applied to one or both of the extensions 13106 to recess the extensions into the body 13102 of the pin 13100.

In one example embodiment, the split body 13102 and head portion 13104 of the pin 13100 can facilitate compression of the pin body 13102 and head portion 13104 during installation. In this manner, a compressed pin 13100 can be inserted into a relatively tight hole or space, and after insertion, the material may expand slightly to fill the hole or space, thus creating a relatively tight fit between the pin 13100 and the hole or space.

The pin 13100 shown in FIG. 132 functions similarly to the pin in FIG. 112, but has a slightly different shape.

Figure 133:
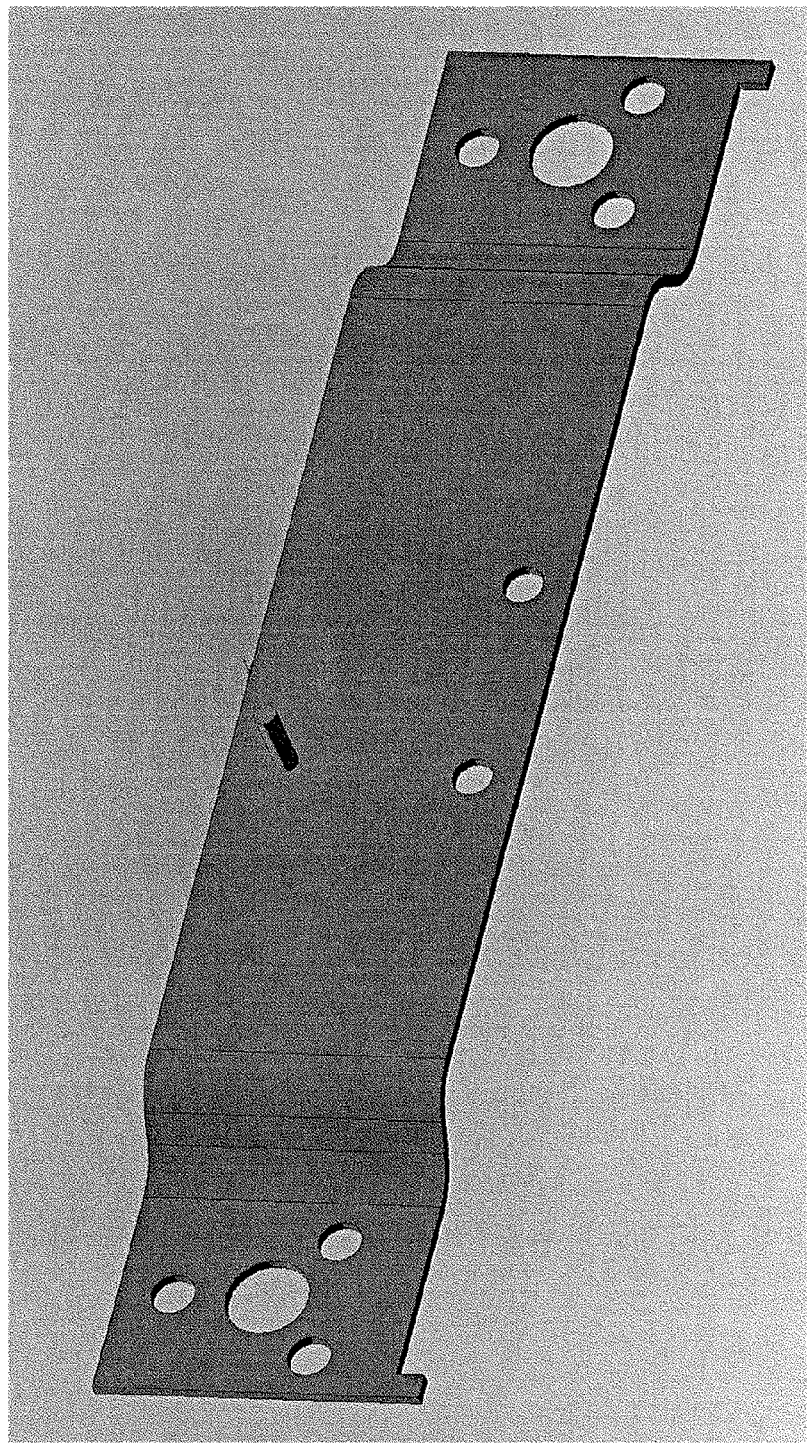

FIGS. 133-134D illustrate views of another example modular bracket for an electrical junction box in accordance with an example embodiment of the disclosure. The bracket 13300 shown can be rectangular-shaped with an elongated or extended body with angled end portions parallel to the body. Typically, the mounting bracket 13300 can be used with any number of electrical junction boxes and/or electrical accessories with a pair of spaced-apart holes to receive a respective number of mounting pins and/or mounting devices associated with the mounting bracket. In this example, the body of the mounting bracket 13300 can include two mounting holes 13302, and in other example embodiments, could include one or more previously installed, spaced-apart mounting pins or mounting devices. When the mounting holes 13302 are aligned with one or more corresponding mounting pins and/or mounting devices associated with an electrical junction box and/or electrical accessory, the mounting pins or mounting devices can be inserted into the corresponding holes, and the relative positions of the mounting bracket 13300 and electrical junction box or electrical accessory can be maintained. Opposing end portions of the mounting bracket 13300 can include additional mounting holes and/or fastener holes. When the additional mounting holes and/or fastener holes are aligned with corresponding pins and/or mounting devices in an electrical junction box and/or electrical accessory, the additional mounting holes and/or fastener holes can be mounted to the corresponding mounting pins or mounting devices, and the relative positions of the mounting bracket 13300 and electrical junction box or electrical accessory can be maintained.

In the example embodiment shown in FIG. 133, an extended portion 13304 between the two angled end portions 13306 can separate the end portions 13306 at a predefined distance. For example, one end portion of the bracket can mount to surface, such as a wall stud, the floor, or other object. In this manner, the bracket 13300 can support a mounted electrical junction box or electrical accessory away from the surface to which the extended lower portion of the bracket is mounted to.

In one example embodiment, the spaced-apart mounting holes are generally spaced apart at approximately the same or similar distance, such as a predefined universal distance, to facilitate using the mounting bracket as a common mounting bracket with any number of electrical junction boxes and/or electrical accessories.

The mounting bracket 13300 shown in FIG. 133 can include two mounting holes, such as 13302, though in other example embodiments, a fewer or greater number of mounting holes can be employed. The mounting holes 13302 shown in FIG. 121 are round and shown by way of example only, and other shape can be used in other example embodiments. In use, the mounting bracket 13300 can mount adjacent to one of the walls of an electrical junction box or to an electrical accessory, when the mounting holes 13302 receive respective mounting devices associated with the wall of an electrical junction box or electrical accessory. After each mounting device is inserted through respective mounting holes 13302, the mating of the mounting devices and mounting holes can maintain the relative positions of the box or electrical accessory and mounting bracket 13300 in a substantially adjacent orientation. Other mounting brackets and associated hole configurations, sizes, dimensions, positions, and numbers of holes in an electrical junction box or electrical accessory are possible in accordance with example embodiments of the disclosure.

Figure 135A:
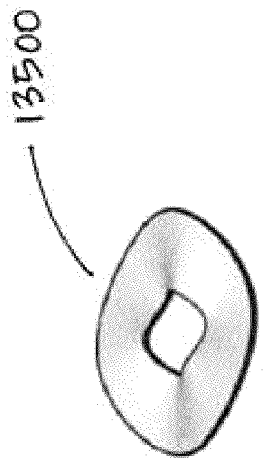
FIGS. 135A-135D show another example mounting device in accordance with an example embodiment of the disclosure.
Figure 135B:
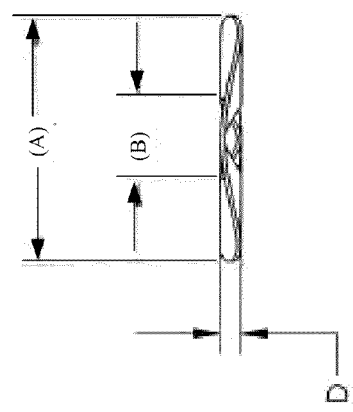
Figure 135D:
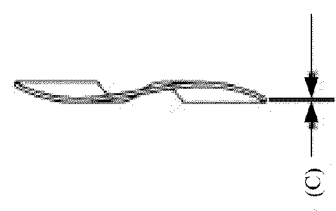
Figure 135C:
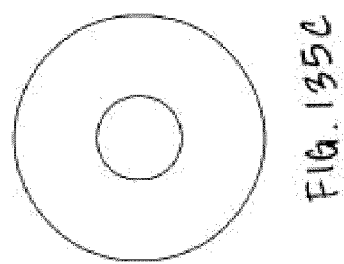

FIGS. 135A-135D show another example mounting device in accordance with an example embodiment of the disclosure. The mounting device shown in FIGS. 135A-135D is a wave spring 13502. In this example embodiment, the wave spring 13502 is annular-shaped. Though the wave spring can be made from a relatively flat piece of material, the spring 13500 can include one or more curves or waves that disrupt the generally flat profile of the spring 13500 as shown in FIG. 135D. When the spring 13500 is compressed towards a relatively flat profile, the curves or waves in the spring 13500 generally resist the compression force. FIGS. 136A-136H show another example mounting device in accordance with an example embodiment of the disclosure. The mounting device shown in FIGS. 136A-136H is a vibration lock pin 13600. The pin 13600 may be used in conjunction with a wave spring, such as 13500 in FIGS. 135A-135D. The example mounting device or pin 13600 shown in FIGS. 136A-136H can be used to connect at least two electrical accessories together. Suitable electrical accessories can include, but are not limited to, an electrical junction box, a mounting bracket, and an electrical accessory. For example, a pair of mounting pins can be inserted into a respective pair of spaced-apart holes, spaced at a predefined universal distance, in a side wall of an electrical junction box to facilitate using a common mounting bracket to mount adjacent to the side wall of the electrical junction box.

The pin 13600 shown in FIG. 136A can include a split elongated body 13602 with a head portion 13604. On opposing lateral sides of the body, a pair of flexible extensions 13606 can be located. Each of the extensions 13606 can be configured to recess within the body when a force is applied to each extension. When the force is removed, each extension 13606 can return to a position extending slightly outward from the lateral side of the body. A split opening 13608 alongside a substantial portion of the body 13602 and/or head portion 13604 can permit compression of certain portions of the pin 13600. In this manner, the pin 13600 can be inserted into a hole, for example, of an electrical junction box, mounting bracket or electrical accessory, and the pin 13600 can be retained within the hole. For instance, as the body 13602 of the pin 13600 passes through the hole, the contact force of the pin 13600 against the lateral sides of the hole compresses certain portions of the pin 13600 and applies a force to the extensions 13606, causing the extensions 13606 to recede within the body 13602 of the pin 13600. As the pin 13600 is suitably or fully inserted into the hole, the extensions 13606 may extend away from the lateral sides of the pin 13600 when the extensions 13606 are no longer in contact with the lateral sides of the hole. If the pin 13600 backed out of the hole, the extended extensions 13606 may prevent movement of the pin 13600 outward from the hole unless a force is applied to one or both of the extensions 13606 to recess the extensions into the body 13602 of the pin 13600.

In one example embodiment, the split body 13602 and head portion 13604 of the pin 13600 can facilitate compression of the pin body 13602 and head portion 13604 during installation. In this manner, a compressed pin 13600 can be inserted into a relatively tight hole or space, and after insertion, the material may expand slightly to fill the hole or space, thus creating a relatively tight fit between the pin 13600 and the hole or space.

The pin 13600 shown in FIGS. 136A-136H functions similarly to the pin in FIG. 112, but has a slightly different shape.

In one example embodiment, the pin 13600 can be used with the mounting device or wave spring 13500 shown in FIGS. 135A-135D, similar to the configuration shown in FIG. 136D. In this configuration, the wave spring can compress as needed between two adjacent electrical accessories to create a relatively tight fit between the adjacent accessories.

FIGS. 137A-137J show another example mounting device in accordance with an example embodiment of the disclosure. This mounting device is similar to the pin 13600 shown in FIGS. 136A-136H.

Figure 138:
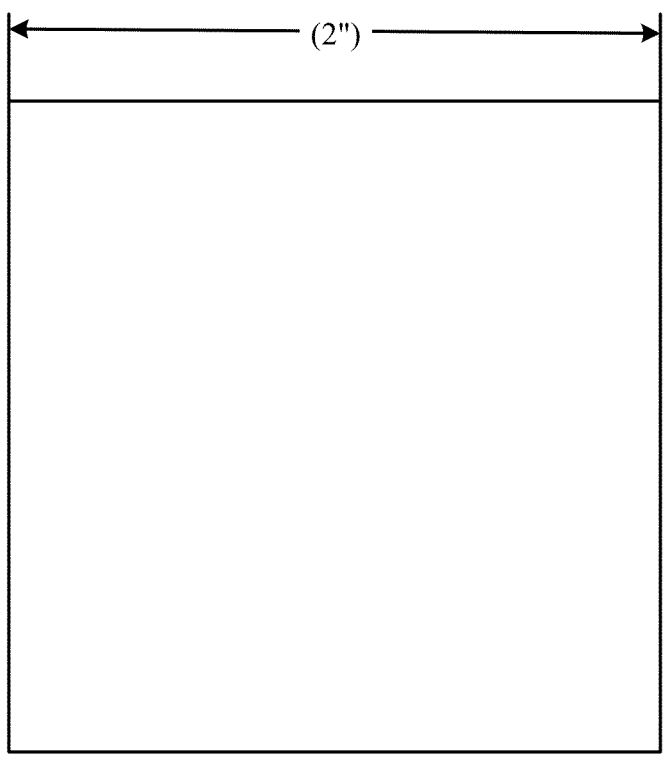
FIGS. 138-146 illustrate an example method in accordance with an example embodiment of the disclosure.

FIGS. 138-146 illustrate an example method in accordance with an example embodiment of the disclosure, In a first operation of the method, as shown in FIG. 138, a wall of a first electrical junction box is selected. In this example, a side wall of a handy box is selected.

Figure 139:
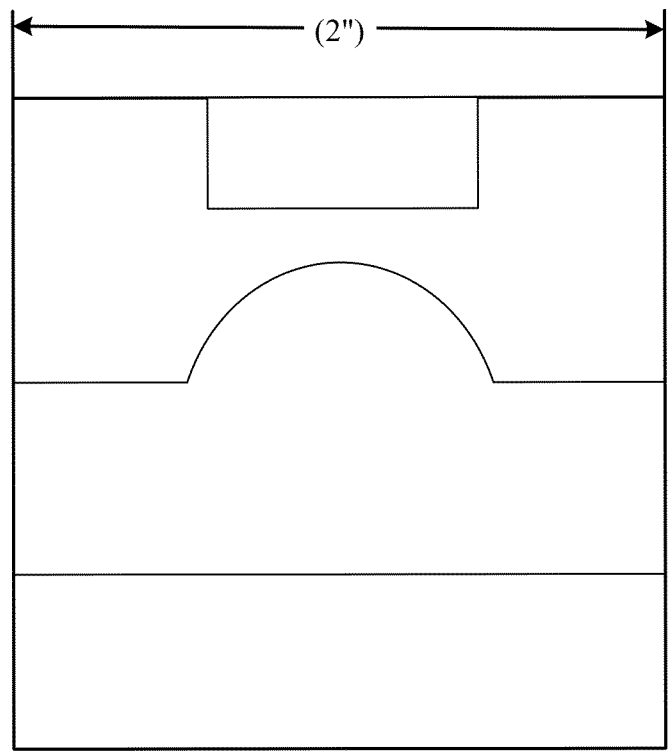

In a second operation of the method, as shown in FIG. 139, a wall of a second electrical junction box is selected. In this example, a side wall of a square box is selected and overlaid on top of the depiction of the wall of the first electrical junction box.

Figure 140:
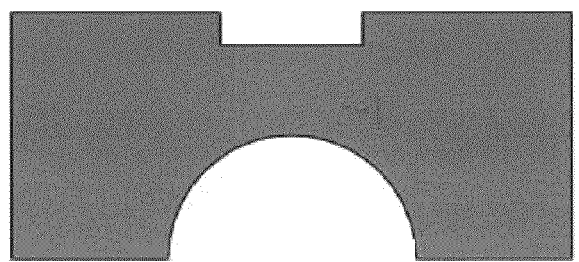

In a third operation of the method, as shown in FIG. 140, a determination is made of a common area between the first electrical junction box and the second electrical box.

Figure 141:
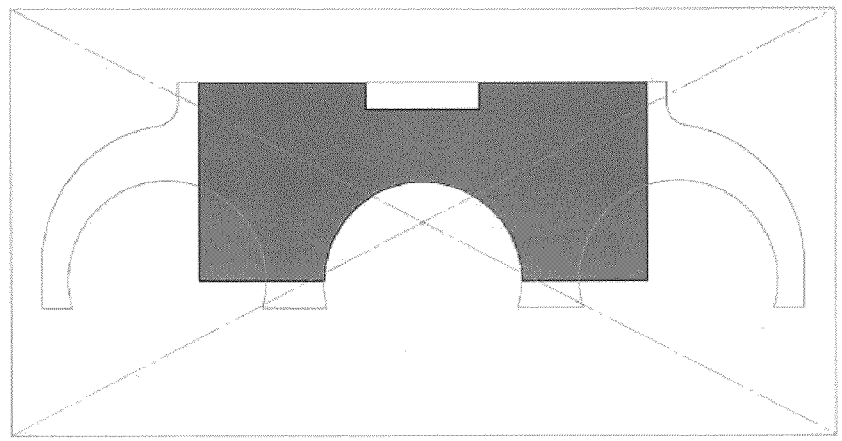

In a fourth operation of the method, as shown in FIG. 141, a wall of a third electrical junction box is selected. In this example, a side wall of another square box is selected and overlaid on top of the depiction of the common area between the first electrical junction box and the second electrical box.

Figure 142:
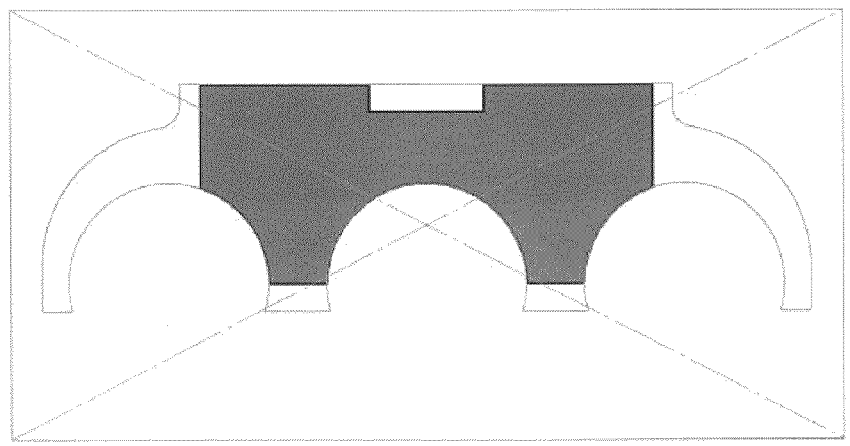

In a fifth operation of the method, as shown in FIG. 142, a determination is made of a common area between the first electrical junction box, the second electrical box, and the third electrical junction box.

Figure 143:
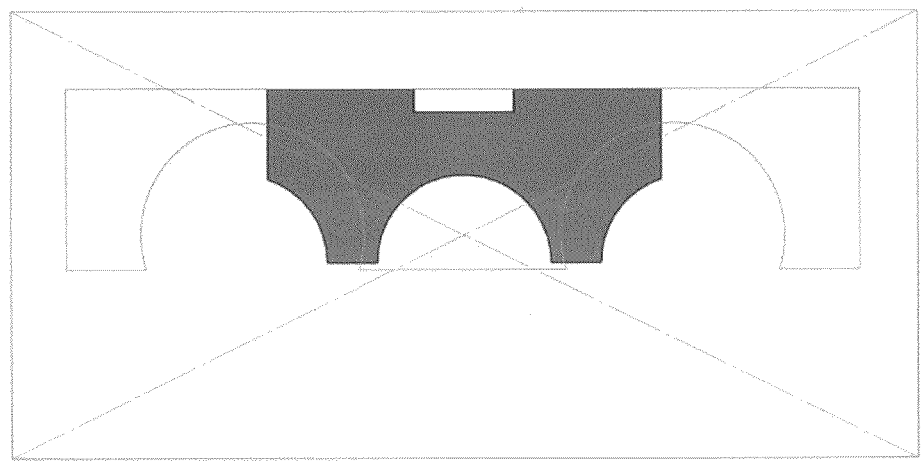

In a sixth operation of the method, as shown in FIG. 143, a wall of a fourth electrical junction box is selected. In this example, a side wall of a third square box is selected and overlaid on top of the depiction of the common area between the first electrical junction box, second electrical box, and the third electrical junction box.

In a seventh operation of the method, as shown in FIG. 143, a determination is made of a common area between the first electrical junction box, the second electrical box, the third electrical junction box, and the fourth electrical junction box.

Figure 144:
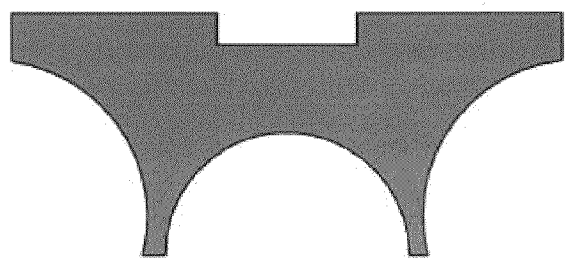

In other subsequent operations of the method, as shown in FIG. 144, N walls of N other electrical junction boxes are selected. A determination is made of a common area between the first electrical junction box, the second electrical box, the third electrical junction box, the fourth electrical junction box, and N electrical boxes.

Figure 145:
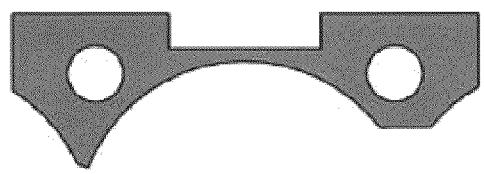
Figure 146:
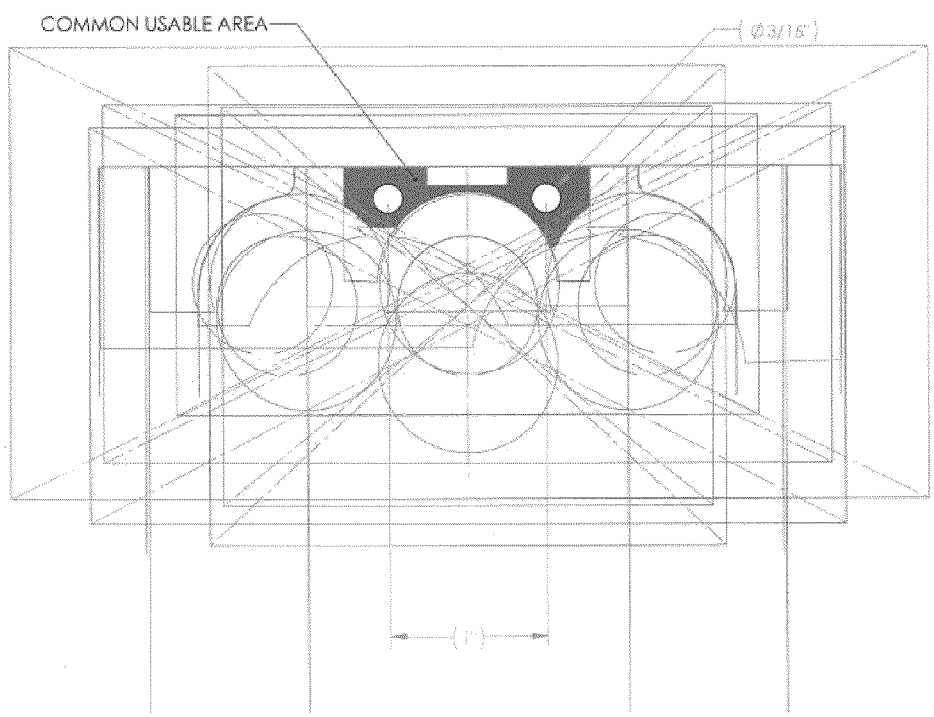

FIG. 145 shows a common usable area in the series of boxes compared in all the prior operations shown in FIGS. 138-144. The common usable area represents area in which mounting holes for a mounting bracket can be positioned. Furthermore, a predefined universal spacing can be selected between the mounting holes based at least in part on the common usable area. In addition, the size and shape of the mounting holes can be selected based at least in part on the common usable area. In this manner, various characteristics of an electrical junction box and associated mounting or modular brackets, in accordance with example embodiments of the disclosure, can be selected.

FIGS. 147A-D illustrate views of another example modular mounting bracket 14700 for an electrical junction box in accordance with an example embodiment of the disclosure. Referring now to FIGS. 147A-D, the example modular mounting bracket 14700 can have a generally rectangular shape made up of an elongated, planar or substantially planar central member 14702 having a first end and a second end, a top surface 14707, and a bottom surface 14709. In addition, the mounting bracket 14700 may include a planar or substantially planar first end mounting member 14704 coupled to, either directly or indirectly, the first end portion of the central member 14702, and a planar or substantially planar second end mounting member 14705 coupled to, either directly or indirectly, the second end of the central member 14702. In certain example embodiments, the central member 14702 and the first 14704 and second 14705 end mounting members each have planar or substantially planar surfaces that are disposed on parallel or substantially parallel planes to one another. In one example embodiment, the first end mounting member 14704 and the second end mounting member 14705 have planar surfaces aligned on the same horizontal plane.

In certain example embodiments, a first angled member 14712 may be disposed between the first end of the central member 14702 and the first end mounting member 14704. For example, the first end of the first angled member 14712 may be coupled to the first end of the central member and disposed at an angle to the central member 14702. In certain example embodiments, the angle can be any angle between 1-90 degrees and preferable between 40-50 degrees. In one example embodiment, the angle is 45 degrees down from the bottom surface 14709 of the central member 14702 such that the first angled member 14712 extends angularly downward from the bottom surface 14709 of the central member 14702. In addition, the opposing second end of the first angled member 14712 may be coupled to first end mounting member 14704 at an angle to the first end mounting member 14704. In certain example embodiments, the angle can be any angle between 1-90 degrees and preferable between 40-50 degrees. In one example embodiment, the angle is 45 degrees up from the surface of the first end mounting member 14704 such that the first angled member 14712 extends angularly upward from the surface of the first end mounting member 14704. In certain example embodiments, the angles of coupling between the first angled member 14712 and the central member 14702 and the first angled member 14712 and the first end mounting member 14704 are selected to dispose the planar or substantially planar surface of the first end mounting member 14704 on a parallel or substantially parallel plane with the planar or substantially planar top surface 14707 of the central member 14702.

In certain example embodiments, a second angled member 14710 may be disposed between the second end of the central member 14702 and the second end mounting member 14705. For example, the first end of the second angled member 14710 may be coupled to the first end of the central member 14702 and disposed at an angle to the central member 14702. In certain example embodiments, the angle can be any angle between 1-90 degrees and preferable between 40-50 degrees. In one example embodiment, the angle is 45 degrees down from the bottom surface 14709 of the central member 14702 such that the second angled member 14710 extends angularly downward from the bottom surface 14709 of the central member 14702. In addition, the opposing second end of the second angled member 14710 may be coupled to second end mounting member 14705 at an angle to the second end mounting member 14705. In certain example embodiments, the angle can be any angle between 1-90 degrees and preferable between 40-50 degrees. In one example embodiment, the angle is 45 degrees up from the surface of the second end mounting member 14705 such that the second angled member 14710 extends angularly upward from the surface of the second end mounting member 14705. In certain example embodiments, the angles of coupling between the second angled member 14710 and the central member 14702 and the second angled member 14710 and the second end mounting member 14705 are selected to dispose the planar or substantially planar surface of the second end mounting member 14705 on a parallel or substantially parallel plane with the planar or substantially planar top surface 14707 of the central member 14702.

The central member 14702 may further include two or more mounting members 14706. In one example embodiment, the spaced-apart mounting members 14706 are generally spaced-apart at approximately the same or similar distance, such as a predefined universal distance, to facilitate using the mounting bracket as a common mounting bracket with multiple electrical junction boxes and/or electrical accessories. In this example embodiment, two mounting members 14706 are shown; however this is for example purposes only as three, four, five or more mounting members could be substituted for that shown in the example bracket 14700.

Figure 147A:
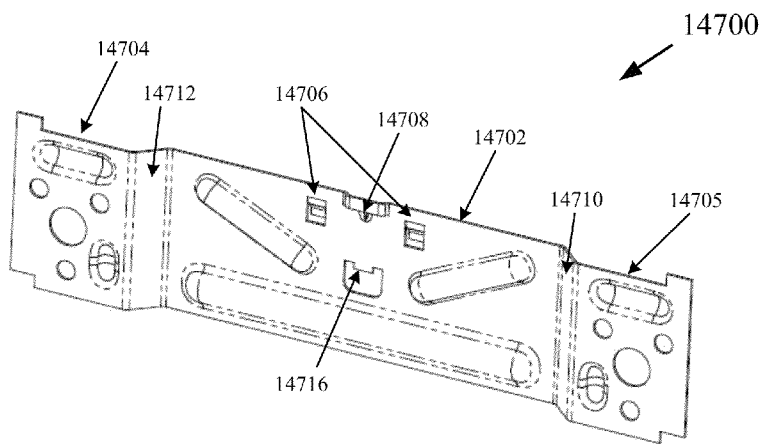
FIGS. 147A-D show another example modular bracket for an electrical junction box in accordance with an example embodiment of the disclosure.
Figure 147B:
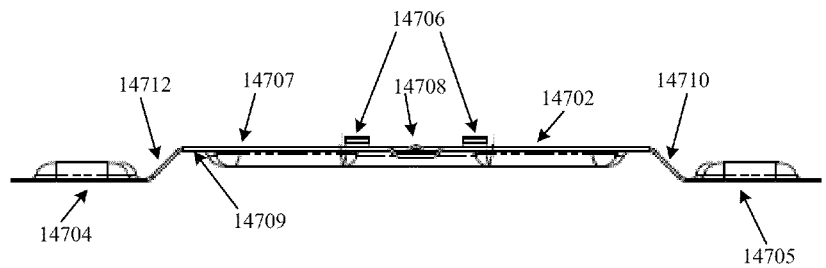
Figure 147C:
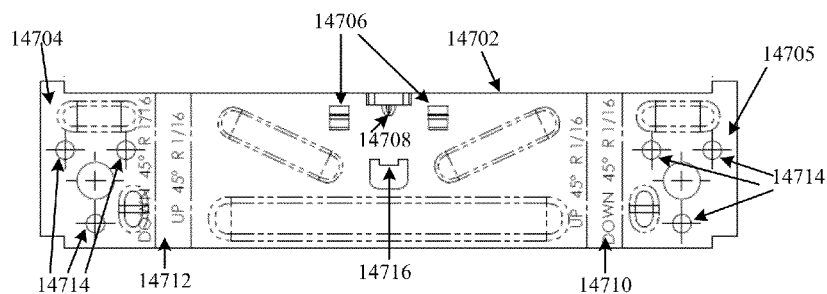
Figure 147D:
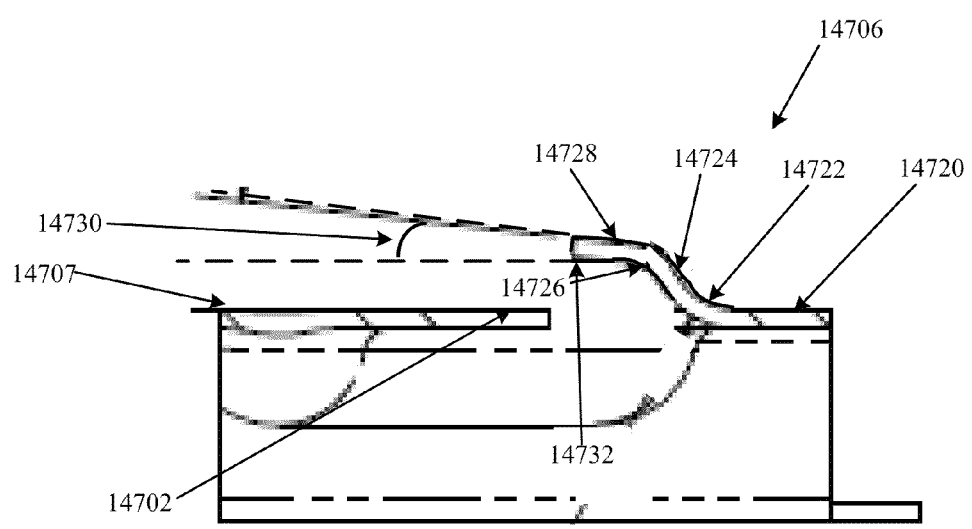

Referring now to FIG. 147D, each mounting member 14706 can be formed from, such as via stamping, a portion of the surface of the central member 14702 and can extend up from the top surface 14707 of the central member 14702. The example mounting member 14706 can include a first end portion 14720 coupled to or integrally formed with the central member 14702. The first end portion 14720 may extend to a first curved portion 14722. In one example embodiment, the first curved portion 14722 may have a concave curvature with respect to the top surface 14707 of the central member 14702. In certain example embodiments, the first curved portion 14722 has a first radius of curvature that is, for example, between 0.8-0.15 inches and preferably 0.112 inches. The first curved portion extends to middle portion 14724. In one example embodiment, the middle portion is straight or substantially straight and extends for a length of between 0.005-0.035 inches. In an alternative embodiment, the middle portion 14724 can be eliminated and the first curved portion 14722 can extend directly to a second curved portion 14726. The middle portion 14724 extends to the second curved portion 14726. In one example embodiment, the second curved portion 14726 may have a convex curvature with respect to the top surface 14707 of the central member 14702. In certain example embodiments, the second curved portion 14726 has a second radius of curvature that is, for example, between 0.025-0.1 inches and preferably 0.056 inches. The second curved portion 14726 may terminate as the end of the mounting member 14706 or alternatively may extend to the free end portion 14728. In one example embodiment, the free end portion terminates the end of the mounting member 14706. In this example embodiment, the free end portion 14726 may extend is a straight or substantially straight manner at an angle 14730 to the top surface 14707 of the central member 14702. In one example embodiment, the angle 14730 may be between 1-20 degrees and preferably about 6 degrees. The first end portion 14720, first curved portion 14722, middle portion 14724, second curved portion 14726, and free end portion 14728 together form a mounting member 14706 that is generally chicane-shaped or serpentine-shaped and raises a bottom surface 14732 of the free end portion 14728 a distance above the top surface 14707 of the center portion 14702 to allow an edge of a corresponding mounting hole/aperture of an electrical junction box or electrical accessory to slide between the top surface 14707 and the bottom surface 14732 of the free end portion 14728 in order to toollessly couple and decouple the electrical junction box or electrical accessory from the mounting bracket 14700. In one example embodiment, the distance between the bottom surface 14732 and the top surface 14707 is between 0.001-0.3 inches.

When each mounting member 14706 is aligned with a corresponding mounting hole in at least one side of an electrical junction box or electrical accessory, each mounting member 14706 can be inserted into the corresponding hole on the side of the electrical junction box or electrical accessory, to couple the mounting bracket 14700 to the electrical junction box or electrical accessory without the need of tools. In addition, the electrical junction box or electrical accessory can be decoupled from the mounting bracket 14700 without the need of a tool by removing slidably adjusting the electrical junction box or electrical accessory to remove each mounting member 14706 from the corresponding opening in at least one side of the electrical junction box or electrical accessory.

Each end mounting member 14704, 14705 may further include one or more through-holes 14714 for coupling the bracket 14700 to a surface, such as a wall stud. In certain example embodiments, each angled member 14710, 14712 can separate the corresponding end mounting member 14704 or 14705 at a predefined distance from the central member 14702. For example, one end mounting member 14704, 14705 of the bracket 14700 can be coupled to a first surface, such as a wall stud, the floor, or other object and the second end mounting member 14704, 14705 can be coupled to the same first surface or a different surface. In this manner, the bracket 14700 can support a mounted electrical junction box or electrical accessory away from the surface to which the end mounting members 14704, 14705 of the bracket 14700 are mounted.

In another example embodiment, each end mounting member 14704, 14705 may further include additional mounting members 14706 (not shown). When the additional mounting members 14706 are aligned with corresponding holes/apertures in a side of an electrical junction box or electrical accessory, the additional mounting members 14706 can be inserted into the corresponding holes/apertures to toollessly couple an electrical junction box or electrical accessory to the mounting end 14704 and/or 14705 of the bracket 14700. Typically, the mounting bracket 14700 can be used with any number of electrical junction boxes and/or electrical accessories having a pair of spaced-apart holes in at least one side of the electrical junction box or electrical accessory to receive a respective number of mounting members 14706 provided on the mounting bracket 14700.

In certain example embodiments, the modular mounting bracket 14700 may also include a raised catch bump 14708. The raised catch bump 14708 can be disposed along the center member 14702 and extend above the top surface 14707 of the center member 14702. In one example embodiment, the raised catch bump 14708 is disposed generally between two of the mounting tabs 14706 near an edge of the mounting bracket 14700. The raised catch bump 14708 may be configured to engage an indention area on an electrical junction box or other electrical accessory when coupled to the mounting bracket 14700 is coupled to the electrical junction box or other electrical accessory to help hold the mounting bracket 14700 and junction box coupled together.

In certain example embodiments, the modular mounting bracket 14700 may also include a retaining tab 14716 disposed in an aperture provided on the center member 14702 of the mounting bracket 14700. In one example embodiment, the retaining tab can be configured to engage or otherwise enter a retaining tab opening 14812 on an electrical junction box or other electrical accessory as the mounting devices, such as mounting tabs 14706 are inserted into the holes 14806 of the junction box to help hold the junction box to the mounting bracket 14700 and to limit the rotation capability of the junction box with respect to the mounting bracket 14700.

Other mounting brackets and associated mounting member 14706 configurations, sizes, dimensions, positions, and numbers of holes in an electrical junction box or electrical accessory are possible in accordance with example embodiments of the disclosure.

Figure 148:
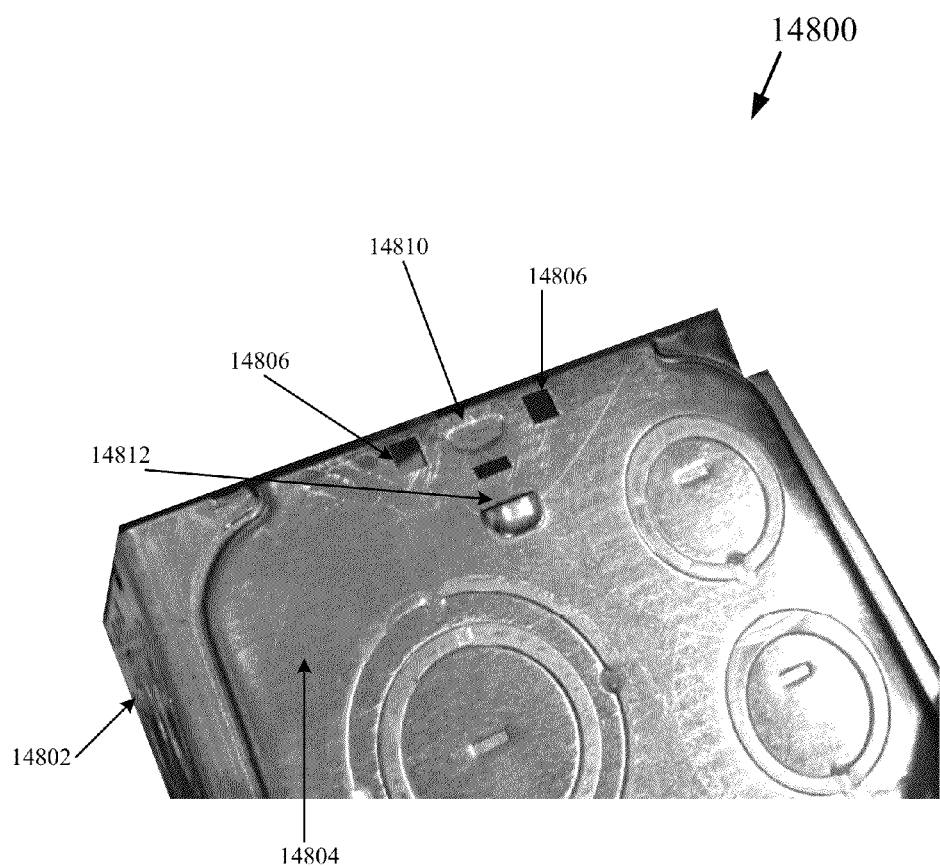
FIG. 148 shows a partial-perspective view of an electrical junction box in accordance with an example embodiment of the disclosure.

FIG. 148 illustrates a partial-perspective view of an example electrical junction box in accordance with an example embodiment of the disclosure. The example electrical junction box of FIG. 148 illustrates a double gang, square-shaped, folded, electrical junction box 14800. However, this is for discussion purposes only as the example junction box could be any other type of junction box or electrical accessory as discussed above. The example junction box 14800 is ready for installation or use with a modular bracket, such as modular mounting bracket 14700 of FIGS. 147A-D or any other modular mounting bracket discussed herein by a user or consumer in accordance with an example embodiment of the disclosure.

Referring now to FIGS. 147A-148, the example, junction boxes 14802 can include one or more spaced-apart holes 14806 on at least one sidewall 14804 of the electrical junction boxes 14802 to receive a respective therein and/or therethrough a number of mounting devices, such as, for example, mounting tabs 14706 provided on the modular bracket 14700. In one example embodiment, each sidewall of the electrical junction box 14802 can include the spaced-apart holes 14806, which can be positioned near the upper open edges of all four of the sidewalls 14804. In one example embodiment, the spaced-apart holes 14806 are generally spaced apart at approximately the same or similar distance, such as a predefined universal distance, to facilitate using a common modular bracket, such as bracket 14700 with mounting devices, such as mounting tabs 14706. For example, a predefined universal distance of spacing between the holes 14806 or the center of the holes 14806 for the electrical junction box 14802 shown FIG. 148 and/or for a similar family or group of electrical junction boxes can be approximately 0.5 inches to 3.0 inches, such as about 1.0 inches (2.54 cm). Electrical junction boxes with similarly shaped spaced-apart holes, such as 14806, for use with a common modular bracket, such as 14700, can be known collectively as a "family of electrical junction boxes." While a square, double-gang electrical box is shown in FIG. 148, in other example embodiments, an electrical junction box can have other shapes including, but not limited to, square, round, octagonal, rectangular "handy box," single gang rectangular, double gang rectangular, triple gang rectangular, and other multiple gang shapes. In other example embodiments, a rectangular-shaped or square-shaped electrical junction box may have other dimensions such as a deeper or shallower depth than the box 14802 shown.

In one example embodiment, the spaced-apart holes 14806 in the electrical junction box 14802 can be square-shaped holes; however, the shape can be different, including circular, in other example embodiments. In one example embodiment, the spacing between the respective centerlines of the holes 14806 can be, for example, between approximately 0.25 inches (0.64 cm) and 3.5 inches (8.9 cm), and the holes 14806 can be spaced, for example, relatively close to the upper edge of the side wall 14804 of the electrical junction box 14802, such as approximately 0.25 to 1.0 inches from the upper edge. In other example embodiments, other shapes, dimensions, and spacing for the holes in an electrical junction box can be used.

A predefined universal distance or spacing between holes 14806 for a modular electrical junction box or other electrical accessory or between the mounting devices, such as mounting tabs 14706 for the mounting bracket 14700, in accordance with an example embodiment of the disclosure, can be selected based at least in part on any one or more of the surface area of one or more sidewalls for an electrical junction box or the group of electrical junction boxes, the sizing and spacing of knockouts, such as knockouts 14814, on the sidewalls 14804 of the electrical junction box 14802, and the relative sizes of some or all electrical junction boxes 14802 in the same family or group of electrical junction boxes. In certain example embodiments, the predefined universal distance or spacing between the mounting devices, such as mounting tabs 14706 for the mounting bracket 14700, in accordance with an example embodiment of the disclosure can be consistent or otherwise closely similar to the distance between holes, such as holes 14806 in electrical junction box 14802, in a family or group of electrical junction boxes. In this manner, a common modular or mounting bracket, such as modular mounting bracket 14700, can be used with multiple electrical junction boxes, including electrical junction box 14802, of different sizes and/or shapes, thus reducing time and costs in storing, assembling together, and coupling together the modular or mounting brackets and electrical junction boxes.

According to an example embodiment of the disclosure, an example method for determining a predefined universal distance and the sizes and locations of various features, such as knockouts, for an electrical junction box is described with respect to FIGS. 138-146.

The mounting devices, such as mounting tabs 14706 in FIGS. 147A-D, are correspondingly spaced apart a predefined universal distance, similar to the spaced-apart holes 14806 in FIG. 148. In use, the modular bracket 14700 can mount adjacent to one of the sidewalls 14804 of the electrical junction box 14802 when the mounting devices, such as mounting tabs 14706, are inserted through respective holes 14806 in the sidewall 14804 of the electrical junction box 14802.

The example electrical junction box 14802 may further include an indentation area 14810 that is sized and shaped to receive at least a portion of the raised catch bump 14708 on top surface 14707 of the center member 14702 of the modular mounting bracket 14700. In one example embodiment, the indention area 14810 may be positioned at least partially between two of the holes 14806. Further, the example indentation area 14810 may have a flat or curved surface and may have at least part of its surface that is below the level of the surrounding area on the side 14804 of the junction box 14802.

The example electrical junction box 14802 may also include a retaining tab opening 14812 disposed on the side wall 14804 of the electrical junction box 14802. In one example embodiment, the retaining tab opening 14812 is an opening through the side wall 14804 and is configured to at least partially receive therein all or a portion of the retaining tab 14716 when the mounting tabs 14706 are inserted through the corresponding holes 14806 in the side wall 14804 of the electrical junction box 14802 or other electrical accessory.

After each mounting device, such as mounting tab 14706 is inserted through respective holes 14806, the raised catch bump 14708 abuts and engages the indentation area 14810 to limit the ability of the junction box 14802 to slide back out of engagement with the mounting tabs 14706 of the mounting bracket 14700 without first moving the electrical junction box 14802 away from the top surface 14707 of the mounting bracket 14700. In addition, the retaining tab 14716 becomes inserted into the retaining tab opening 14812 on the electrical junction box 14802 to further hold the box 14802 to the mounting bracket 14700 and to limit rotation of the electrical junction box 14802 with respect to the modular mounting bracket 14700. In addition the shape and configuration of the mounting devices, such as mounting tabs 14706 can help maintain the relative positions of the electrical junction box 14802 or other electrical accessory and the modular mounting bracket 14700 in an abutted and substantially adjacent orientation.

Other modular brackets, mounting devices, and associated holes, and associated configurations, sizes, dimensions, positions, and numbers of modular brackets, mounting devices, and holes in each sidewall and electrical junction box are possible in accordance with other example embodiments of the disclosure. In one example embodiment, a modular mounting bracket 14700 and electrical junction box 14802 in accordance with an example embodiment of the disclosure can meet the standards specified by UL (Underwriters' Laboratories) 514A.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A system comprising:
a plurality of electrical junction boxes, each electrical junction box comprising:
at least one wall; and
at least two spaced-apart holes in the at least one wall, wherein each hole is sized and shaped to receive one of at least two corresponding spaced-apart mounting devices,
wherein at least one of the plurality of electrical junction boxes differs from another of the plurality of electrical junction boxes in at least one of a) a surface area of the wall comprising the at least two spaced-apart holes; b) a size of the junction box; c) a shape of the junction box; or d) a number of knockouts on the wall comprising the at least two spaced-apart holes; and
at least one mounting bracket comprising:
the at least two spaced-apart mounting devices, wherein each mounting device is sized and shaped to at least partially protrude through one of the at least two-corresponding spaced-apart holes provided in each of the plurality of electrical junction boxes;
wherein at least one of the plurality of electrical junction boxes is maintained in a relative stationary position with respect to the at least one mounting bracket when the at least two spaced-apart mounting devices protrude at least partially through the respective at least two spaced-apart holes in the wall of the at least one electrical junction box, and
wherein spacing between the at least two spaced-apart holes is a predefined universal distance for each of the plurality of electrical junction boxes.

2. The system of claim 1, wherein the predefined universal distance is selected based at least in part on a surface area of a wall for the plurality of electrical junction boxes.

3. The system of claim 1, wherein the predefined universal distance is selected based at least in part on a number of knockouts on a wall for each of the plurality of electrical junction boxes.

4. The system of claim 1, wherein the predefined universal distance is selected based at least in part on relative sizes of the plurality of electrical junction boxes.

5. The system of claim 1, wherein a first surface area of the wall comprising the at least two spaced-apart holes for at least the one of the plurality of electrical junction boxes differs from a second surface area of the wall comprising the at least two spaced-apart holes for the another of the plurality of electrical junction boxes.

6. The system of claim 1, wherein a first number of knockouts on the wall comprising the at least two spaced-apart holes for at least the one of a plurality of electrical junction boxes differs from a second number of knockouts on the wall comprising the at least two spaced-apart holes for the another of the plurality of electrical junction boxes.

7. The system of claim 1, wherein each of the mounting devices comprise a serpentine-shaped mounting tab.

8. The system of claim 1, wherein the at least one mounting bracket comprises a member, wherein the at least two mounting devices extend from a surface of the member and wherein each of the mounting devices comprises:
   a first portion coupled to the surface of the member;
   a first curved portion extending from a first end of the first portion and concave to the surface of the member;
   a second curved portion convex to the surface of the member; and
   a free end portion extending in a substantially linear direction from a first end of the second curved portion.

9. The system of claim 1, wherein each of the plurality of junction boxes further comprises an indentation area disposed substantially between two of the at least two spaced-apart holes, wherein the at least one mounting bracket further comprises a raised catch bump disposed substantially between two of the at least two spaced-apart mounting devices and wherein the raised catch bump is configured to abut and engage the indentation area when the at least two spaced-apart mounting devices protrude at least partially through the respective at least two spaced-apart holes in the wall of the at least one electrical junction box.

10. The system of claim 1, wherein the mounting devices comprise at least one of the following: a pivoting retainer clip, a locking spring, a locking ball mechanism, a V-shaped spring device, a wire spade device, an omega clip device, a combination tab and screw mechanism, a pliable lock device, a V-shape clip device, a winged locking device, a combination of locating devices and screws, a L-shaped tab or clip, a tree-shaped device, a T-shaped tab, a pliable tab, a split T-shaped lock, a serpentine-shaped mounting tab, or a split elongated body pin.

11. The system of claim 1, wherein each of the plurality of electrical junction boxes further comprises a plurality of walls forming an opening, wherein each wall comprises a respective at least two spaced-apart holes, wherein the holes are sized and shaped to receive the at least two corresponding spaced-apart mounting devices.

12. The system of claim 1, wherein the wall comprising the space-apart holes further comprises a plurality of knockouts wherein each of the plurality of knockouts are disposed along a different portion of the wall.

13. A method comprising:
   providing a plurality of electrical junction boxes, each electrical junction box comprising:
      at least one wall; and
      at least two spaced-apart holes in the at least one wall, wherein the holes are sized and shaped to receive at least two corresponding spaced-apart mounting devices, wherein at least one of the plurality of electrical junction boxes differs from another of the plurality of electrical junction boxes in at least one of a) a surface area of the wall comprising the at least two spaced-apart holes; b) a size of the junction box; c) a shape of the junction box; or d) a number of knockouts on the wall comprising the at least two spaced-apart holes, and wherein spacing between the at least two spaced-apart holes is a predefined universal distance for the plurality of electrical junction boxes;
   providing at least one mounting bracket comprising:
      the at least two spaced-apart mounting devices, wherein the mounting devices are sized and shaped to at least partially protrude through the at least two corresponding spaced-apart holes in the plurality of electrical junction boxes; and
   mounting the at least one mounting bracket to at least one of the plurality of electrical junction boxes to maintain the at least one electrical junction box in a relative stationary position with respect to the at least one mounting bracket when the at least two spaced-apart mounting devices protrude at least partially through the respective at least two spaced-apart holes in the wall of the at least one electrical junction box.

14. The method of claim 13, wherein the predefined universal distance is selected based at least in part on a surface area of a wall for each the plurality of electrical junction boxes.

15. The method of claim 13, wherein the predefined universal distance is selected based at least in part on a number of knockouts on a wall for each of the plurality of electrical junction boxes.

16. The method of claim 13, wherein each of the mounting devices comprise a serpentine-shaped mounting tab.

17. The method of claim 13, wherein the at least one mounting bracket comprises a member, wherein the at least two spaced-apart mounting devices extend from a surface of the member and wherein each of the mounting devices comprises:
   a first portion coupled to the surface of the member;
   a first curved portion extending from a first end of the first portion and concave to the surface of the member;
   a second curved portion convex to the surface of the member; and
   a free end portion extending in a substantially linear direction from a first end of the second curved portion.

18. The method of claim 13, wherein the mounting devices comprise at least one of the following: a pivoting retainer clip, a locking spring, a locking ball mechanism, a V-shaped spring device, a wire spade device, an omega clip device, a combination tab and screw mechanism, a pliable lock device, a V-shape clip device, a winged locking device, a combination of locating devices and screws, a L-shaped tab or clip, a tree-shaped device, a T-shaped tab, a pliable tab, a split T-shaped lock, a serpentine-shaped mounting tab, or a split elongated body pin.

19. An apparatus comprising:
an electrical junction box comprising:
- at least one wall; and
- at least two spaced-apart holes in the at least one wall, wherein at least one of the plurality of electrical junction boxes differs from another of the plurality of electrical junction boxes in at least one of a) a surface area of the wall comprising the at least two spaced-apart holes; b) a size of the junction box; or c) a number of knockouts on the wall comprising the at least two spaced-apart holes, wherein the holes are sized and shaped to receive at least two corresponding mounting devices associated with at least one mounting bracket, wherein the mounting devices are sized and shaped to protrude at least partially through the at least two corresponding spaced-apart holes in the electrical junction box;

wherein the electrical junction box can be maintained in a relative stationary position with respect to the at least one mounting bracket when the at least two spaced-apart mounting devices at least partially protrude through the respective at least two spaced-apart holes in the at least one wall of the electrical junction box, and wherein spacing between the at least two spaced-apart holes is a predefined universal distance for the plurality of junction boxes.

20. The apparatus of claim 19, wherein each of the mounting devices comprise a serpentine-shaped mounting tab.

21. The apparatus of claim 19, wherein each of the plurality of junction boxes further comprises an indentation area disposed substantially between two of the at least two spaced-apart holes, wherein the indentation area is configured to receive and abut a raised catch bump disposed substantially between two of the at least two spaced-apart mounting devices on the mounting bracket when the at least two spaced-apart mounting devices protrude at least partially through the respective at least two spaced-apart holes in the wall of the at least one electrical junction box.

22. The apparatus of claim 19, wherein the mounting devices comprise at least one of the following: a pivoting retainer clip, a locking spring, a locking ball mechanism, a V-shaped spring device, a wire spade device, an omega clip device, a combination tab and screw mechanism, a pliable lock device, a V-shape clip device, a winged locking device, a combination of locating devices and screws, a L-shaped tab or clip, a tree-shaped device, a T-shaped tab, a pliable tab, a split T-shaped lock, a serpentine-shaped mounting tab, or a split elongated body pin.

23. The apparatus of claim 19, wherein the electrical junction box further comprises a plurality of walls forming an opening, wherein each wall comprises a respective at least two spaced-apart holes, wherein the holes are sized and shaped to receive the at least two corresponding spaced-apart mounting devices.

24. The apparatus of claim 19, wherein the electrical junction box is made using a folded-wall manufacturing process.

* * * * *